United States Patent
Fukui et al.

[11] Patent Number: 5,920,563
[45] Date of Patent: Jul. 6, 1999

[54] SYNCHRONOUS TRANSFER MODE/ASYNCHRONOUS TRANSFER MODE CONVERTING TRANSMISSION PATH TERMINATING APPARATUS

[75] Inventors: Satoshi Fukui; Toshikazu Ota; Hiroyuki Shimono; Masami Hashizume; Toshiharu Sakai, all of Osaka; Tomoyuki Yamaguchi, Kawasaki, all of Japan

[73] Assignee: Fujitsu Limited, Kanagawa, Japan

[21] Appl. No.: 08/790,216

[22] Filed: Feb. 1, 1997

[30] Foreign Application Priority Data

Feb. 7, 1996 [JP] Japan .................................. 8-021522

[51] Int. Cl.⁶ .................................................. H04L 12/56
[52] U.S. Cl. ........................................... 370/395; 370/412
[58] Field of Search .................................... 370/242, 244, 370/248, 250, 352, 355, 395, 397, 465, 412, 466, 907, 375, 516, 517, 474, 409, 371, 372

[56] References Cited

U.S. PATENT DOCUMENTS

| | | | |
|---|---|---|---|
| 5,341,376 | 8/1994 | Yamashita | 370/466 |
| 5,428,609 | 6/1995 | Eng et al. | 370/392 |
| 5,623,491 | 4/1997 | Skoog | 370/397 |

FOREIGN PATENT DOCUMENTS 5-7219  1/1993  Japan .
7-177116 7/1995  Japan .

Primary Examiner—Chi H. Pham
Assistant Examiner—Kim T. Nguyen
Attorney, Agent, or Firm—Helfgott & Karas, P.C.

[57] ABSTRACT

In a synchronous transfer mode/asynchronous transfer mode converting transmission path terminating apparatus, a receive synchronous transfer mode processing unit has an out of synchronization detecting unit for detecting out of synchronization information, and an asynchronous transfer mode cell extracting unit has an asynchronous transfer mode cell synchronizing unit for forcibly outputting a signal representing out of synchronization when receiving the out of synchronization information from the out of synchronization detecting unit, an asynchronous transfer mode cell discard judging unit for forcibly outputting a cell discard signal when receiving the out of synchronization information from the out of synchronization detecting unit, and a storage write controlling unit for forcibly inhibiting an asynchronous transfer mode cell from being written in a storage unit when receiving the out of synchronization information from the out of synchronization detecting unit, thereby always capturing accurate data (cells) to continue a process even immediately after generation of an alarm such as an SEF signal, besides transferring error information used to accurately switch a transmission path so as to prevent unnecessary switching of the transmission path.

17 Claims, 70 Drawing Sheets

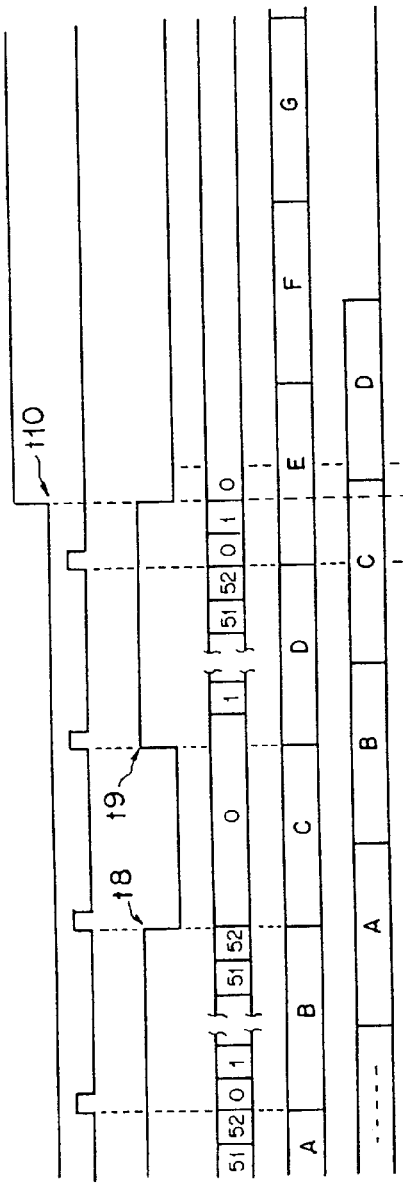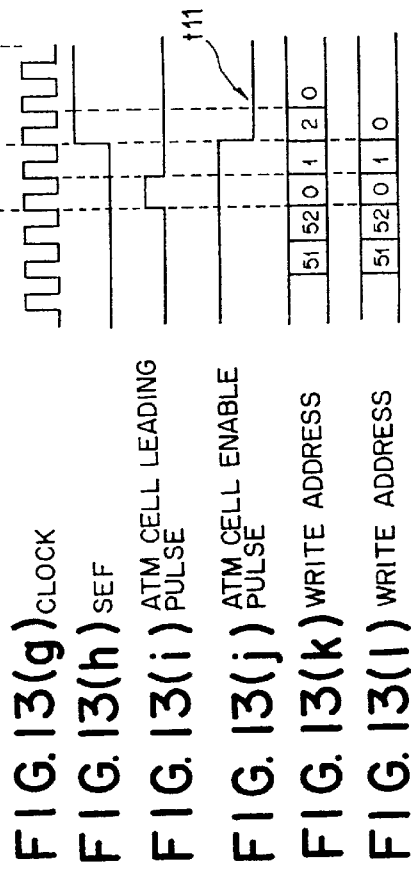
FIG.13(a) SEF
FIG.13(b) ATM CELL LEADING PULSE
FIG.13(c) ATM CELL ENABLE PULSE
FIG.13(d) WRITE ADDRESS
FIG.13(e) WRITE DATA
FIG.13(f) READ DATA
FIG.13(g) CLOCK
FIG.13(h) SEF
FIG.13(i) ATM CELL LEADING PULSE
FIG.13(j) ATM CELL ENABLE PULSE
FIG.13(k) WRITE ADDRESS
FIG.13(l) WRITE ADDRESS

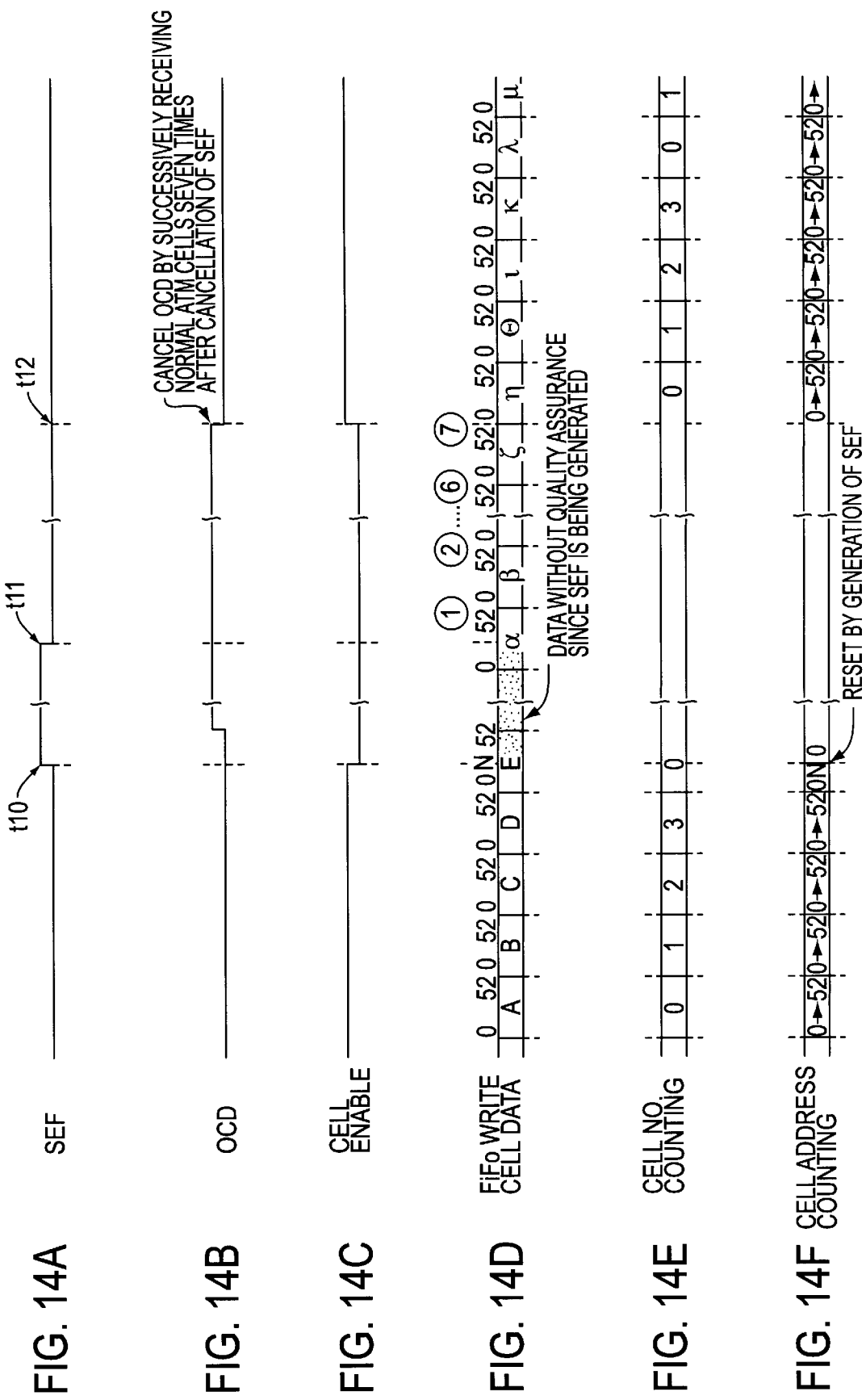

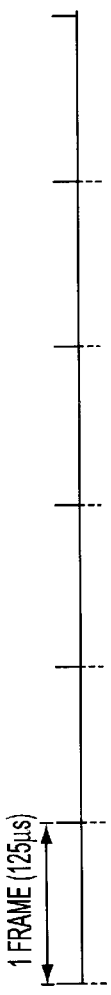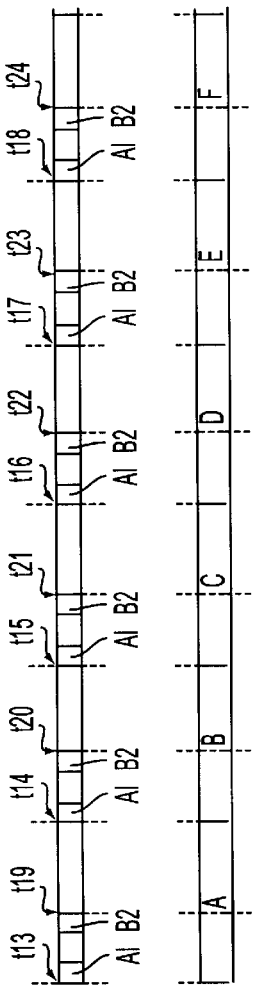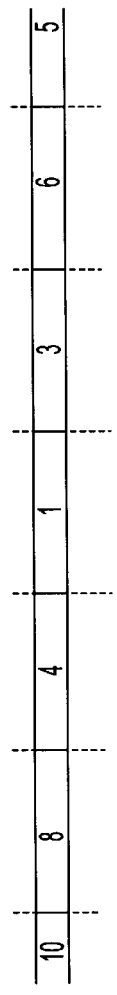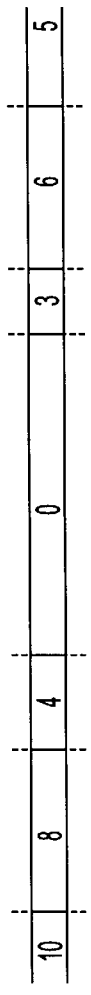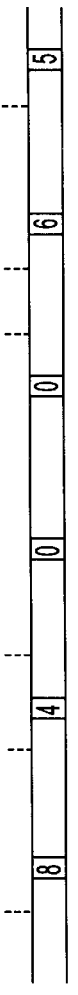
FIG. 18A  FRAME TIMING
FIG. 18B  RECEIVE SIGNAL ON THE TRANSMISSION PATH SIDE
FIG. 18C  B2 PARITY ARITHMETIC OPERATION RESULT
FIG. 18D  L-FEBE HOLDING REGISTER
FIG. 18E  SEF
FIG. 18F  L-FEBE DATA
FIG. 18G  TRANSMIT SIGNAL ON THE TRANSMISSION PATH SIDE

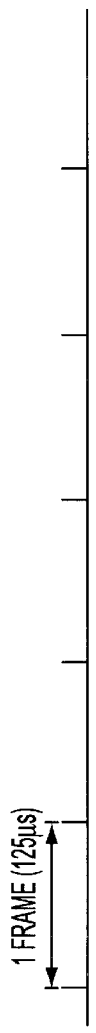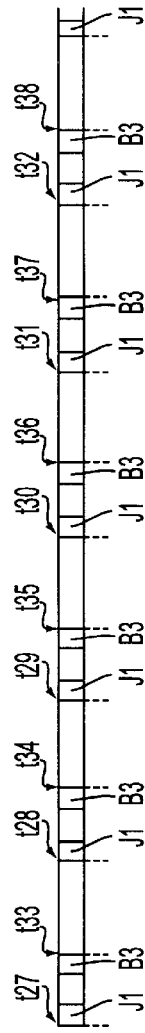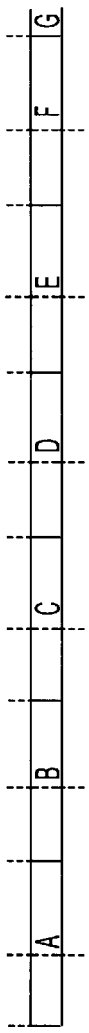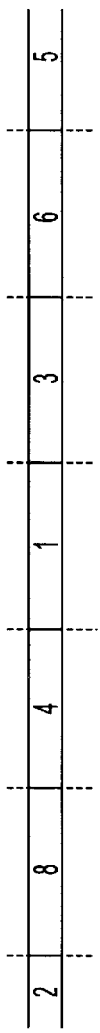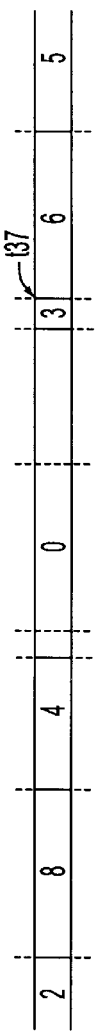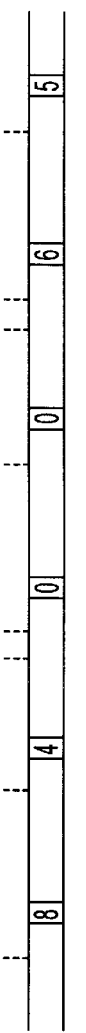
FIG. 26A  FRAME TIMING
FIG. 26B  RECEIVE SIGNAL ON THE TRANSMISSION PATH SIDE
FIG. 26C  B3 PARITY ARITHMETIC OPERATION RESULT
FIG. 26D  P-FEBE HOLDING REGISTER
FIG. 26E  SEF
FIG. 26F  P-FEBE DATA
FIG. 26G  TRANSMIT SIGNAL ON THE TRANSMISSION PATH SIDE

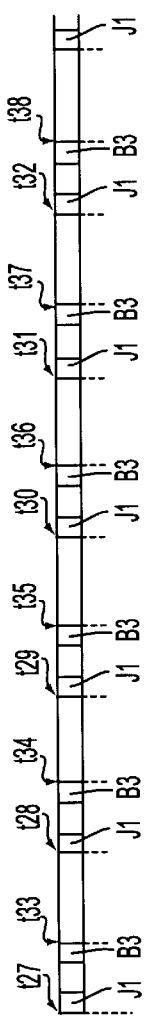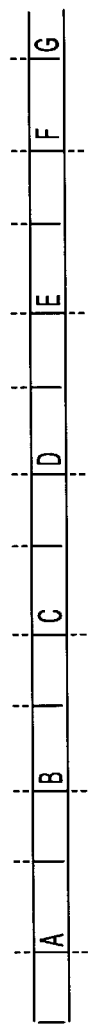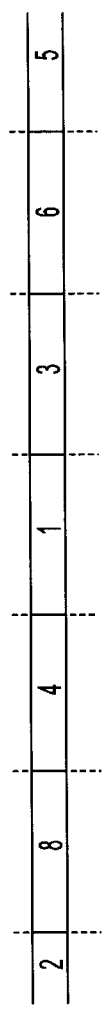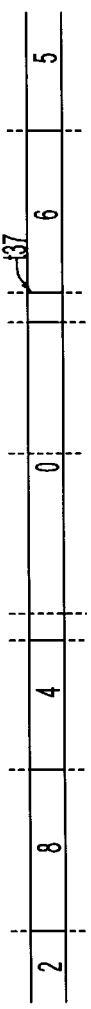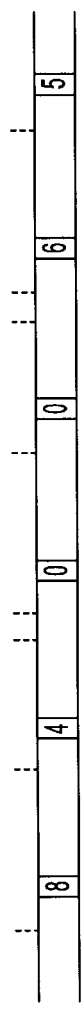
FIG. 28A  FRAME TIMING
FIG. 28B  RECEIVE SIGNAL ON THE TRANSMISSION PATH SIDE
FIG. 28C  B3 PARITY ARITHMETIC OPERATION RESULT
FIG. 28D  P-FEBE HOLDING REGISTER
FIG. 28E  SEF
FIG. 28F  P-FEBE DATA
FIG. 28G  TRANSMIT SIGNAL ON THE TRANSMISSION PATH SIDE

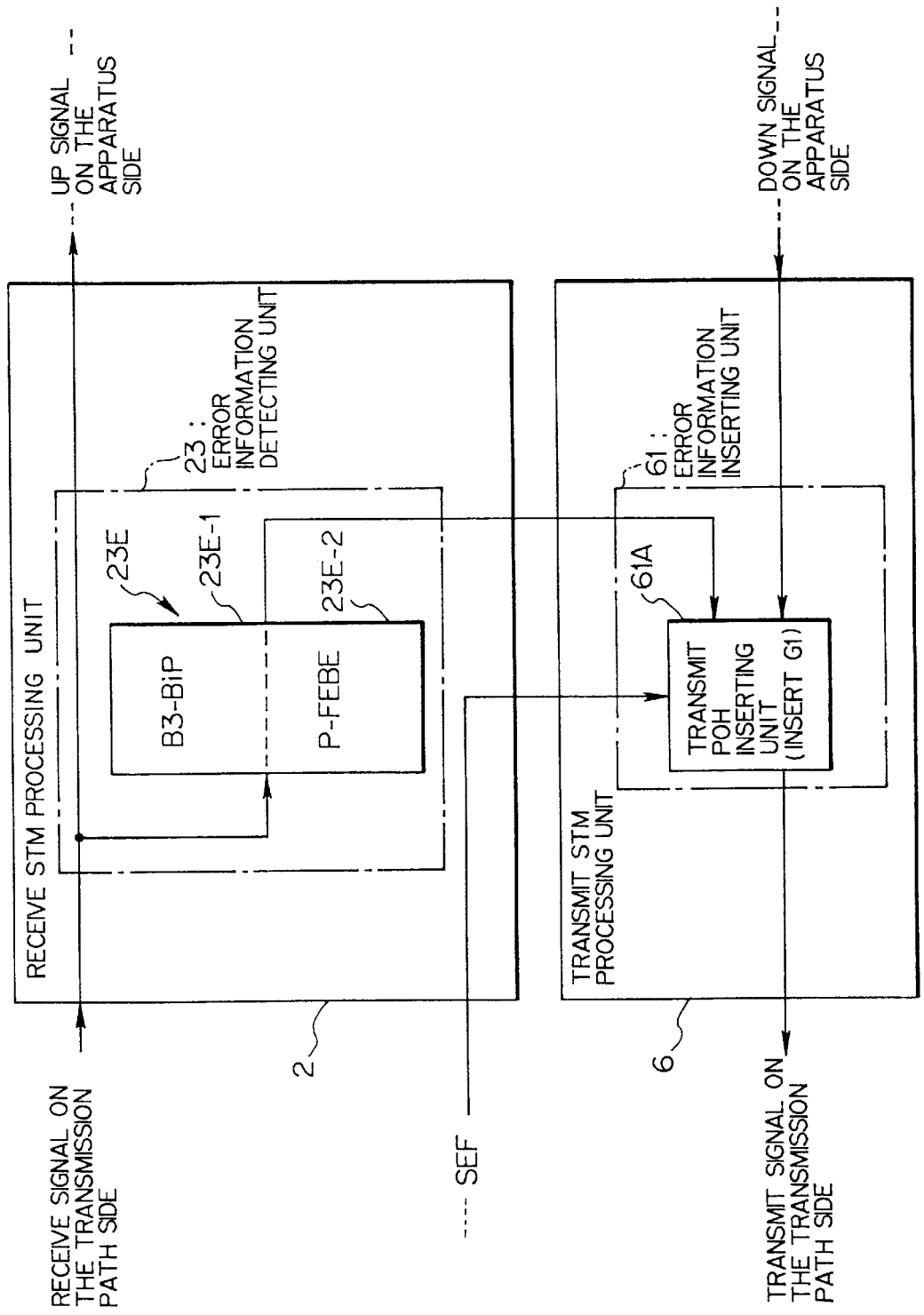

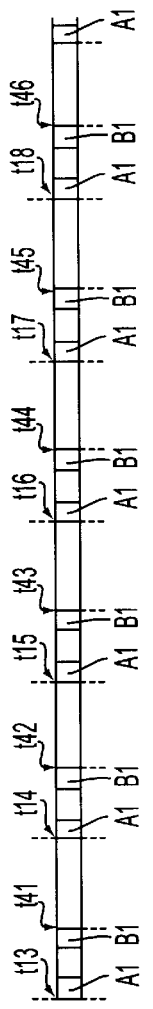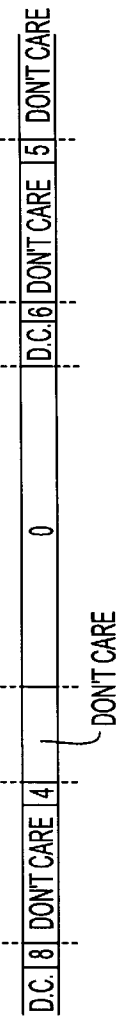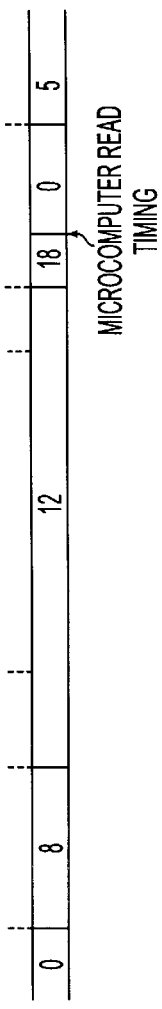
FIG. 34A  FRAME TIMING
FIG. 34B  RECEIVE SIGNAL ON THE TRANSMISSION PATH SIDE
FIG. 34C  B1 PARITY ARITHMETIC OPERATION RESULT
FIG. 34D  B1 PARITY ERROR
FIG. 34E  SEF
FIG. 34F  B1 PARITY ERROR (AFTER SEF MASKING)
FIG. 34G  B1 PERFORMANCE MONITOR

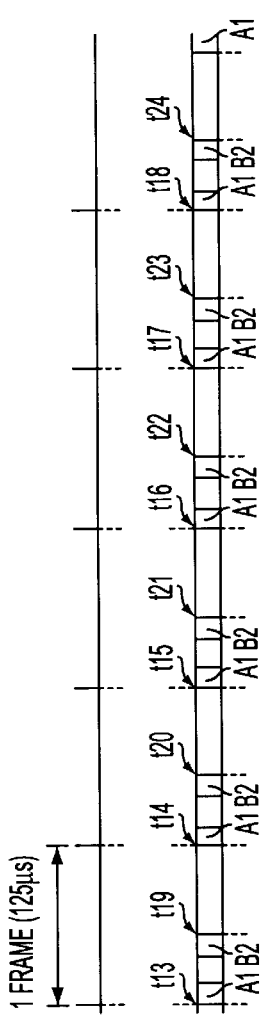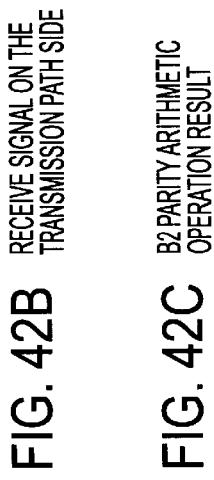
FIG. 42A  FRAME TIMING
FIG. 42B  RECEIVE SIGNAL ON THE TRANSMISSION PATH SIDE
FIG. 42C  B2 PARITY ARITHMETIC OPERATION RESULT
FIG. 42D  B2 PARITY ERROR
FIG. 42E  SEF
FIG. 42F  B2 PARITY ERROR (AFTER SEF MASKING)
FIG. 42G  B2 PERFORMANCE MONITOR

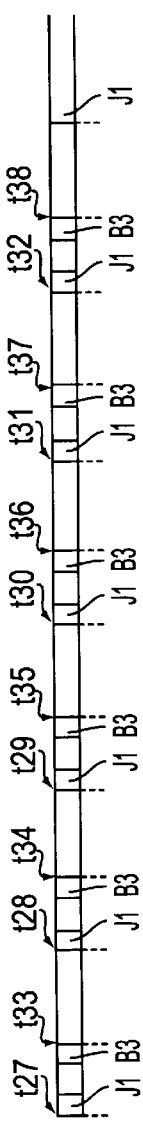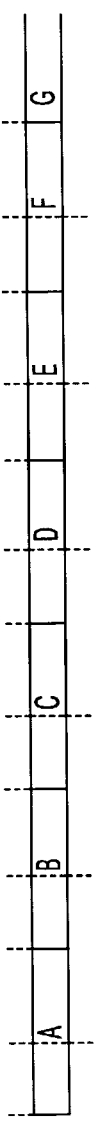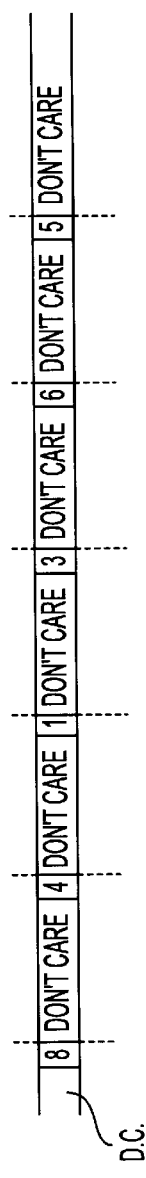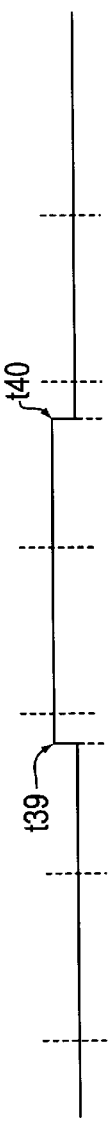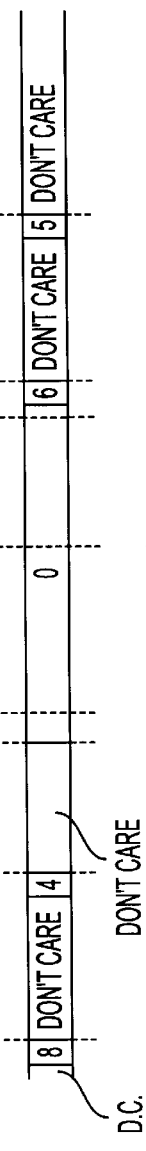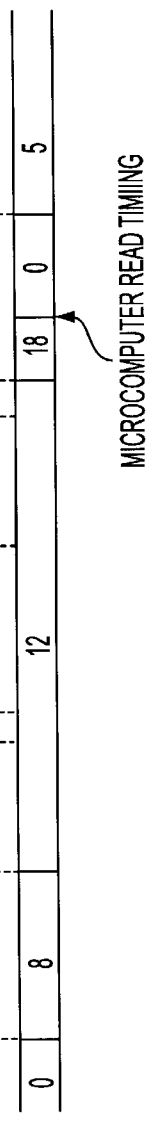
FIG. 52A  FRAME TIMING
FIG. 52B  RECEIVE SIGNAL ON THE TRANSMISSION PATH SIDE
FIG. 52C  B3 PARITY ARITHMETIC OPERATION RESULT
FIG. 52D  B3 PARITY ERROR
FIG. 52E  SEF
FIG. 52F  B3 PARITY ERROR (AFTER SEF MASKING)
FIG. 52G  TRANSMIT SIGNAL ON THE TRANSMISSION PATH SIDE

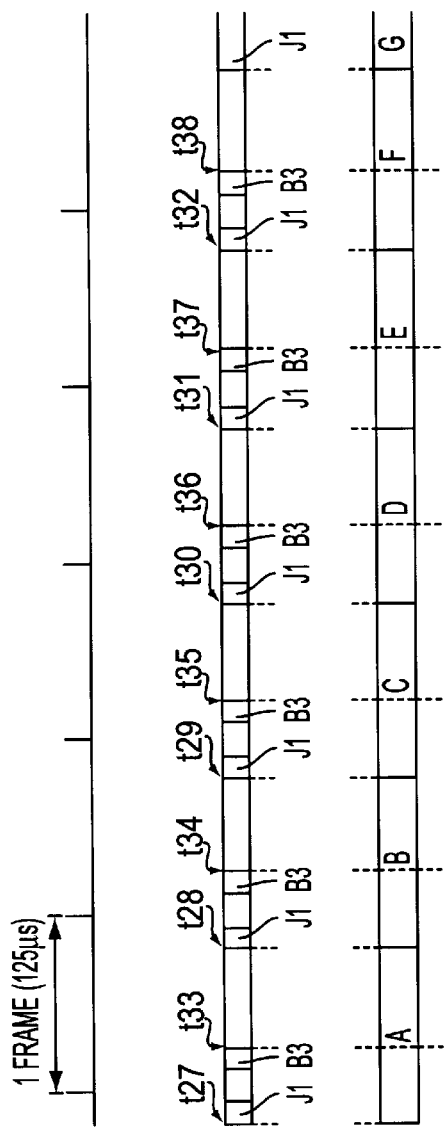
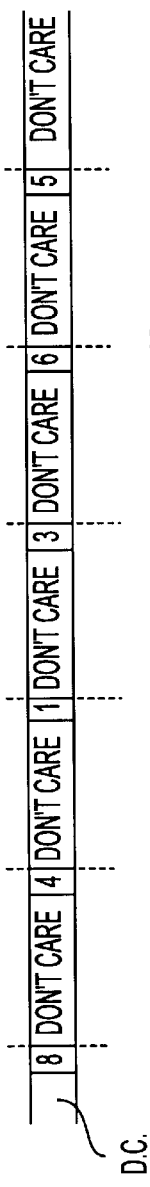
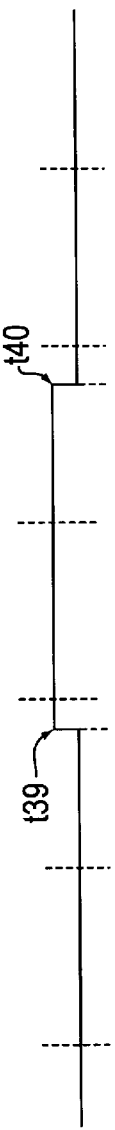
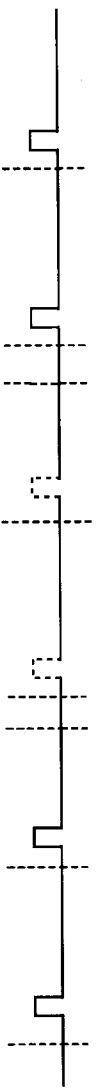
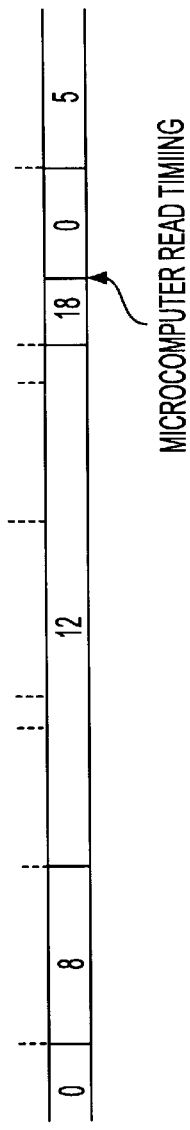
FIG. 55A  FRAME TIMING
FIG. 55B  RECEIVE SIGNAL ON THE TRANSMISSION PATH SIDE
FIG. 55C  B3 PARITY ARITHMETIC OPERATION RESULT
FIG. 55D  B3 PARITY ERROR
FIG. 55E  SEF
FIG. 55F  G1 TIMING
FIG. 55G  TRANSMIT SIGNAL ON THE TRANSMISSION PATH SIDE

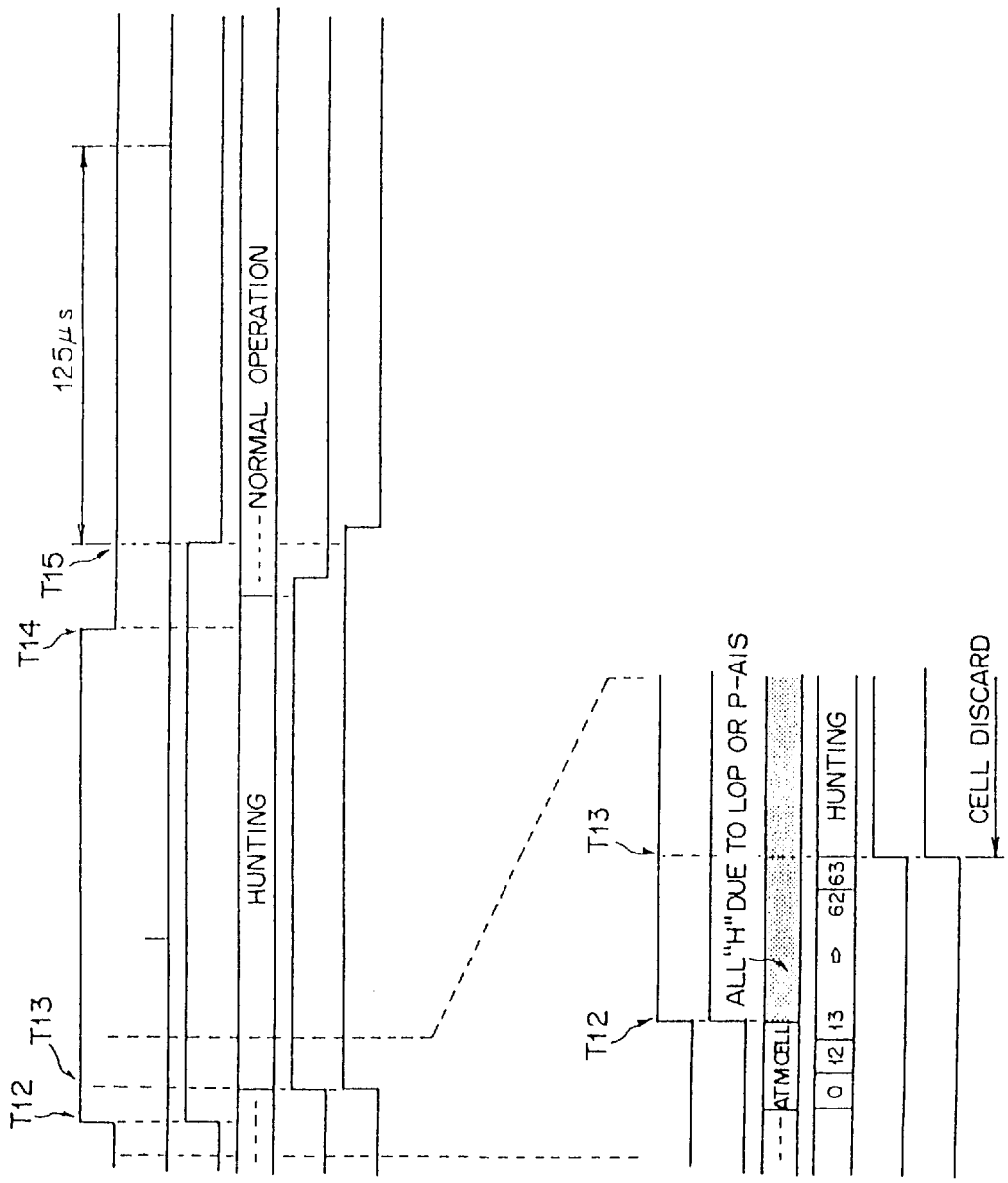

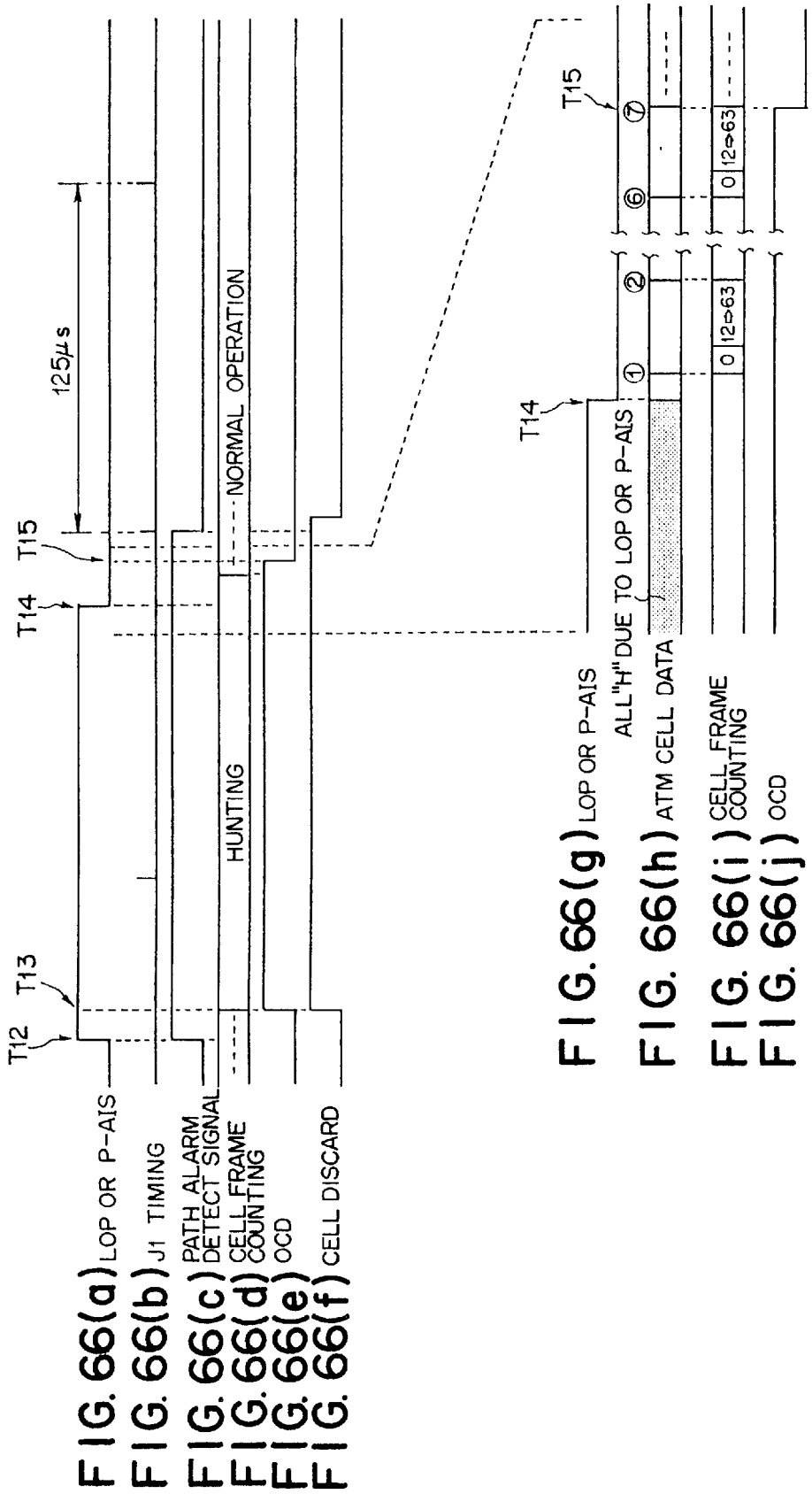

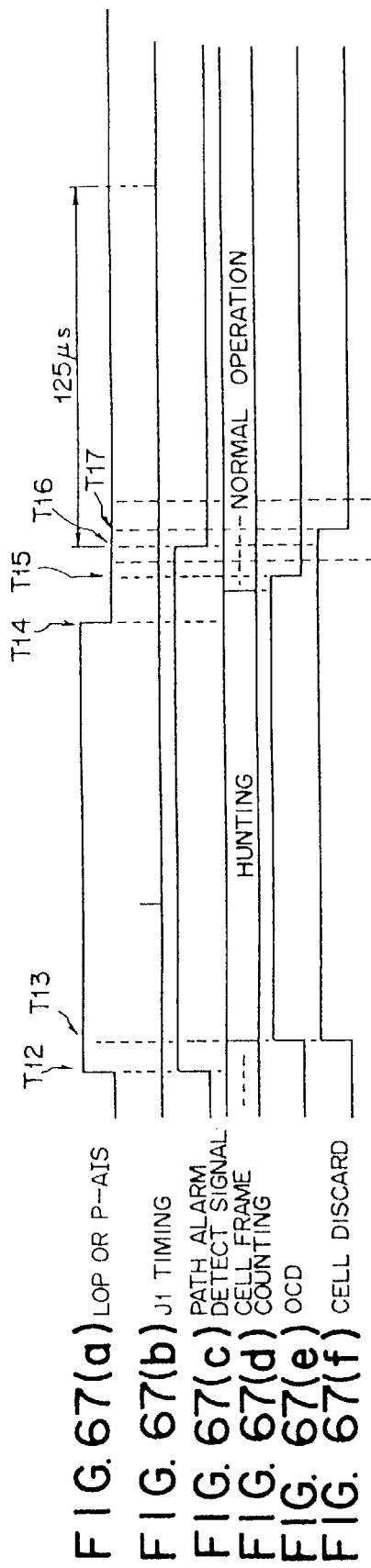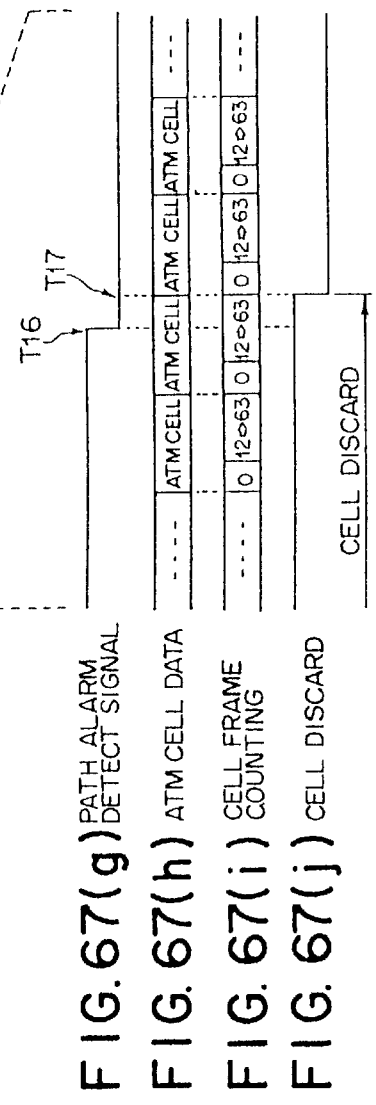

SYNCHRONOUS TRANSFER MODE/ ASYNCHRONOUS TRANSFER MODE CONVERTING TRANSMISSION PATH TERMINATING APPARATUS

BACKGROUND OF THE INVENTION (1) Field of the Invention

The present invention relates to a synchronous transfer mode/asynchronous transfer mode converting transmission path terminating apparatus.

(2) Description of the Related Art

In B-ISDN being rapidly spreading in recent years, asynchronous transfer mode (ATM) having overcome a limitation of the technique of synchronous transfer mode (STM) such as circuit mode, packet mode and the like is standardized on the recommendation of ITU-T as a data transfer technique in the next generation in order to meet various needs of the users.

With this, high-function and high-performance are required for a synchronous transfer mode (STM)/ asynchronous transfer mode (ATM) converting transmission path terminating apparatus which terminates a transmission path in an SDH (Synchronous Digital Hierarchy) network complying with ATM in these years.

FIG. 68 is a block diagram showing an STM/ATM converting transmission path terminating apparatus. As shown in FIG. 68, the STM/ATM converting transmission path terminating apparatus (hereinafter, simply referred as a terminating apparatus) 1 has a receive STM processing unit 2, an ATM cell extracting unit 3, an ATM switch (an ATM-SW) 4, an ATM cell inserting unit 5, and a transmit STM processing unit 6. Incidentally, reference numeral 7 denotes a subscriber's terminal.

The receive STM processing unit 2 receives an STM signal sent from an STM transmission path, and conducts necessary processes such as to guard synchronization of the STM signal (a frame) or supervise a state of the transmission path (a fault or the like on the transmission path) on the basis of overhead information such as a section overhead (SOH), a path overhead (POH) and the like included in the STM signal. If the receive STM processing unit 2 detects out of synchronization of the STM frame, the STM/ATM converting transmission path terminating apparatus 1 generates and outputs an SEF (Severely Errored Frame) signal representing out of synchronization.

The above STM frame has, in general, a section overhead 8, a path overhead 9 and a payload (an information field) 10 as-shown in FIG. 69(a), for example. These parts constitute one frame, and nine frames (9 Rows) are transmitted per 125μsec.

In concrete, in one frame of the STM frame (at a transmission rate of 51.84 Mb/s, for example), the section overhead 8 accommodates overhead information (A1, A2, C1 and the like) in 9 rows (9 Rows)×3 lines (3 bytes) and of 27 sorts, the pass overhead 9 accommodates overhead information (J1, B3, C2 and the like) of 9 sorts (in 9 rows×1 line), and ATM cells 11 each for the subscriber's terminal 7 are appropriately mapped (accommodated) in the payload 10.

In the section overhead 8, A1 and A2 are frame pattern bytes used for synchronization of the STM frame, C1 is a byte representing an identification number of the STM frame, B1 is a byte used to supervise a code error in a regenerator section (between regenerators), E1 is a byte used to arrange voice in the regenerator section, F1 is a byte used to specify a fault in the regenerator section, and D1 through D3 are bytes used to communicate data in the regenerator section.

H1 through H3 are pointer bytes used to indicate a leading position of mapped data (position of J1 byte) in the payload 10, B2 is a byte used to supervise an error in a section, K1 is a byte used to control a switching system, K2 is a byte used to transfer a multiplex section (between terminal regenerator equipments), D4 through D12 are bytes used to communicate data in the multiplex section, Z1 and Z2 are spare bytes, and E2 is a byte used to arrange voice in the multiplex section.

On the other hand, in the path overhead 9, J1 is a byte used to supervise continuity of a path, B2 is a byte used to supervise an error of the path, C2 is a byte used to identify information of the path, G1 is a byte used to notify an error of a transmission path state, F2 is a byte for a channel used for maintenance, H4 is a byte used to identify a frame number (i.e., to identify the lead of the ATM cell 11), and Z3 through Z5 are spare bytes.

The above ATM cell 11 has, as shown in FIG. 69(b), a format totaled 53 bytes configured with a header portion 11a of 5 bytes consisting of own transfer destination information and the like and a data portion (information field) 11b of 48 bytes (384 bits). In the header portion. 11a, there are prepared various fields such as a generic flow control (GFC), a virtual path identifier (VPI), a virtual channel identifier (VCI), a payload type (PT), a cell loss priority (CLP), and a header error control (HEC).

Incidentally, the general flow control (GFC) is a field prepared to avoid collision of the ATM cell 11 send from each of the subscriber's terminal 7 on an interface. The virtual path identifier (VPI) and the virtual channel identifier (VCI) are fields in which number information used to discriminate transfer routes (VP and VC) are accommodated. The payload type (PT) is a field in which information used to discriminate whether data accommodated in the data portion 11b is user information or control information is accommodated. The cell loss priority (CLP) is a field in which information showing transfer priority as to whether the ATM cell 11 can be lost or not is accommodated. The header error control (HEC) is a field used to detect an error in the header portion 11a or synchronization of the ATM cell 11, in which a CRC (Cyclic Redundancy Check) code is written.

In FIG. 68, the ATM cell extracting unit 3 extracts the ATM cell 11 mapped in the payload 10 as described above with reference to FIG. 69(b) on the basis of the section overhead 8 and the path overhead 9 of the STM frame having been processed in the above receive STM processing unit 2. The ATM switch 4 conducts a switching process between each of the subscriber's terminals 7 and another terminating apparatus 1 based on the header unit 11a (VPI and VCI, particularly) of the ATM cell 11 extracted by the ATM cell extracting unit 3.

The ATM cell inserting unit 5 successively inserts the ATM cell 11 sent from each of the subscriber's terminals into a signal fed from the ATM switch 4. The transmit STM processing unit 6 conducts a necessary process such as to successively insert various overhead information for the section overhead 8 and the path overhead 9 into a signal (ATM cells) fed from the ATM cell inserting unit 5, thereby forming an STM frame having the format described above with reference to FIG. 69(b), and transmits the STM frame to the STM transmission path.

With the above structure, the terminating apparatus 1 can convert ATM cells 11 each from the subscriber's terminal 7 into a STM frame having a high transmission rate to transfer it at a high rate to another terminating apparatus 1, or extracts plural ATM cells 11 from a STM frame sent from another terminating apparatus 1 to transmit each of them to a corresponding subscriber's terminal apparatus 7 on the basis of the transfer destination information (VPI and VCI) in the header portion 11a.

In the terminating apparatus 1 as above, synchronization guard in a necessary number of stages is conducted on an ATM cell 11 mapped in the payload 10 of the STM frame when the ATM cell extracting unit 3 extracts the ATM cell 11. This synchronization guard is conducted irrespectively of a state of frame synchronization of the STM frame.

For this, if the receive STM processing unit 2 detects out of synchronization of the STM frame and the SEF signal is thus generated in the terminating apparatus 1 on the receiving side, the ATM extracting unit 3 judges that synchronization of the ATM cell 11 which is now being written in an internal storage (a FIFO storage, for example) has been established and has no header error. In consequence, the STM frame might be captured in the terminating apparatus 1 as it is although a signal quality of the STM frame is not assured.

If the receive STM processing unit 2 detects normally the frame pattern [A1 and A2 bytes: refer to FIG. 69(b) ] of the STM frame even once (that is, the synchronization guard in one stage) after the SEF signal has been generated, an STM frame counting process inside the receive STM processing unit 2 becomes a normal operation. For this, the synchronization guarding process on the ATM cell 11 within the ATM cell extracting unit 3 becomes a normal operating state even under a state where the SEF signal is generated.

In consequence, synchronization of the ATM cell 11 is established before synchronization of the STM frame is established and generation of the SEF signal is stopped. In this case, the ATM cell 11 might be captured into the terminating apparatus 11 although a signal quality of the STM frame is not assured, as well.

In the terminating apparatus 1, if the receive STM processing unit 2 cannot normally detect pointer bytes H1 through H3 (bytes indicating a position of the J1 byte in the STM frame) included in the section overhead 8 of the STM frame or detect that a fault or the like has occurred in the STM transmission path, LOP (Loss of pointer) or a path-alarm indication signal (P-AIS) is generated. When these alarm signals are cancelled, a main signal (the STM frame) instantaneously becomes a normal signal from the alarm signal so that the ATM cell 11 is captured into the terminating apparatus 1 only if cell synchronization is established in the ATM cell extracting unit 3.

However, since the path overhead 9 while the receive STM processing unit 2 detected the first J1 byte [refer to FIG. 69(b)] after cancellation of the LOP and P-AIS is not detected in an accurate position timing, the ATM cell 11 which might have a header error is captured into the terminating apparatus 1 during a period from an alarm cancel timing to detection of the first J1 byte.

In the terminating apparatus 1, the receive STM processing unit 2 next conducts, in general, a parity arithmetic operation using the B2 byte and B3 byte [refer to FIG. 69(b)] included in the section overhead 8, and a result of the arithmetic operation is transferred as line far end block error information (L-FEBE) and path far end block error information (P-FEBE) which are information used for supervision in order to switch a transmission path according to a state of the STM transmission path to the terminating apparatus which is a transmission source of the STM frame through the transmission STM processing unit 6.

The process of transferring the L-FEBE and P-FEBE in the terminating apparatus 1 might transfer an erroneous result of the arithmetic operation since the STM frame is out of synchronization when the SEF signal is generated in the receive STM processing unit 2, which leads to unnecessary switching of the STM transmission path.

The above terminating apparatus 1 can also supervise and count a result of the parity arithmetic operation on any bit among the B1 byte through B3 byte in an interfacing process such as a performance monitoring or the like so as to switch the STM transmission path according to the count value. In such case, an erroneous result of the arithmetic operation might be counted since the STM frame is out of synchronization when the SEF signal is generated in the receive STM processing unit 2 so that the STM transmission path is unnecessarily switched as a result.

SUMMARY OF THE INVENTION

In the light of the above problems, an object of the present invention is to provide a synchronous transfer mode/asynchronous transfer mode converting transmission path terminating apparatus which can always continue a process on the basis of accurate data by stopping capture of data (a cell) if an alarm such as an SEF signal or the like is generated, and transfer accurate error information used to switch a transmission path to prevent unnecessary switching of the transmission path.

The present invention therefore provides a synchronous transfer mode/asynchronous transfer mode converting transmission path terminating apparatus for terminating a synchronous transfer mode transmission path to conduct a switching process in an asynchronous transfer mode comprising a receive synchronous transfer mode processing unit for receiving a synchronous transfer mode signal sent from the synchronous transfer mode transmission path to conduct a necessary process on overhead information included in the synchronous transfer mode signal, an asynchronous transfer mode cell extracting unit for extracting an asynchronous transfer mode cell on the basis of a signal having been undergone the process in the receive synchronous transfer mode processing unit, an asynchronous transfer mode switching unit for conducting a switching process on a signal fed from the asynchronous transfer mode cell extracting unit, an asynchronous transfer mode cell inserting unit for inserting a synchronous transfer mode cell into a signal fed from the asynchronous transfer mode switching unit, a transmit synchronous transfer mode processing unit for conducting a necessary process on the overhead information of a signal fed from the asynchronous transfer mode cell inserting unit to transmit the synchronous transfer mode signal to the synchronous transfer mode transmission path or another synchronous transfer mode transmission path, the receive synchronous transfer mode processing unit comprising an out of synchronization detecting unit for detecting out of synchronization information from the received synchronous transfer mode signal, the asynchronous transfer mode cell extracting unit comprising a header error information arithmetically operating unit for determining header error information of the asynchronous transfer mode cell through an arithmetic operation, an asynchronous transfer mode cell synchronizing unit for judging a synchronous state of the received synchronous transfer mode signal on the basis of the header error information fed from the header error information arithmetically operating unit, besides forcibly outputting a signal representing that the received synchronous transfer mode signal is out of synchronization when receiving the out of synchronization information detected by the out of synchronization detecting unit of the receive synchronous transfer mode processing unit, an asynchronous transfer mode cell discard judging receifor receiving synchronization judgement information fed from the asynchronous transfer mode cell synchronizing unit to judge whether the asynchronous transfer mode cell should be discarded or not, besides forcibly outputting a cell discard signal when receiving the out of synchronization information detected by the out of synchronization detecting unit of the receive synchronous transfer mode processing unit, a storage unit for successively storing the asynchronous transfer mode cell having synchronous transfer mode signal information received, a storage write controlling unit for conducting a control for writing the asynchronous transfer mode cell in the storage unit on the basis of outputs from the asynchronous transfer mode cell synchronizing unit and the asynchronous transfer mode cell discard judging unit, besides forcibly inhibiting the asynchronous transfer mode cell from being written in the storage unit when receiving the out of synchronization information detected by the out of synchronization detecting unit of the receive synchronous transfer mode processing unit, and a storage read controlling unit for conducting a control to read asynchronous transfer mode cell information stored in the storage unit to output it to the asynchronous transfer mode switching unit.

The synchronous transfer mode/asynchronous transfer mode converting transmission path terminating apparatus of this invention outputs a signal representing that a received synchronous transfer mode signal is out of synchronization when the out of synchronization information is detected to forcibly bring the synchronous transfer mode signal to the out of synchronization state, outputs the cell discard signal to discard an asynchronous transfer mode cell, and inhibits the asynchronous transfer mode cell from being written in the storage unit. Therefore, an asynchronous transfer mode cell lacking reliability in signal quality is not captured in the terminating apparatus so that the process can be always continued based on accurate data (synchronous transfer mode cells).

The present invention further provides a synchronous transfer mode/asynchronous transfer mode converting transmission path terminating apparatus for terminating a synchronous transfer mode transmission path to conduct a switching process in an asynchronous transfer mode comprising a receive synchronous transfer mode processing unit for receiving a synchronous transfer mode signal sent from the synchronous transfer mode transmission path to conduct a necessary process on overhead information included in the synchronous transfer mode signal, an asynchronous transfer mode cell extracting unit for extracting an asynchronous transfer mode cell on the basis of a signal having been undergone the process in the receive synchronous transfer mode processing unit, an asynchronous transfer mode switching unit for conducting a switching process on a signal fed from the asynchronous transfer mode cell extracting unit, an asynchronous transfer mode cell inserting unit for inserting a synchronous transfer mode cell into a signal fed from the asynchronous transfer mode switching unit, a transmit synchronous transfer mode processing unit for conducting a necessary process on the overhead information of a signal fed from the asynchronous transfer mode cell inserting unit to transmit the synchronous transfer mode signal to the synchronous transfer mode transmission path or another synchronous transfer mode transmission path, and the receive synchronous transfer mode processing unit comprising an out of synchronization detecting unit for detecting out of synchronization information from the received synchronous transfer mode signal, the synchronous transfer mode cell extracting unit executing at least any one among a process of forcibly judging that the received synchronous transfer mode cell is out of synchronization, a process of forcibly outputting a cell discard signal and a process of forcibly inhibiting the asynchronous transfer mode cell from being written in a storage unit.

The synchronous transfer mode/asynchronous transfer mode converting transmission path terminating apparatus of this invention can execute at least any one among a process of forcibly judging that a received transfer mode signal is out of synchronization, a process of forcibly outputting the cell discard signal and a process of forcibly inhibiting an asynchronous transfer mode cell from being written in the storage unit, thereby certainly preventing an asynchronous transfer mode cell lacking reliability in signal quality from being captured in the terminating apparatus.

The present invention still further provides a synchronous transfer mode/asynchronous transfer mode converting transmission path.terminating apparatus for terminating a synchronous transfer mode transmission path to conduct a switching process in an asynchronous transfer mode comprising a receive synchronous transfer mode processing unit for receiving a synchronous transfer mode signal sent from the synchronous transfer mode transmission path to conduct a necessary process on overhead information included in the synchronous transfer mode signal, an asynchronous transfer mode cell extracting unit for extracting an asynchronous transfer mode cell on the basis of a signal having been undergone the process in the receive synchronous transfer mode processing unit, an asynchronous transfer mode switching unit for conducting a switching process on a signal fed from the asynchronous transfer mode cell extracting unit, an asynchronous transfer mode cell inserting unit for innserting a synchronous transfer mode cell into a signal fed from the asynchronous transfer mode switching unit, a transmit synchronous transfer mode processing unit for conducting a necessary process on the overhead information of a signal fed from the asynchronous transfer mode cell inserting unit to transmit the synchronous transfer mode signal to the synchronous transfer mode transmission path, the receive synchronous transfer mode processing unit comprising an out of synchronization detecting unit for detecting out of synchronization information from the received synchronous transfer mode signal and a receive pointer processing unit for conducting a necessary process on pointer information of the overhead information of the received synchronous transfer mode signal besides outputting an alarm signal on the basis of the out of synchronization information detected by the out of synchronization detecting unit, the asynchronous transfer mode cell extracting unit comprising a header error information arithmetically operating unit for determining header error information of the asynchronous transfer mode cell through an arithmetic operation, an asynchronous transfer mode cell synchronizing unit for judging a synchronous state of the received synchronous transfer mode signal on the basis of the header error information fed from the header error information arithmetically operating unit besides forcibly outputting a signal representing that the received synchronous transfer mode signal is out of synchronization when receiving the alarm signal from the receive pointer processing unit of the receive synchronous transfer mode processing unit, an asynchronous transfer mode cell discard judging unit for receiving synchronization judgement information fed from the asynchronous transfer mode cell synchronizing unit to judge whether the asynchronous transfer mode cell should be discarded or not besides forcibly outputting a cell discard signal when receiving the alarm signal from the receive pointer processing unit of the receive synchronous transfer mode processing unit, a storage unit for successively storing the asynchronous transfer mode cell having synchronous transfer mode signal information received, a storage write controlling unit for conducting a control to write the asynchronous transfer mode cell in the storage unit on the basis of outputs from the asynchronous transfer mode cell synchronizing unit and the asynchronous transfer mode cell discard judging unit, and a storage read controlling unit for conducting a control to read asynchronous transfer mode cell information stored in the storage unit to output it to the asynchronous transfer mode switching unit.

The synchronous transfer mode/asynchronous transfer mode converting transmission path terminating apparatus according to this invention outputs the alarm signal from the receive pointer processing unit on the basis of the out of synchronization information when out of synchronization of a synchronous transfer mode signal is detected to forcibly bring the synchronous transfer mode signal to the out of synchronization state by the alarm signal, besides being able to discard an asynchronous transfer mode cell extracted from the synchronous transfer mode signal in the out of synchronization state. In this case, an asynchronous transfer mode cell lacking reliability in signal quality is not captured in the terminating apparatus so that it is possible to continue the process any time on the basis of accurate data (asynchronous transfer mode cells).

The present invention still further provides a synchronous transfer mode/asynchronous transfer mode converting transmission path terminating apparatus for terminating a synchronous transfer mode transmission path to conduct a switching process in an asynchronous transfer mode comprising a receive synchronous transfer mode processing unit for receiving a synchronous transfer mode signal sent from the synchronous transfer mode transmission path to conduct a necessary process on overhead information included in.the synchronous transfer mode signal, an asynchronous transfer mode cell extracting unit for extracting an asynchronous transfer mode cell on the basis of a signal having been undergone the process in the receive synchronous transfer mode processing unit, an asynchronous transfer mode switching unit for conducting a switching process on a signal fed from the asynchronous transfer mode cell extracting unit, an asynchronous transfer mode cell inserting unit for inserting a synchronous transfer mode cell into a signal fed from the asynchronous transfer mode switching unit, a transmit synchronous transfer mode processing unit for conducting a necessary process on the overhead information of a signal fed from the asynchronous transfer mode cell inserting unit to transmit a synchronous transfer mode signal to the synchronous transfer mode transmission path or another synchronous transfer mode transmission path, the receive synchronous transfer mode processing unit comprising an out of synchronization detecting unit for detecting out of synchronization information from the received synchronous transfer mode signal and a receive pointer processing unit for conducting a necessary process on pointer information of the overhead information of the received synchronous transfer mode signal besides outputting an alarm signal on the basis of the out of synchronization information detected by the out of synchronization detecting unit, and the asynchronous transfer mode cell extracting unit executing at least either a process of forcibly judging that the received synchronous transfer mode signal is out of synchronization or a process of forcibly outputting a cell discard signal when receiving the alarm signal from the receive pointer processing unit of the receive synchronous transfer mode processing unit.

In the synchronous transfer mode/asynchronous transfer mode converting transmission path terminating apparatus according to this invention, the asynchronous transfer mode cell extracting unit can execute either a process of forcibly judging that a received synchronous transfer mode signal is out of synchronization or a process of forcibly outputting the cell discard signal when receiving the alarm signal from the receive pointer processing unit of the receive synchronous transfer mode processing unit, thereby preventing an asynchronous transfer mode cell lacking reliability in signal quality from being captured in the terminating apparatus.

The present invention still further provides a synchronous transfer mode/asynchronous transfer mode converting transmission path terminating apparatus for terminating a synchronous transfer mode transmission path to conduct a switching process in an asynchronous transfer mode comprising a receive synchronous transfer mode processing unit for receiving a synchronous transfer mode signal sent from the synchronous transfer mode transmission path to conduct a necessary process on overhead information included in the synchronous transfer mode signal, an asynchronous transfer mode cell extracting unit for extracting an asynchronous transfer mode cell on the basis of a signal having been undergone the process in the receive synchronous transfer mode processing unit, an asynchronous transfer mode switching unit for conducting a switching process on a signal fed from the asynchronous transfer mode cell extracting unit, an asynchronous transfer mode cell inserting unit for inserting a synchronous transfer mode cell into a signal fed from the asynchronous transfer mode switching unit, a transmit synchronous transfer mode processing unit for conducting a necessary process on the overhead information of a signal fed from the asynchronous transfer mode cell inserting unit to transmit the synchronous transfer mode signal to the synchronous transfer mode transmission path or another synchronous transfer mode transmission path, the receive synchronous transfer mode processing unit comprising an out of synchronization detecting unit for detecting out of synchronization information from the received synchronous transfer mode signal and an error information detecting unit for detecting error information from the received synchronous transfer mode signal, and the transmit synchronous transfer mode processing unit comprising an error information inserting unit for inserting the error information fed from the error information detecting unit of the receive synchronous transfer mode processing unit to provide information used to switch a transmission path, the error information detecting unit of the receive synchronous transfer mode processing unit inhibiting transfer of the error information to the error information inserting unit of the transmit synchronous transfer mode processing unit when receiving the out of synchronization information from the out of synchronization detecting unit.

The present invention still further provides a synchronous transfer mode/asynchronous transfer mode converting transmission path terminating apparatus for terminating a synchronous transfer mode transmission path to conduct a switching process in an asynchronous transfer mode comprising a receive synchronous transfer mode processing unit for receiving a synchronous transfer mode signal sent from the synchronous transfer mode transmission path to conduct a necessary process on overhead information included in the synchronous transfer mode signal, an asynchronous transfer mode cell extracting unit for extracting an asynchronous transfer mode cell on the basis of a signal having been undergone the process in the receive synchronous transfer mode processing unit, an asynchronous transfer mode switching unit for conducting a switching process on a signal fed from the asynchronous transfer mode cell extracting unit, an asynchronous transfer mode cell inserting unit for inserting a synchronous transfer mode cell in a signal fed from the asynchronous transfer mode switching unit, a transmit synchronous transfer mode processing unit for conducting a necessary process on the overhead information of a signal fed from the asynchronous transfer mode cell inserting unit to transmit the synchronous transfer mode signal to the synchronous transfer mode transmission path or another synchronous transfer mode transmission path, and the receive synchronous transfer mode processing unit comprising an out of synchronization detecting unit for detecting out of synchronization information from the received synchronous transfer mode signal, an error information detecting unit for detecting error information from the received synchronous transfer mode signal and a monitoring unit for monitoring the error information detected by the error information detecting unit to provide information used to switch a transmission path, the error information detecting unit of the receive synchronous transfer mode processing unit inhibiting transfer of the error information to the monitoring unit when receiving the out of synchronization information from the out of synchronization detecting unit.

The present invention still further provides a synchronous transfer mode/asynchronous transfer mode converting transmission path terminating apparatus for terminating a synchronous transfer mode transmission path to conduct a switching process in an asynchronous transfer mode comprising a receive synchronous transfer mode processing unit for receiving a synchronous transfer mode signal sent from the synchronous transfer mode transmission path to conduct a necessary process on overhead information included in the synchronous transfer mode signal, an asynchronous transfer mode cell extracting unit for extracting an asynchronous transfer mode cell on the basis of a signal having been undergone the process in the receive synchronous transfer mode processing unit, an asynchronous transfer mode switching unit for conducting a switching process on a signal fed from the asynchronous transfer mode cell extracting unit, an asynchronous transfer mode cell inserting unit for inserting a synchronous transfer mode cell into a signal fed from the asynchronous transfer mode switching unit, a transmit synchronous transfer mode processing unit for conducting a necessary process on the overhead information of a signal fed from the asynchronous transfer mode cell inserting unit to transmit the synchronous transfer mode signal to the synchronous transfer mode transmission path or another synchronous transfer mode transmission path, the receive synchronous transfer mode processing unit comprising an out of synchronization detecting unit for detecting out of synchronization information from the received synchronous transfer mode signal, an error information detecting unit for detecting first error information composed of far end block error information from the received synchronous transfer mode signal and second error information composed of transmission path error information from the received synchronous transfer mode signal, and a monitoring unit for monitoring the second error information detected by the error information detecting unit to provide information used to switch a transmission path, and the transmit synchronous transfer mode processing unit comprising an error information inserting unit for inserting the first error information fed from said error information detecting unit of the receive synchronous transfer mode processing unit to provide information used to switch the transmission path, the error information detecting unit of the receive synchronous transfer mode processing unit inhibiting transfer of the first error information to the error information inserting unit of the transmit synchronous transfer mode processing unit when receiving the out of synchronization information from the out of synchronization detecting unit besides inhibiting transfer of the second error information to the monitoring unit.

In the synchronous transfer mode/asynchronous transfer mode converting transmission path terminating apparatus according to this invention, the error information detecting unit of the receive synchronous transfer mode processing unit inhibits transfer of the second error information and the first error information to the monitoring unit and the error information inserting unit. of the transmit synchronous transfer mode processing unit, respectively, thereby preventing transfer of the first error information and the second error information lacking reliability in results of the arithmetic operation obtained while a received synchronous transfer mode signal is out of synchronization so as to certainly avoid unnecessary switching of a transmission path.

BRIEF DESCRIPTION OF THE DRAWINGS

FIGS. 13(a) through 13(l) are timing charts for illustrating an operation of the FiFo writing unit in the STM/ATM converting transmission path terminating apparatus according to the first embodiment;

FIGS. 14(a) through 14(k) are timing charts for illustrating in detail the operation of the FiFo writing unit in the STM/ATM converting transmission path terminating apparatus according to the first embodiment;

FIGS. 18(a) through 18(g) are timing charts for illustrating operations of the essential parts of the error information detecting unit and the error information inserting unit in the STM/ATM converting transmission path terminating apparatus according to the first embodiment;

FIGS. 26(a) through 26(g) are timing charts for illustrating the operations of the essential parts of the error information detecting unit and the error information inserting unit in the STM/ATM converting transmission path terminating apparatus according to the first embodiment;

FIGS. 28(a) through 28(g) are timing charts for illustrating the operations of the essential parts of the error information detecting unit and the error information inserting unit in the STM/ATM converting transmission path terminating apparatus according to the first embodiment;

FIG. 29 is a block diagram showing the structures of the essential parts of the error information detecting unit and the error information inserting unit in the STM/ATM converting transmission path terminating apparatus according to the first embodiment;

FIGS. 34(a) through 34(g) are timing charts for illustrating operations of the essential part of the error information detecting unit and the performance monitor in the STM/ATM converting transmission path terminating apparatus according to the first embodiment;

FIGS. 42(a) through 42(g) are timing charts for illustrating the operations of the essential part of the error information detecting unit and the performance monitor in the STM/ATM converting transmission path terminating apparatus according to the first embodiment;

FIGS. 52(a) through 52(g) are timing charts for illustrating the operations of the essential part of the error information detecting unit and the performance monitor in the STM/ATM converting transmission path terminating apparatus according to the first embodiment;

FIGS. 55(a) through 55(g) are timing charts for illustrating the operations of the essential part of the error information detecting unit and the performance monitor in the STM/ATM converting transmission path terminating apparatus according to the first embodiment;

FIGS. 65(a) through 65(l) are timing charts for illustrating an operation of the ATM cell discard judging unit in the STM/ATM converting transmission path terminating apparatus according to the second embodiment;

FIGS. 66(a) through 66(j) are timing charts for illustrating the operation of the ATM cell discard judging unit in the STM/ATM converting transmission path terminating apparatus according to the second embodiment;

FIGS. 67(a) through 67(j) are timing charts for illustrating the operation of the ATM cell discard judging unit in the STM/ATM converting transmission path terminating apparatus according to the second embodiment;

Figure 1:
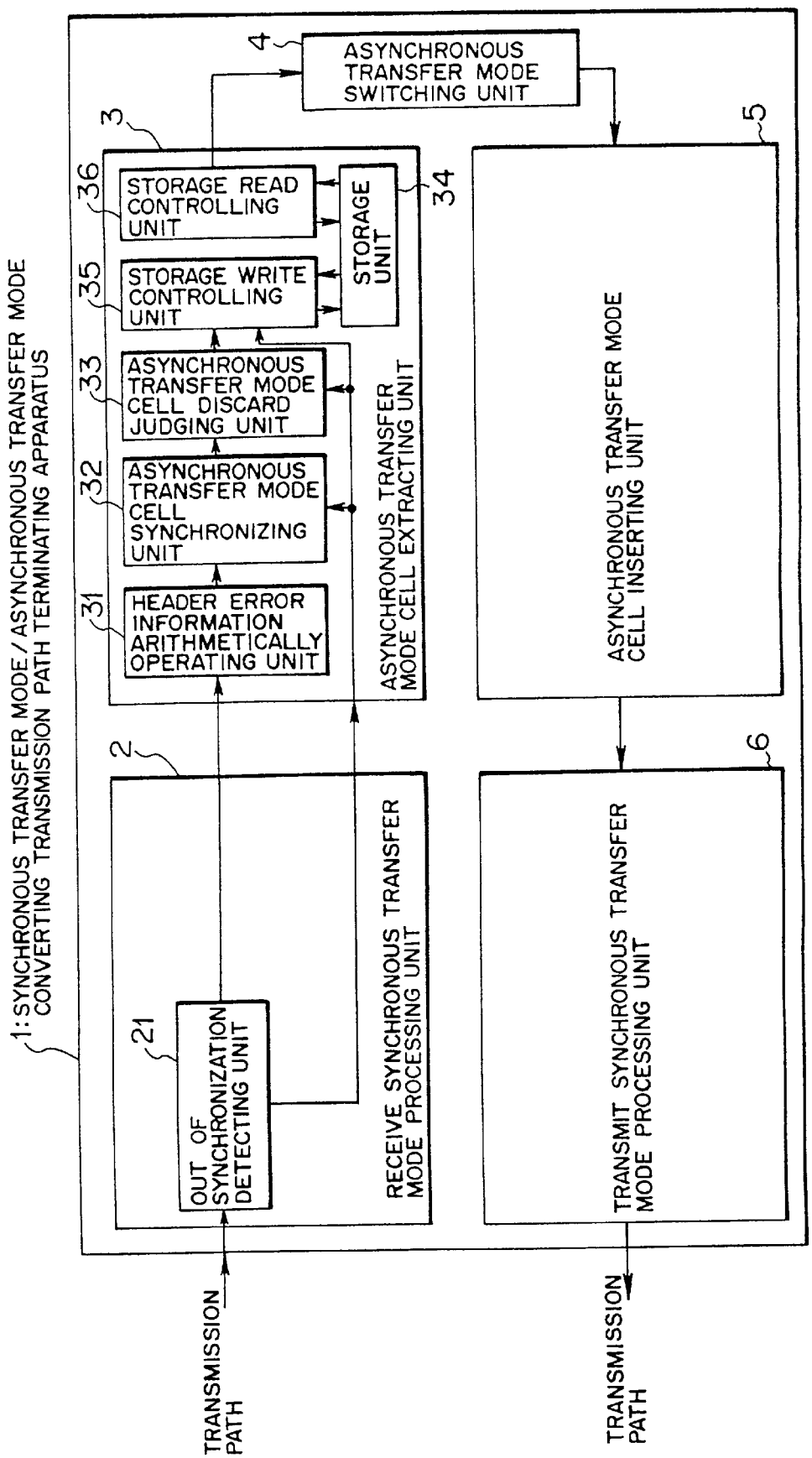
FIGS. 1 through 3 are block diagrams showing aspects of this invention.

DESCRIPTION OF THE PREFERRED EMBODIMENTS (a) Description of Aspects of the Invention Now, description will be made of aspects of the present invention referring to the drawings.

FIG. 1 is a block diagram showing an aspect of this invention. In FIG. 1, reference numeral 1 denotes a synchronous transfer mode/asynchronous transfer mode converting transmission path terminating apparatus which terminates a synchronous transfer mode transmission path to conduct a switching process in an asynchronous transfer mode. As shown in FIG. 1, the synchronous transfer mode/ asynchronous transfer mode converting transmission path terminating apparatus 1 has a receive synchronous transfer mode processing unit 2, an asynchronous transfer mode cell extracting unit 3, an asynchronous transfer mode switching unit 4, an asynchronous transfer mode cell inserting unit 5 and a transmit synchronous transfer mode processing unit 6.

The receive synchronous transfer mode processing unit 2 receives a synchronous transfer mode signal sent from a synchronous transfer mode transmission path to conduct a necessary process on overhead information included in the synchronous transfer mode signal. The asynchronous transfer mode cell extracting unit 3 extracts an asynchronous transfer mode cell on the basis of a signal having been processed in the receive synchronous transfer mode processing unit 2.

The asynchronous transfer mode switching unit 4 conducts a switching process on a signal fed from the asynchronous transfer mode cell extracting unit 3. The asynchronous transfer mode cell inserting unit 5 inserts a synchronous transfer mode cell in a signal fed from the asynchronous transfer mode switching unit 4. The transmission synchronous transfer mode processing unit 6 conducts a necessary process on overhead information of a signal fed from the asynchronous transfer mode cell inserting unit 5 to transmit the synchronous transfer mode signal to the synchronous transfer mode transmission path or another synchronous transfer mode transmission path.

As shown in FIG. 1, the receive synchronous transfer mode processing unit 2 has an out of synchronization detecting unit 21, whereas the asynchronous transfer mode cell extracting unit 3 has a header error information arithmetically operating unit 31, an asynchronous transfer mode cell synchronizing unit 32, an asynchronous transfer mode cell discard judging unit 33, a storage unit 34, a storage write controlling unit 35 and a storage read controlling unit 36.

In the receive synchronous transfer mode processing unit 2, the out of synchronization detecting unit 21 detects out of synchronization information from the received synchronous transfer mode signal. In the asynchronous transfer mode cell extracting unit 3, the header error information arithmetically operating unit 31 determines header error information of an asynchronous transfer mode cell through an arithmetic operation. The asynchronous transfer mode cell synchronizing unit 32 judges a synchronous state of the received synchronous transfer mode signal on the basis of the header error information fed from the header error information arithmetically operating unit 31, and forcibly outputs a signal representing that the received synchronous transfer mode signal is out of synchronization when receiving the out of synchronization information detected by the out of synchronization detecting unit 21 of the receive synchronous transfer mode processing unit 2.

The asynchronous transfer mode cell discard judging unit 33 receives synchronization judgement information from the asynchronous transfer mode cell synchronizing unit 32 to judge whether the asynchronous transfer mode cell should be discarded or not, besides forcibly outputting a cell discard signal when receiving the out of synchronization information detected by the out of synchronization detecting unit 21 of the receive synchronous transfer mode processing unit 2. The storage unit 34 successively stores the received asynchronous transfer mode cell having synchronous transfer mode signal information.

The storage writing controlling unit 35 conducts a control to write the asynchronous transfer mode cell in the storage unit 34 on the basis of outputs from the asynchronous transfer mode cell synchronizing unit 32 and the asynchronous transfer mode cell discard judging unit 33, besides forcibly inhibiting the asynchronous transfer mode cell from being written in the storage unit 34 when receiving the out of synchronization information detected by the out of synchronization detecting unit 21 of the receive synchronous transfer mode processing unit 2. The storage read controlling unit 36 conducts a control to read out asynchronous transfer mode cell information stored in the storage unit 34 and output it to the asynchronous transfer mode switching unit 4.

In the synchronous transfer mode/asynchronous transfer mode converting transmission path terminating apparatus (hereinafter, simply called "a terminating apparatus" occasionally) 1 of this invention with the above structure, when the out of synchronization detecting unit 21 of the receive synchronous transfer mode processing unit 2 detects the out of synchronization information, the asynchronous transfer mode cell synchronizing unit 32 in the asynchronous transfer mode cell extracting unit 3 outputs a signal representing that a received synchronous transfer mode signal is out of synchronization to forcibly bring the synchronous transfer mode signal that should be processed after that to an out of synchronization state.

At that time, the asynchronous transfer mode cell discard judging unit 33 outputs the cell discard signal thereby to discard an asynchronous transfer mode cell extracted from the synchronous transfer mode signal in the out of synchronization state, besides the storage write controlling unit 35 inhibits the asynchronous transfer mode cell from being written in the storage unit 34.

It is therefore possible to promptly prevent an asynchronous transfer mode cell in the course of a process in the asynchronous transfer mode cell extracting unit 3, that is, an asynchronous transfer mode cell having lost reliability in signal quality since out of synchronization has been detected in the received synchronous transfer mode signal, from being written in the storage unit 34 when out of synchronization is detected so as to avoid the terminating apparatus 1 from capturing the asynchronous transfer mode cell lacking reliability in signal quality.

The above synchronous transfer mode/asynchronous transfer mode converting transmission path terminating apparatus 1 outputs a signal representing that a received synchronous transfer mode signal is out of synchronization when the out of synchronization information is detected, forcibly brings the synchronous transfer mode signal to the out of synchronization state, and outputs the cell discard signal to discard an asynchronous transfer mode cell besides inhibiting the asynchronous transfer mode cell from being written in the storage unit 34, whereby the asynchronous transfer mode cell lacking reliability in signal quality is not captured in this terminating apparatus 1. It is therefore possible to always continue a processing on the basis of accurate data (asynchronous transfer mode cells).

Concretely, the above asynchronous transfer mode cell synchronizing unit 32 has a synchronization guarding unit for outputting a signal representing synchronization or out of synchronization by receiving the header error information two or more times from the header error information arithmetically operating unit 31. The synchronization guarding unit has a circuit unit for forcibly outputting a signal representing that a received synchronous transfer mode signal is out of synchronization when receiving the out of synchronization information detected by the out of synchronization detecting unit 21 of the receive synchronous transfer mode processing unit 2.

In the asynchronous transfer mode cell synchronizing unit 32, when the synchronization guarding unit receives the header error information two or more times and the received synchronous transfer mode signal is fully out of synchronization is detected, the circuit unit instantaneously outputs a signal representing that the received synchronous transfer mode signal is out of synchronization so that the synchronous transfer mode signal is forcibly brought to the out of synchronization state.

In consequence, synchronization of an asynchronous transfer mode cell received during the out of synchronization state is not established, and thus the asynchronous transfer mode cell lacking reliability in signal quality is not certainly captured in the terminating apparatus 1.

In concrete, the above asynchronous transfer mode cell discard judging unit 33 has an idle cell detecting unit for detecting an idle cell from asynchronous transfer mode cell data, a bit error detecting unit for detecting a bit error from the header error information fed from the header error information arithmetically operating unit 31, and a cell discard signal holding unit for holding synchronization judgement information fed from the asynchronous transfer mode cell synchronizing unit, out of synchronization information detected by the out of synchronization detecting unit 21 of the receive synchronous transfer mode processing unit 2, idle cell detection information fed from the above idle cell detecting unit and bit error detection information fed from the above bit error detecting unit.

In the asynchronous transfer mode cell discard judging unit 33, the cell discard signal holding unit outputs a cell discard signal if any one of the above synchronization judgement information, the out of synchronization information, the idle cell detection information and the bit error detection information so as to discard an asynchronous transfer mode cell without reliability in signal quality.

In the above asynchronous transfer mode cell discard judging unit 33, the cell discard signal holding unit outputs the cell discard signal if any one of the synchronization judgement information, the out of synchronization information, the idle cell detection information and the bit error detection information is detected. In particular, if receiving the out of synchronization information, the cell discard signal holding unit instantaneously outputs the cell discard signal, thereby more certainly discarding an asynchronous transfer mode cell lacking reliability in signal quality when out of synchronization of a synchronous transfer mode cell is detected to prevent the asynchronous transfer mode cell from being captured in the terminating apparatus 1.

In concrete, the above storage write controlling unit 35 has a write address counting unit for counting a write address to the storage unit 34, and a write address counting controlling unit for controlling the write address counting unit on the basis of outputs from the asynchronous transfer mode cell synchronizing unit 32 and the asynchronous transfer mode cell discard judging unit 33. The address counting controlling unit controls the address counting unit in order to forcibly inhibit an asynchronous transfer mode cell from being written in the storage unit 34 when receiving the out of synchronization information detected by the out of synchronization detecting unit 21 of the receive synchronous transfer mode processing unit 2.

In the storage write controlling unit 35, when the out of synchronization detecting unit 21 of the receive synchrodetects out of mode processing unit 2 detects out of synchronization of a received synchronous transfer mode signal, the address counting controlling unit controls the write address counting unit counting a write address to the storage unit 34, thereby inhibiting an asynchronous transfer mode cell lacking reliability in signal quality from being written in the storage unit 34.

The above storage write controlling unit 35 can therefore inhibit an asynchronous transfer mode cell lacking reliability in signal quality from being written in the storage unit 34 quite easily.

When receiving the out of synchronization information detected by the out of synchronization detecting unit 21 of the receive synchronous transfer mode processing unit 2, the above asynchronous transfer mode cell extracting unit 3 can conduct at least one among a process of forcibly judging that a received synchronous transfer mode signal is out of synchronization, a process of forcibly outputting the cell discard signal and a process of forcibly inhibiting an asynchronous transfer mode cell from being written in the storage unit 34, thereby certainly preventing the asynchronous transfer mode cell lacking reliability in signal quality from being captured in the terminating apparatus 1, as well.

Figure 2:
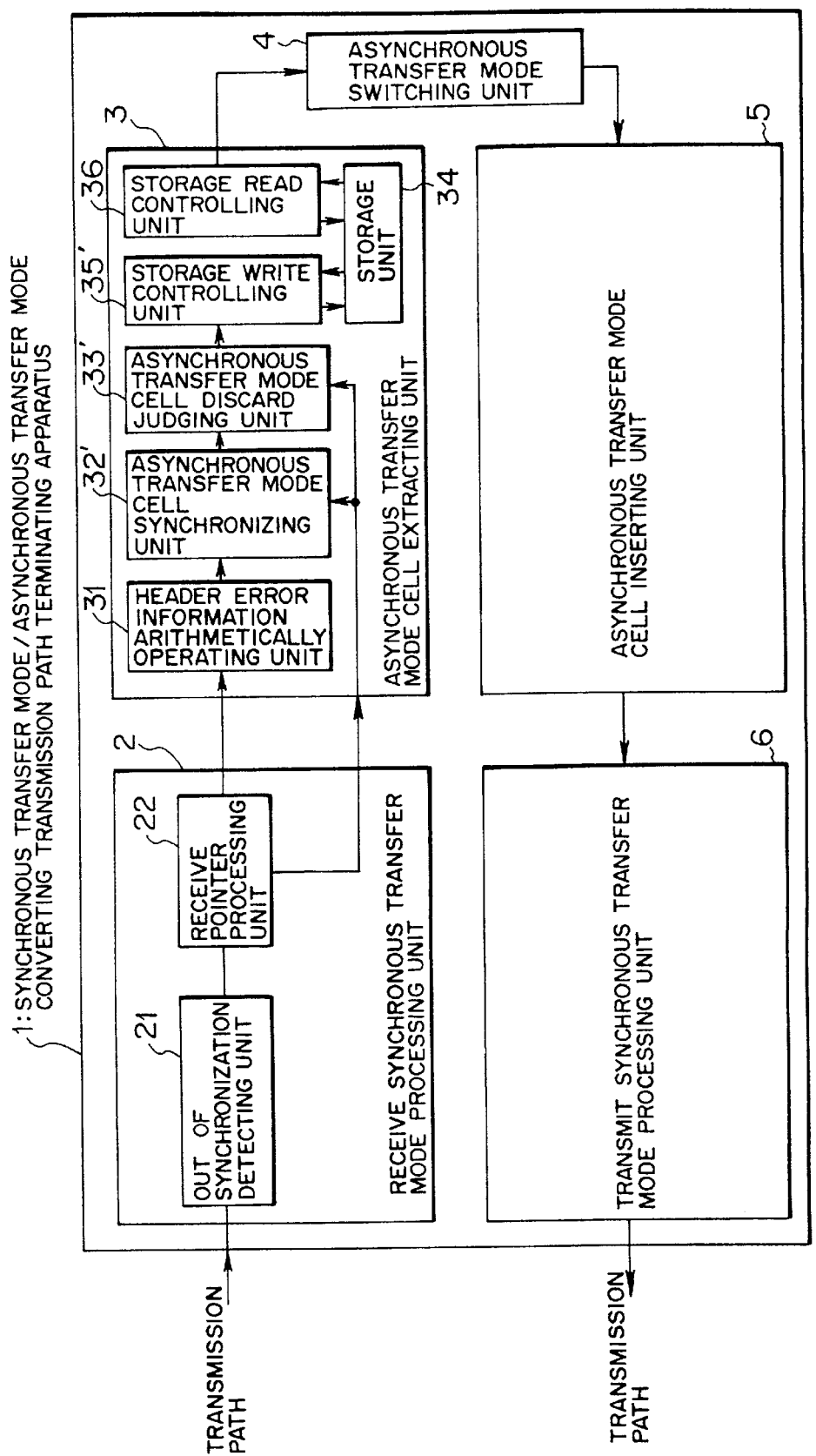

FIG. 2 is a block diagram showing another aspect of this invention. In FIG. 2, like reference characters designate like or corresponding parts in FIG. 1. In the synchronous transfer mode/asynchronous transfer mode converting transmission path terminating apparatus 1, the receive synchronous transfer mode processing unit 2 has a receive pointer processing unit 22 in addition to the out of synchronization detecting unit 21. Further, the asynchronous transfer mode cell extracting unit 3 has an asynchronous transfer mode cell synchronizing unit 32', an asynchronous transfer mode cell discard judging unit 33' and a storage write controlling unit 35' instead of the asynchronous transfer mode cell synchronizing unit 32, the asynchronous transfer mode cell discard judging unit 33 and the storage write controlling unit 35.

In the receive synchronous transfer mode processing unit 2, the receive pointer processing unit 22 conducts a necessary process on pointer information in the overhead information of a received synchronous transfer mode signal, besides outputting an alarm signal on the basis of out of synchronization information detected by the out of synchronization detecting unit 21.

In the asynchronous transfer mode cell extracting unit 3, the asynchronous transfer mode cell synchronizing unit 32' judges a synchronous state of a received synchronous transfer mode signal on the basis of the header error information fed from the header error information arithmetically operating unit 31, besides forcibly outputting a signal representing that the received synchronous transfer mode signal is out of synchronization when receiving the alarm signal from the receive pointer processing unit 22 of the receive synchronous transfer mode processing unit 2.

The asynchronous transfer mode cell discard judging unit 33' receives the synchronization judgement information from the asynchronous transfer mode cell synchronizing unit 32' to judge whether an asynchronous transfer mode cell should be discarded or not, besides forcibly outputting the cell discard signal when receiving the alarm signal from the receive pointer processing unit 22 of the receive synchronization transfer mode processing unit 2. The storage write controlling unit 35' conducts a control to write the asynchronous transfer mode cell in the storage unit 4 on the basis of outputs from the asynchronous transfer mode cell synchronizing unit 32' and the asynchronous transfer mode cell discard judging unit 33'.

In the terminating apparatus 1 shown in FIG. 2, when the receive synchronous transfer mode processing unit 2 detects out of synchronization of a synchronous transfer mode signal, the receive pointer processing unit 22 outputs the alarm signal on the basis of the out of synchronization information. When the asynchronous transfer mode cell synchronizing unit 32' and the asynchronous transfer mode cell discard judging unit 33' receive the alarm signal, the terminating apparatus 1 forcibly brings a synchronous transfer mode signal that should be processed after that to an out of synchronization state similarly to the above terminating apparatus 1 shown in FIG. 1, besides discarding an asynchronous transfer mode cell extracted from the synchronous transfer mode signal in the out of synchronization state.

In this case, it is, as well, possible to instantaneously prevent an asynchronous transfer mode cell in the course of a process in the asynchronous transfer mode cell extracting unit 3, that is, an asynchronous transfer mode cell having lost reliability in signal quality since out of synchronization is detected from a received synchronous transfer mode signal, from being written in the storage unit 34 when the out of synchronization is detected so that the asynchronous transfer mode cell lacking reliability in signal quality is not captured in the terminating apparatus 1.

In consequence, an asynchronous transfer mode cell lacking reliability in signal quality is not captured in the terminating apparatus 1 so that the process can be always continued on the basis of accurate data (asynchronous transfer mode cells).

The above asynchronous transfer mode cell synchronizing unit 32' has a synchronization guarding unit for outputting a signal representing synchronization or out of synchronization by receiving the header error information two or more times from the header error information arithmetically operating unit 31. The synchronization guarding unit has a circuit unit for forcibly outputting a signal representing that a received synchronous transfer mode signal is out of synchronization when receiving the alarm signal from the receive pointer processing unit 22 of the receive synchronous transfer mode processing unit 2.

In the asynchronous transfer mode synchronizing unit 32', the circuit unit promptly outputs a signal representing that a received synchronous transfer mode signal is out of synchronization when the synchronization guarding unit receives the header error information plural times so as to detect that a received synchronous transfer mode signal is fully out of synchronization, whereby the synchronous transfer mode signal is forcibly set to be in the out of synchronization state.

In the, above asynchronous transfer mode cell synchronizing unit 32', when a received synchronous transfer mode signal is fully out of synchronization is detected, synchronization of an asynchronous transfer mode cell is not established so that it is possible to certainly prevent the asynchronous transfer mode cell lacking reliability in signal quality from being captured in the terminating apparatus 1.

In concrete, the above asynchronous transfer mode cell discard judging unit 33' has the idle cell detecting unit for detecting an idle cell from asynchronous transfer mode cell data, the bit error detecting unit for detecting an bit error from the header error information fed from the header error information arithmetically operating unit 31, and the cell discard signal holding unit for holding synchronization judgement information fed from the asynchronous transfer mode cell synchronizing unit 32', an alarm signal fed from the receive pointer processing unit 22 of the receive synchronous transfer mode processing unit 2, idle cell detection information fed from the above idle cell detecting unit, and bit error detection information fed from the above bit error detecting unit.

In the asynchronous transfer mode cell discard judging unit 33', the cell discard signal holding unit outputs a cell discard signal if any one of the above alarm signal, the out of synchronization information, the idle cell detection information and the bit error detection information is detected, thereby discarding an asynchronous transfer mode cell lacking reliability in signal quality.

It is thereby possible to certainly discard an asynchronous transfer mode cell lacking reliability in signal quality so as to prevent it from being captured in the terminating apparatus 1.

In the terminating apparatus 1 shown in FIG. 2, the asynchronous transfer mode cell extracting unit 2 may execute at least either a process of forcibly judging that a received synchronous transfer mode signal is out of synchronization or a process of forcibly outputting the cell discard signal when receiving the alarm signal from the receive pointer processing unit 22 of the receive synchronous transfer mode processing unit 2, whereby an asynchronous transfer mode cell lacking reliability in signal quality is not certainly captured in the terminating apparatus 1.

Figure 3:
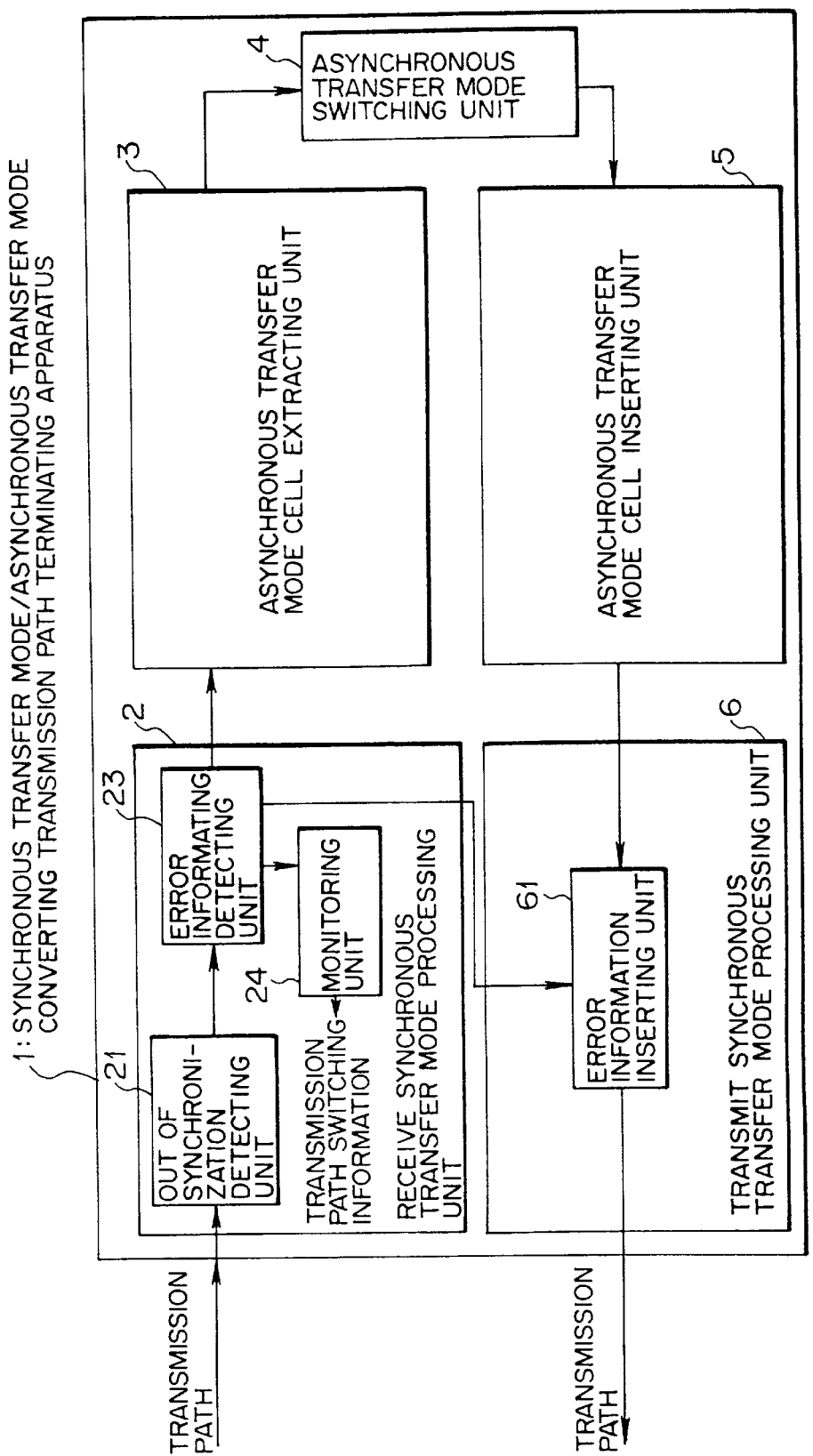

FIG. 3 is a block diagram showing still another aspect of this invention. In FIG. 3, like reference characters designate like or corresponding parts in FIG. 1. In the asynchronous transfer mode/asynchronous transfer mode converting transmission path terminating apparatus 1, the receive synchronous transfer mode processing unit 2 has an error information detecting unit 23 and a monitoring unit 24 in addition to the out of synchronization detecting unit 21, and the transmit synchronous transfer mode processing unit 6 has an error information inserting unit 61.

In the receive synchronous transfer mode processing unit 2, the error information detecting unit 23 detects first error information composed of far end block error information from a received synchronous transfer mode signal and second error information composed of transmission path error information from a received synchronous transfer mode signal. The monitoring unit 24 monitors the second error information detected by the error information detecting unit 23 to provide information used to switch a transmission path. In the transmission synchronous transfer mode processing unit 6, the error information inserting unit 61 inserts the first error information fed from the error information detecting unit 23 of the receive synchronous transfer mode processing unit 2 to provide information used to switch a transmission path.

In the terminating apparatus 1 shown in FIG. 3, the error information detecting unit 23 of the receive synchronous transfer mode processing unit 2 inhibits transfer of the first error information (the far end block error information) to the error information inserting unit 61 of the transmit synchronous transfer mode processing unit 6, besides inhibiting transfer of the second error information (the transmission path error information) to the monitoring unit 24 when receiving the out of synchronization information from the out of synchronization detecting unit 21.

In the synchronous transfer mode/asynchronous transfer mode converting transmission path terminating apparatus 1 with the above structure, when the out of synchronization detecting unit 21 of the receive synchronous transfer mode processing unit 2 detects out of synchronization of a received synchronous transfer mode signal, the error information detecting unit 23 of the receive synchronous transfer mode processing unit 2 inhibits transfer of the second error information and the first error information to the monitoring unit 24 and the error information inserting unit 61 of the transmit synchronous transfer mode processing unit 6, respectively, so that the first error information and the second error information having lost reliability since synchronization of the received synchronous transfer mode signal is out are not transferred.

According to the above synchronous transfer mode/asynchronous transfer mode converting transmission path terminating apparatus 1, it is possible to certainly prevent unnecessary switching of a transmission path.

The above error information detecting unit 23 of the receive synchronous transfer mode processing unit 2 detects line far end block error information or a path far end block error information as the first error information (the far end block error information), and detects section error information, line error information or path error information as the second error information (the transmission line error information).

With the above error information detecting unit 23 of the receive synchronous transfer mode processing unit 2, it is possible to readily and certainly realize prevention of unnecessary switching of a transmission path as above.

(b) Description of a First Embodiment

Now, a first embodiment of this invention will be described with reference to the drawings.

Figure 4:
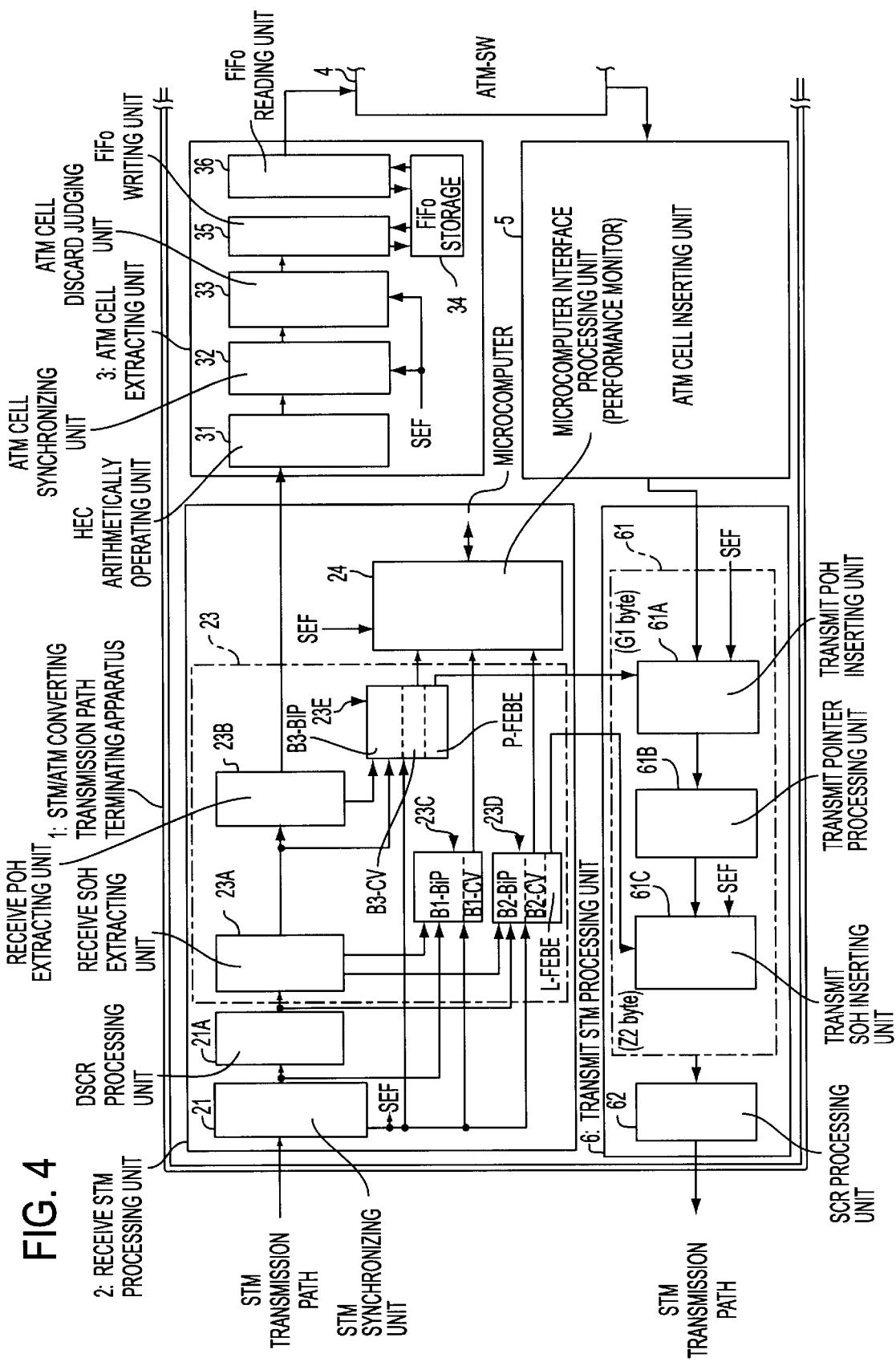
FIG. 4 is a block diagram showing a structure of a synchronous transfer mode/asynchronous transfer mode (STM/ATM) converting transmission path terminating apparatus according to a first embodiment of this invention.
Figure 68:
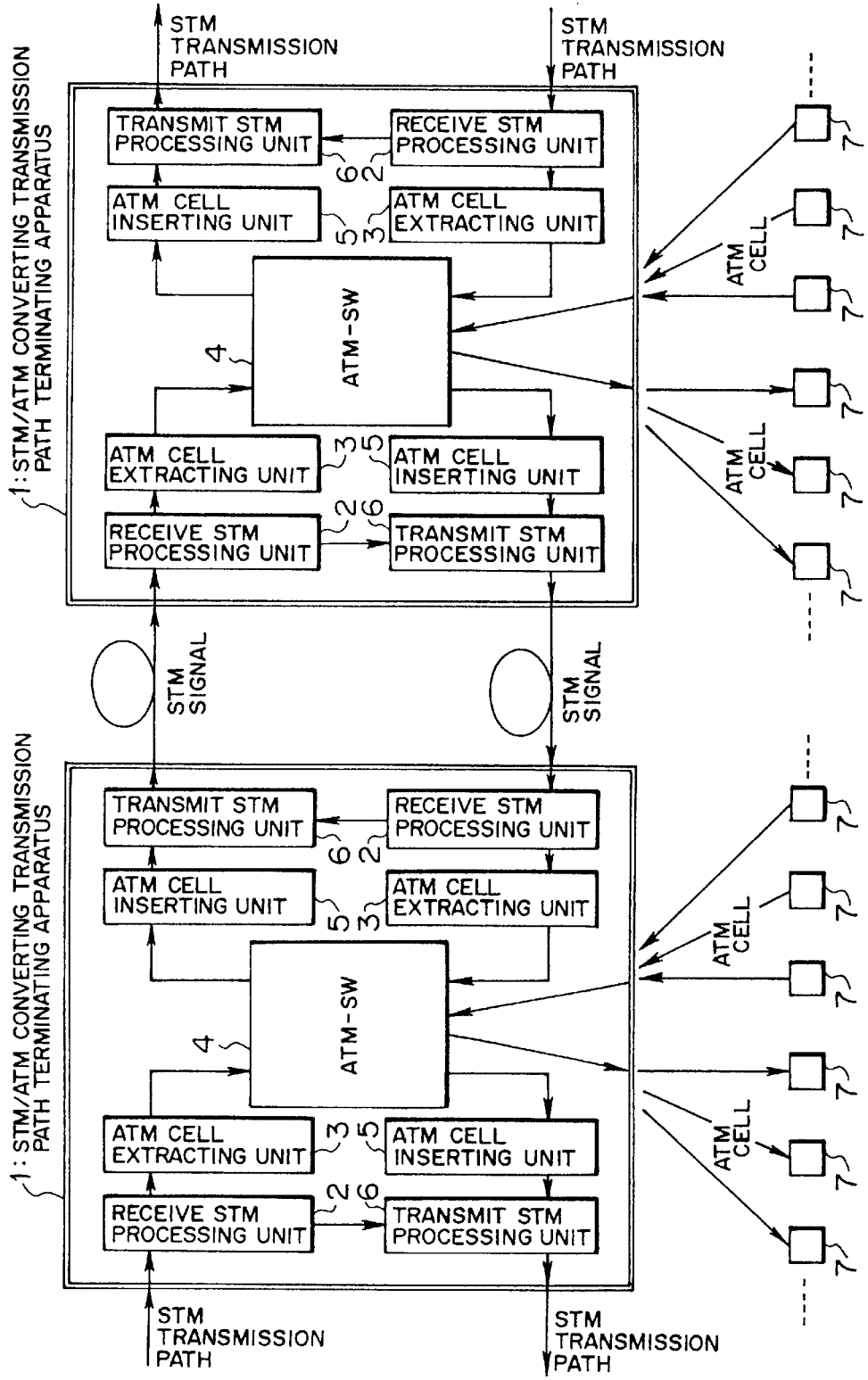
FIG. 68 is a block diagram showing a structure of a synchronous transfer mode/asynchronous transfer mode (STM/ATM) converting transmission path terminating apparatus.

FIG. 4 is a block diagram showing a structure of a synchronous transfer mode/asynchronous transfer mode (STM/ATM) converting transmission path terminating apparatus according to a first embodiment of this invention. As shown in FIG. 4, the STM/ATM converting transmission path terminating apparatus (hereinafter, simply referred as "a terminating apparatus", occasionally) according to this embodiment has a receive STM processing unit 2, an ATM cell extracting unit 3, an ATM switch 4, an ATM cell inserting unit 5 and a transmit STM processing unit 6, similarly to the apparatus described hereinbefore with reference to FIG. 68.

Figure 69A:
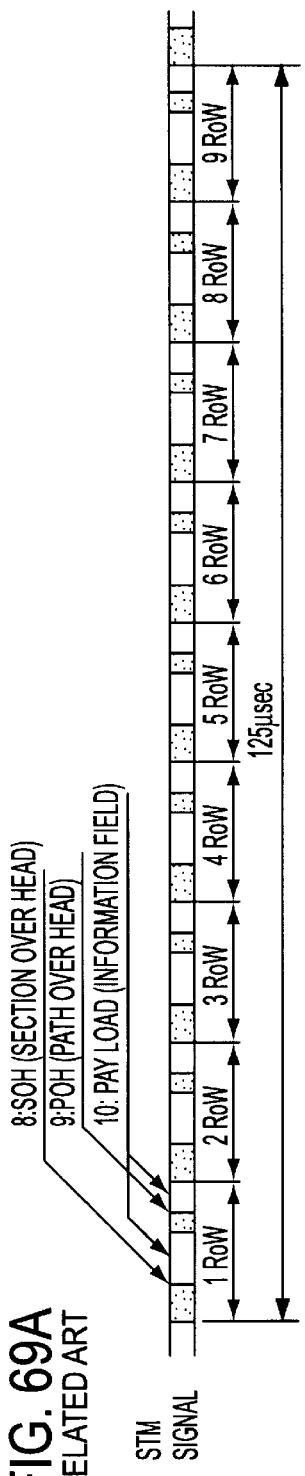
FIGS. 69(a) and 69(b) are diagrams for illustrating an example of a format of an STM frame.
Figure 69B:
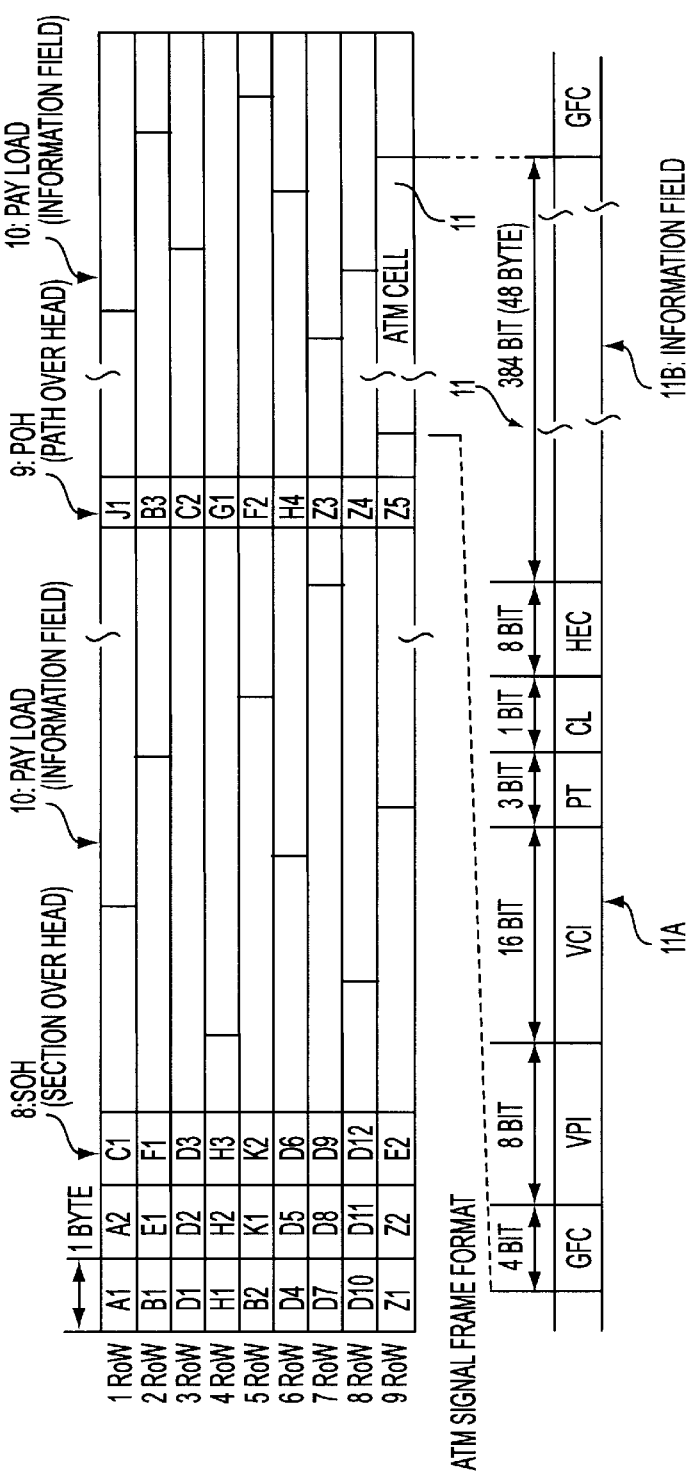

The receive STM processing unit 2 receives an STM signal (an STM frame) sent from an STM transmission path to guard synchronization of the STM frame on the basis of overhead information such as a section overhead (SOH) 8, a path overhead (POH) 9 [refer to FIGS. 69(a) and 69(b)] included in the STM frame or conducts a necessary process such as to supervise a state of the transmission path. As shown in FIG. 4, the receive STM processing unit 2 has an STM synchronizing unit 21, a descramble (DSCR) processing unit 21A, an error information detecting unit 23, and a microcomputer interface processing unit (a performance monitor) 24.

The STM synchronizing unit (the out of synchronization detecting unit) 21 guards synchronization of the STM frame received from the STM transmission path in a necessary number of stages. If the STM synchronizing unit 21 cannot normally detect a frame pattern (the A1 and A2 bytes) included in the section overhead 8 of the STM frame, an SEF signal representing that STM frame is out of synchronization is detected as out of synchronization information, and sent to a B1 byte processing unit (B1-BiP/B1-CV) 23C and a B2 byte processing unit (B2-BiP/B1-CV/L-FEBE) 23D of the error information detecting unit 23, the performance monitor 24, an ATM cell synchronizing unit 32, an ATM cell discard judging unit 33 and an FiFo writing unit 35 of the ATM cell extracting unit 3, and an error information inserting unit 61 of the transmission STM processing unit 6, which will be described later.

Since the STM frame received through the STM synchronizing unit 21 has been undergone a scrambling process (provided, the overhead information has not been undergone the scrambling process) to be randomized on the transmitting side in order to readily discriminate the data (a bit string), the descramble processing unit 21A conducts a descrambling process on the STM frame in order to restore it into original data.

The error information detecting unit 23 detects the far end block error information (first error information) including the line far end block error information (L-FEBE) or the path far end block error information (P-FEBE), and transmission path error information (second error information) including B1 parity error information (section error information) and B2 parity error information (line error information) on the basis of the B1 and B2 bytes included in the section overhead 8 of the received STM frame, or B3 parity error information (path error information) on the basis of the B3 byte included in the path overhead 9. The performance monitor (the monitoring unit) 24 counts (monitors) the B1 and B2 or B3 parity error information detected by the error information detecting unit 23 to provide information used to switch the transmission path to a microcomputer (omitted in the drawing) directing switching of the transmission path.

The error information detecting unit 23 has, as shown in FIG. 4, a receive section overhead (SOH) extracting unit 23A, a receive path overhead (POH) extracting unit 23B, a B1 byte processing unit 23C, a B2 byte processing unit 23D and a B3 byte processing unit 23E.

The receive section overhead extracting unit 23A extracts the section overhead 8 from the STM frame received through the STM synchronizing unit 21 and the descramble processing unit 21A. The receive path overhead extracting unit 23B further extracts the path overhead 9 from the STM frame from which the section overhead 8 has been extracted by the receive section overhead extracting unit 23A.

The B1 byte processing unit 23C conducts a parity arithmetic operation on bit information written in the B1 byte of the section overhead 8 extracted by the receive section overhead extracting unit 23A, and transfers a result of the arithmetic operation (the B1 parity error information) as a count value (B1CV) for the performance monitor 24. According to this embodiment, when out of synchronization of the STM frame is detected by the STM synchronizing unit 21 of the receive STM processing unit 2 and the SEF signal is received, transfer of the B1 parity error information to the performance monitor 24 is inhibited as will be described later.

Similarly, the B2 byte processing unit 23D conducts the parity arithmetic operation on bit information written in the B2 byte of the section overhead 8, and transfers a result of the arithmetic operation (the B2 parity error information) as a count value (B2CV) for the performance monitor 24. Besides, the B2 byte processing unit 23D detects the line far end block error information (L-FEBE) on the basis of the B2 parity error information, inserts it into a transmit STM frame [concretely, inserts it as the Z2 byte of the section overhead 8 (refer to FIG. 69(b)], and transfers it to the error information inserting unit 61 providing transmission path switching information of the transmit STM processing unit 6 which will be described later in order to send it back to a transmission source of the received STM frame.

The B3 byte processing unit 23E conducts the parity arithmetic operation on bit information written in the B3 byte of the path overhead 9 extracted by the receive path overhead extracting unit 23B, and transfers a result of the arithmetic operation as a count value (B3CV) for the performance monitor 24. Besides, the B3 byte processing unit 23E detects the path far end block error information (P-FEBE) on the basis of the B3 parity error information, and transfers it to the error information inserting unit 61 in order to insert it into a transmit STM frame [concretely, insert it as the G1 byte (refer to FIG. 69(b)] of the path overhead 9, similarly.

If the STM synchronizing unit 21 of the receive STM processing unit 2 detects out of synchronization of the STM frame and the SEF signal is received, the B2 type processing unit 23D and the B3 byte processing unit are inhibited from transferring the transmission path error information (the B1/B2/B3 parity error information) to the performance monitor 24, the line far end block error information (L-FEBE) and the path far end block error information (P-FEBE) to the error information inserting unit 61 as will be described later.

Namely, if the error information detecting unit 23 of the receive STM processing unit 2 receives the SEF signal (the out of synchronization information) from the STM synchronizing unit 21, the terminating apparatus 1 of this embodiment inhibits transfer of the B1/B2/B3 parity error information to the performance monitor 24 and transfer of the line/path far end block error information to the error information inserting unit 61 of the transmit STM processing unit 6.

The ATM cell extracting unit 3 has an HEC (Header Error Control) arithmetically operating unit 31, an ATM cell synchronizing unit 32, an ATM cell discard judging unit 33, an FiFo (First-in First-out) storage 34, an FiFo writing unit 35 and an FiFo reading unit 36.

The HEC arithmetically operating unit (the header error information arithmetically operating unit) 31 determines header error information of the ATM cell 11 through an arithmetic operation. The ATM cell synchronizing unit (the asynchronous transfer mode cell synchronizing unit) 32 judges a state of synchronization of the received STM frame on the basis of the header error information fed from the HEC arithmetic operating unit 31. Besides, the ATM cell synchronizing unit 32 forcibly outputs a signal representing that the received STM frame is out of synchronization when receiving the SEF signal detected by the STM synchronizing unit 21 of the receive STM processing unit 2 to bring a frame pattern of the STM frame to an out of synchronization state.

The ATM cell discard judging unit (the asynchronous transfer mode cell discard judging unit) 33 receives synchronization judgement information from the ATM cell synchronizing unit 32 to judge whether the ATM cell 11 should be discarded or not, besides forcibly outputting a cell discard signal when receiving the SEF signal detected by the STM synchronizing unit 21 of the receive STM processing unit 2 to discard the ATM cell 11. The FiFo storage (the storage unit) 34 successively stores the ATM cells 11 having STM frame information received.

The FiFo writing unit (the storage write controlling unit) 35 conducts a control to write the ATM cell 11 in the FiFo storage 34 on the basis of outputs from the ATM cell synchronizing unit 32 and the ATM cell discard judging unit 33, besides forcibly inhibiting the ATM cell 11 from being written in the FiFo storage 34 when receiving the SEF signal detected by the STM synchronizing unit 21 of the receive STM processing unit 2. The FiFo reading unit (the storage read controlling unit) 36 conducts a control to read ATM cell data stored in the FiFo storage 34 and output it to the ATM switch 4.

The ATM switch (the asynchronous transfer mode switching unit) 4 conducts a switching process between each of the subscriber's terminals (refer to FIG. 68) and another terminating apparatus 1 on a signal (the ATM cell 11) fed from the ATM cell extracting unit 3 on the basis of its header portion 11a [VPI, VCI and the like: refer to FIG. 69(b)]. The ATM cell inserting unit 5 successively inserts the ATM cell 11 fed from each of the subscriber's terminals 7 in a signal fed from the ATM switch 4.

The transmit STM processing unit 6 conducts a necessary process such as to successively insert various. overhead information for the section overhead 8 and the path overhead 9 on a signal (ATM cells 11) fed from the ATM cell inserting unit 5, thereby forming an STM frame and transmitting it to the STM transmission path.

For this, the transmit STM processing unit 6 has, as shown in FIG. 4, an error information inserting unit 61 and a scramble (SCR) processing unit 62. Further, the error information inserting unit 61 has a transmit path overhead (POH) inserting unit 61A, a transmit pointer processing unit 61B and a transmit section overhead (SOH) inserting unit 61C.

The error information inserting unit 61 conducts a necessary process on the overhead information such as to insert the section overhead 8 and the path overhead 9 into a signal fed from the ATM cell inserting unit 5 that should be transmitted to form a transmit STM frame, besides inserting error information (the line far end block error information and the path far end block error information) fed from the error information detecting unit 23 of the receive STM processing unit 2 to provide information used to switch a transmission path. The scramble processing unit 62 conducts a scrambling process on a data portion other than the overhead information portion of the so formed STM frame in order to facilitate discrimination of bit information on the receiving side.

In the error information inserting unit 61, the transmit path overhead inserting unit 61A writes the path far end block error information (P-FEBE) fed from the error information detecting unit 23 (the B3 parity arithmetically operating unit 23E) of the transmit STM processing unit 2 in the G1 byte of the path overhead 9 to be inserted upon inserting the path overhead 9 for the STM frame that should be transmitted, thereby providing information used to switch a transmission path. The transmit pointer processing unit 61B conducts a process such as to generate a pointer indicating a leading position of a frame of ATM cells 11 accommodated in the STM frame.

The transmit section overhead inserting unit 61C inserts the line far end block error information (L-FEBE) fed from the error information detecting unit 23 (the B2 parity arithmetically operating unit 23D) of the transmit STM processing unit 2 as the Z2 byte of the section overhead 8 upon inserting the section overhead 8 into a signal fed from the transmit pointer processing unit 61B, thereby providing information (such as an error of multiplexing or the like of the ATM cell 11) used to switch a transmission path to the terminating apparatus 1 on the STM frame receiving side.

Next, more detailed description will be made of the receive STM processing unit 2 (the error information detecting unit 23B), the ATM cell extracting unit 3 (the ATM cell synchronizing unit 32, the ATM cell discard judging unit 33, and FiFo writing unit 35) and the transmit STM processing unit 6 (the error information inserting unit 61), which are essential parts of this embodiment. First, the ATM cell extracting unit 3 (the ATM cell synchronizing unit 32, the ATM cell discard judging unit 33 and the FiFo writing unit 35) will be described in detail for the sake of convenience.

Figure 5:
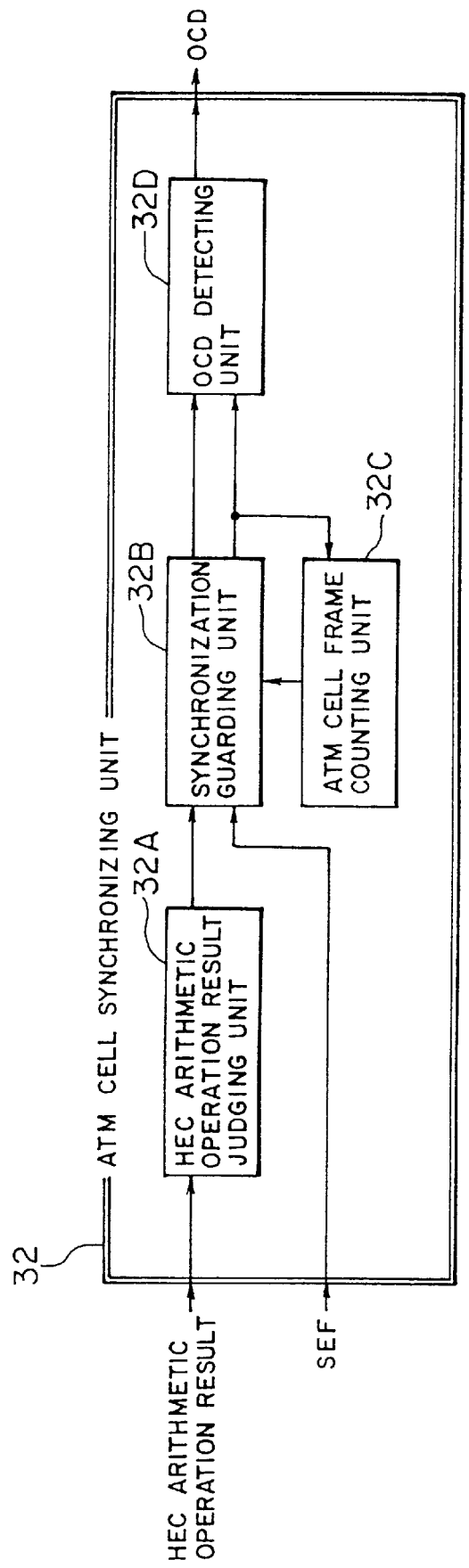
FIG. 5 is a block diagram showing a structure of an ATM cell synchronizing unit in the STM/ATM converting transmission path terminating apparatus according to the first embodiment.

FIG. 5 is a block diagram showing a structure of the ATM cell synchronizing unit 32. In FIG. 5, reference numeral 32A denotes an HEC arithmetic operation result judging unit, 32B denotes a synchronization guarding unit, 32C denotes an ATM cell frame counting unit, and 32D denotes a cell loss indicting signal (OCD: Out Of Cell Delineation) detecting unit.

Figure 6:
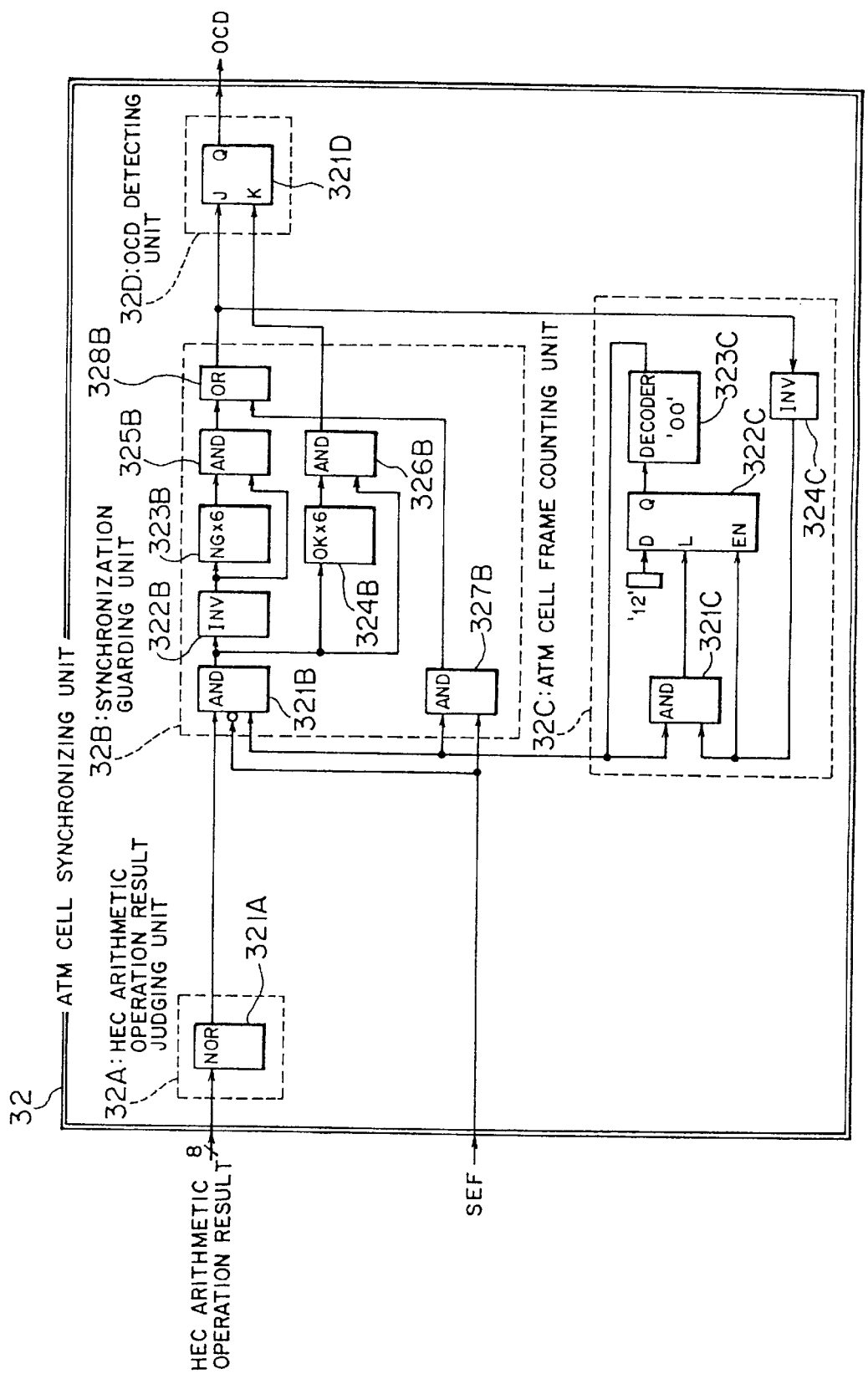
FIG. 6 is a block diagram showing in detail the structure of the ATM cell synchronizing unit in the STM/ATM converting transmission path terminating apparatus according to the first embodiment.

As shown in FIG. 6, the HEC arithmetic operation result judging unit 32A judges whether the ATM cell 11 has a header error or not on the basis of a result of an arithmetic operation fed from the HEC arithmetically operating unit 31 by using a NOR gate (a not-OR operation element) 321A.

The synchronization guarding unit 32 has, as shown in FIG. 6, an AND gate of a one-input inverting type (a logical multiplication operation element) 321B, an inversion gate (INV) 322B, an asynchronous state judging unit 323B in six stages, a synchronous state judging unit 324B in six stages, AND gates 325B through 327B and an OR gate (a logical sum operation element) 328B to successively receive the header error information fed from the HEC arithmetically operating unit 31 six times by the asynchronous state judging unit 323B and the synchronous state judging unit 324B, thereby outputting a signal representing out of synchronization (NG) or synchronization (OK).

An OCD detecting unit (the circuit unit) 32D has, as shown in FIG. 6, a J-K flip-flop circuit 321D to forcibly output an OCD signal representing that the received STM frame is out of synchronization if the SEF signal detected by the STM synchronizing unit 21 of the receive STM processing unit 2 is received by the synchronization guarding unit 32B.

The ATM cell frame counting unit 32C has, as shown in FIG. 6, an AND gate 321C, a frame counter 322C, a decoder 323C and an inversion gate (INV) 324D to generate 53 counter values on the basis of an output of the synchronization guarding unit 32B such that a synchronization guarding process is conducted on all bytes (53 bytes) in a unit of the ATM cell 11 of one frame in the synchronization guarding unit 32B, and outputs them to the synchronization guarding unit 32B.

If the STM frame becomes out of synchronization, the counter value is fixed to "0" until the header of the ATM cell is again acquired (hunted) in this case, as will be described later. For this, not "0" but "12", for example, is inputted as an initial counter value in a data input terminal (D) of the frame counter 322C.

Figure 7:
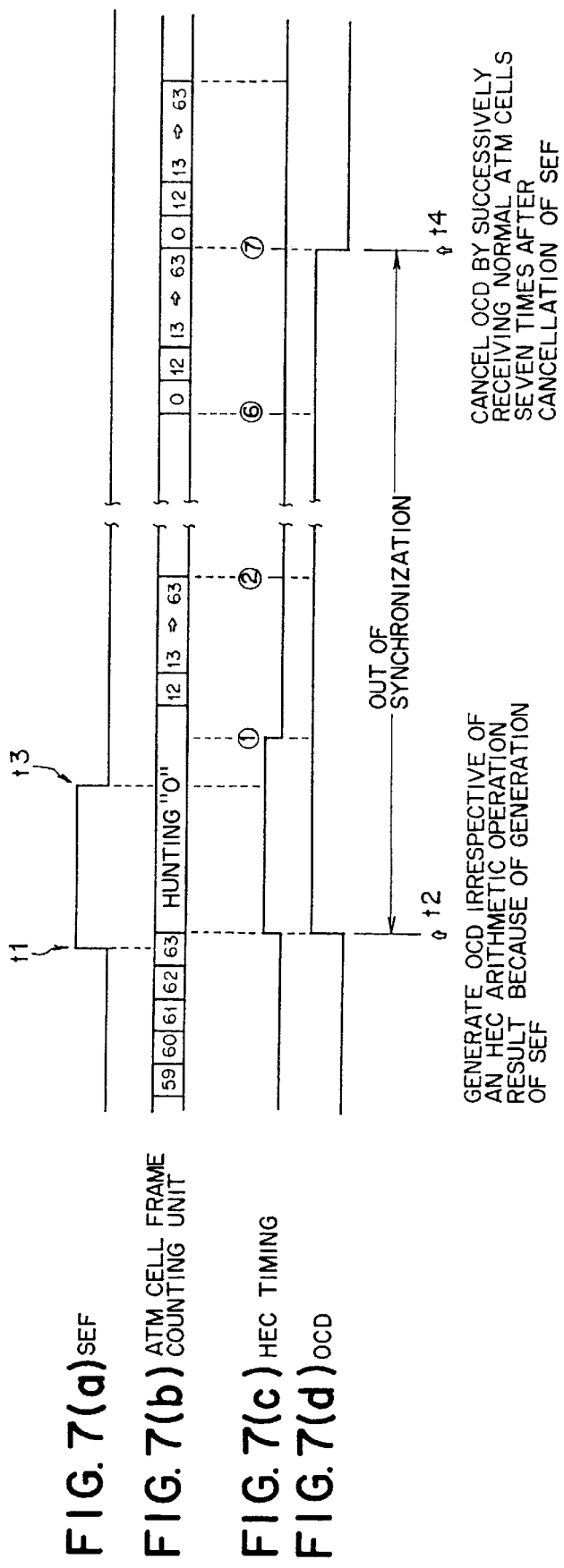
FIGS. 7(a) through 7(d) are timing charts for illustrating an operation of the ATM cell synchronizing unit in the STM/ATM converting transmission path terminating apparatus according to the first embodiment.

In the ATM cell synchronizing unit 32 with the above structure, when out of synchronization of the received STM frame is detected by the STM synchronizing unit 21 (refer to FIG. 4) of the receive STM processing unit 2 and the SEF signal becomes an "H" level from a point of time t1 as shown in FIG. 7(a), for example, outputs of the AND gate 327B and the OR gate 328B become the "H" level, and a counter value of the frame counter 322C of the ATM cell frame counter 32C is fixed to "0" from a point of time t2 as shown in FIG. 7(b).

In the OCD detecting unit 32D, an output of the J-K flip-flop circuit 321D becomes the "H" level by receiving an output of the OR gate 328B of the synchronization guarding unit 32B. As a result, an OCD signal (a signal representing that a received STM frame is out of synchronization) is unconditionally outputted from the J-K flip-flop circuit 321D of the OCD detecting unit 32D as shown at the point of time t2, whereby the STM frame that should be processed after that is forcibly set to an out of synchronization state irrespective of a result of an HEC arithmetic operation (an HEC timing: refer to FIG. 7(c)].

After that, if synchronization of the STM frame is established and the SEF signal fed from the STM synchronizing unit 21 of the receive STM processing unit 2 is cancelled as shown at a point of time t3 in FIG. 7(a), for example, counting by the ATM cell frame counting unit 32C is resumed as shown in FIG. 7(b), and generation of the OCD signal fed from the OCD detecting unit 32D is cancelled at a point of time t4 up to which a normal. ATM cell 11 counted each time the HEC timing becomes an "L" level (i.e., each time the ATM cell frame counting unit 32C is re-timed) as shown at ① through ⑦ in FIG. 7(c).

Namely, if the SEF signal is not detected by the STM synchronizing unit 21 of the receive STM processing unit 2, the above ATM cell synchronizing unit 32 stops outputting the OCD signal at a point of time up to which normal ATM cell data, has been successively received predetermined times (7 times, here) so as to cancel the forcible out of synchronization state.

The above ATM cell synchronizing unit 32 outputs the OCD signal representing that the received STM frame is out of synchronization from the OCD detecting unit 32D while out of synchronization of the STM frame is detected by the STM synchronizing unit 21 of the receive STM processing unit 2 and the SEF signal is generated, thereby forcibly bringing the ATM cell 11 to the out of synchronization state until the ATM cell 11 normally synchronized has been successively received seven times so that it is recognized that synchronization of the STM frame has been fully established. In consequence, the ATM cell 11 lacking reliability in signal quantity is not captured in the terminating apparatus 1, it is thus possible to continue at all times the process on the basis of accurate data.

Figure 8:
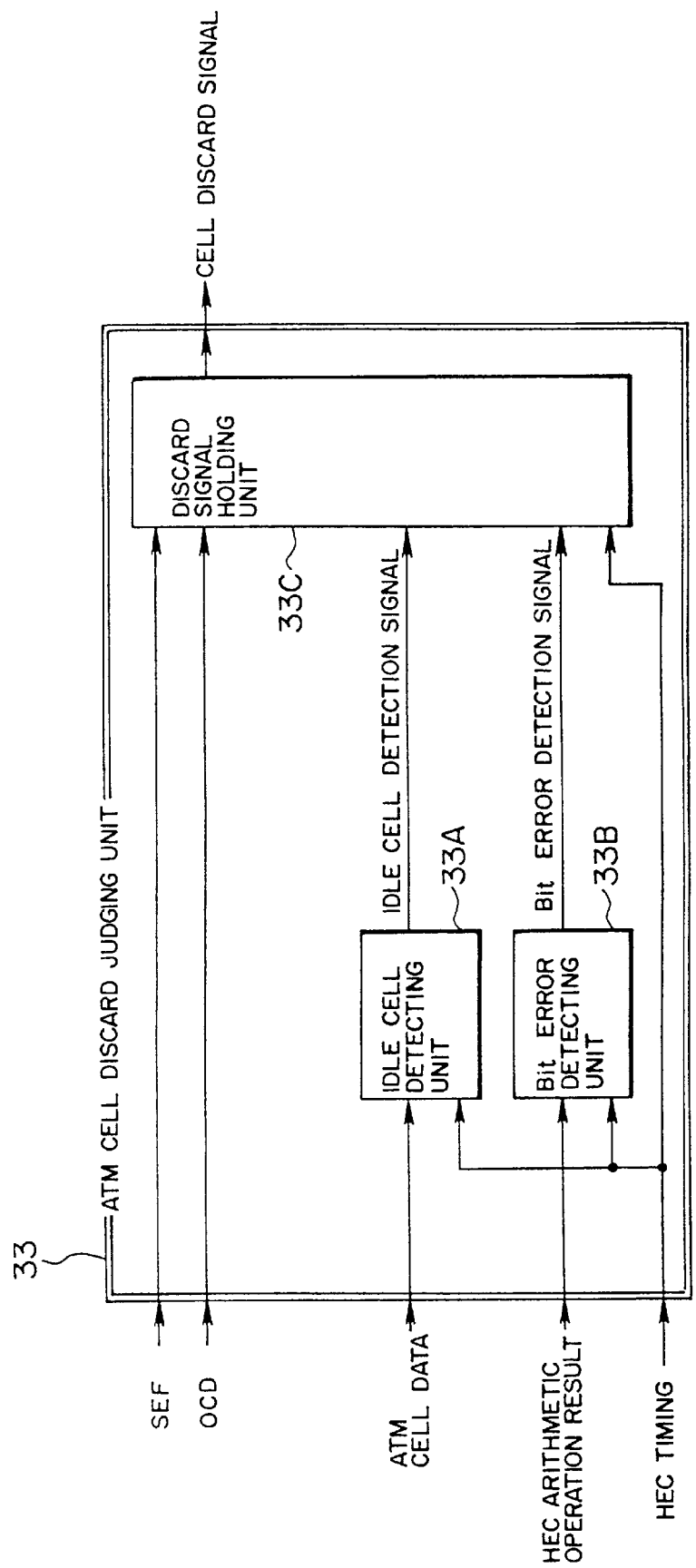
FIG. 8 is a block diagram showing a structure of an ATM cell discard judging unit in the STM/ATM converting transmission path terminating apparatus according to the first embodiment.

FIG. 8 is a block diagram showing a structure of the ATM cell discard judging unit 33. In FIG. 8, reference numeral 33A denotes an idle cell detecting unit, 33B denotes a bit error detecting unit and 33C denotes a discard signal holding unit.

Figure 9:
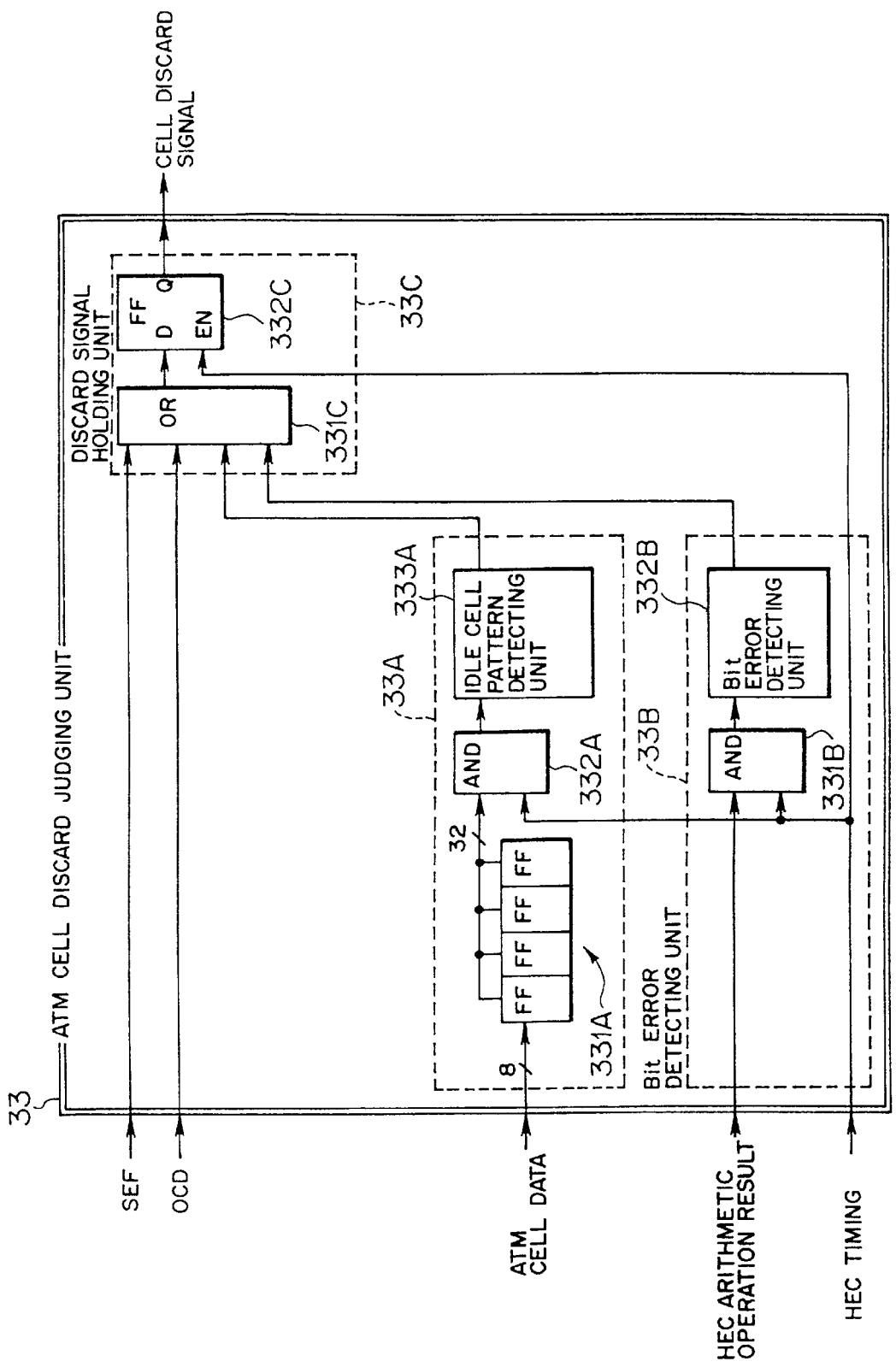
FIG. 9 is a block diagram showing in detail the structure of the ATM cell discard judging unit in the STM/ATM converting transmission path terminating apparatus according to the first embodiment.

The idle cell detecting unit 33A detects an idle cell (an empty cell) from ATM cell data fed from the above ATM cell synchronizing unit 32. According to this embodiment, the idle cell detecting unit 33A has, as shown in FIG. 9, for example, a flip-flop (FF) circuit 331A in four stages, an AND gate 332A and an idle pattern detecting unit 333A, in which on the basis of a result of AND (a logical multiplication arithmetic operation) on the ATM cell data having been delayed in four stages in the flip-flop circuit 331A and the HEC timing fed from the ATM cell synchronizing unit 32, the idle cell detecting unit 333A detects an idle pattern representing which ATM cell 11 is an idle cell over four ATM cells 11 and outputs an idle cell detection signal.

The bit error detecting unit 33B detects a bit error from a result of the HEC arithmetic operation (header error information) fed from the HEC arithmetically operating unit 31. The bit error detecting unit 33B has an AND gate 331B and a bit error detector 332B as shown in FIG. 9, for example, in which on the basis of a result of an AND (logical multiplication) arithmetic operation on the result of the HEC arithmetic operation and the HEC timing, a bit error is detected, then a bit error detection signal is thereby outputted.

The discard signal holding unit 33C holds the OCD signal (the synchronization judgement information) fed from the ATM cell synchronizing unit 32, the SEF signal (the out of synchronization information) detected by the STM synchronizing unit 21 of the receive STM processing unit 2, the idle sell detection signal fed from the idle cell detecting unit 33A and the bit error detection signal fed from the bit error detecting unit 33B. The discard signal holding unit 33C has, as shown in FIG. 9, for example, an OR gate 331C and a flip-flop (FF) circuit 332C, in which a result of OR (a logical sum arithmetic operation) on the above OCD signal, SEF signal, idle cell detection signal and bit error detection signal is successively inputted to the flip-flop (FF) circuit 332C, each of which is outputted as a cell discard signal in cell according to the HEC timing.

In the ATM cell discard judging unit 33 with the above structure, if any one among the above OCD signal, SEF signal, idle cell detection signal and bit error detection signal (discard condition signal) is detected, the discard condition signal is re-timed at the HEC timing and the cell discard signal is outputted in cell from the discard signal holding unit 33C. In particular, if out of synchronization of the STM frame is detected by the STM synchronizing unit 21 of the receive STM processing unit 2 and the SEF signal is thus generated at a point of time t5 in FIG. 10(*a*), for example, the ATM cell discard judging unit 33 instantaneously outputs the cell discard signal as shown in FIG. 10(*c*), thereby forcibly discarding an asynchronous transfer mode cell lacking reliability in signal quantity.

Figure 10:
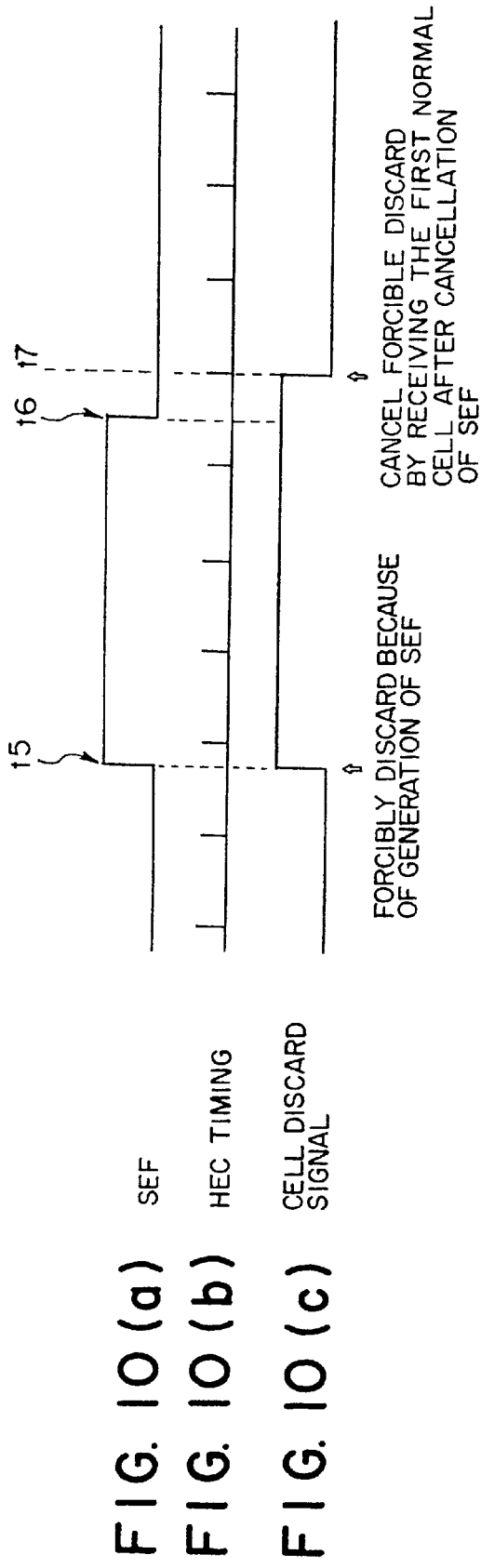
FIGS. 10(a) through 10(c) are timing charts for illustrating an operation of the ATM cell discard judging unit in the STM/ATM converting transmission path terminating apparatus according to the first embodiment.

In this case, at the first timing, that is, at a point of time t7 at which a normal ATM cell 11 is first detected after synchronization of the STM frame has been established and the SEF signal has been cancelled as shown at a point of time t6 in FIG. 10(*a*), generation of the cell discard signal fed from the ATM cell discard judging unit 33 is cancelled so that the operation returns to normal. Namely, the ATM cell discard judging unit 33 forcibly cancels generation of the cell discard signal when synchronization of the ATM cell 11 is established in the ATM cell synchronizing unit 32 if the SEF signal is not detected by the STM synchronizing unit 21 of the receive STM processing unit 2.

As above, if any one among the OCD signal, the SEF signal, the idle cell detecting signal and the bit error detection signal is detected, the discard signal holding unit 33C outputs the cell discard signal in the above ATM cell discard judging unit 33. In particular, the ATM cell discard judging unit 33 instantaneously outputs the cell discard signal when receiving the SEF signal from the receive STM processing unit 2. It is therefore possible to discard more certainly the ATM cell 11 lacking reliability in signal quality when out of synchronization of the STM frame is detected so as to prevent the ATM cell 11 form being captured in the terminating apparatus.

Upon cancelling the SEF, forcible generation of the cell discard signal is instantaneously cancelled so that an ATM cell 11 whose quality is assured can be promptly captured in the terminating apparatus 1 when synchronization of the STM frame is fully established.

Figure 11:
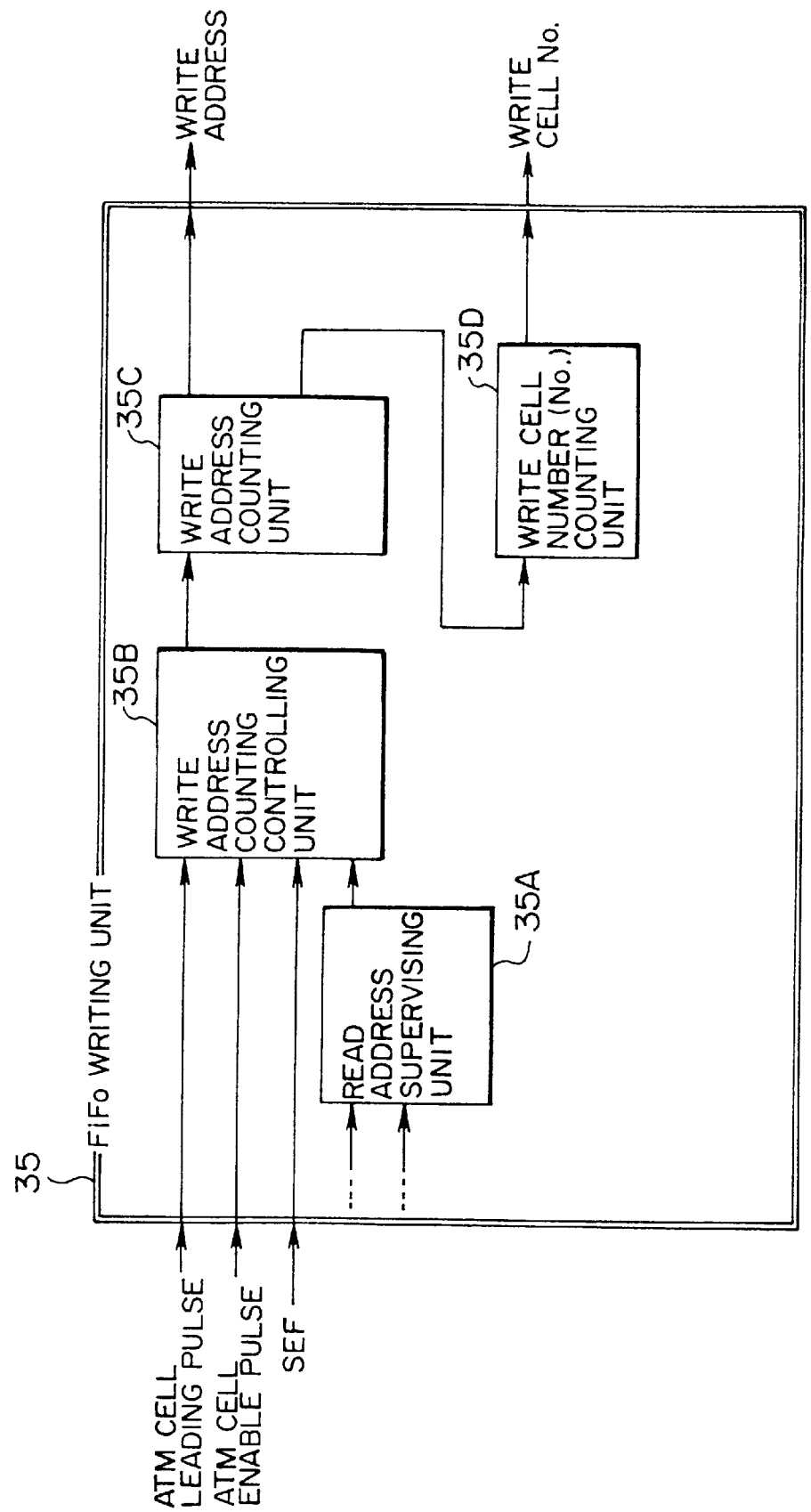
FIG. 11 is a block diagram showing a structure of a FiFo writing unit in the STM/ATM converting transmission path terminating apparatus according to the first embodiment.

Next, FIG. 11 is a block diagram of the FiFo writing unit 35. In FIG. 11, reference numeral 35A denotes a read address supervising unit, 35B denotes a write address counting controlling unit, 35C denotes a write address counting unit, and 35D denotes a write cell number counting unit.

The read address supervising unit 35A supervises a read address obtained in the FiFo reading unit 36 to indicate a timing used to write the ATM cell data in the FiFo storage 34 to the write address counting controlling unit 35B. The write address counting controlling unit 35B controls the write address counting unit 35C on the basis of outputs of the ATM cell synchronizing unit 32 and the ATM cell discard judging unit 33 (an ATM cell leading pulse, an ATM cell enable pulse and the SEF signal), which has an OR gate 351B for conducting a logical sum arithmetic operation on the ATM cell leading pulse and the SEF signal and an AND gate 352B for conducting a logical multiplication arithmetic operation on the ATM cell enable pulse and an output of the read address supervising unit 35A as shown in FIG. 12, for example.

Figure 12:
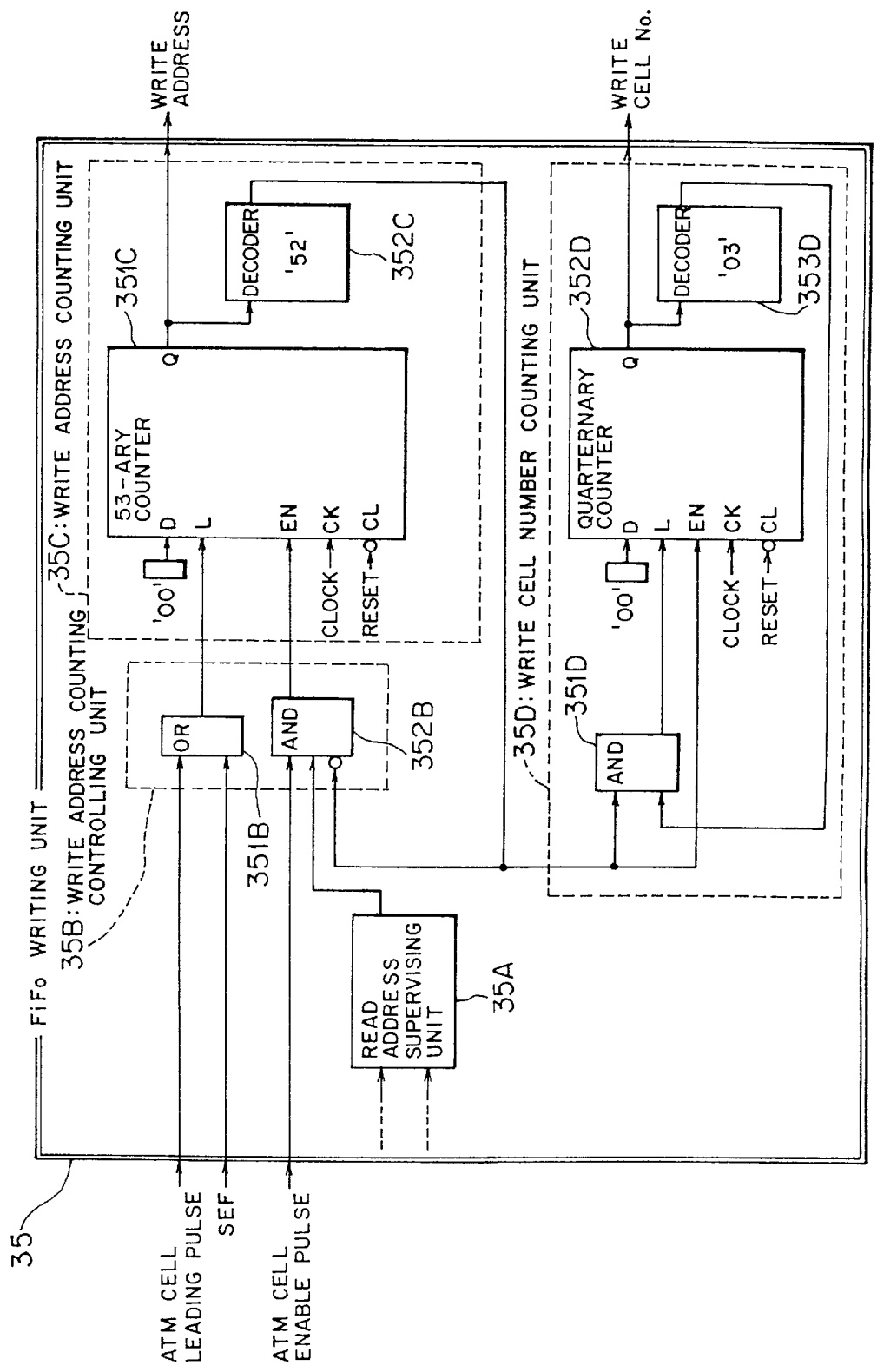
FIG. 12 is a block diagram showing in detail the structure of the FiFo writing unit in the STM/ATM converting transmission path terminating apparatus according to the first embodiment.

The write address counting unit 35C counts a write address for the ATM cell data in the FiFo storage 34, which has a 53-counting (53-ary) counter 531C for generating and outputting count values for 53 kinds from "0" to "52" (since the ATM cell 11 is of 53 bytes) as write addresses for the FiFo storage 34, and a decoder 352C for decoding a count value "52" of the 53-counting counter 351C as shown in FIG. 12, for example.

The write cell number counting unit 35D counts a write cell number of the ATM cell data to be written in the FiFo storage 34 according to a count value ("0" through "52") fed from the write address counting unit 35C. The write cell number counting unit 35D has, as shown in FIG. 12, for example, an AND gate 351D for conducting a logical multiplication arithmetic operation on the count value fed from the write address counting unit 35C and a feedback signal of its own output, a quarternary counter 352D for generating and outputting count values of four kinds from "0" to "3" in synchronization with the above write address, and a decoder 352 for decoding the count value "3" of the quarternary counter 352D.

According to this embodiment, the above write address counting controlling unit 35B controls the write address counting unit 35C such as to forcibly inhibit the ATM cell data from being written in the FiFo storage 34 when the OR gate 351B of the write address counting controlling 35B receives the SEF signal detected by the STM synchronizing unit 21 of the receive STM processing unit 2.

Hereinafter, an operation of the FiFo writing unit 35 with the above structure will be described in detail with reference to FIGS. 13(*a*) through 13(*f*) and 14(*a*) through 14(*k*).

Up to a point of time t10 where neither the SEF signal nor the OCD signal are received (i.e., both the SEF signal and the OCD signal are in the "L" level) as shown in FIGS. 13(*a*), 14(*a*) and 14(*b*), for example, counting by the write address counting unit 35C (the 53-counting counter 351C) as shown in FIGS. 13(*d*) and 14(*f*) and counting by the write cell number counting unit 35D (the quarternary counter 352D) as shown in FIG. 14(*e*) are repeatedly conducted as usual each time the ATM leading pulse becomes the "H" level as shown in FIG. 13(*b*), and the ATM cell data (A through D) are successively written in the FiFo storage 34 as shown in FIGS. 13(*e*) and 14(*d*).

Concretely, in the FiFo storage 34, ATM cell data is successively written in byte (A-0 through A-52, B-0 through B-52 and the like) at this time according to write cell numbers from "0" to "3" generated by the quarternary counter 352D of the write cell number counting unit.35D and write addresses from "0" to "52" generated by the 53-counting counter 351C of the write address counting unit 35C, as shown in FIGS. 14(*g*) through 14(*j*).

While the ATM cell enable pulse is in the "L" level during points of time from t8 to t9 as shown in FIG. 13(*c*), the ATM cell data is not received. A write address fed from the write address counting unit 35C is therefore set to "0" as shown in FIG. 13(*d*). The ATM cell data (A through D).written in the FiFo storage 34 as above is read out, lagging behind by a half cycle of the write cycle as shown in FIGS. 13(*f*) and 14(*k*).

After that, when out of synchronization of the STM frame is detected by the STM synchronizing unit 21 of the receive STM processing unit 2 and the SEF signal becomes the "H" level at a point of time t10 [in this case, the OCD signal becomes the "H" level, too, as shown in FIG. 14(b)] as shown in FIGS. 13(a), 13(h) and 14(a), for example, signals to be fed to load terminals (Ls) of the 53-counting counter 351C of the write address counting unit 35C and the quarternary counter of the quarternary counter 352D of the write cell number counting unit 35D become the "H" level, data "00" is read from the data terminals (Ds), and the write address are forcibly fixed (reset) to "0".

Here, an "H" level signal fed from the OR gate 351B is, however, inputted to the load terminal (L) of the 53-counting counter 351 in this case. For this, if a clock to be inputted to the clock terminal (CL) has a cycle as shown in FIG. 13(g), for example, the write address becomes "0" from a point of time till, lagging behind by one clock cycle from a point of time t10 at which the SEF signal has become the "H" level as shown in FIG. 13(k).

As a result, the ATM cell data [ATM cell data (E) in FIGS. 13(e) and 14(d) ] lacking reliability in quality in the course of writing in the FiFo storage 34 is stopped (inhibited) to be written therein when the SEF signal is generated. Incidentally, why the ATM cell data (E) is written in the FiFo storage 34 even if the SEF signal is generated is that only synchronization of the STM frame is out but the header portion of the ATM cell 11 is normal.

Figure 14G:
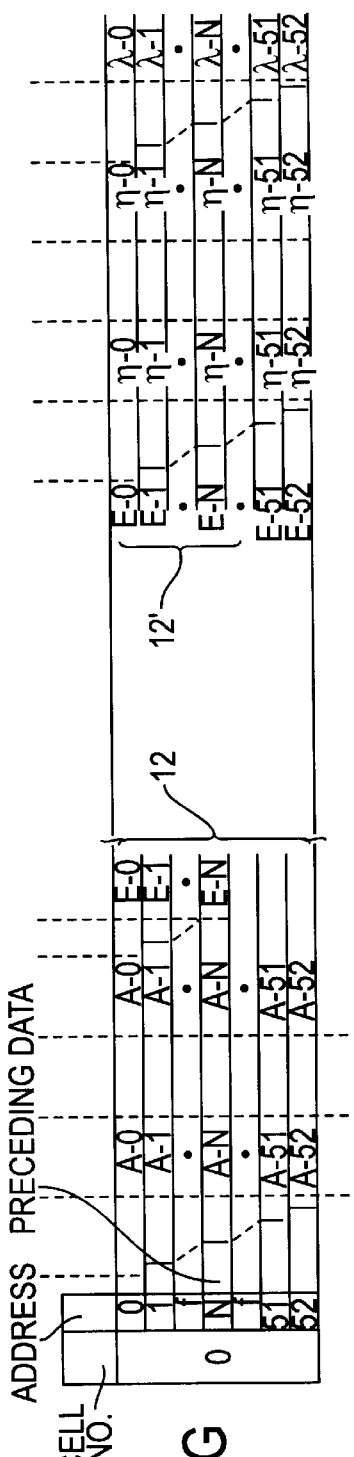
Figure 14H:
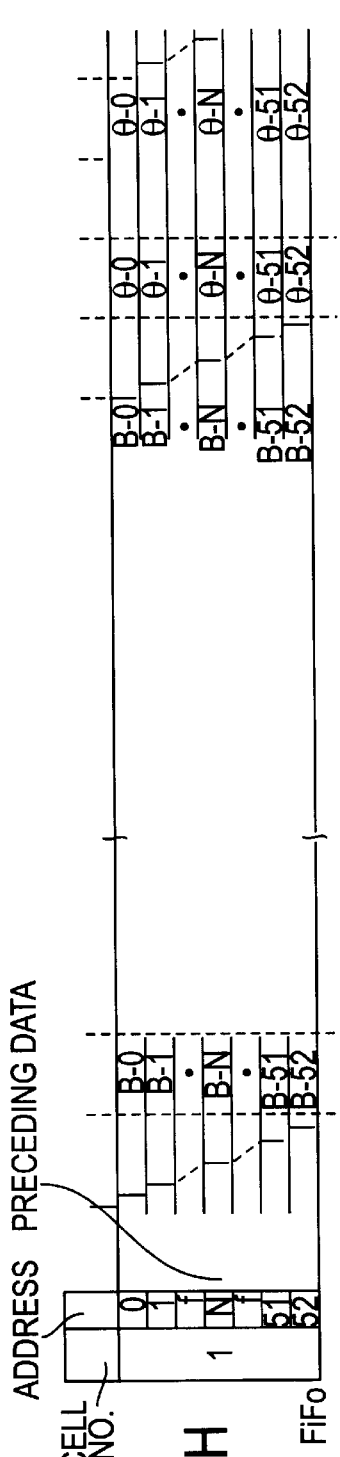
Figure 14I:
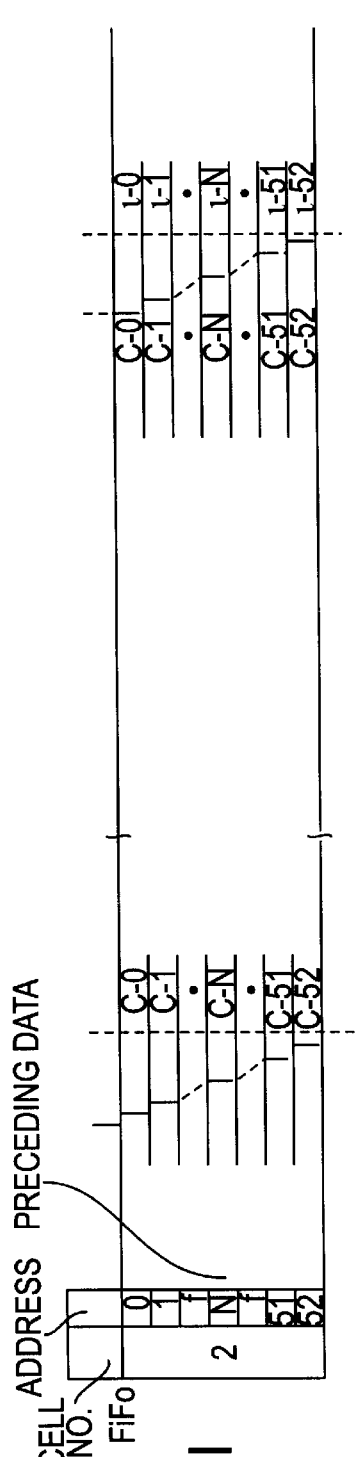
Figure 14J:
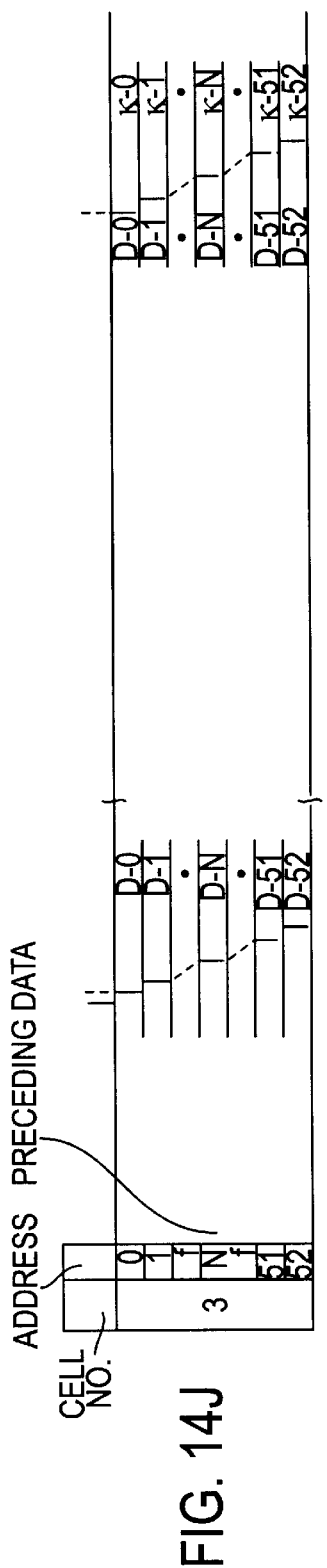
Figure 14K:
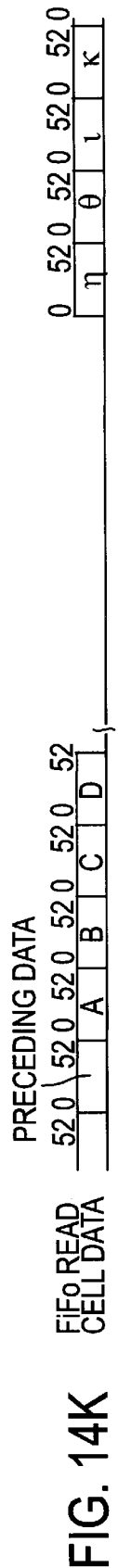

If synchronization of the STM frame received by the STM synchronizing unit 21 of the receive STM processing unit 2 is established at the point of time t11 as shown in FIG. 14(d), generation of the SEF signal is cancelled (the SEF signal becomes the "Low" level), after that, a normal ATM cell 11 is successively received seven times by the ATM cell synchronizing unit 32 as shown in FIG. 14(b) [refer to ① through ⑦ in FIG. 14(d)], generation of the OCD signal is thus cancelled at a point of time t12, the write cell number counting unit 35D and the write address counting unit 35C resume the counting as shown in FIGS. 14(e) and 14(f), respectively, so that the ATM cell data (η, θ, . . .) is successively written in byte in the FiFo storage 34 from that point of time as shown in FIGS. 14(g) through 14(j).

In the FiFo writing unit 35, if the STM synchronizing unit 21 of the receive STM processing unit 2 comes to not detect the out of synchronization information of the STM frame, the write address counting controlling unit 35B resumes counting by the write address counting unit 35C when a normal ATM cell 11 is successively received predetermined times (7 times, here) by the ATM cell synchronizing unit 32 and an output of the OCD signal is cancelled, the ATM cell data is thus written in the FiFo storage 34.

Incidentally, the ATM cell data [refer to reference numeral 12 in FIG. 14(g) ] whose quality has been degraded in the course of writing in the FiFo storage 34 at a point of time at which the SEF signal is generated is overwritten by ATM cell data after restoration to the normal state so as to be erased as shown by reference numeral 12' in FIG. 14(g).

In the above FiFo writing unit 35, when the STM synchronizing unit 21 of the receive STM processing unit 2 detects out of synchronization of the STM frame and the SEF signal is generated, the write address counting controlling unit 35B stops the 53-counting counter 351C counting a write address for the ATM cell 11 and the quarternary counter 352D counting a write cell number for the ATM cell 11. It is thereby possible to inhibit the ATM cell data lacking reliability in signal quality from being written in the FiFo storage 34 quite easily so as to avoid the ATM cell 11 without assurance of its quality from being captured in the terminating apparatus 1.

If the STM synchronizing unit 21 of the receive STM processing unit 2 comes to not detect the out of synchronization of the STM frame, writing of the ATM cell data in the FiFo storage 34 is resumed when normal ATM cell data is successively received seven times so that normal ATM cell data can be promptly captured in the terminating apparatus 1 after synchronization of the STM frame has been established.

Figure 15:
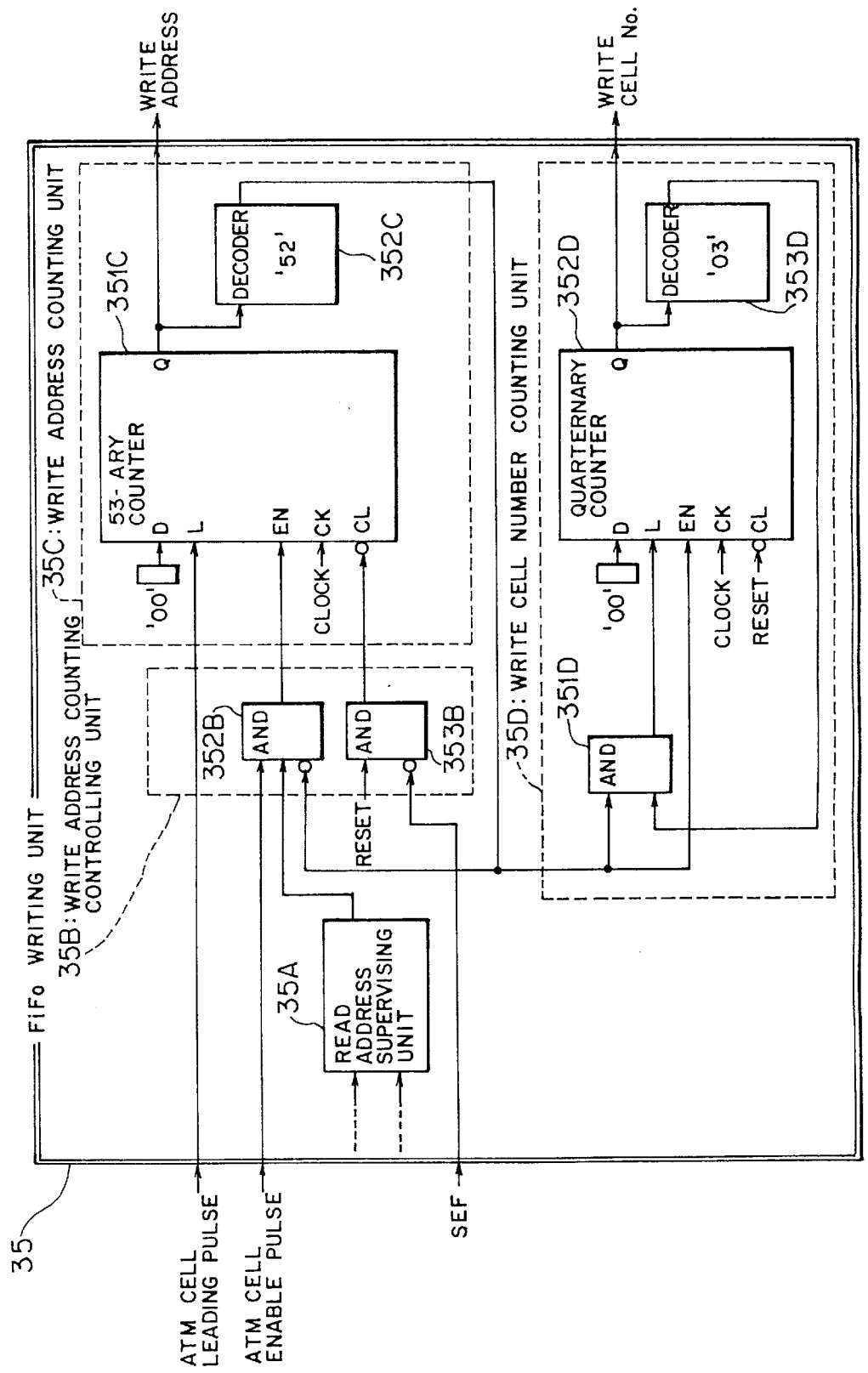
FIG. 15 is a block diagram showing a modification of the FiFo writing unit in the STM/ATM converting transmission path terminating apparatus according to the first embodiment.

The FiFo writing unit 35 shown in FIG. 12 stops counting by the 53-counting counter 351C and the quarternary counter 352D when the SEF signal is generated by using the OR gate 351B conducting a logical sum arithmetic operation on the ATM cell leading pulse and the SEF signal in the write address counting controlling unit 35B. However, it is alternatively possible, as shown in FIG. 15, to use an AND gate 353B of a one-input inverting type for conducting a logical multiplication arithmetic operation on a signal obtained by inverting the SEF signal and a reset signal, and input an output of the AND gate 353B to a clock terminal (CL) of the 53-counting counter 351C, thereby stopping the counting by the counter 351C and the counter 352D when the SEF signal is generated, as well.

In which case, if a clock inputted to the clock terminal (CL) of the 53-counting counter 351C has a cycle as shown in FIG. 13(g), the write address is spontaneously fixed to "0" at a point of time at which the SEF signal becomes the "H" level as shown in FIG. 13(l) since an output of the AND gate 353B is inputted to the clock terminal (CL) of the 53-counting counter 351C.

Alternatively, the above ATM cell extracting unit 3 can execute at least any one process among a process of outputting the OCD signal from the above STM cell synchronizing unit 32 to forcibly bring the received STM frame to the out of synchronization, a process of forcibly outputting the cell discard signal from the ATM cell discard judging unit 33 and a process of forcibly inhibiting the ATM cell data from being written in the FiFo storage 34 by the FiFo writing unit 35 when receiving the SEF signal detected by the STM synchronizing unit 21 of the receive STM processing unit 2.

Next, detailed description will be made of the receive STM processing unit 2 (the error information detecting unit 23) and the transmit STM processing unit 6 (the error information inserting unit 61) shown in FIG. 4.

Figure 16:
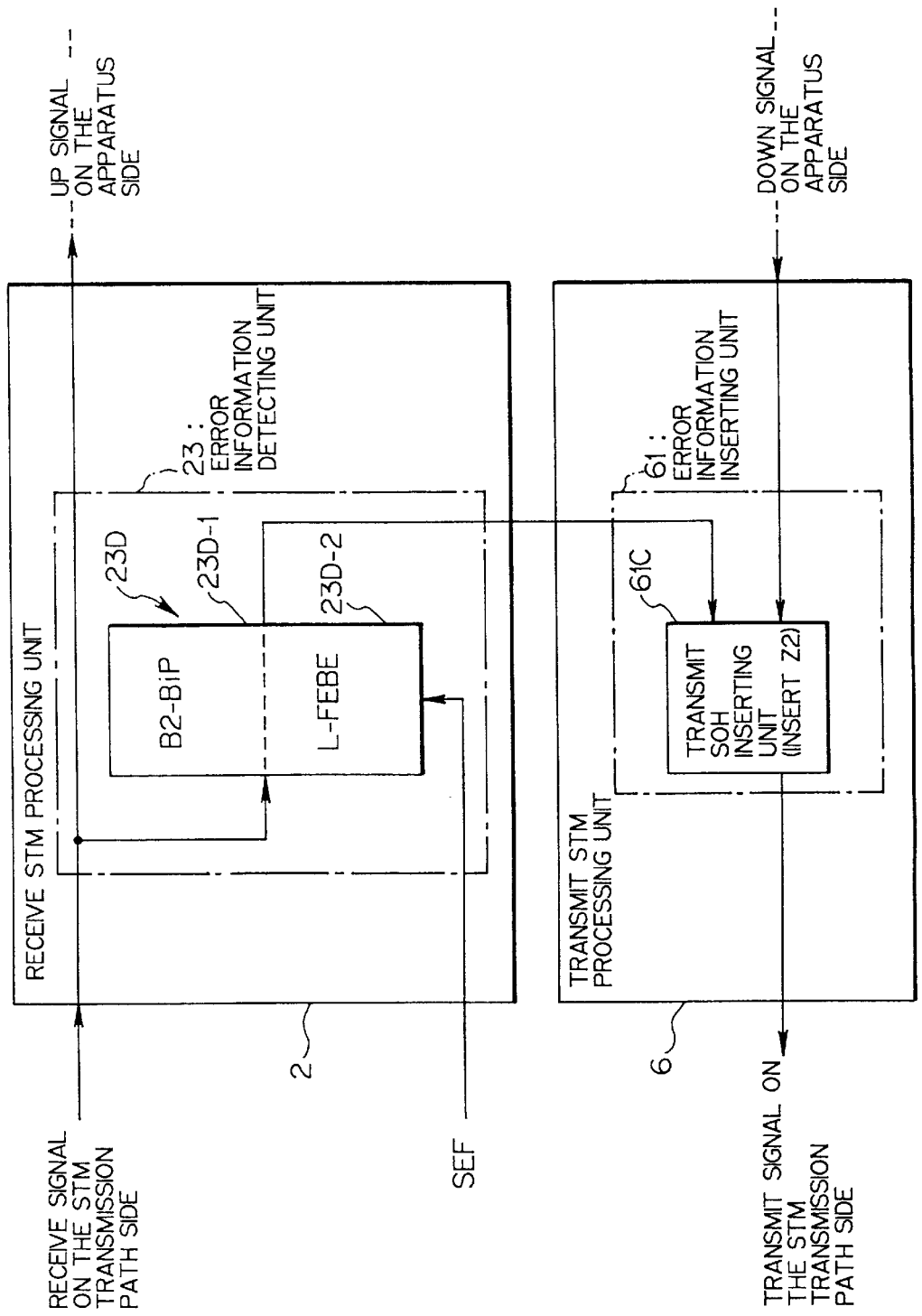
FIG. 16 is a block diagram showing structures of essential parts of an error information detecting unit and an error information inserting unit in the STM/ATM converting transmission path terminating apparatus according to the first embodiment.

FIG. 16 is a block diagram showing structures of essential parts of the error information detecting unit 23 and the error information inserting unit 61. As having been described hereinbefore, the error information detecting unit 23 has the B2 byte processing unit 23D, whereas the error information inserting unit 61 has the transmit section overhead inserting unit 61C. Further, the B2 byte processing unit 23D has a B2 byte arithmetic operation processing unit 23D-1 and a line far end block error information (L-FEBE) detecting unit 23D-2.

Figure 17:
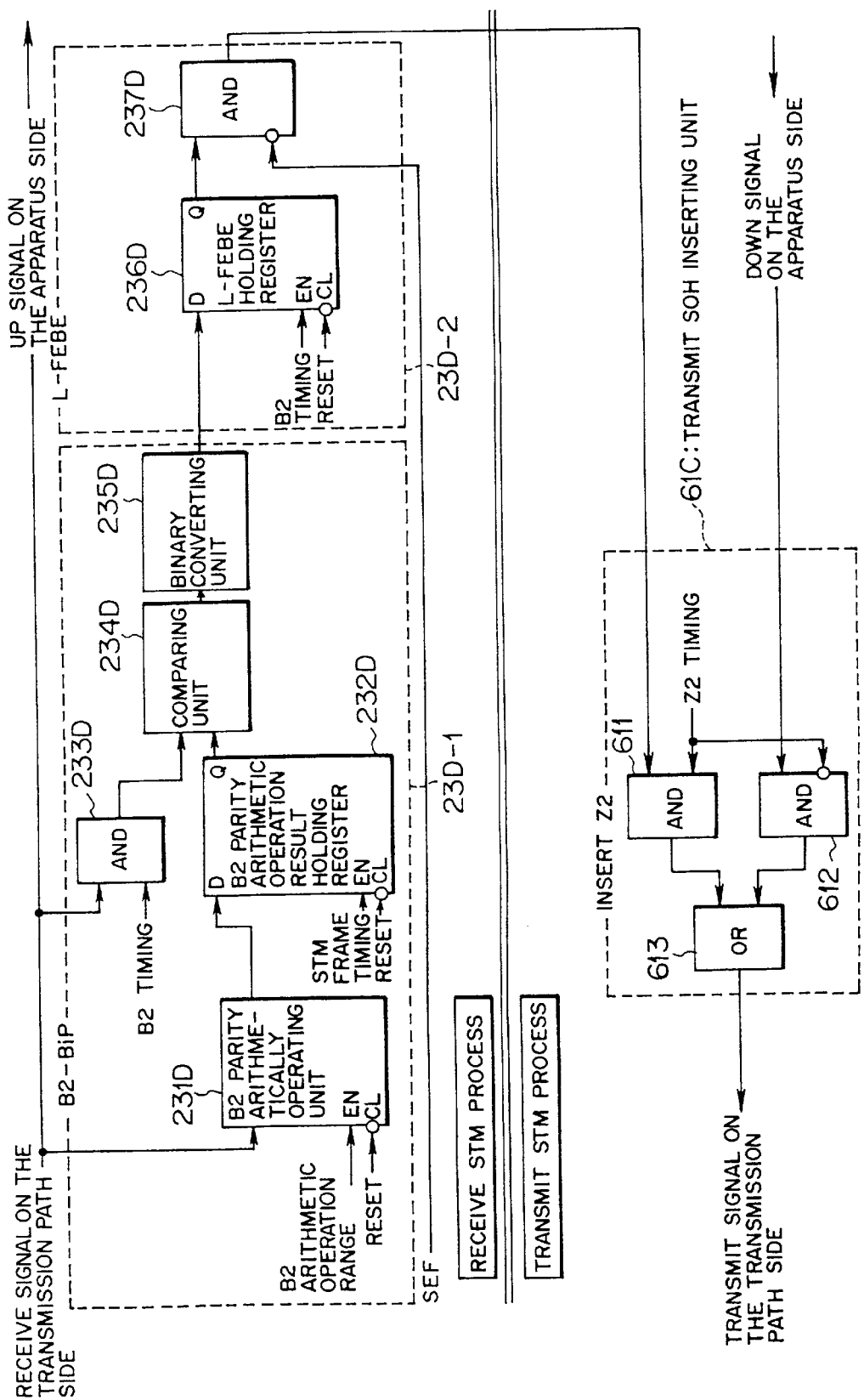
FIG. 17 is a block diagram showing in detail the structures of the essential parts of the error information detecting unit and the error information inserting unit in the STM/ATM converting transmission path terminating apparatus according to the first embodiment.

As shown in FIG. 17, the B2 byte arithmetic operation processing unit 23D-1 has a B2 parity arithmetically operating unit 231D, a B2 parity arithmetic operation result holding register 232D, an AND gate 233D, a comparing unit 234D and a binary converting unit 235D. The line far end block error information detecting unit 23D-2 has a line far end block error information holding register 236D and an AND gate 237D of a one-input inverting type. The section overhead inserting unit 61C has an AND gate 611, an AND gate 612 of a one-input inverting type and an OR gate 613.

In the B2 byte arithmetic operation processing unit 23D-1, the B2, parity arithmetically operating unit 231D conducts a parity arithmetic operation on the B2 byte included in the section overhead 8 of the received STM frame according to an arithmetic operation range of the parity arithmetic operation on the B2 byte inputted from the outside and the reset signal to detect B2 parity error information used to supervise an error in the STM transmission path (section). The B2 parity arithmetic operation result holding register 232D temporarily holds a result of the arithmetic operation (the B2 parity error information) obtained in the B2 parity arithmetically operating unit 231D, and outputs it according to an STM frame timing inputted every leading position of the STM frame.

The AND gate 233D conducts a logical multiplication: arithmetic operation on the received STM frame and a hunt timing of the B2 byte and outputs a compare timing for the comparing unit 234D. The comparing unit 234D compares the compare timing fed from the AND gate 233D with the result of the B2 parity arithmetic operation fed from the B2 parity arithmetic operation result holding register 232D to output the result of the B2 parity arithmetic operation at every compare timing. The binary converting unit 234D converts the result of the B2 parity arithmetic operation into a binary code (binary data).

In the line far end block error information detecting unit 23D-2, the line far end block error information holding register 236D temporarily holds the result of the B2 parity arithmetic operation fed from the binary converting unit 235D of the B2 byte arithmetic operation processing unit 23D-1 as line far end block error information, and outputs it at each detect timing (the B2 timing) of a B2 byte position of the section overhead 8. The AND gate 237D of a one-input inverting type conducts a logical multiplication arithmetic operation on an output of the line far end block error information holding register 236D and an inverted signal of the SEF signal fed from the STM synchronizing unit 21.

In the transmit section overhead inserting unit 61C of the transmit STM processing unit 6, the AND gate 611 conducts a logical multiplication arithmetic operation on an output of the above line far end block error information detecting unit 23D-2 (the AND gate 237D) and a Z2 timing inputting every position of the Z2 byte (a byte used to notify an error of multiplexing of the ATM cell 11) of the section overhead 8. The AND gate 612 of a one-input inverting type conducts a logical multiplication arithmetic operation on a transmit STM frame (a down signal on the apparatus side) and the Z2 timing. The OR gate 613 conducts a logical sum arithmetic operation on outputs of these AND gates 611 and 612.

In the error information inserting unit 61 (the transmit section overhead inserting unit 61C), when the SEF signal is generated (becomes the "H" level) by the STM synchronizing unit 21 and an output of the AND gate 237D of the line far end block error information detecting unit 23D-2 thus becomes the "L" level, an output of the AND gate 611 becomes the "L" level, too. Therefore, line far end block error information at that time is not inserted as the Z2 byte of the section overhead 8 that should be inserted in the down signal on the apparatus side.

When the error information detecting unit 23 of the receive STM processing unit 2 detects the line far end block error information by means of the line far end block error information detecting unit 23D-2 and receives the SEF signal from the STM synchronizing unit 21, the STM/ATM converting transmission path terminating apparatus 1 according to this embodiment inhibits transfer of the line far end block error information to the error information inserting unit 61 (the transmit section overhead inserting unit 61C) of the transmit STM processing unit 6.

Hereinafter, operations of the error information detecting unit 23 of the receive STM processing unit 2 and the error information inserting unit 61 of the transmit STM processing unit 6 with the above structures will be described in detail using a timing chart shown in FIGS. 18(a) through 18(g).

If it is assumed that the receive STM processing unit 2 receives one frame of the STM frame per 125 µs as shown in FIG. 18(a), the STM synchronizing unit 21 detects a frame leading position from the A1 byte of the section overhead 8 at every timing during points of time t13 through t18 as shown in FIG. 18(b), thereby detecting a B2 byte position on the basis of this at each timing as shown at points of time t19 through t24.

In the B2 byte processing unit 23D-1 of the error information detecting unit 23, the B2 parity arithmetically operating unit 231D conducts a parity arithmetic operation on the B2 byte according to a detect timing of the B2 byte position, and the B2 parity arithmetic operation result holding register 232D holds a result of this arithmetic operation.

At this time, the above detect timing for the B2 byte position is inputted as the B2 timing for the AND gate 233D of the B2 byte processing unit 23D-1. According to the B2 timing, the comparing unit 234D successively outputs results of the B2 parity arithmetic operation (A through F) as shown in FIG. 18(c), for example, the binary converting unit 235D converts each of them into binary data as shown in FIG. 18(d), then the line far end block error information holding register 236D holds them.

As shown in FIG. 18(e), for example, when out of synchronization of the STM frame is detected by the STM synchronizing unit 21, the SEF signal is generated (becomes the "H" level) during points of time from t25 to t26 and a signal obtained by inverting this SEF signal is inputted to the AND gate 237D of the line far end block error information detecting unit 23D-2, an output of the AND gate 237D becomes the "L" level so that the line far end block error information to be transferred to the transmit STM processing unit 6 becomes "0" as shown in FIG. 18(f), for example.

As a result, in the transmit section overhead inserting unit 61C of the transmit STM processing unit 6 which receives an output of the AND gate 237D as an input, an output of the transmit section overhead inserting unit 61C becomes "0" since one input of the AND gate 611 is "0" so that "0" is inserted in the Z2 byte of the section overhead 8 as the line far end block error information while the SEF signal is generated as shown in FIG. 18(g) and the STM frame is transmitted to the STM transmission path.

In order to prevent line far end block error information having possibility of an error in results of the arithmetic operation obtained while out of synchronization of the STM frame is detected by the STM synchronizing unit 21 and the SEF signal is thus generated from being inserted in an STM frame that should be transmitted, the error information detecting unit 23 stops transfer of the line far end block error information to the error information inserting unit 61 while the SEF signal is generated.

In the error information detecting unit 23 of the above receive STM processing unit 2, transfer of line far end block error information to the error information inserting unit 61 (the transmit section overhead inserting unit 61C) of the transmit STM process unit 6 is inhibited while out of synchronization of the received STM frame is detected in the STM synchronizing unit 21 and the SEF signal is thus generated so that line far end block error information lacking reliability obtained while synchronization of the received STM frame is out is not transferred. In consequence, it is possible to certainly prevent unnecessary switching of the transmission path in an apparatus or the like which receives the line far end block error information to switch the transmission path.

Figure 19:
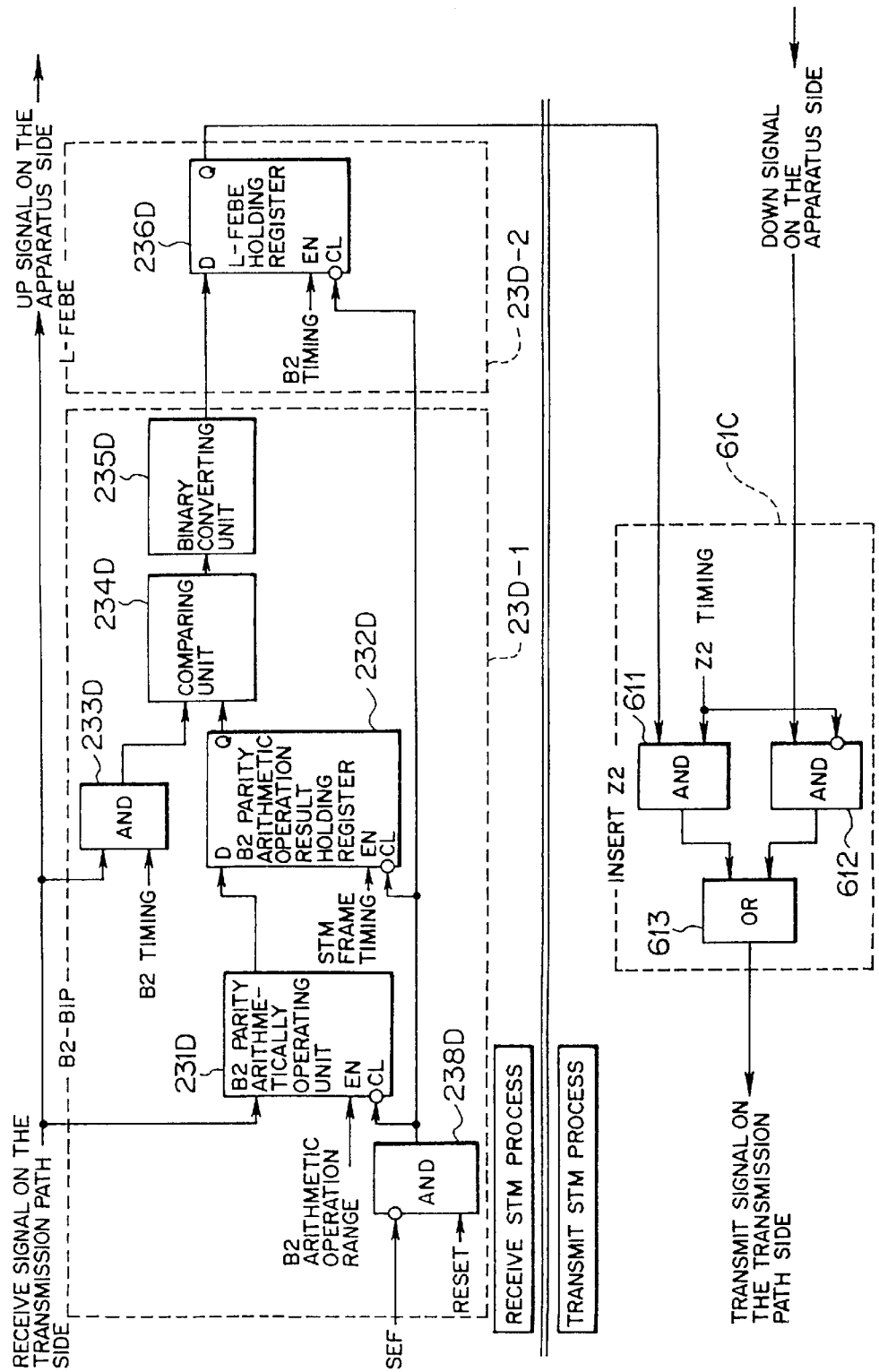
FIG. 19 is a block diagram showing in detail the essential parts of the error information detecting unit and the error information inserting unit in the STM/ATM converting transmissaccording to theting apparatus according to the first embodiment.

The above error information detecting unit 23 shown in FIG. 17 can be alternatively configured such that, as shown in FIG. 19, the AND gate 237D of the line far end block error information detecting unit 23D-2 is omitted, and an AND gate 238D of a one-input inverting type for conducting a logical multiplication arithmetic operation on an inverted signal of the SEF signal and the reset signal is used in the B2 byte arithmetic operation processing unit 23D-1, and a signal obtained by inverting an output of the AND gate 238D is inputted to each of clock terminals (CLs) of the B2 parity arithmetically operating unit 231D, the B2 parity arithmetic operation result holding register 232D and the line far end block error information holding register 236D of the line far end block error information detecting unit 23D-2, whereby it is possible, as well, to inhibit transfer of the line far end block error information to the error information inserting unit 61 while the SEF signal is generated.

Figure 20:
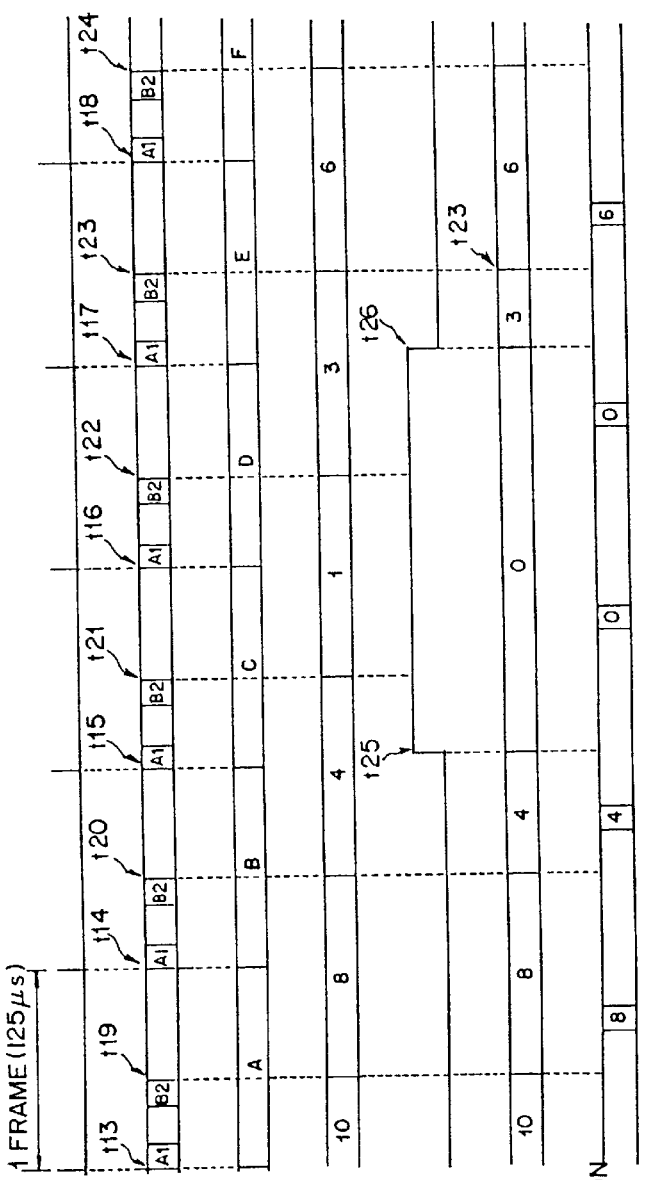
FIGS. 20(a) through 20(g) are timing charts for illustrating the operations of the essential parts of the error information detecting unit and the error information inserting unit in the STM/ATM converting transmission path terminating apparatus according to the first embodiment.

In the error information detecting unit 23 shown in FIG. 17, the line far end block error information is outputted from the AND gate 237D as usual from a point of time t26 at which generation of the SEF signal is cancelled, as shown in FIG. 18(f). In the above case, the line far end block error information is outputted from the line far end block error information holding register 236D from a detect timing (a point of time t23) of the first B2 byte position after generation of the SEF signal has been cancelled, as shown in FIG. 20(f).

Figure 21:
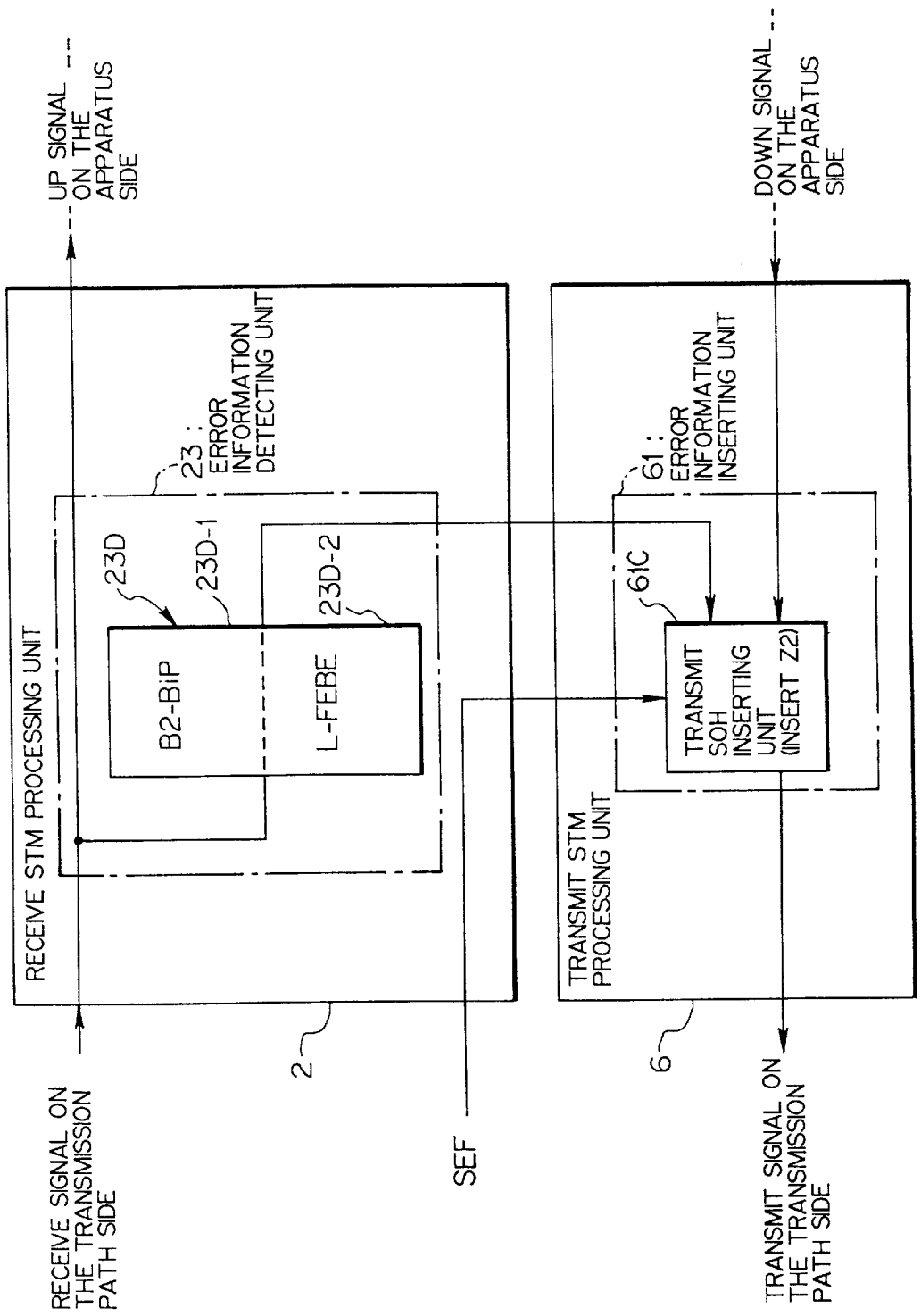
FIG. 21 is a block diagram showing the structures of the essential parts of the error information detecting unit and the error information inserting unit in the STM/ATM converting transmission path terminating apparatus according to the first embodiment.

The above description has been made by way of an example in which the SEF signal fed from the STM synchronizing unit 21 of the receive STM processing unit 2 is received by the error information detecting unit 23 (the B2 byte processing unit 23D) of the receive STM processing unit 2 in the terminating apparatus 1. However, it is alternatively possible that the SEF signal is received by the error information inserting unit 61 (the transmit section overhead inserting unit 61C) of the transmit STM processing unit 6 as shown in FIG. 21, for example.

Figure 22:
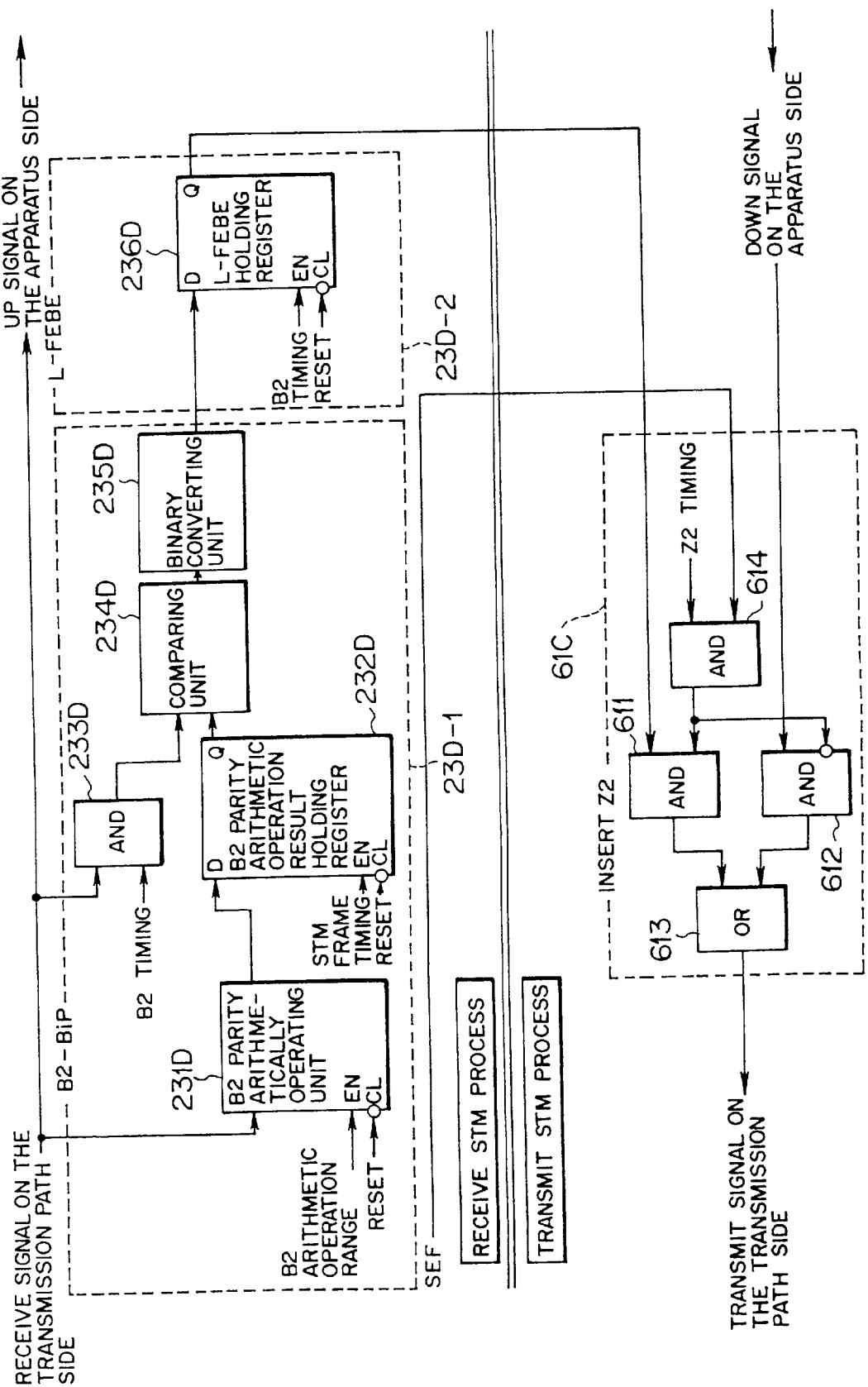
FIG. 22 is a block diagram showing in detail the structures of the essential parts of the error information detecting unit and the error information inserting unit in the STM/ATM converting transmission path terminating apparatus according to the first embodiment.

In which case, the B2 byte processing unit 23D and the transmit section overhead inserting unit 61C are configured as shown in FIG. 22. Namely, the B2 byte processing unit 23D has the line far end block error information detecting unit 23D-2 having a structure shown in FIG. 17 in which the AND gate 237D is omitted, whereas the transmit section overhead inserting unit 61C has an AND gate 614 of a one-input inverting type for conducting a logical multiplication arithmetic operation on the Z2 timing and an inverted signal of the SEF signal, in addition to the structure shown in FIG. 17.

In the error information detecting unit 23 and the error information inserting unit 61 shown in FIG. 22, with the above structure, when the SEF signal becomes the "H" level during points of time from t25 to t26 as shown in FIG. 23(e), for example, output data of the AND gate 614 of the transmit section overhead inserting unit 61C becomes "0", and "0" is inserted in the Z2 byte of the section overhead 8 as shown in FIG. 23(h), as well. As a result, transfer of the line far end block error information to the error information inserting unit 61 is stopped (inhibited) while the SEF signal is generated.

Incidentally, FIGS. 23(a) through 23(e) correspond to FIGS. 18(a) through 18(e), respectively. FIG. 23(f) shows an example of an insert timing for the Z2 byte (the Z2 timing), while FIG. 23(g) shows an example of a down signal on the apparatus side to which the Z2 byte is inserted (an STM frame: provided data "0" is in advance inserted in the overhead portion in this case).

Figure 24:
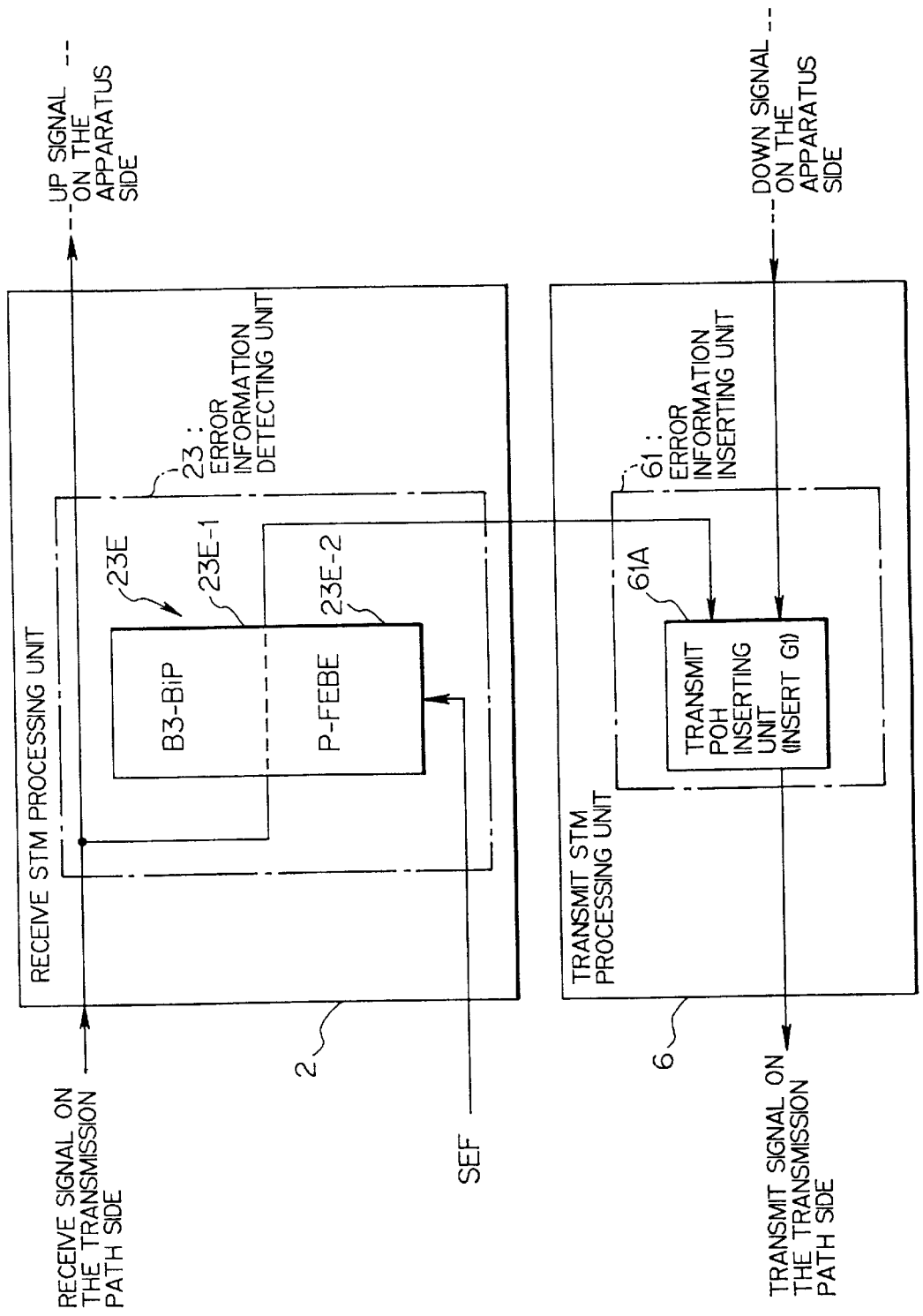
FIG. 24 is a block diagram showing the structures of the essential parts of the error information detecting unit and the error information inserting unit in the STM/ATM converting transmission path terminating apparatus according to the first embodiment.

FIG. 24 is a block diagram showing structures of essential parts of the error information detecting unit 23 and the error information inserting unit 61. As having been described hereinbefore with reference to FIG. 4, the error information detecting unit 23 has the B3 byte processing unit 23E other than the above-mentioned B2 byte processing unit 23D, the error information inserting unit 61 has the transmit path overhead inserting unit 61A other than the above-mentioned transmit section overhead inserting unit 61C. Further, the B3 byte processing unit 23E has a B3 byte arithmetic operation processing unit 23E-1, and a path far end block error information (P-FEBE) detecting unit 23E-2.

Figure 25:
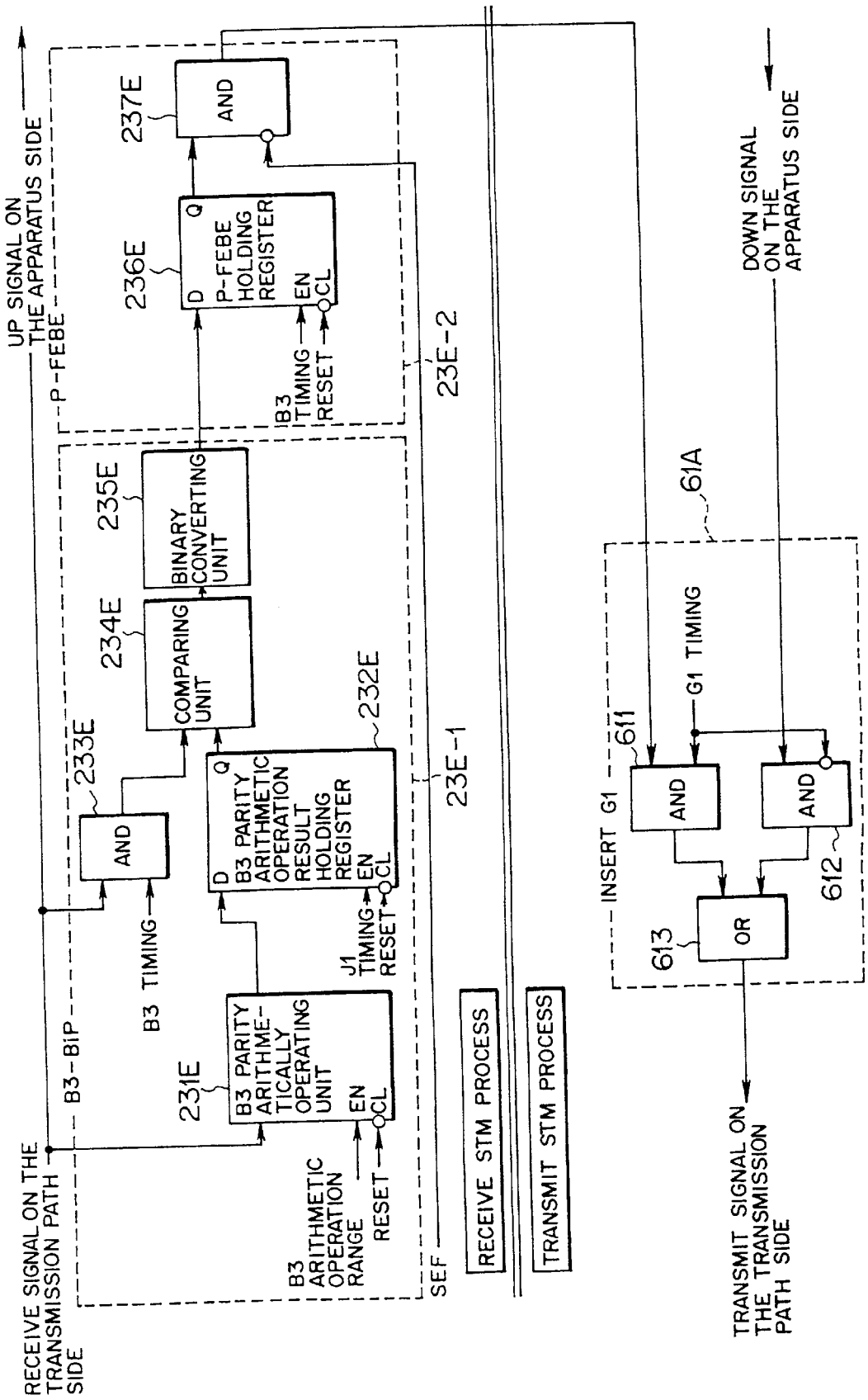
FIG. 25 is a block diagram showing in detail the structures of the essential parts of the error information detecting unit and the error information inserting unit in the STM/ATM converting transmission path terminating apparatus according to the first embodiment.

As shown in FIG. 25, the B3 byte arithmetic operation processing unit 23E-1 has a B3 parity arithmetically operating unit 231E, a B3 parity arithmetic operation result holding register 232E, an AND gate 233E, a comparing unit 234E and a binary converting unit 235E. The path far end block error information detecting unit 23E-2 has a path far end block error information holding register 236E and an AND gate 237E of a one-input inverting type. Further, the transmit path overhead inserting unit 61A has, similarly to the transmit section overhead inserting unit 61C having been described with reference to FIG. 17, the AND gate 611, the AND gate 612 of a one-input inverting type and the OR gate 613.

In the B3 byte arithmetic operation processing unit 23E-1, the B3 parity arithmetically operating unit 231E conducts a parity arithmetic operation on the B3 byte [refer to FIG. 69(b)] included in the path overhead 9 of the received STM frame according to an arithmetic operation rage of the parity arithmetic operation on the B3 byte and a reset signal inputted from the outside to detect B3 parity error information used to supervise an error in the STM transmission path (the path). The B3 parity arithmetic operation result holding register 232E outputs a result of the arithmetic operation (the B3 parity error information) obtained in the B3 parity arithmetically operating unit 231E according to an inputted STM frame timing each time a leading position (the A1 byte) of the STM frame is detected.

The AND gate 233E conducts a multiplication product arithmetic operation on the received STM frame and a hunt timing for the B3 byte, and outputs a compare timing for the comparing unit 234E. The comparing unit 234E compares the compare timing fed from the AND gate 233E with a result of the B3 parity arithmetic operation fed from the B3 parity arithmetic operation result holding register 232E, and outputs a result of the B3 parity arithmetic operation at each comparing timing. The binary converting unit 235E converts a result of the B3 parity arithmetic operation into a binary code (binary data).

In the line far end block error information detecting unit 23E-2, the path far end block error information holding register 236E temporarily holds the result of the B3 parity arithmetic operation fed from the binary converting unit 235E of the B3 byte arithmetic operation processing unit 23E-1 as path far end block error information, and outputs it at each detect timing (the B3 timing) of a B3 byte position of the path overhead 9. The AND gate 237E of a one-input inverting type conducts a logical multiplication arithmetic operation on an output of the path far end block error information holding register 236E and an inverted signal of the SEF signal fed from the STM synchronizing unit 21.

In the transmit path overhead inserting unit 61A of the transmit STM processing unit 6, the AND gate 611 conducts a logical multiplication arithmetic operation on an output of the above line far end block error information detecting unit 23E-2 (the AND gate 237E) and a hunt timing (G1 timing)

of a G1 byte (a byte used to notify an error of a transmission path state) position of the path overhead 9. The AND gate 612 of a one-input inverting type conducts a logical multiplication arithmetic operation on a transmit STM frame (a down signal on the apparatus side) and the GI timing. The OR gate 613 conducts a logical sum arithmetic operation on outputs of these AND gates 611 and 612.

In the error information inserting unit 61 (the transmit path overhead inserting unit 61A), when the SEF signal is generated (becomes the "H" level) by the STM synchronizing unit 21 so that an output of the AND gate 237E of the path far end block error information detecting unit 23E-2 becomes the "L" level, an output of the AND gate 611 becomes the "L" level. Therefore, the path far end block error information at that time is not inserted as the G1 byte of the section overhead 8 that should be inserted in the down signal on the apparatus side.

Namely, in the STM/ATM converting transmission path terminating apparatus 1 according to this embodiment, when the error information detecting unit 23 of the receive STM processing unit 2 detects the path far end block error information by means of the path far end block error information detecting unit 23E-2 and while the error information detecting unit 23 receives the SEF signal from the STM synchronizing unit 21, transfer of this path far end block error information to the error information inserting unit 61 (the transmit path overhead inserting unit 61A) of the transmit STM processing unit is inhibited.

Hereinafter, operations of the error information detecting unit 23 of the receive STM processing unit 2 and the error information inserting unit 61 of the transmit STM processing unit 6 will be described in detail with reference to a timing chart shown in FIGS. 26(a) through 26(g).

In this case, if it is assumed that the receive STM processing unit 2 receives one frame of the STM frame per 125 μs as shown in FIG. 26(a), the STM synchronizing unit 21 detects a leading position of the path overhead 9 in the STM frame from the J1 byte of the path overhead 9 at each timing during points of time from t27 to t32 as shown in FIG. 26(b), whereby the B3 byte position is detected at a timing as shown at each of points of time t33 through t38 on the basis of the leading position of the path overhead 9.

In the B3 byte processing unit 23E-1 of the error information detecting unit 23, the B3 parity arithmetically operating unit 231E conducts the parity arithmetic operation on the B3 byte according to the detect timing of the B3 byte position, and the B3 parity result holding register 232E holds a result of the parity arithmetic operation.

At this time, the above detect timing for the B3 byte position is inputted as the B3 timing for the AND gate 233E of the B3 byte processing unit 23E-1. According to the above B3 timing, the comparing unit 234E successively outputs results of the B3 parity arithmetic operation (A through F) as shown in FIG. 26(c), the binary converting unit 235E converts each of them into binary data as shown in FIG. 26(d), then the path far end block error information holding register 236E holds them as the path far end block error information.

When out of synchronization of the STM frame is detected by the STM synchronizing unit 21 as shown in FIG. 26(e), the SEF signal is generated (becomes the "H" level) during points of time from t39 to t40, for example, and a signal obtained by inverting the SEF signal is inputted to the AND gate 237E of the path far end block error information detecting unit 23E-2, an output of the AND gate 237E becomes the "L" level so that the path far end block error information to be transferred to the transmit STM processing unit 6 becomes "0" as shown in FIG. 26(f), for example.

As a result, an output of the error information inserting unit 61 (the transmit path overhead inserting unit 61A) of the transmit STM processing unit 6 which receives an output of the AND gate 237E as an input becomes "0" since one input of the AND gate 611 is "0" so that "0" is inserted as the path far end block error information obtained while the SEF signal is generated in the G1 byte of the path overhead 9, then the STM frame is transmitted to the STM transmission path as shown in FIG. 26(g).

Namely, in order to prevent path far end block error information having possibility of an error in results of the arithmetic operation obtained while the STM synchronizing unit 21 detects out of synchronization of the STM frame and the SEF signal is thus generated from being inserted in an STM frame that should be transmitted, the error information detecting unit 23 inhibits transfer of the path far end block error information to the error information inserting unit 61 while the SEF signal is generated.

In the above error information detecting unit 23 of the receive STM processing unit 2, if out of synchronization of a received STM frame is detected by the STM synchronizing unit 21 and the SEF signal is thus generated, transfer of the path far end block error information to the error information inserting unit 61 (the transmit path overhead inserting unit 61A) of the transmit STM processing unit 6 is inhibited during that so that path far end block error information lacking reliability in results of the arithmetic operation obtained while the synchronization of the received STM frame is out is not transferred. It is therefore possible to certainly avoid unnecessary switching of the transmission path in an apparatus or the like which receives the path far end block error information to switch the transmission path.

Figure 23:
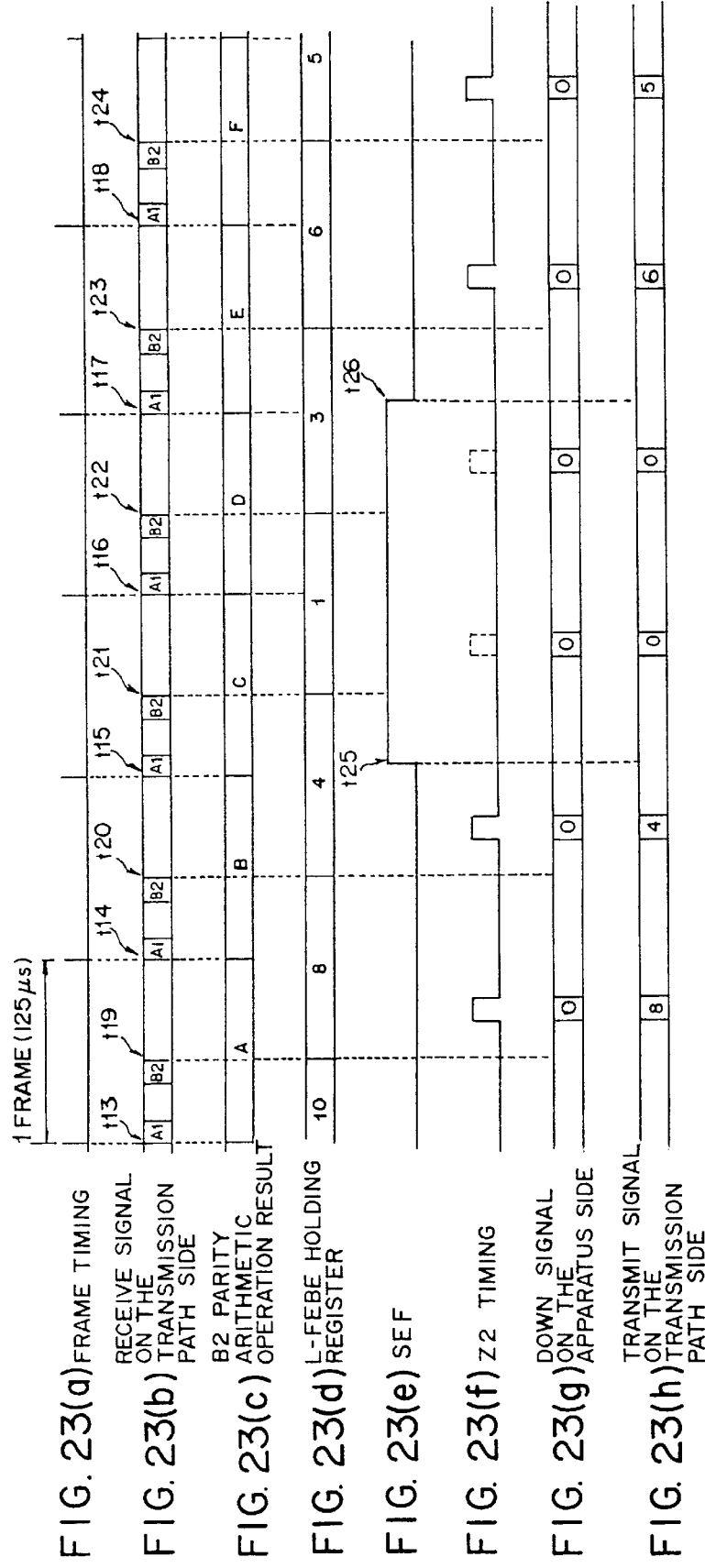
FIGS. 23(a) through 23(h) are timing charts for illustrating the operations of the essential parts of the error information detecting unit and the error information inserting unit in the STM/ATM converting transmission path terminating apparatus according to the first embodiment.
Figure 27:
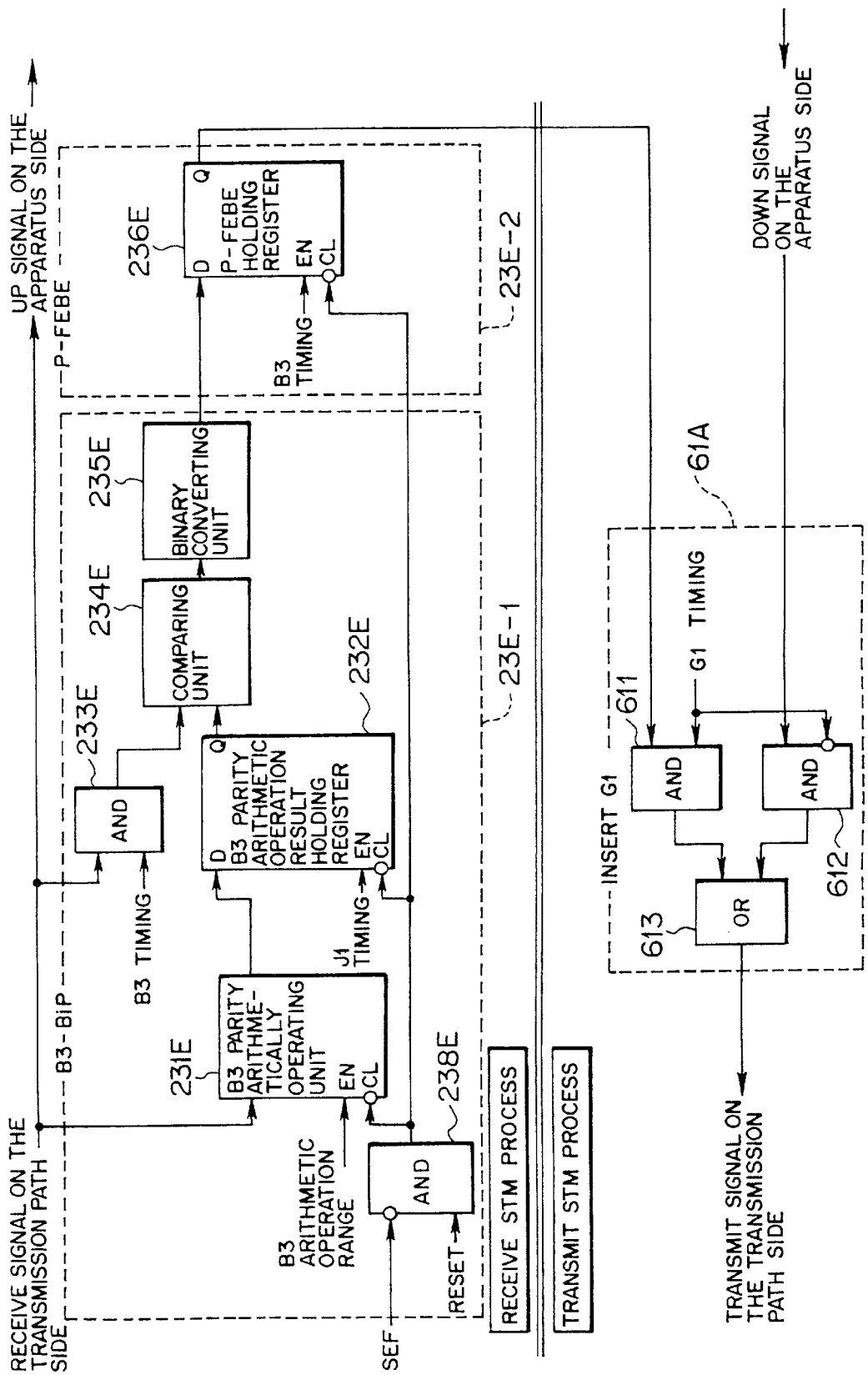
FIG. 27 is a block diagram showing in detail the essential parts of the error information detecting unit and the error information inserting unit in the STM/ATM converting transmission path terminating apparatus according to the first embodiment.

In the above error information detecting unit 23 shown in FIG. 23, it is alternatively possible, similarly to the error information detecting unit 23 shown in FIG. 17, to omit the AND gate 237E of the path far end block error information detecting unit 23E-2, use an AND gate 238E of one-input inverting type for conducting a logical multiplication arithmetic operation on an inverted signal of the SEF signal and the reset signal in the B3 byte arithmetic operation processing unit 23E-1, and input a signal obtained by inverting an output of the AND gate 238E to clock terminals (CLs) of the B3 parity arithmetically operating unit 231E, the B3 parity arithmetic operation result holding register 232E and the line far end block error information holding register 236E of the path far end block error information detecting unit 23E-2 as shown in FIG. 27. With the above arrangement, it is, as well, possible to inhibit transfer of the path far end block error information to the error information inserting unit 61 while the SEF signal is generated.

In the error information detecting unit 23 shown in FIG. 25, the path far end block error information is outputted from the AND gate 237E as usual from a point of time t40 when generation of the SEF signal is cancelled as shown in FIG. 26(f). In the above case, the path far end block error information is outputted from the path far end block error information holding register 236E at the detect timing of the first B3 byte position after generation of the SEF signal (a point of time t37) has been cancelled as shown in FIG. 28(f).

The above description has been made by way of an example in which the SEF signal fed from the STM synchronizing unit 21 of the receive STM processing unit 2 is received by the error information detecting unit 23 (the B3 byte processing unit 23E) of the receive STM processing unit 2 in the terminating apparatus 1. However, it is alternatively possible to receive the SEF signal by the error information inserting unit 61 (the transmit path overhead inserting unit 61A) of the transmit STM processing unit 6 as shown in FIG. 29, for example.

Figure 30:
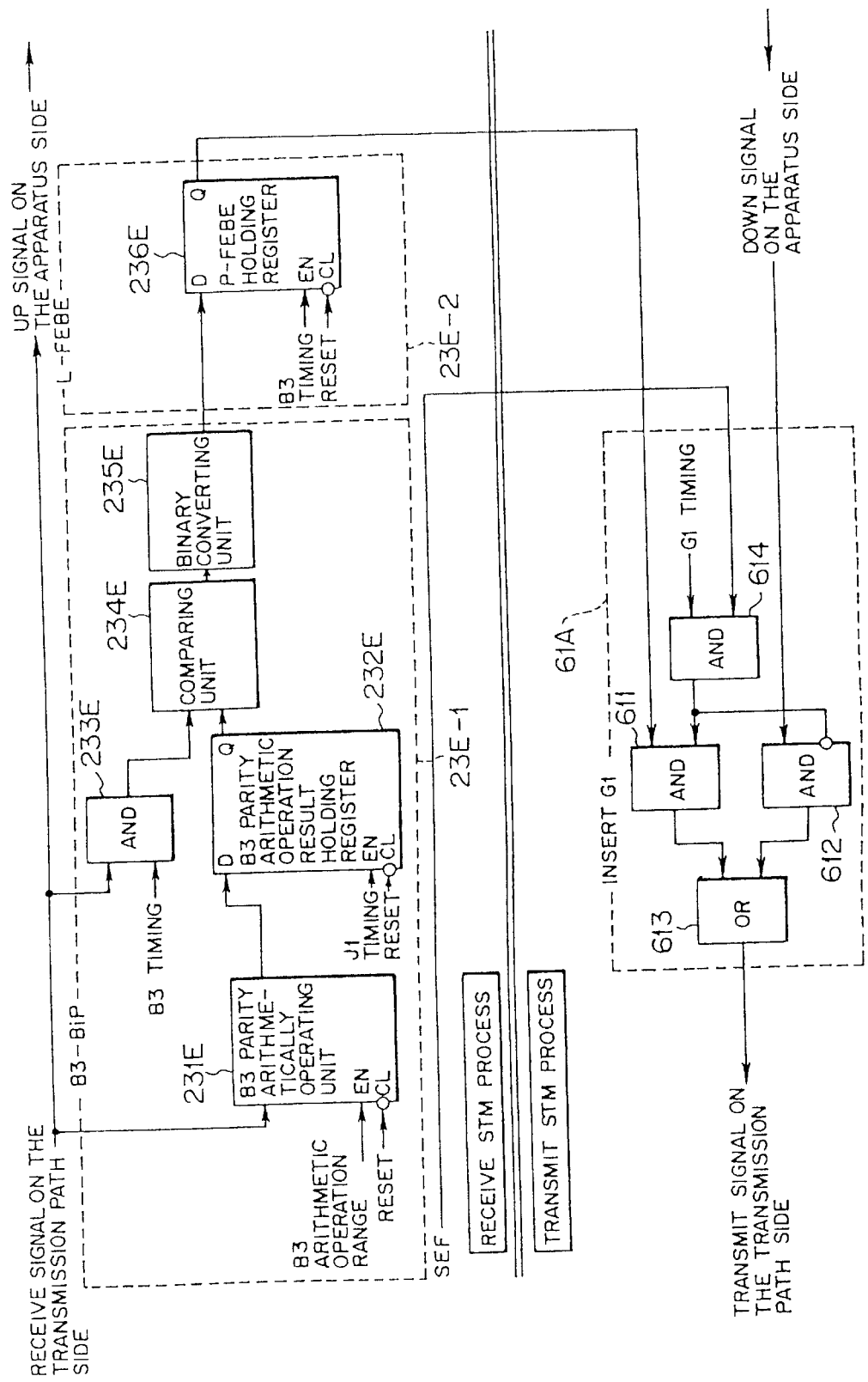
FIG. 30 is a block diagram showing in detail the essential parts of the error information detecting unit and the error information inserting unit in the STM/ATM converting transmission path terminating apparatus according to the first embodiment.

In which case, the B3 byte processing unit 23E and the transmit section overhead inserting unit 61A are configured as shown in FIG. 30. Namely, the B3 byte processing unit 23E having the structure shown in FIG. 25 has the path far end block error information detecting unit 23E-2 in which the AND gate 237E is omitted, whereas the transmit section overhead inserting unit 61C further has an AND gate 614 of a one-input inverting type for conducting a logical multiplication arithmetic operation on the G1 timing and an inverted signal of the SEF signal in addition to the structure shown in FIG. 17.

Figure 31:
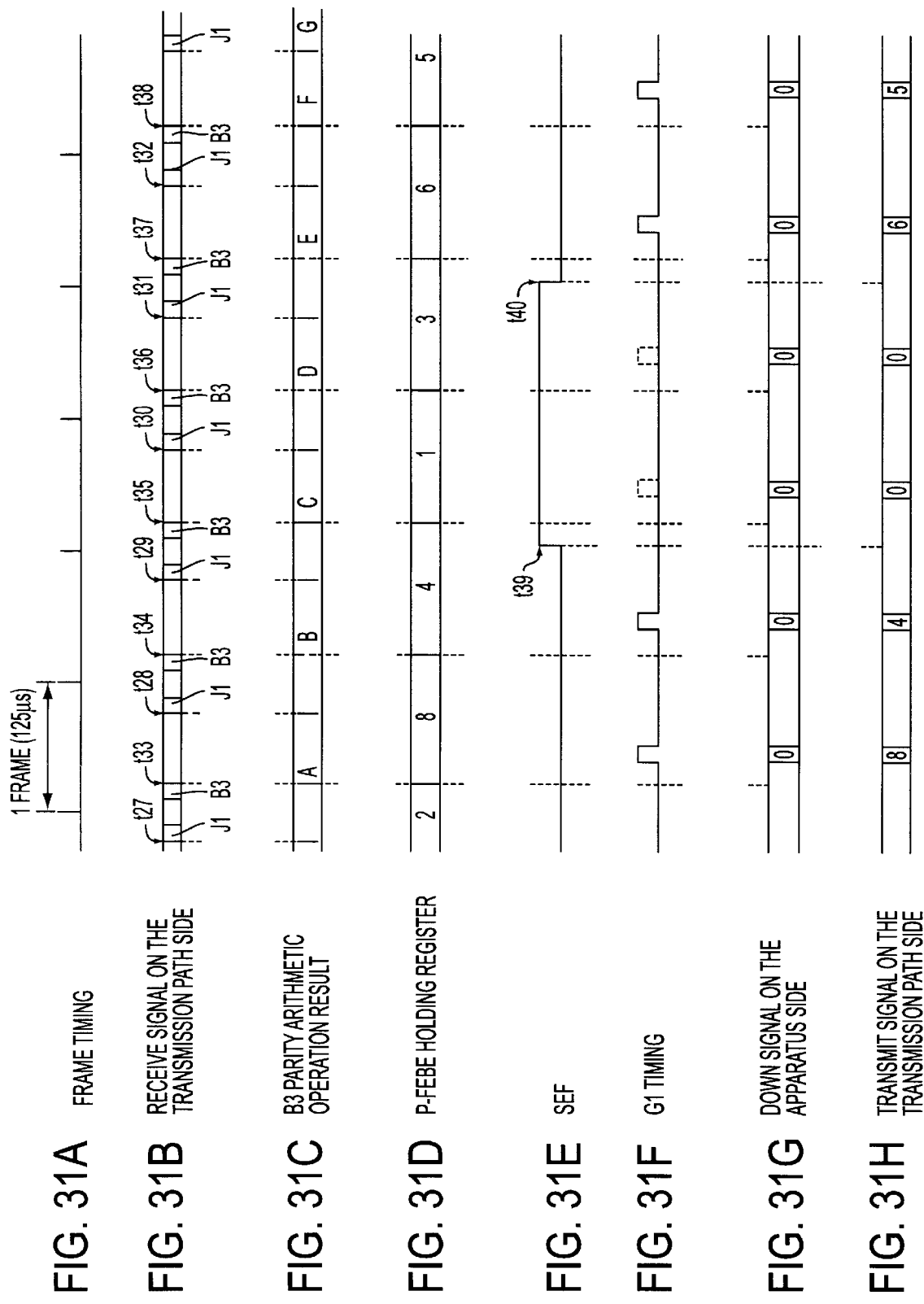
FIGS. 31(a) through 31(h) are timing charts for illustrating the operations of the essential parts of the error information detecting unit and the error information inserting unit in the STM/ATM converting transmission path terminating apparatus according to the first embodiment.

In the error information detecting unit 23 and the error information inserting unit 61 with the above structures shown in FIG. 30, when the SEF signal becomes the "H" level during points of time from t39 to t40 as shown in FIG. 31(e), for example, output data of the AND gate 614 of the transmit path overhead inserting unit 61A becomes "0" so that data "0" is inserted in the G1 byte of the path overhead 9 as shown in FIG. 31(h). As a result, transfer of the path far end block error information to the error information inserting unit 61 is stopped (inhibited) while the SEF signal is generated.

Incidentally, FIGS. 31(a) through 31(e) correspond to FIGS. 26(a) through 26(e), respectively. FIG. 31(f) shows an example of an insert timing (the G1 timing) of the G1 byte, while FIG. 31(g) shows an example of a down signal on the apparatus side to which the G1 byte is inserted (STM frame: data "0" is inserted in advance in the overhead portion in this case).

Figure 32:
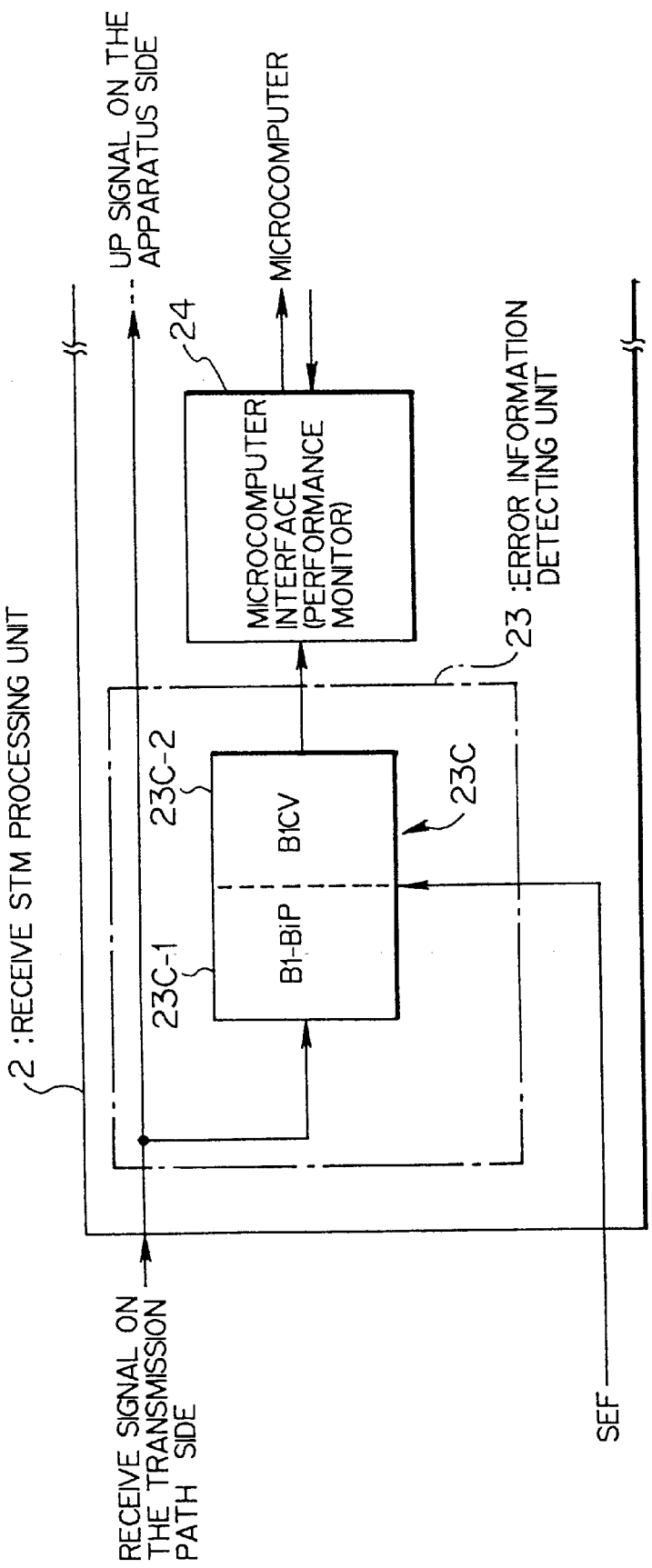
FIG. 32 is a block diagram showing structures of the essential part of the error information detecting unit and a performance monitor in the STM/ATM converting transmission path terminating apparatus according to the first embodiment.

FIG. 32 is a block diagram showing an essential part of the error information detecting unit 23 and a structure of the performance monitor 24. As having been described hereinbefore, the error information detecting unit 23 has the Bi byte processing unit 23C. Further, the B1 byte processing unit 23C has a B1 byte arithmetic operation processing unit (B1-Bi
) 23C-1 for conducting a necessary process such as the parity arithmetic operation on the B1 byte included in the section overhead 8 extracted by the receive section overhead extracting unit 23A (refer to FIG. 4) to detect B1 parity error (section error) information about the STM transmission path, and a B1 byte count value detecting unit 23C-2 for detecting a count value (B1CV) used for monitoring by the performance monitor 24 on the basis of the B1 parity error information obtained by the B1 byte arithmetic operation processing unit 23C-1.

Figure 33:
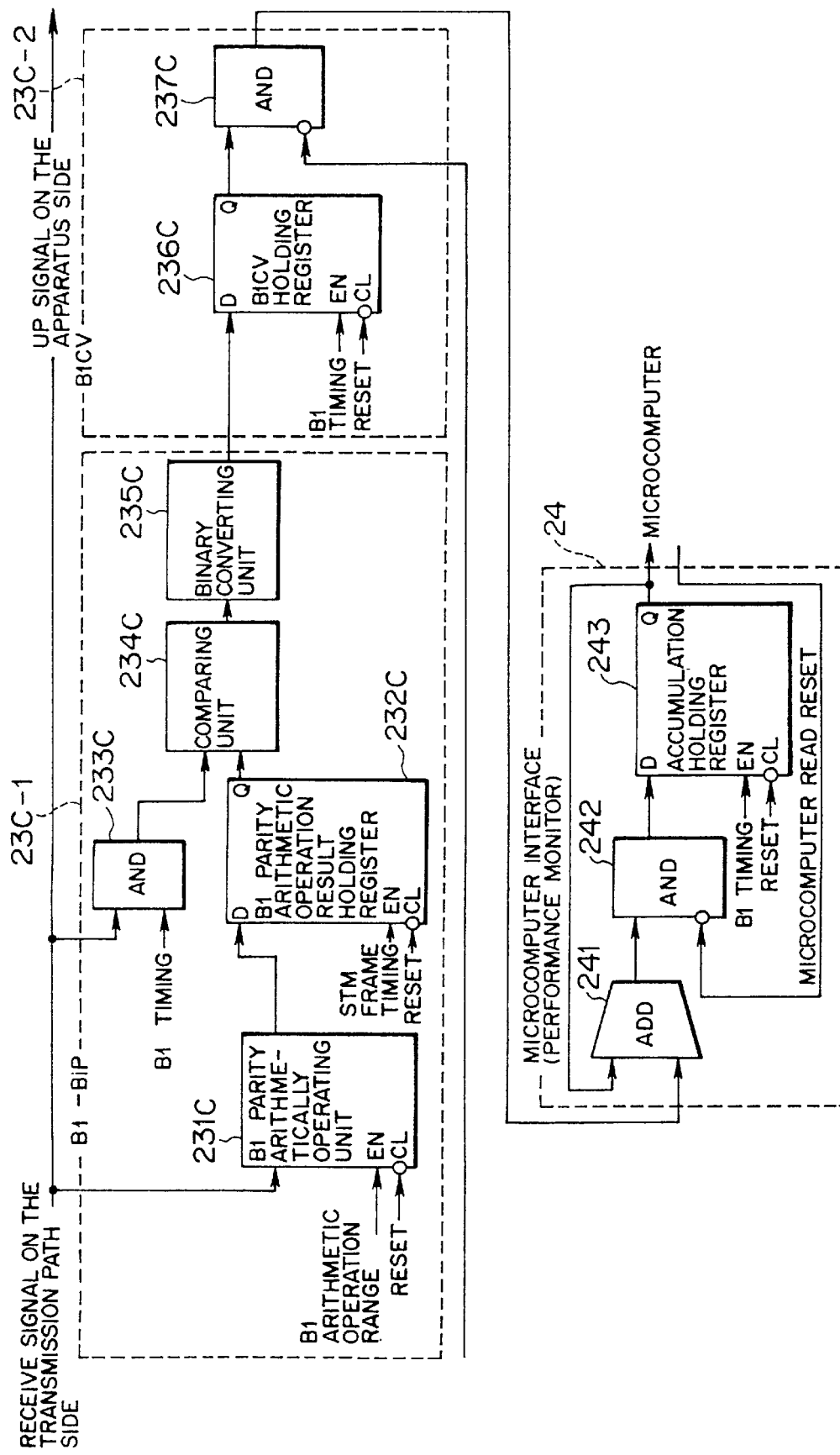
FIG. 33 is a block diagram showing in detail the structures of the essential part of the error information detecting unit and the performance monitor in the STM/ATM converting transmission path terminating apparatus according to the first embodiment.

As shown in FIG. 33, the B1 byte arithmetic operation processing unit 23C-1 has a B1 parity arithmetically operating unit 231C, a B1 parity arithmetic operation result holding register 232C, an AND gate 233C, a comparing unit 234C and a binary converting unit 235C. The B1 byte count value detecting unit 23C-2 has a B1 byte count value holding register 236C and an AND gate 237C of a one-input inverting type. Further, the performance monitor 24 has an adding unit (ADD) 241, an AND gate 242 of a one-input inverting type and an accumulation holding register 243.

In the B1 byte arithmetic operation processing unit 23C-1, the B1 parity arithmetically operating unit 231C conducts a parity arithmetic operation on the B1 byte [refer to FIG. 69(b)] included in the section overhead 8 of the received STM frame according to an arithmetic operation range of the parity arithmetic operation on the B1 byte inputted from the outside and the reset signal to detect the B1 parity error information used to supervise an error in the STM transmission path (a regenerator section). B1 parity arithmetic operation result holding register 232C outputs a result of the arithmetic operation (the B1 parity error information) obtained by the B1 parity arithmetically operating unit 231C according to the STM frame timing inputted each time a leading position (the A1 byte) of the STM frame is detected.

The AND gate 233C conducts a logical multiplication arithmetic operation on the received STM frame and a hunt timing (the B1 timing) of the B1 byte and outputs a compare timing for the comparing unit 234C. The comparing unit 234C compares the compare timing fed from the AND gate 233C with the result of the B1 parity arithmetic operation fed from the B1 parity arithmetic operation result holding register 232C and outputs the result of the B1 parity arithmetic operation at each comparing timing. The binary converting unit 235C converts the result of the B1 parity arithmetic operation into a binary code (binary data).

Further, in the B1 byte count value detecting unit 23C-2, the B1 byte count value holding register 236C temporarily holds the result of the B1 parity arithmetic operation fed from the binary converting unit 235C of the B1 byte arithmetic operation processing unit 23C-1 as a B1 byte count value for the performance monitor 24, and outputs it at each detect timing (the B1 timing) of a B1 byte position of the section overhead 8. the AND gate 237C of a one-input inverting type conducts a logical multiplication arithmetic operation on an output of the B1 byte count value holding register 236C and an inverted signal of the SEF signal fed from the STM synchronizing unit 21.

In the performance monitor 24, the adding unit 241 adds (i.e., accumulates) the B1 byte count value (a binary code) outputted from the B1 byte count value holding register 236C of the B1 byte count value detecting unit 23C-2 to a feed-back signal (binary code) of an output of the accumulation holding register 243. The AND gate 242 conducts a logical multiplication arithmetic operation on an output of the adding unit 241 and a signal obtained by inverting an output indicate signal of the B1 byte count value from the microcomputer.

The accumulation holding register 243 temporarily holds an output of the AND gate 242 and outputs it according to the B1 timing so as to output an accumulation value of the results of the parity arithmetic operation on the B1 byte to the microcomputer as information used to switch the transmission path.

In the error information detecting unit 23 (the B1 byte arithmetic operation processing unit 23C-1 and. the B1 byte count value detecting unit 23C-2), when the SEF signal is generated (becomes the "H" level) by the STM synchronizing unit 21 so that an output of the AND gate 237C of the B1 byte count value detecting unit 23C-2 becomes the "L" level (data "0"), an output of the adding unit 241 of the performance monitor 24 is held to data obtained at the preceding point of time, thus transmission path switching information to be fed to the microcomputer is also held to data obtained immediately before generation of the SEF signal, as will be described later.

In the STM/ATM converting transmission path terminating apparatus 1 according to this embodiment, the error information detecting unit 23 of the receive STM processing unit 2 detects the B1 parity error information through the B1 parity arithmetic operation by the B1 byte arithmetic operation processing unit 23C-1 and fixes the B1 parity error information to data "0" while receiving the SEF signal from the STM synchronizing unit 21, thereby stopping (inhibiting) transfer of the B1 parity error information to the performance monitor 24.

Next, operations of the error information detecting unit 23 of the receive STM processing unit 2 and the performance monitor 24 with the above structures will be described in detail with reference to a timing chart shown in FIGS. 34(a) through 34(g).

In this case, if it is assumed that the receive STM processing unit 2 receives one frame of the STM frame per 125 μs as shown in FIG. 34(a), the STM synchronizing unit 21 detects a leading position of the STM frame by detecting the A1 byte of the section overhead 8 at each timing during points of time t13 through t18 as shown in FIG. 34(b) so as to detect a position of the B1 byte included in the section overhead 8 at each timing as shown during points of time t41 through t46 on the basis of the leading position of the STM frame.

In the B1 byte arithmetic operation processing unit 23C-1 of the error information detecting unit 23, the B1 parity arithmetically operating unit 231C conducts the parity arithmetic operation on the B1 byte according to the detect timing (the B1 timing) of the B1 byte position, and the B1 parity arithmetic operation result holding register 232C holds results of the arithmetic operation (A through F).

At this time, the above detect timing of the B1 byte position is inputted as the B1 timing for the AND gate 233C of the B1 byte arithmetic operation processing unit 23C-1. According to the B1 timing, the comparing unit 234C successively outputs the results of the B1 parity arithmetic operation as shown in FIG. 34(c), for example, the binary converting unit 235C converts each of them into binary data as shown in FIG. 34(d), then the B1 byte count value holding register 236C holds them as B1 parity error information.

When the STM synchronizing unit 21 detects out of synchronization of the STM frame, the SEF signal is generated (becomes the "H" level) during points of time from t47 to t48 as shown in FIG. 34(e), and a signal obtained by inverting the SEF signal is inputted to the AND gate 237C of the B1 byte count value detecting unit 23C-2, an output of the AND gate 237C thereby becomes the "L" level so that the B1 parity error information to be transferred to the transmit STM processing unit 6 becomes "0" as shown in FIG. 34(f).

As a result, in the performance monitor 24 receiving an output ("0") of the AND gate 237C as an input, the adding unit 241 adds data "0" so that an output (a count value) of the performance monitor 24 is held and fixed to a count value ("12") obtained at the preceding point of time (t42) as shown in FIG. 34(g).

Namely, the error information detecting unit 23 prevents the B1 parity error information having possibility of an error in the results of the arithmetic operation obtained while out of synchronization of the STM frame is detected by the STM synchronizing unit 21 and the SEF signal is thus generated from being transferred to the performance monitor 24 which provides information used to switch the transmission path to the microcomputer.

In the above error information detecting unit 23 of the receive STM processing unit 2, transfer of the B1 parity error information to the performance monitor 24 is inhibited while out of synchronization of the received STM frame is detected by the STM synchronizing unit 21 and the SEF signal is thus generated, as above. In consequence, the B1 parity error information lacking reliability in results of the arithmetic operation obtained while synchronization of the received STM frame is out is not transferred, whereby unnecessary switching of the transmission path is certainly prevented in a microcomputer or the like which switches the transmission path by receiving the B1 parity error information.

Figure 35:
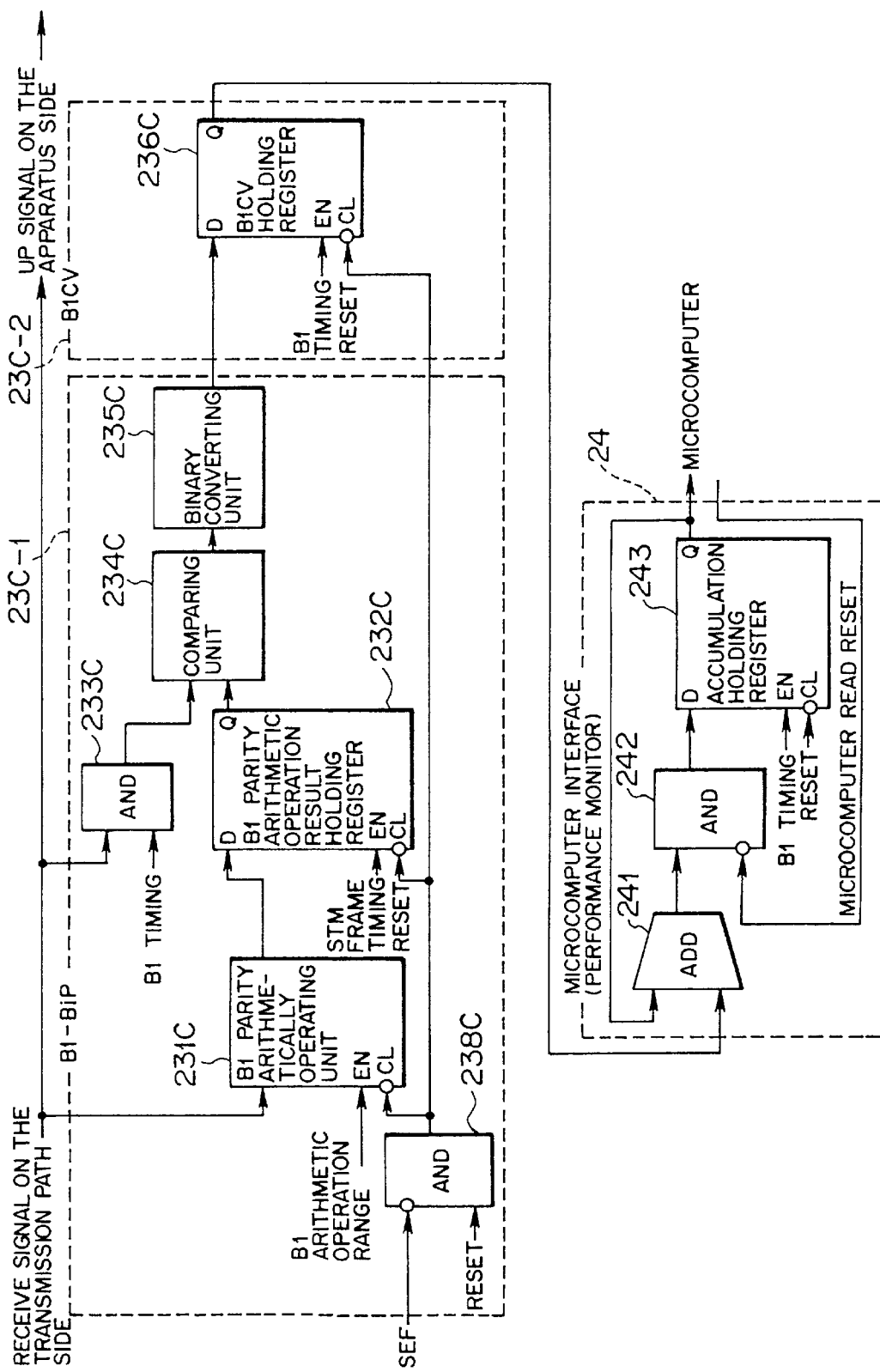
FIG. 35 is a block diagram showing in detail the structures of the essential part of the error information detecting unit and the performance monitor in the STM/ATM converting transmission path terminating apparatus according to the first embodiment.

It is alternatively possible to configure the above error information detecting unit 23 shown in FIG. 33 such that, as shown in FIG. 35, for example, the AND gate 237C of the B1 byte count value detecting unit 23C-2 is omitted, an AND gate 238C of a one-input inverting type for conducting a logical multiplication arithmetic operation on an inverted signal of the SEF signal and the reset signal is used in the B1 byte arithmetic operation processing unit 23C-1, and a signal obtained by inverting an output of the AND gate 238C is inputted to clock terminals (CLs) of the Bi parity arithmetically operating unit 231C, the B1 parity arithmetic operation result holding register 232C and the B1 byte count value holding register 236C of the B1 byte count value detecting unit 23C-2. With this arrangement, it is, as well, possible to inhibit transfer of the B1 parity error information to the performance monitor 24 while the SEF signal is generated.

Figure 36:
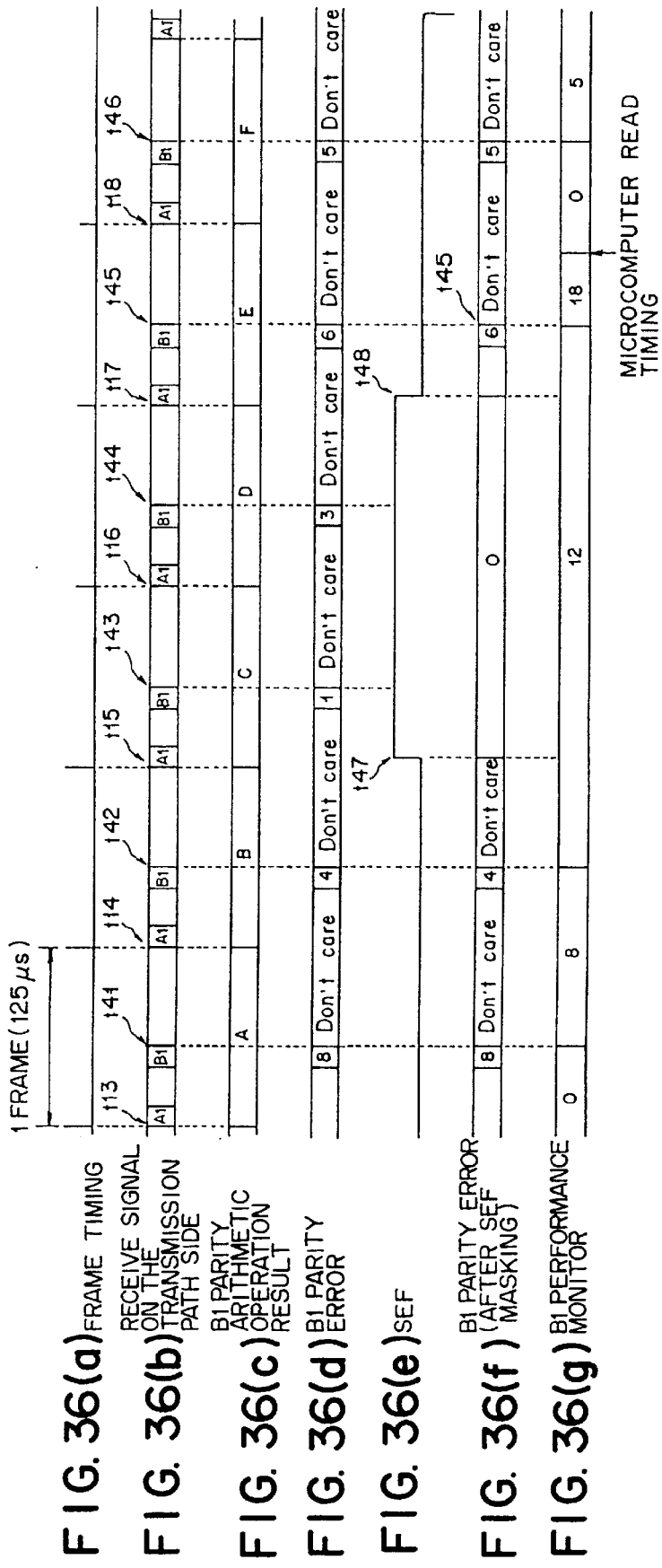
FIGS. 36(a) through 36(g) are timing charts for illustrating the operations of the essential part of the error information detecting unit and the performance monitor in the STM/ATM converting transmission path terminating apparatus according to the first embodiment.
Figure 37:
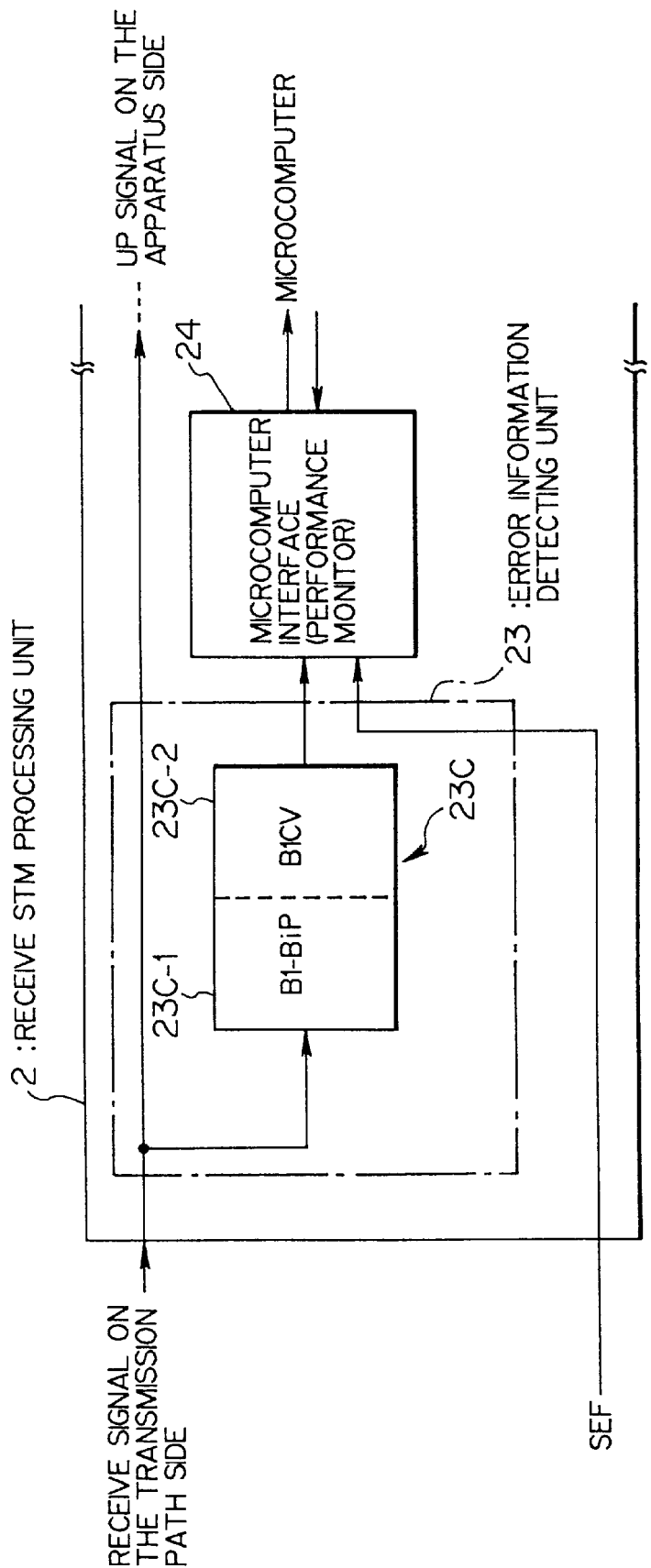
FIG. 37 is a block diagram showing the structures of the essential part of the error information detecting unit and the performance monitor in the STM/ATM converting transmission path terminating apparatus according to the first embodiment.

In the error information detecting unit 23 shown in FIG. 33, the B1 parity error information is outputted from the AND gate 237C as usual from a point of time t48 when generation of the SEF signal is cancelled as shown in FIGS. 34(e) and 34(f). In the above case, the B1 parity error information is, however, outputted from the B1 byte count value holding register 236C at the detect timing (a point of time t45) of the first B1 byte position after generation of the SEF signal has been cancelled as shown in FIGS. 36(e) and 36(f).

Incidentally, FIGS. 36(a) through 36(d) and 36(g) show an operation which is similar to the operation described with reference to FIGS. 34(a) through 34(d) and 34(g).

The above description has been made by way of an example in which the SEF signal fed from the STM synchronizing unit 21 of the receive STM processing unit 2 is received by the error information detecting unit 23 (the B1 byte processing unit 23C). However, it is alternatively possible to receive the SEF signal by the performance monitor 24 as shown in FIG. 29, for example.

Figure 38:
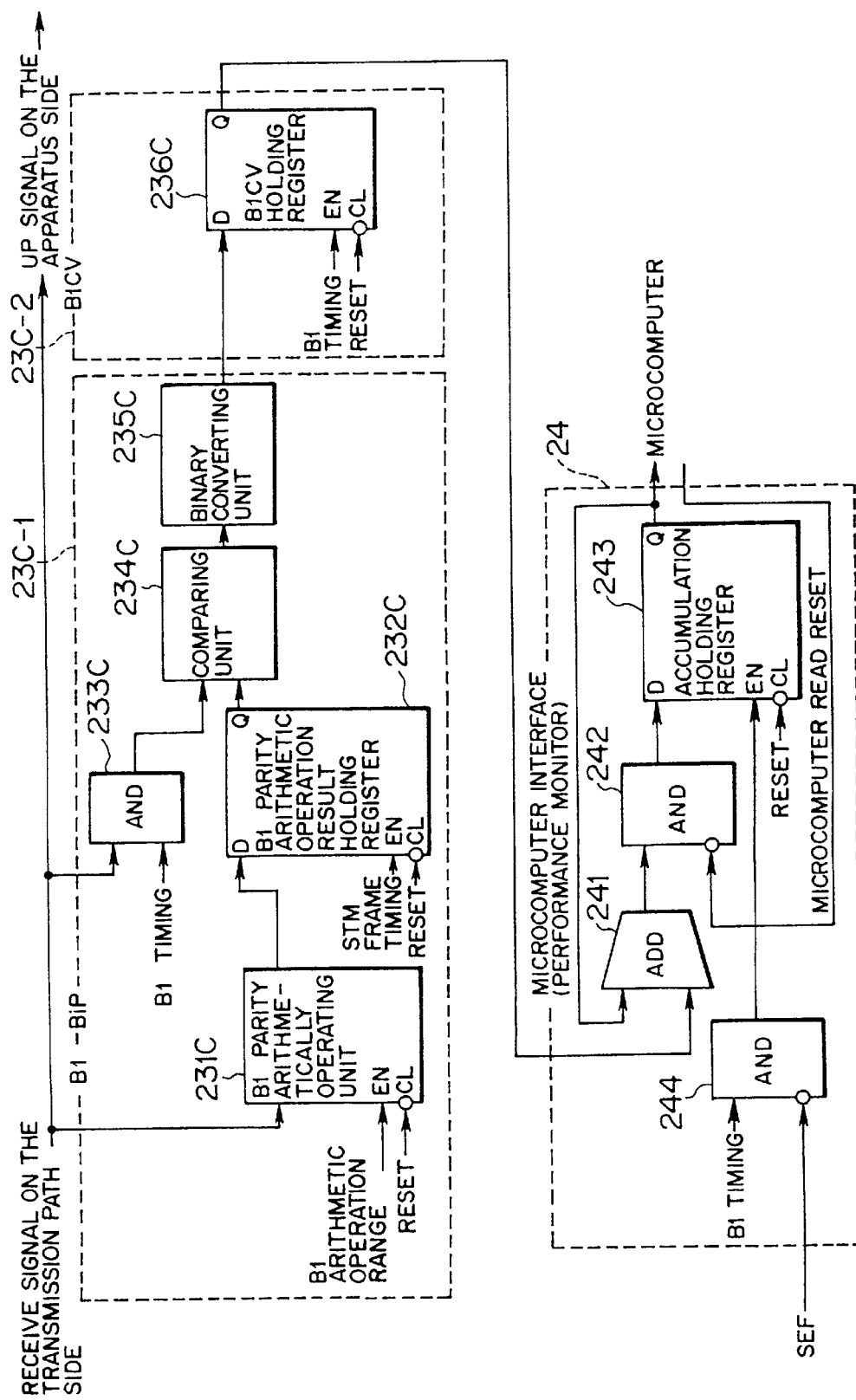
FIG. 38 is a block diagram showing in detail the structures of the essential part of the error information detecting unit and the performance monitor in the STM/ATM converting transmission path terminating apparatus according to the first embodiment.

In which case, the B1 byte processing unit 23C and the performance monitor 24 are configured as shown in FIG. 38. Namely, the B1 byte processing unit 23C having the structure shown in FIG. 33 has the B1 byte count value detecting unit 23C-2 in which the AND gate 237C is omitted, whereas the performance monitor 24 further has an AND gate 244 of a one-input inverting type for conducting a logical multiplication arithmetic operation on the B1 timing and an inverted signal of the SEF signal in addition to the structure shown in FIG. 33.

Figure 39:
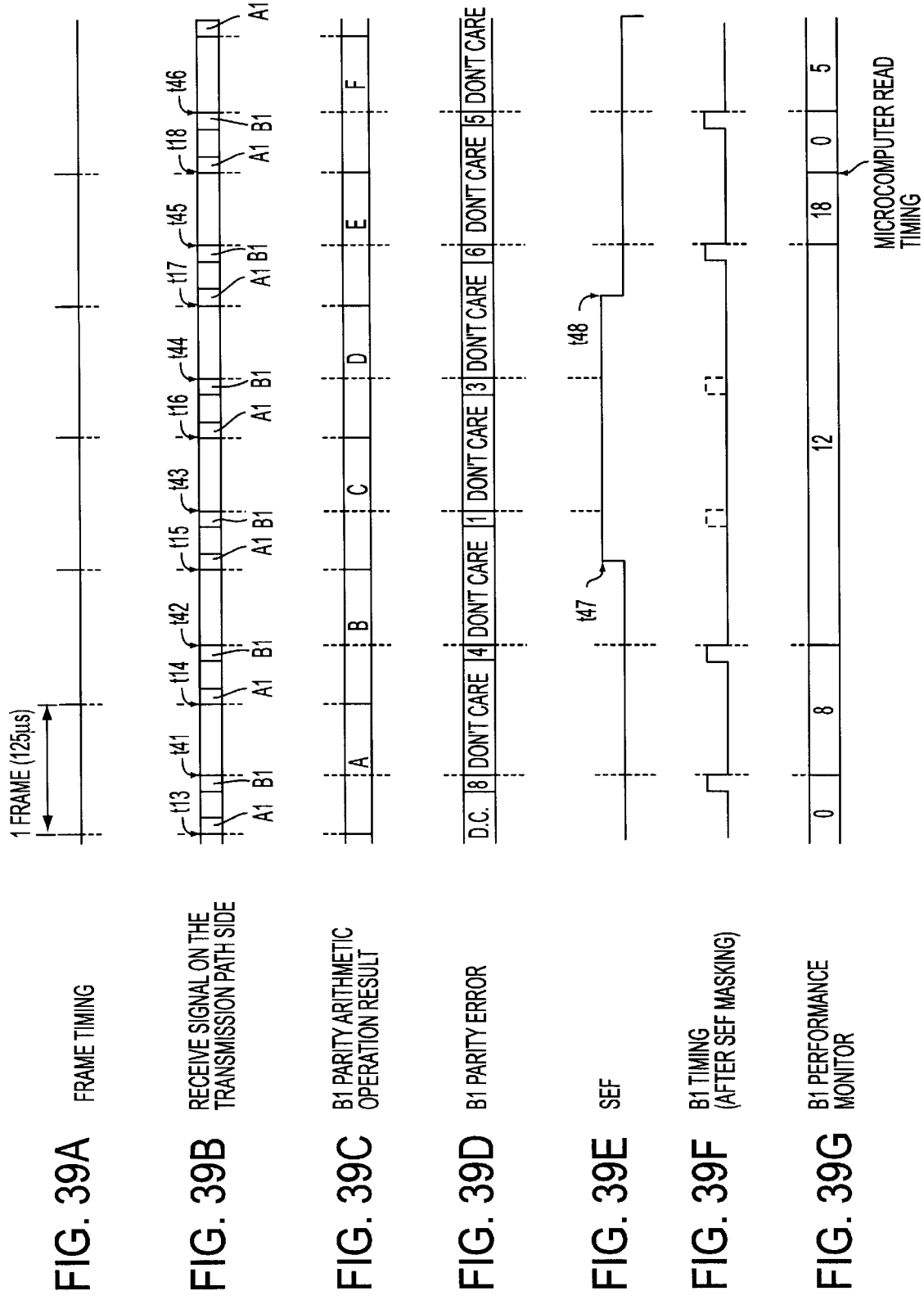
FIG. 39(a) through 39(g) are timing charts for illustrating the operations of the essential part of the error information detecting unit and the performance monitor in the STM/ATM converting transmission path terminating apparatus according to the first embodiment.

In the error information detecting unit 23 and the performance monitor 24 with the above structures shown in FIG. 38, when the SEF signal becomes the "H" level during points of time from t47 to t48 as shown in FIG. 39(e), an output of the AND gate 244 of the performance monitor 24 becomes the "L" level as shown in FIG. 39(f) so that an output (a count value) of the performance monitor 24 is held and fixed to a count value ("12") obtained at the preceding point of time (t42) as shown in FIG. 39(g).

Incidentally, FIGS. 39(a) through 39(d) show an operation which is similar to the operation described with reference to FIG. 34(a) through FIG. 34(d) described hereinbefore, respectively.

Figure 40:
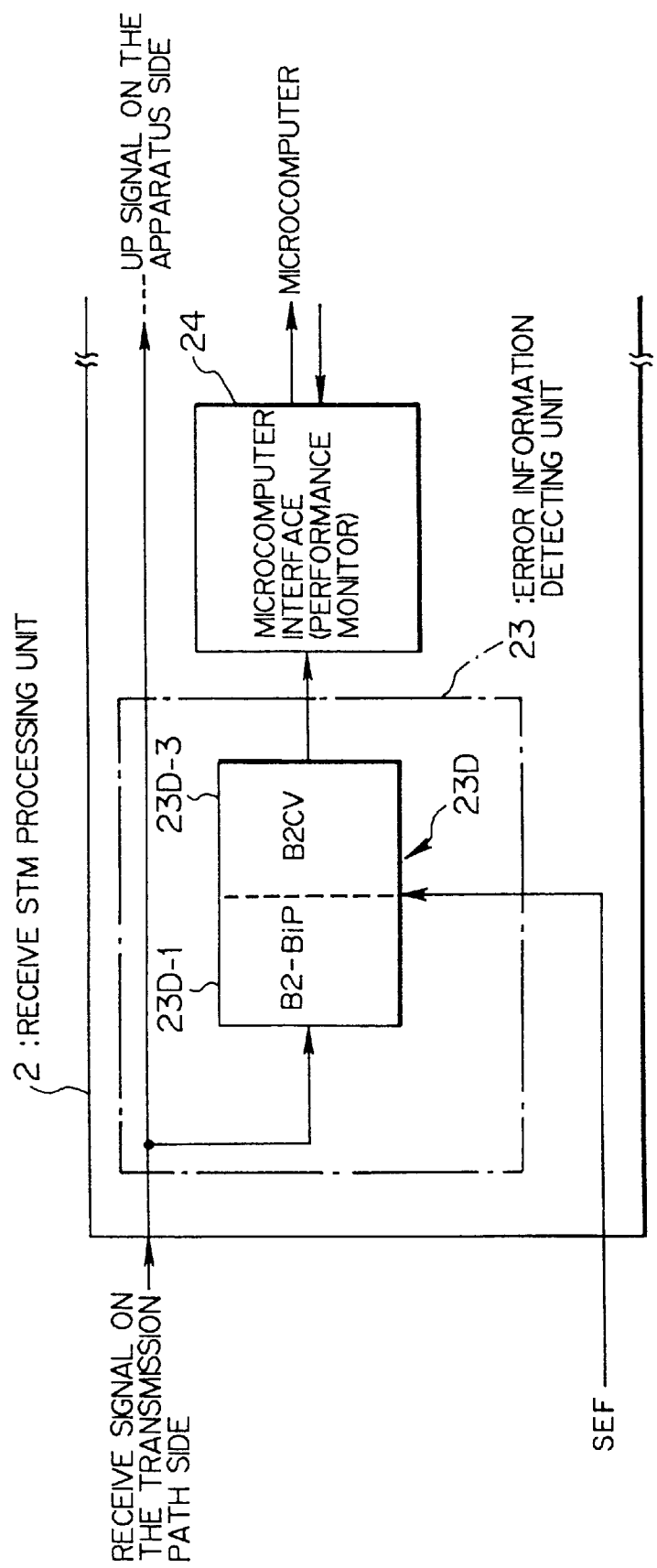
FIG. 40 is a block diagram showing the structures of the essential part of the error information detecting unit and the performance monitor in the STM/ATM converting transmission path terminating apparatus according to the first embodiment.

FIG. 40 is a block diagram showing the structures of the essential part of the error information detecting unit 23 and the performance monitor 24. As having been described hereinbefore, the error information detecting unit 23 has the B2 byte processing unit 23D. Further, the B2 byte processing unit 23D has the B2 byte arithmetic operation processing unit (B2-BiP) 23D-1 for conducting a necessary process such as the parity arithmetic operation or the like on the B2 byte included in the section overhead 8 extracted by the receive section overhead extracting unit 23A (refer to FIG. 4) to detect line error (B2 parity error) information of the STM transmission path, and a B2 byte count value detecting unit 23D-3 for detecting a count value (B2CV) used for monitoring by the performance monitor 24 on the basis of the B2 parity error information obtained by the B2 byte arithmetic operation processing unit 23D-1.

Figure 41:
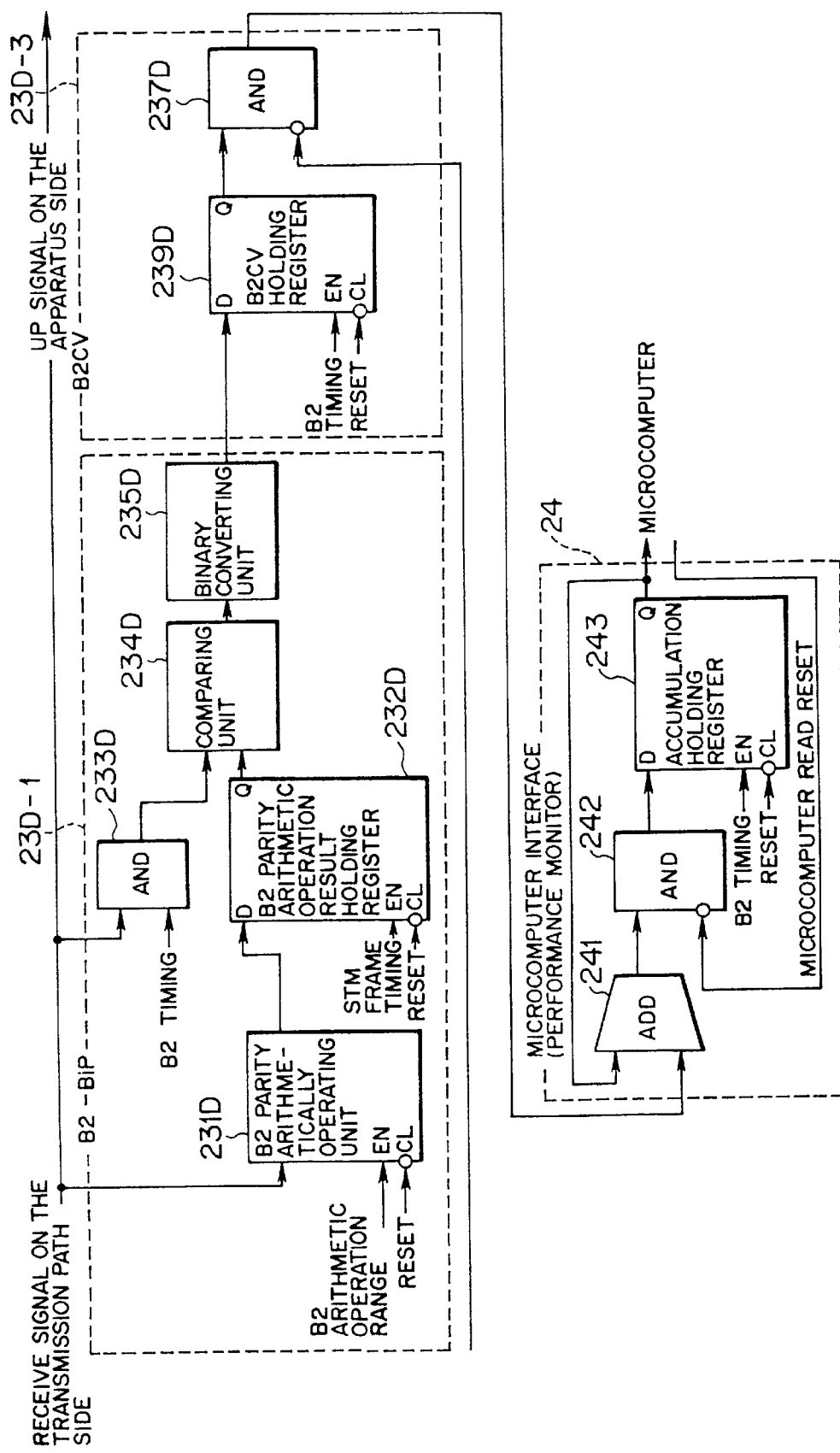
FIG. 41 is a block diagram showing in detail the structures of the essential part of the error information detecting unit and the performance monitor in the STM/ATM converting transmission path terminating apparatus according to the first embodiment.

As shown in FIG. 41, the B2 byte arithmetic operation processing unit 23D-1 has the B2 parity arithmetically operating unit 231D, the B2 parity arithmetic operation result holding register 232D, the AND gate 233D, the comparing unit 234D and the binary converting unit 235D, whereas the B2 byte count value detecting unit 23D-3 has a B2 byte count value holding register 239D and an AND gate 237D of a one-input inverting type. Incidentally, the performance monitor 24 is configured similarly to that shown in FIG. 33.

In the B2 byte arithmetic operation processing unit 23D-1, the B2 parity arithmetically operating unit 231D, the B2 parity arithmetic operation result holding register 232D, the AND gate 233D, the comparing unit 234D and the binary converting unit 235D are similar to those having been described hereinbefore with reference to FIG. 17. In the B2 byte count value detecting unit 23D-3, the B2 byte count value holding register 239D temporarily holds a operation fed f parity arithmetic operation fed from the binary converting unit 235D of the B2 byte arithmetic operation processing unit 23D-1 as a B2 byte count value for the performance monitor 24, and outputs it according to the detect timing (the B2 timing) of a B2 byte position of the section overhead 8. The AND gate 237D of a one-input inverting type conducts a logical multiplication arithmetic operation on an output of the B2 byte count value holding register 239D and an inverted signal of the SEF signal fed from the STM synchronizing unit 21.

In the error information detecting unit 23 (the byte arithmetic operation processing unit 23D-1 and the B2 byte count value detecting unit 23D-3), when the SEF signal is generated (becomes the "H" level) by the STM synchronizing unit 21 so that an output of the AND gate 237D of the B2 byte count value detecting unit 23D-3 becomes the "L" level (data "0"), an output of the adding unit 241 of the performance monitor 24 is held to data obtained at the preceding point of time, as will be described later. Therefore, transmission path switching information to be fed to the microcomputer is held to data obtained immediately before generation of the SEF signal.

Namely, in the STM/ATM converting transmission path terminating apparatus 1 according to this embodiment, the error information detecting unit 23 of the receive STM processing unit 2 detects the B2 parity error information through the B2 parity arithmetic operation by the B2 byte arithmetic operation processing unit 23D-1, and fixes the B2 parity error information to data "0" while receiving the SEF signal from the STM synchronizing unit 21, thereby stopping (inhibiting) transfer of the B2 parity error information to the performance monitor 24.

Next, operations of the error information detecting unit 23 of the receive STM processing unit 2 and the performance monitor 24 with the above structures will be described in detail with reference to a timing chart shown in FIGS. 42(a) through 42(g).

In this case, if it is assumed that the receive STM processing unit 2 receives one frame of the STM frame per 125μs as shown in FIG. 42(a), for example, the STM synchronizing unit 21 detects a leading position of the STM frame by detecting the A1 byte of the section overhead 8 at a timing at each of points of time t13 through t128 as shown in FIG. 42(b) so as to detect a position of the B2 byte included in the section overhead 8 at each timing as shown at points of time t19 through t24 on the basis of the leading position of the STM frame.

In the B2 byte arithmetic operation processing unit 23D-1 of the error information detecting unit 23, the B2 parity arithmetically operating unit 231D conducts the parity arithmetic operation on the B2 byte according to the detect timing (the B2 timing) of a B2 byte position, then the B2 parity arithmetic operation result holding register 232D holds results of the arithmetic operation (A through F).

At this time, the above detect timing for the B2 byte position is inputted as the B2 timing for the AND gate 233D of the B2 byte arithmetic operation processing unit 23D-1. According to the B2 timing, the comparing unit 234D successively outputs the results of the B2 parity arithmetic operation (A through F) as shown in FIG. 42(c), for example, the binary converting unit 235D converts each of them into binary data (a B2 parity error) as shown in FIG. 42(d), and the B2 byte count value holding register 239D holds them as B2 parity error information.

When the STM synchronizing unit 21 detects out of synchronization of the STM frame so that the SEF signal is generated (becomes the "H" level) during points of time from t25 to t26 as shown in FIG. 42(e), for example, and a signal obtained by inverting the SEF signal is inputted to the AND gate 237D of the B2 byte count value detecting unit 23D-3, an output of the AND gate 237D becomes the "L" level so that the B2 parity error information to be transferred to the performance monitor 24 becomes "0" as shown in FIG. 42(f).

As a result, in the performance monitor 24 receiving the output ("0") of the AND gate 237D as an input, the adding unit 241 adds data "0", whereby an output (a count value) of the performance monitor 24 is held and fixed to a count value ("12") obtained at the preceding point of time (t20) as shown in FIG. 42(g).

Namely, the error information detecting unit 23 prevents the B2 parity error information having possibility of an error in the results of the arithmetic operation obtained while out of synchronization of the STM frame is detected by the STM synchronizing unit 21 so that the SEF signal is generated from being transferred to the performance monitor 24 which provides information used to switch the transmission path to the microcomputer.

In the above error information detecting unit 23 of the receive STM processing unit 2, the B2 parity error information is inhibited from being transferred to the performance monitor 24 while out of synchronization of the received STM frame is detected by the STM synchronizing unit 21 and the SEF signal is thus generated so that the B2 parity error signal lacking reliability in the results of the arithmetic operation obtained while the received STM frame is out of synchronization is not transferred. It is therefore possible to certainly avoid unnecessary switching of the transmission path in a microcomputer or the like receiving the B2 parity error information to switch the transmission path.

Figure 43:
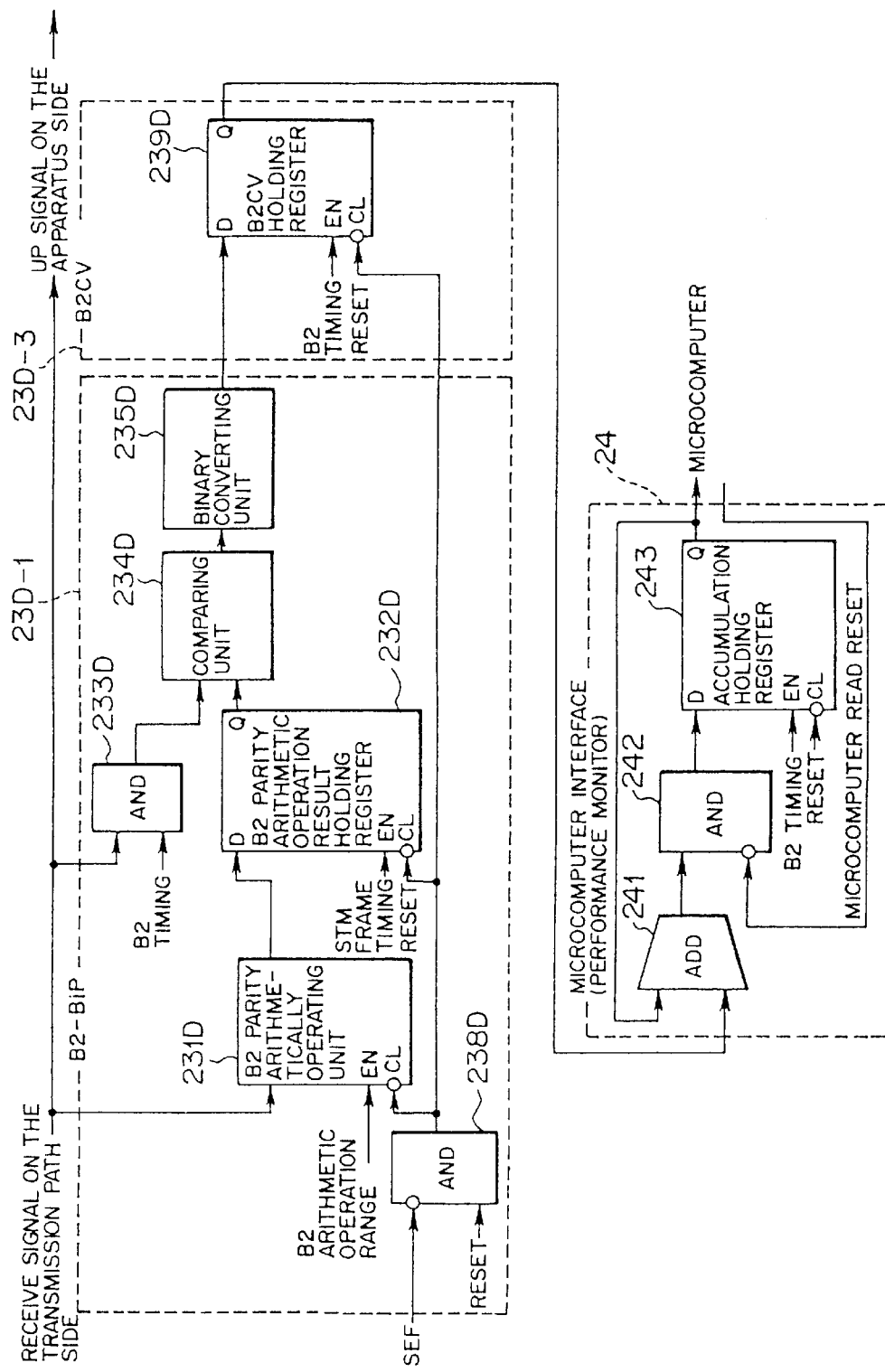
FIG. 43 is a block diagram showing in detail the structures of the essential part of the error information detecting unit and the performance monitor in the STM/ATM converting transmission path terminating apparatus according to the first embodiment.

It is alternatively possible to configure the above error information detecting unit 23 shown in FIG. 41 such that, as shown in FIG. 43, for example, the AND gate 237D of the B2 byte count value detecting unit 23D-3 is omitted, an AND gate 238D of a one-input inverting type for conducting a logical multiplication arithmetic operation on an inverted signal of the SEF signal and the reset signal is used in the B2 byte arithmetic operation processing unit 23D-1 and a signal obtained by inverting an output of the AND gate 238D is inputted to each of clock terminals (CLs) of the B2 parity arithmetically operating unit 231D, the B2 parity arithmetic operation result holding register 232D and the B2 byte count value holding register 239D of the B2 byte count value detecting unit 23D-3, whereby transfer of the B2 parity error information to the performance monitor 24 can be inhibited while the SEF signal is generated, as well.

Figure 44:
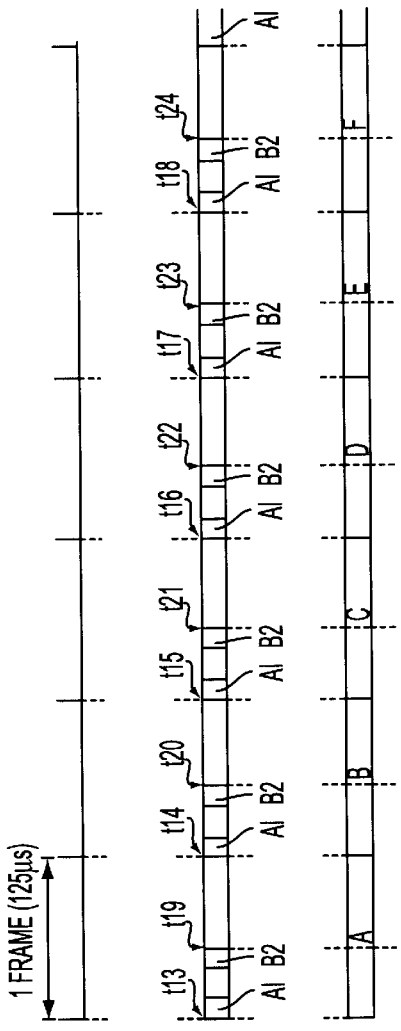
FIGS. 44(a) through 44(g) are timing charts for illustrating the operations of the essential part of the error information detecting unit and the performance monitor in the STM/ATM converting transmission path terminating apparatus according to the first embodiment.

In the error information detecting unit 23 shown in FIG. 41, the B2 parity error information ("Don't care") is outputted from the AND gate 237D from a point of time t26 at which generation of the SEF signal is cancelled as shown in FIGS. 42(e) and 42(f). In the above case, the B2 parity error information fed from the B2 byte count value holding register 239D is fixed to "0" up to a detect timing of the first B2 byte position (a point of time t23) after generation of the SEF signal has been cancelled as shown in FIGS. 44(e) and 44(f).

Incidentally, FIGS. 44(a) through 44(d) and 44(g) show an operation which is similar to the operation described with reference to FIGS. 42(a) through 42(d) and 42(g).

Figure 45:
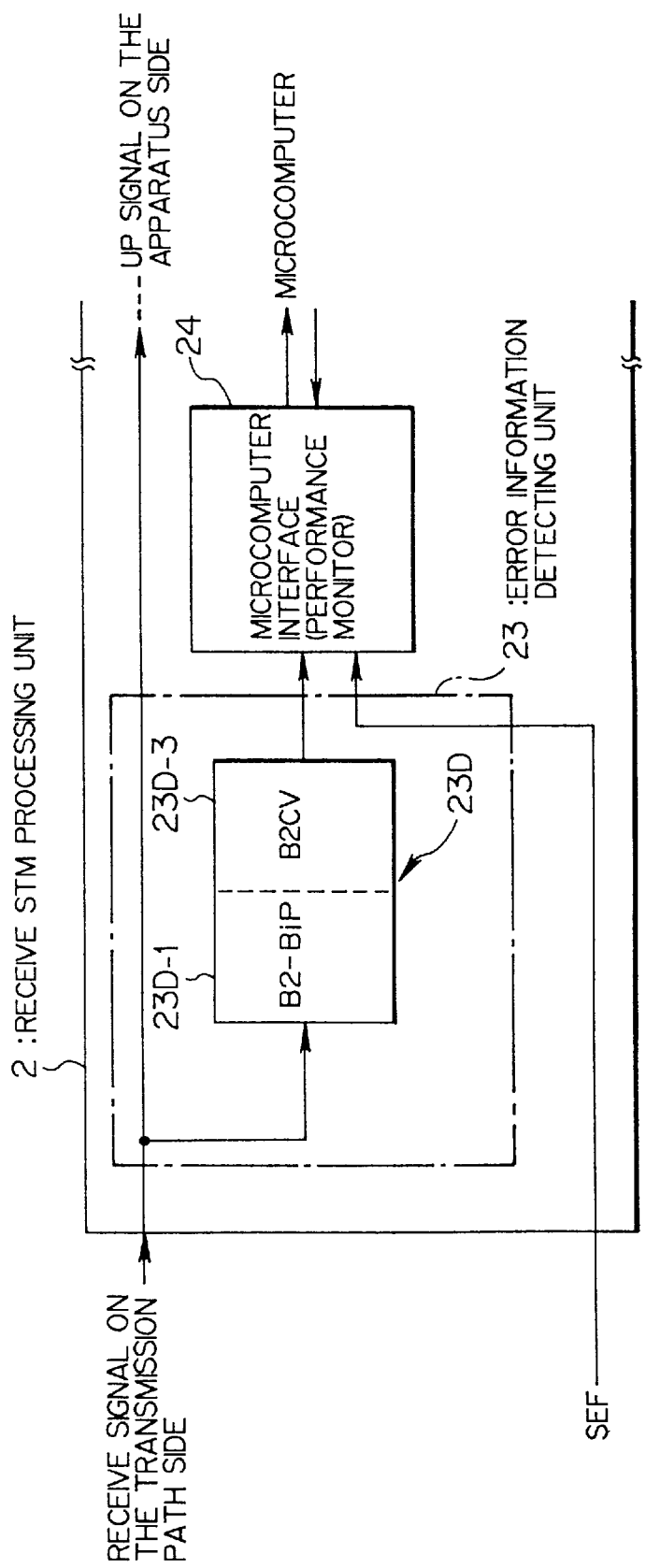
FIG. 45 is a block diagram showing the structures of the essential part of the error information detecting unit and the performance monitor in the STM/ATM converting transmission path terminating apparatus according to the first embodiment.

The above description has been made by way of an example in which the error information detecting unit 23 (the B2 byte processing unit 23D) receives the SEF signal fed from the STM synchronizing unit 21 of the receive STM processing unit 2. However, it is alternatively possible that the performance monitor 24 receives the SEF signal as shown in FIG. 45, for example.

Figure 46:
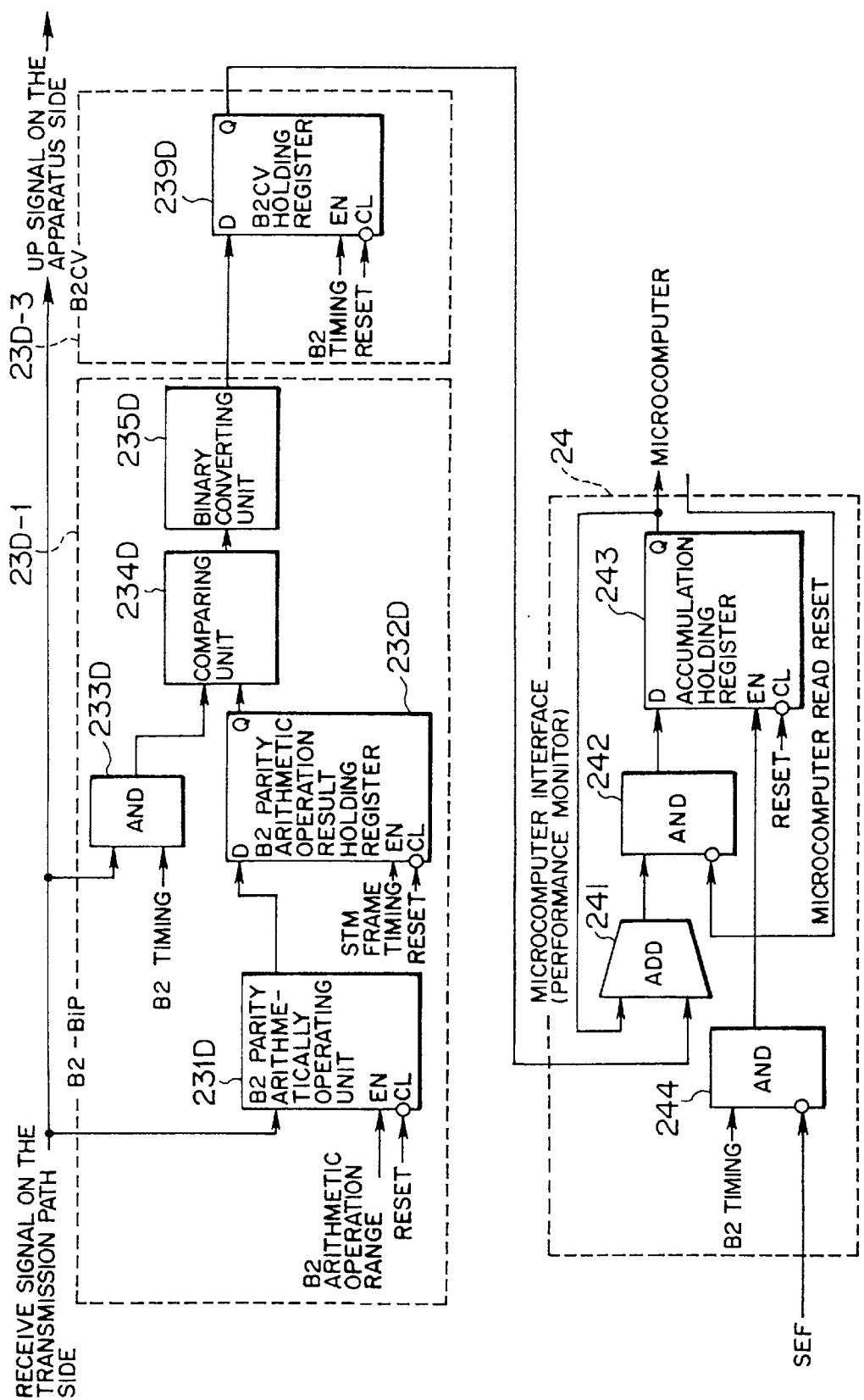
FIG. 46 is a block diagram showing in detail the structures of the essential part of the error information detecting unit and the performance monitor in the STM/ATM converting transmission path terminating apparatus according to the first embodiment.

In which case, the B2 byte processing unit 23D and the performance monitor 24 are configured as shown in FIG. 46. Namely, the B2 byte processing unit 23D having the structure shown in FIG. 41 has the B2 byte count value detecting unit 23D-3 in which the AND gate 237D is omitted, whereas the performance monitor 24 has an AND gate 244 of a one-input inverting type for conducting a logical multiplication arithmetic operation on the B2 timing and an inverted signal of the SEF signal in addition to the structure shown in FIG. 41.

Figure 47:
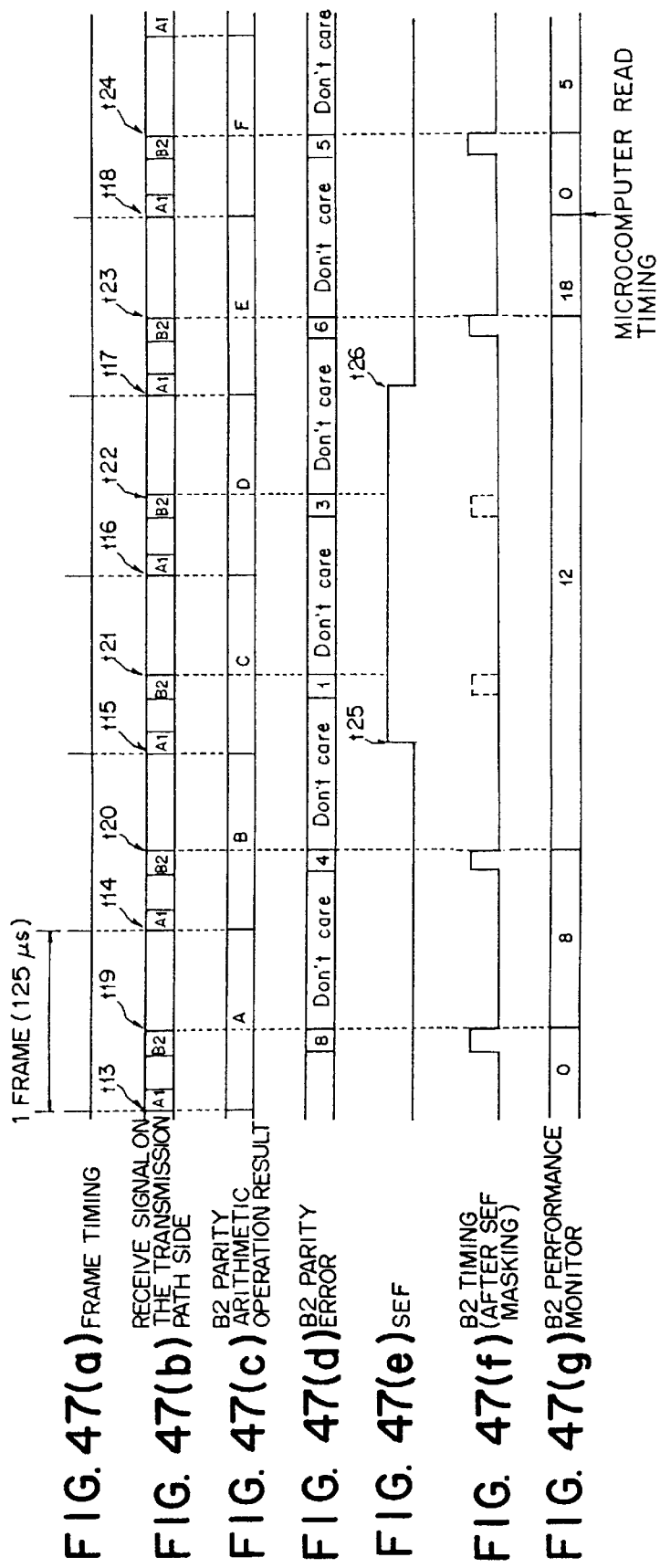
FIGS. 47(a) through 47(g) are timing charts for illustrating the operations of the essential part of the error information detecting unit and the performance monitor in the STM/ATM converting transmission path terminating apparatus according to the first embodiment.

In the error information detecting unit 23 and the performance monitor 24 shown in FIG. 46 with the above structures, if the SEF signal becomes the "H" level during points of time from t25 to t26 as shown in FIG. 47(e), for example, an output (the B2 timing) of the AND gate 244 of the performance monitor 24 becomes the "L" level as shown in FIG. 47(f) so that an output (a count value) of the performance monitor 24 is held and fixed to a count value ("12") obtained at the preceding point of time (t42) a shown in FIG. 47(g).

Incidentally, FIGS. 47(a) through 47(d) show an operation which is similar to the operation described with reference to FIGS. 42(a) through 42(d) having been described hereinbefore, respectively.

Figure 48:
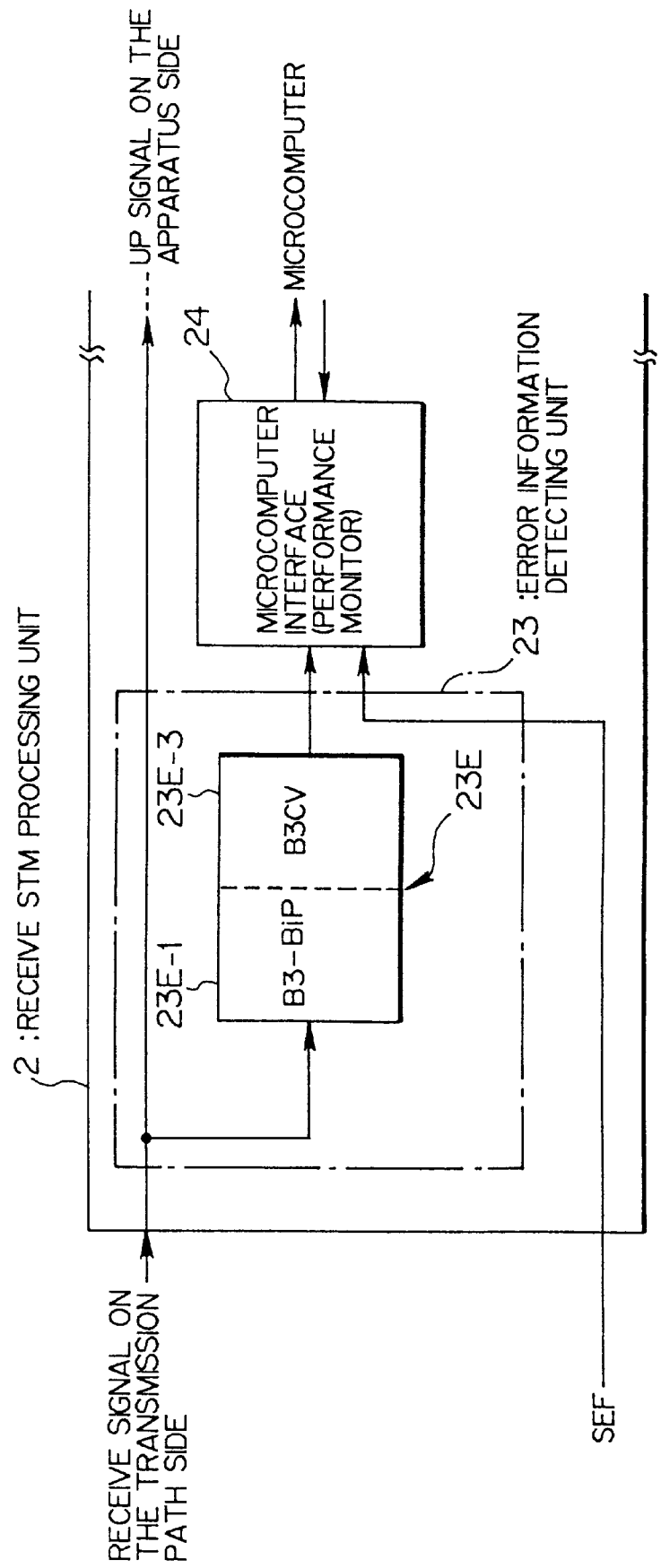
FIG. 48 is a block diagram showing the structures of the essential part of the error information detecting unit and the performance monitor in the STM/ATM converting transmission path terminating apparatus according to the first embodiment.

FIG. 48 is a block diagram showing the structures of the essential part of the error information detecting unit 23 and the performance monitor 24. As having been described hereinbefore, the error information detecting unit 23 has the B3 byte processing unit 23E. Further, the B3 byte processing unit 23E has the B3 byte arithmetic operation processing unit (B3-BiP) 23E-1 for conducting a necessary process such as the parity arithmetic operation or the like on the B3 byte included in the path overhead 9 extracted by the receive path overhead extracting unit 23B (refer to FIG. 4) to detect B3 parity error (path error) information of the STM transmission path, and a B3 byte count value detecting unit 23E-3 for detecting a count value (B3CV) used for monitoring by the performance monitor 24 on the basis of the B3 parity error information obtained by the B3 byte arithmetic operation processing unit 23E-1.

Figure 49:
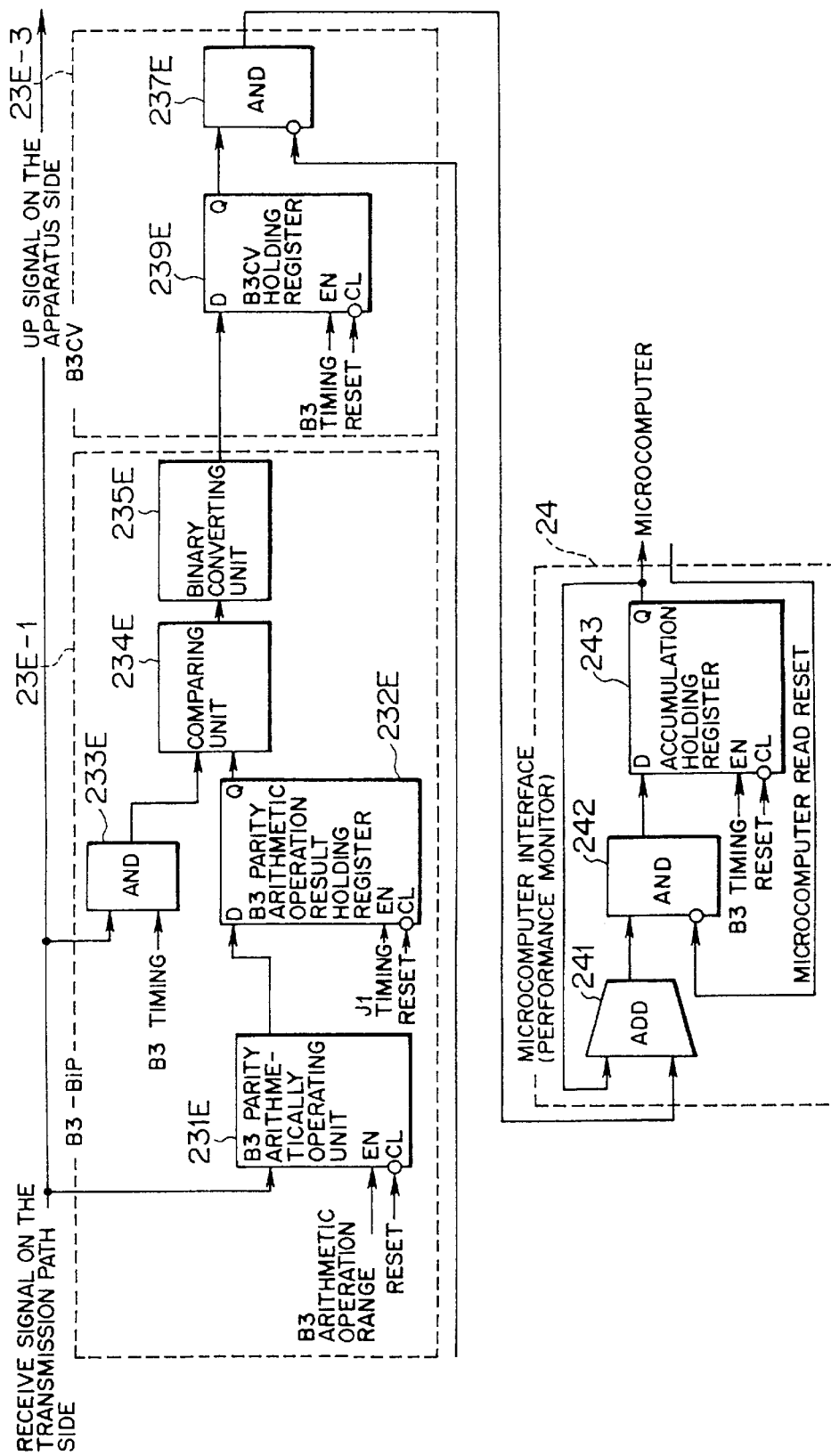
FIG. 49 is a block diagram showing in detail the structures of the essential part of the error information detecting unit and the performance monitor in the STM/ATM converting transmission path terminating apparatus according to the first embodiment.

As shown in FIG. 49, the B3 byte arithmetic operation processing unit 23E-1 has the B3 parity arithmetically operating unit 231E, the B3 parity arithmetic operation result holding register 232E, the AND gate 233E, the comparing unit 234E and the binary converting unit 235E, whereas the B3 byte count value detecting unit 23E-3 has a B3 byte count value holding register 239E and an AND gate 237E of a one-input inverting type. Incidentally, the performance monitor 24 has, similarly to that shown in FIG. 33, the adding unit (ADD) 241, the AND gate 242 of a one-input inverting type and the accumulation holding register 243. In this case, the accumulation holding register 243 operates according to the B3 timing.

In the B3 byte arithmetic operation processing unit 23E-1, the B3 parity arithmetically operating unit 231E, the B3 parity arithmetic operation result holding register 232E, the AND gate 233E, the comparing unit 234E and the binary converting unit 235E are similar to those having been described hereinbefore with reference to FIG. 25. In the B3 byte count value detecting unit 23E-3, the B3 byte count value holding register 239E temporarily holds a result of the parity arithmetic operation fed from the binary converting unit 235E of the B3 byte arithmetic operation processing unit 23E-1, and outputs it according to the detect timing (the B3 timing) of a B3 byte position of the path overhead 9. The AND gate 237E of a one-input inverting type conducts a logical multiplication arithmetic operation on an output of the B3 byte count value holding register 239E and an inverted signal of the SEF signal fed from the STM synchronizing unit 21.

In the error information detecting unit 23 (the B2 byte arithmetic operation processing unit 23E-1 and the B3 byte count value detecting unit 23E-3), when the SEF signal is generated (becomes the "H" level) by the STM synchronizing unit 21 so that an output of the AND gate 237E of the B3 byte count value detecting unit 23E-3 becomes the "L" level (data "0"), an output of the adding unit 241 of the performance monitor 24 is held to data obtained at the preceding point of time, whereby transmission path switching information to be fed to the microcomputer is held to data obtained immediately before the SEF signal has been generated In the STM/ATM converting transmission path terminating apparatus 1 according to this embodiment, the error information detecting unit 23 of the receive STM processing unit 2 detects the B3 parity error information through the B3 parity arithmetic operation by the B3 byte arithmetic operation processing unit 23E-1, and fixes the B3 parity error information to data "0" while receiving the SEF signal from the STM synchronizing unit 21, thereby stopping (inhibiting) transfer of the B3 parity error information to the performance monitor 24.

Operations of the error information detecting unit 23 of the receive STM processing unit 2 and the performance monitor 24 with the above structures will be described in detail with reference to a timing chart shown in FIGS. 50(a) through 50(g).

Figure 50:
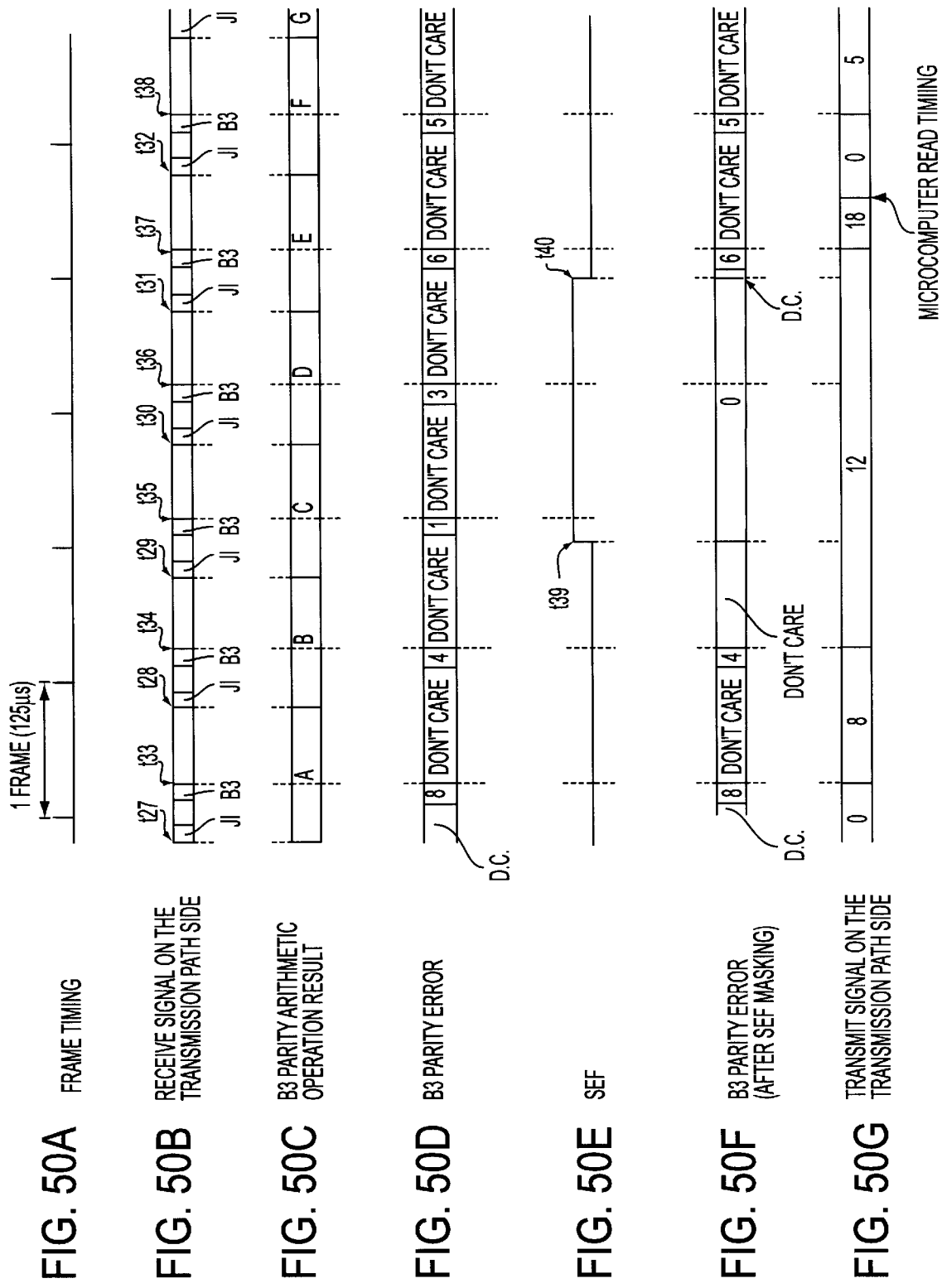
FIGS. 50(a) through 50(g) are timing charts for illustrating the operations of the essential part of the error information detecting unit and the performance monitor in the STM/ATM converting transmission path terminating apparatus according to the first embodiment.

In this case, if it is assumed that the receive STM processing unit 2 receives one frame of the STM frame per 125 μs as shown in FIG. 50(a), the receive path overhead extracting unit 23B detects a position of the J1 byte included in the path overhead 9 at a timing of each of points of time t27 through t32 as shown in FIG. 50(b) so as to detect a position of the B3 byte at a timing as shown at each of points of time t33 through t38 on the basis of the position of the J1 byte.

In the B3 byte processing unit 23E-1 of the error information detecting unit 23, the B3 parity arithmetically operating unit 231E conducts the parity arithmetic operation on the B3 byte according to the detect timing (the B3 timing) of the B3 byte position, and the B3 parity arithmetic operation result holding register 232E holds results of the arithmetic operation (A through F).

At this time, the above detect timing of the B3 byte position is inputted as the B3 timing for the AND gate 233E of the B3 byte processing unit 23E-1. According to the B3 timing, the comparing unit 234E successively outputs the results of the B3 parity arithmetic operation (A through F) as shown in FIG. 50(c), for example, the binary converting unit 235E converts each of them into binary data (B3 parity error) as shown in FIG. 50(d), then the B3 byte count value holding register 239E holds them.

When the out of synchronization of the STM frame is detected by the STM synchronizing unit 21 so that the SEF signal is generated (becomes the "H" level) during points of time from t39 to t40 as shown in FIG. 50(e), for example, and a signal obtained by inverting the SEF signal is inputted to the AND gate 237E of the B3 byte count value detecting unit 23E-3, an output of the AND gate 237E becomes the "L" level, whereby the B3 parity error information to be transferred to the performance monitor 24 becomes "0" as shown in FIG. 50(f).

As a result, in the performance monitor 24 receiving an output ("0") of the AND gate 237E as an input, the adding unit 241 adds "0". Therefore, an output (a count value) of the performance monitor 24 is held and fixed to a count value ("12") obtained at the immediately preceding point of time at which the J1 byte has been detected (a point of time t20).

Namely, the error information detecting unit 23 prevents the B3 parity error information having possibility of an error in the results of the arithmetic operation obtained while out of synchronization of the STM frame is detected by the STM synchronizing unit 21 so that the SEF signal is generated from being transferred to the performance monitor 24 which provides information used to switch the transmission path to the microcomputer.

As above, in the error information detecting unit 23 of the receive STM processing unit 2, transfer of the B3 parity error information is inhibited while out of synchronization of the received STM frame is detected by the STM synchronizing unit 21 and the SEF is thus generated so that the B3 parity error information lacking reliability in the results of the arithmetic operation obtained while the received STM frame is out of synchronization is not transferred. In consequence, it is possible to certainly prevent unnecessary switching of the transmission path in a microcomputer or the like which receives the B3 parity error information to switch the transmission path.

Figure 51:
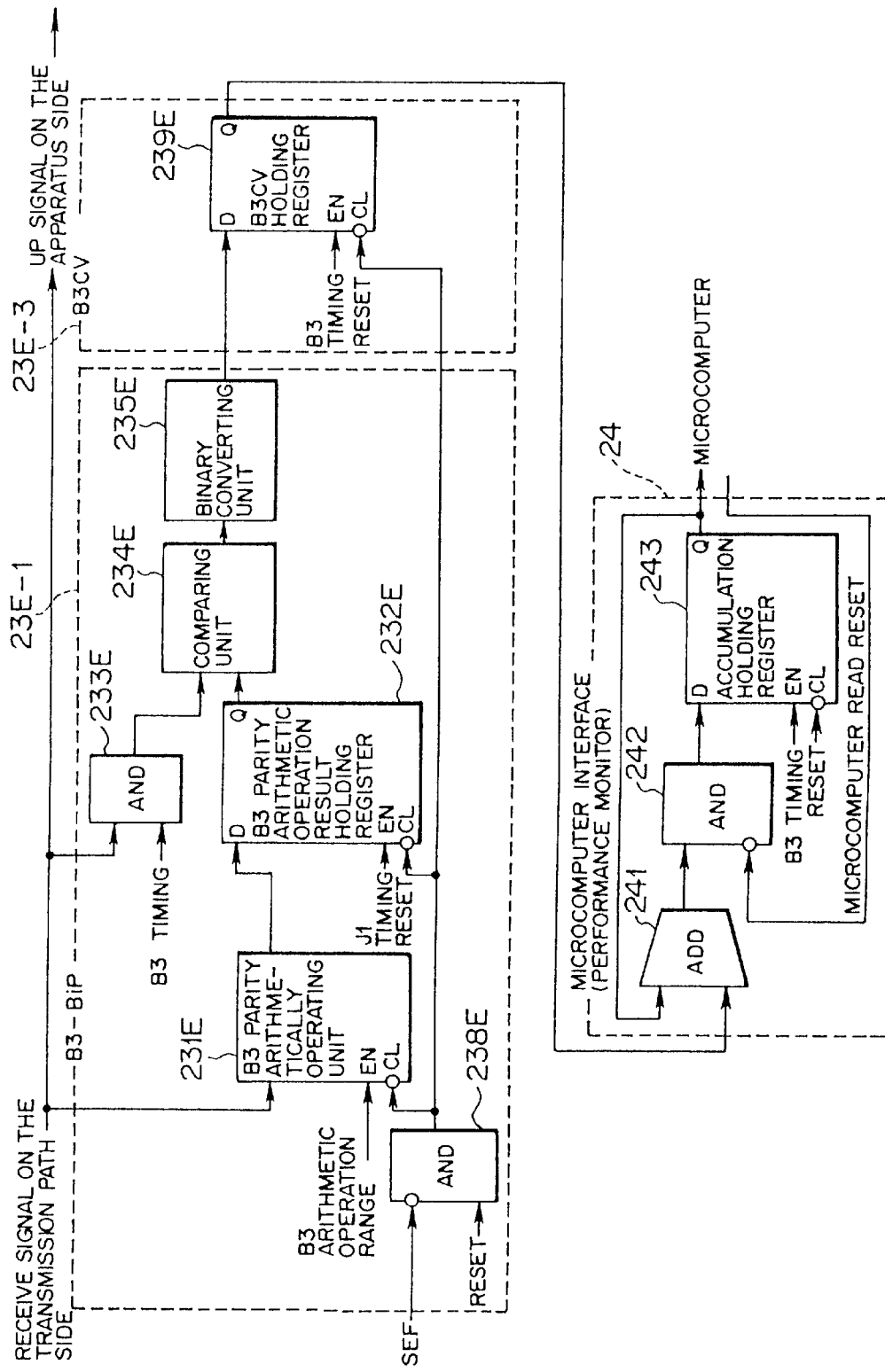
FIG. 51 is a block diagram showing in detail the structures of the essential part of the error information detecting unit and the performance monitor in the STM/ATM converting transmission path terminating apparatus according to the first embodiment.

It is alternatively possible to configure the above error information detecting unit 23 shown in FIG. 49 such that, as shown in FIG. 51, for example, the AND ate 237E of the B3 byte count value detecting unit 23E-3, is omitted, an AND gate 238E of a one-input inverting type for conducting a logical product arithmetic operation on an inverted signal of the SEF signal and the reset signal is used in the B3 byte arithmetic operation processing unit 23E-1, and a signal obtained by inverting an output of the AND gate 238E is inputted to each of clock terminals (CLs) of the B3 parity arithmetically operating unit 231E, the B3 parity arithmetic operation result holding register 232E and the B3 byte count value holding register 239E of the B3 byte count value detecting unit 23E-3, whereby it is possible to inhibit transfer of the B3 parity error information to the performance monitor 24 while the SEF signal is generated, as well.

In the error information detecting unit 23 shown in FIG. 49, the B3 parity error information (D.C.: Don't care) is outputted from the AND gate 237E from a point of time t39 at which generation of the SEF signal is cancelled as shown in FIGS. 50(e) and 50(f). In the above case, the B3 parity error information fed from the B3 byte count value holding register 239E is fixed to "0" up to the detect timing (a point of time t37) of the first B3 byte position after generation of the SEF signal has been cancelled as shown in FIGS. 52(e) and 52(f).

Incidentally, FIGS. 52(a) through 52(d) and 52(g) show an operation which is similar to the operation described with reference to FIG. 50(a) through 50(d) and 50(g), respectively.

Figure 53:
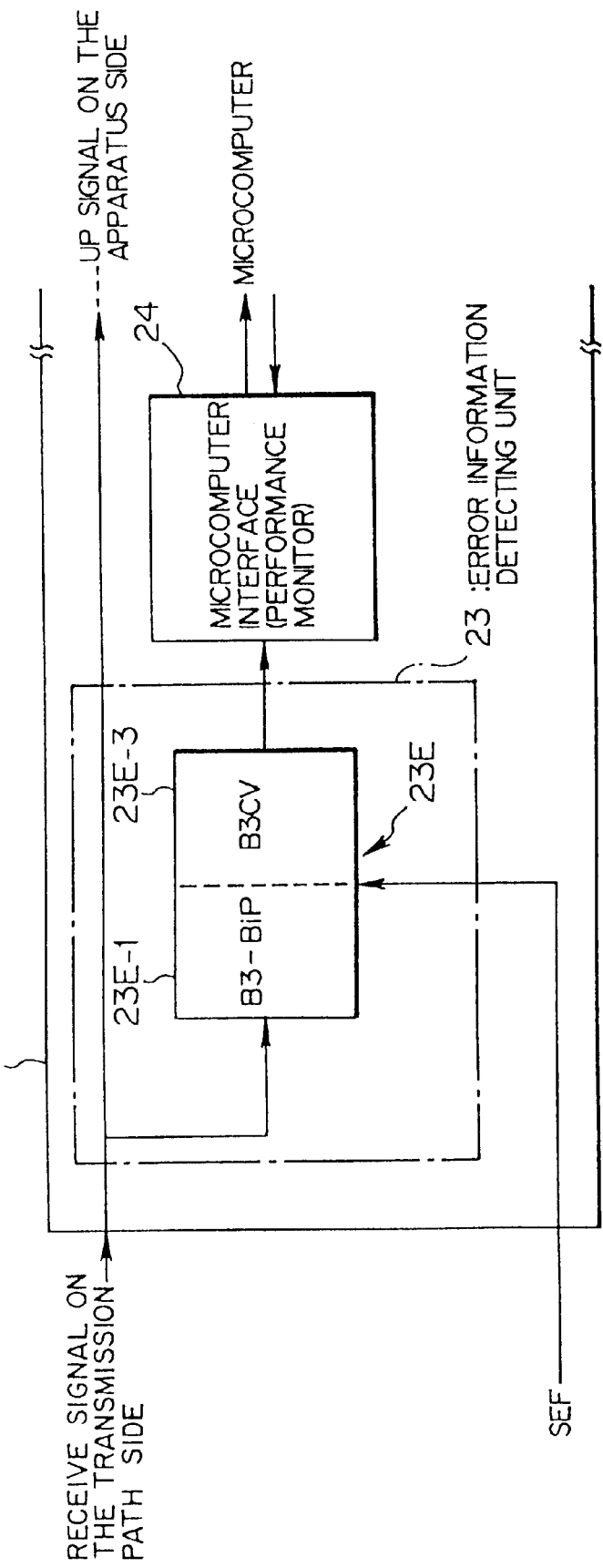
FIG. 53 is a block diagram showing the structures of the essential part of the error information detecting unit and the performance monitor in the STM/ATM converting transmission path terminating apparatus according to the first embodiment.

The above description has been made by way of an example in which the SEF signal fed from the STM synchronizing unit 21 of the receive STM processing unit 2 is received by the error information detecting unit 23 (the B3 byte processing unit 23E). In this case, it is alternatively possible that the SEF signal is received by the performance monitor 24 as shown in FIG. 53, for example.

Figure 54:
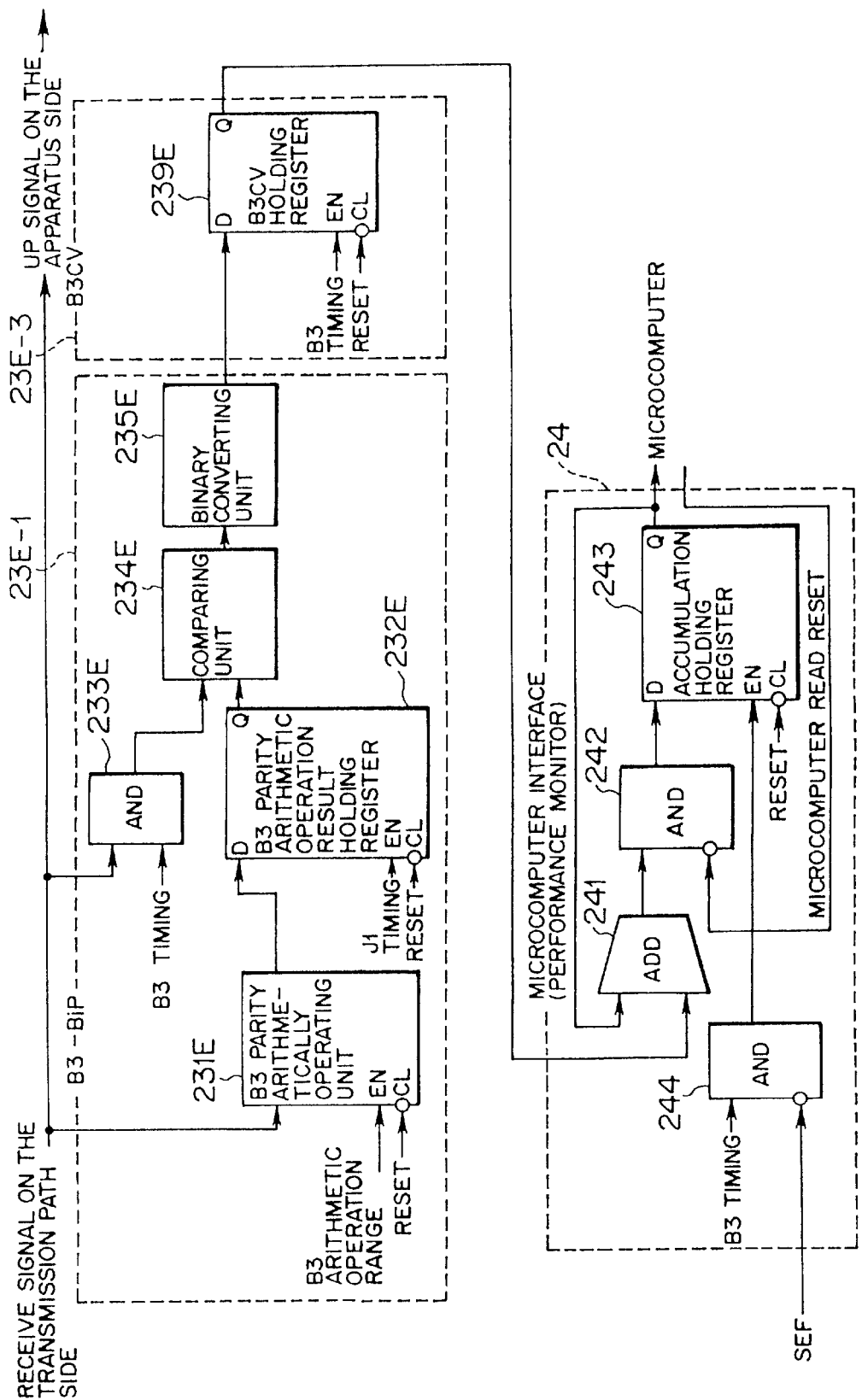
FIG. 54 is a block diagram showing in detail the structures of the essential part of the error information detecting unit and the performance monitor in the STM/ATM converting transmission path terminating apparatus according to the first embodiment.

In which case, the B3 byte processing unit 23E and the performance monitor 24 are configured as shown in FIG. 54. Namely, the B3 byte processing unit 23E having the structure shown in FIG. 49 has the B3 byte count value detecting unit 23E-3 in which the AND gate 237E is omitted, whereas the performance monitor 24 further has an AND gate 244 of a one-input inverting type for conducting a logical multiplication arithmetic operation on the B3 timing and an inverted signal of the SEF signal in addition to the structure shown in FIG. 49.

In the error information detecting unit 23 and the performance monitor with the above structures shown in FIG. 54, when the SEF signal becomes the "H" level during points of time from t39 to t40 as shown in FIG. 55(e), for example, an insert timing of the G1 byte becomes the "L" level as shown in FIG. 55(f), and an output (a count value) of the performance monitor 24 is held and fixed to a count value ("12") obtained at the preceding point of time (t42) as shown in FIG. 55(g).

Incidentally, FIGS. 55(a) through 55(d) show an operation which is similar to the operation described with reference to FIG. 52(a) through 52(d) having been described hereinbefore, respectively.

As above, if an alarm such as the SEF signal or the like is generated, the STM/ATM converting transmission path terminating apparatus 1 according to this embodiment promptly suspends capture of ATM cell data during that. It is therefore possible to at any time continue the process on the basis of accurate cell data.

While the SEF signal is generated, the line far end block error information and the path far end block error information are inhibited to be transferred to the transmit STM processing unit 6 and the performance monitor 24. Whereby, the transmit STM processing unit 6 and the performance monitor 24 can always execute the process on the basis of accurate transmission path switching information so that it is possible to certainly prevent unnecessary switching of the transmission path.

(c) Description of a Second Embodiment

Figure 56:
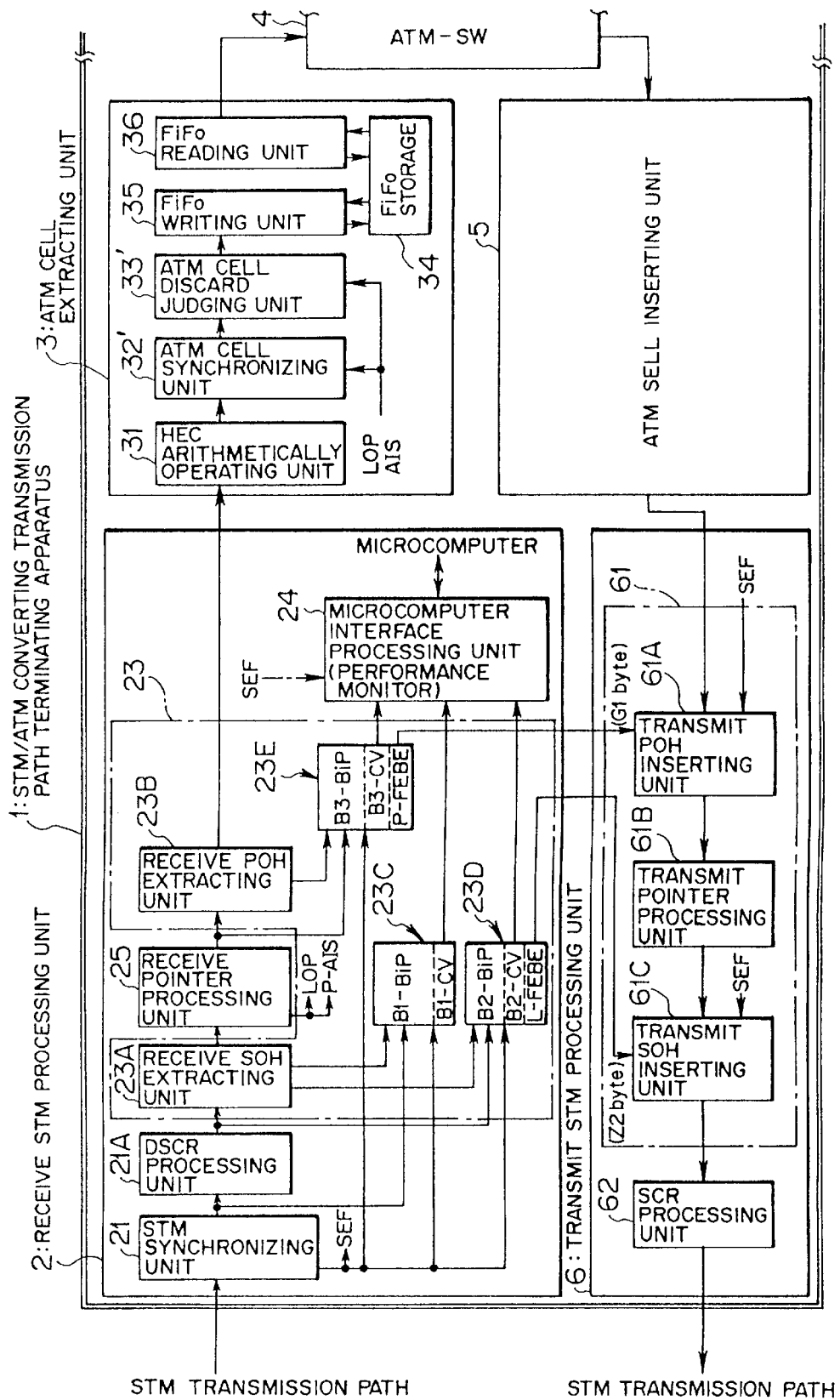
FIG. 56 is a block diagram showing a structure of a synchronous transfer mode/asynchronous transfer mode (STM/ATM) converting transmission path terminating apparatus according to a second embodiment of this invention.

FIG. 56 is a block diagram showing a structure of a synchronous transfer mode/asynchronous transfer mode (STM/ATM) converting transmission path terminating apparatus according to a second embodiment of this invention. In the STM/ATM converting transmission path terminating apparatus 1 shown in FIG. 56, the receiving STM processing unit 2 further has a receive pointer processing unit 25 in addition to the structure shown in FIG. 4, and the ATM cell extracting unit 3 has an ATM cell synchronizing unit 32' and the ATM cell synchronizing unit 32 instead of an ATM cell discard judging unit 33' and the ATM cell discard judging unit 33 shown in FIG. 4.

The receive pointer processing unit 25 of the receive STM processing unit 2 conducts a necessary process on pointer information such as H1 through H3 bytes [refer to FIG. 69(b) ] of the section overhead (overhead information) 8 of a received STM frame (a main signal) to detect LOP (Loss Of Pointer) or a path alarm indication signal (P-AIS) and outputs an alarm signal.

The LOP and P-AIS are generally detected after out of synchronization of the STM frame has been detected by the STM synchronizing unit 21 of the receive STM processing unit 2, the SEF signal has been generated, then a predetermined time (3 msec, for example) has been elapsed, as having been described in the first embodiment.

In the ATM cell extracting unit 3, the ATM cell synchronizing unit (the asynchronous transfer mode cell synchronizing unit) 32' judges a state of synchronization of a received STM frame on the basis of a result of the HEC arithmetic operation fed from the HEC arithmetically operating unit (the header error information arithmetically operating unit) 31, besides forcibly outputting the OCD signal representing that the received STM frame is out of synchronization when receiving an alarm signal from the above receive pointer processing unit 25. The ATM cell discard judging unit (the asynchronous transfer mode cell discard judging unit) 33' receives synchronization judgement information from the ATM cell synchronizing unit 32' to judge whether the ATM cell 11 should be discarded or not, besides forcibly outputting a cell discard signal when receiving the alarm signal from the receive pointer processing unit 25.

Figure 57:
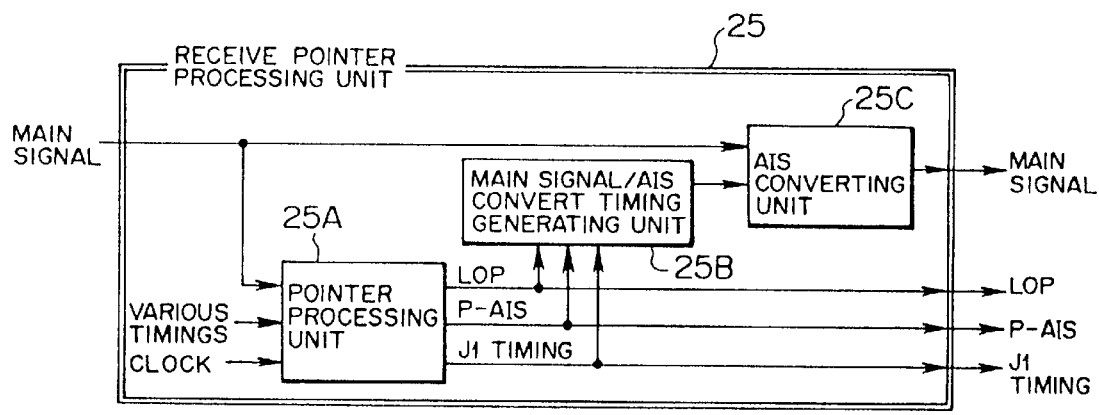
FIG. 57 is a block diagrams showing a structure of a receive pointer processing unit in the STM/ATM converting transmission path terminating apparatus according to the second embodiment.

The receive pointer processing unit 25 of the receive STM processing unit 2 has, as shown in FIG. 57, for example, a pointer processing unit 25A, a main signal/AIS convert timing generating unit 25B and an AIS converting unit 25C.

The pointer processing unit 25A detects the LOP, the P-AIS and a detect timing for the J1 byte (the J1 timing) included in the path overhead 9 from the main signal on the basis of the main signal, various timings (a timing indicating a position of a leading position of the STM frame or a position of the path overhead 9 in the STM frame and the like) supplied from the receive section overhead extracting unit 23A and an internal clock.

The main signal/AIS convert timing generating unit 25B generates a convert timing signal for the main signal/AIS on the basis of the LOP, the P-AIS and the J1 timing signal detected by the above pointer processing unit 25A. The AIS converting unit 25C converts the main signal into an AIS signal according to the main signal/AIS convert timing signal supplied from the main signal/AIS convert timing generating unit 25B.

Figure 58:
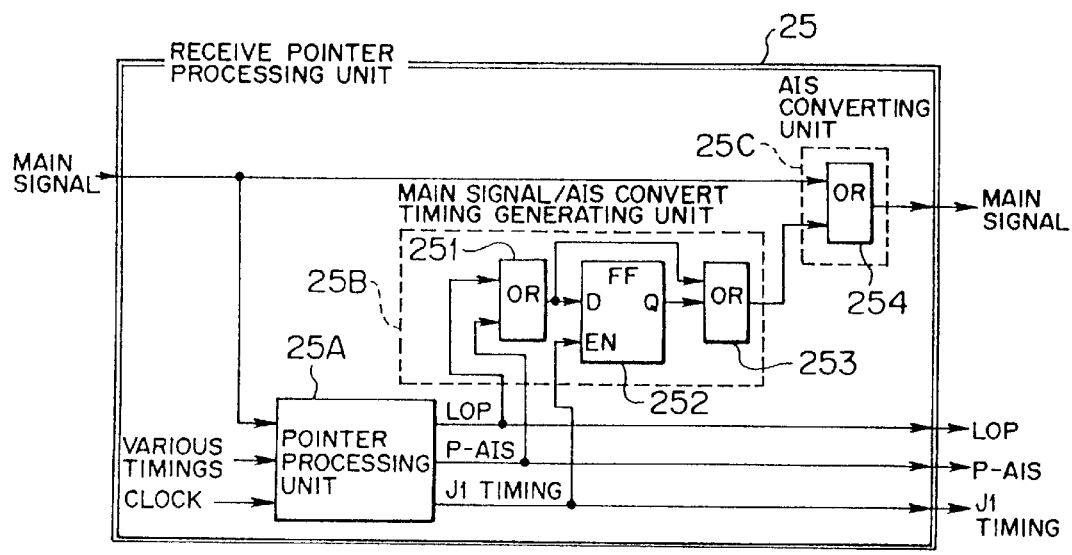
FIG. 58 is a block diagrams showing in detail the structure of the receive pointer processing unit in the STM/ATM converting transmission path terminating apparatus according to the second embodiment.

For this, the above main signal/AIS convert timing generating unit 25B has an OR gate 251 for conducting a logical sum arithmetic operation on the LOP and the P-AIS fed from the pointer processing unit 25A, a flip-flop (FF) circuit 252 for outputting an output of the OR gate 251 according to the J1 timing signal detected by the pointer processing unit 25A and an OR gate for conducting a logical sum arithmetic operation on an output of the OR gate 251 and an output of the FF circuit 252, whereas the AIS converting unit 25C has an OR gate 254 for conducting a logical sum arithmetic operation on the main signal and the main signal/AIS convert timing signal fed from the main signal/AIS convert timing generating unit 25B, as shown in FIG. 58.

Figure 59:
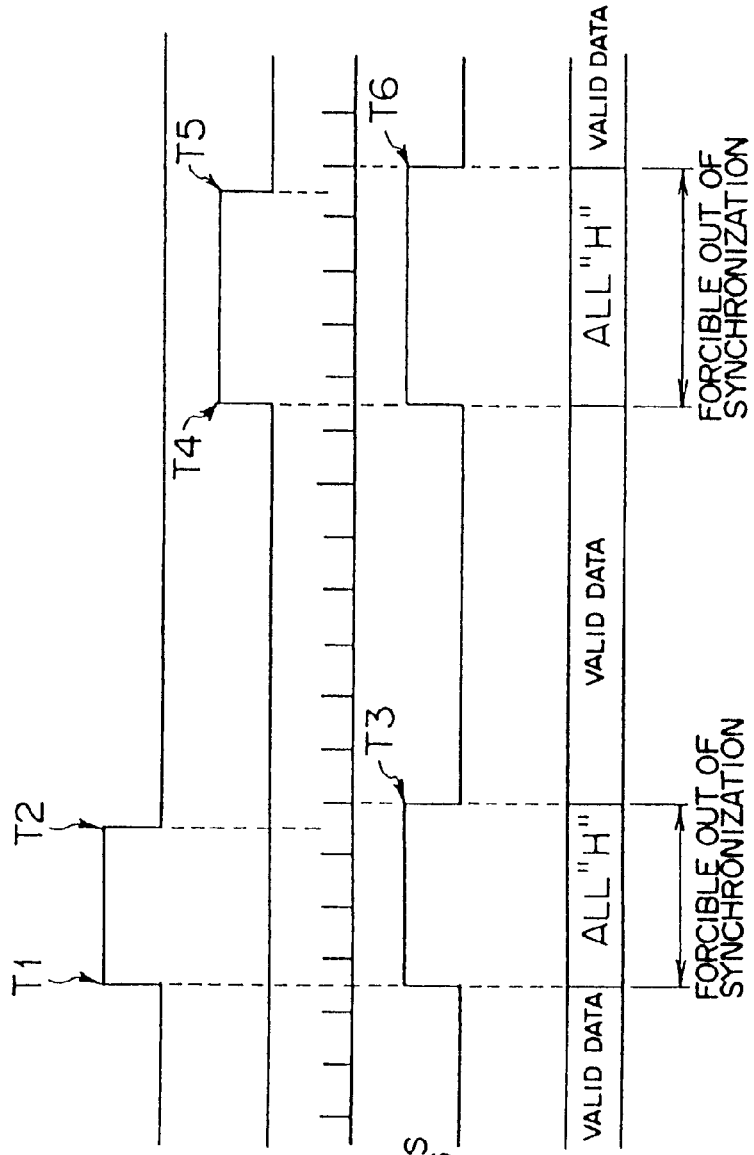
FIGS. 59(a) through 59(e) are timing charts for illustrating an operation of the receive pointer processing unit in the STM/ATM converting transmission path terminating apparatus according to the second embodiment.

In the receive pointer processing unit 25 with the above structure, when the P-AIS signal is detected by the pointer processing unit 25A at a point of time T1 as shown in FIG. 59(a), for example, an output of the OR gate 251 of the main signal/AIS convert timing generating unit 25B becomes the "H" level, and the main signal/AIS convert timing signal is outputted (becomes the "H" level) through the FF circuit 252 and the OR gate 253 as shown in FIG. 59(d) according to the J1 timing signal as shown in FIG. 59(c).

In the AIS converting unit 25C, the main signal/AIS convert timing signal fed from the main signal/AIS convert timing generating unit 25B is inputted to the OR gate 254, whereby the main signal (valid data) is all converted into the "H" level (ALL "H") so that the main signal is forcibly brought to out of synchronization state.

After that, when the P-AIS comes to be not detected from the main signal by the pointer processing unit 25 at a point of time T2 as shown in FIG. 59(a), for example, and an output of the P-AIS is cancelled (that is, the P-AIS becomes the "L" level), the main signal/AIS convert timing signal is cancelled at the first J1 timing after the output of the P-AIS has-been cancelled as shown at a point of time T3 in FIG. 59(d).

As a result, the main signal (the valid data) gets out from the ALL "H" state and comes to be outputted as usual from the OR gate 254 of the AIS converting unit 25C as shown in FIG. 59(e). Namely, the receive pointer processing unit 25 promptly cancels the forcible out of synchronization state when the P-AIS (or the LOP) comes to be not detected.

If the LOP is detected by the pointer processing unit 25A during points of time from T4 to T5 as shown in FIG. 59(b), for example, the main signal/AIS convert timing signal is outputted from the main signal/AIS convert timing generating unit 25B during the points of time T4 through T6 as shown in FIGS. 59(d) and 59(e), as well. The main signal is thereby converted in the ALL "H" state so as to be forcibly brought to the out of synchronization state.

The above receive pointer processing unit 25 forcibly makes the main signal be in the out of synchronization state when the LOP or the P-AIS is detected from the main signal (the STM frame) and it is thus admitted that there is any abnormality in the main signal as above so that synchronization of the ATM cell 11 is not established in the ATM cell extracting unit 3 which will be described later. It is therefore possible to prevent the ATM cell 11 under an alarm generated state (an abnormality detected state) from being captured in the terminating apparatus 1.

Figure 60:
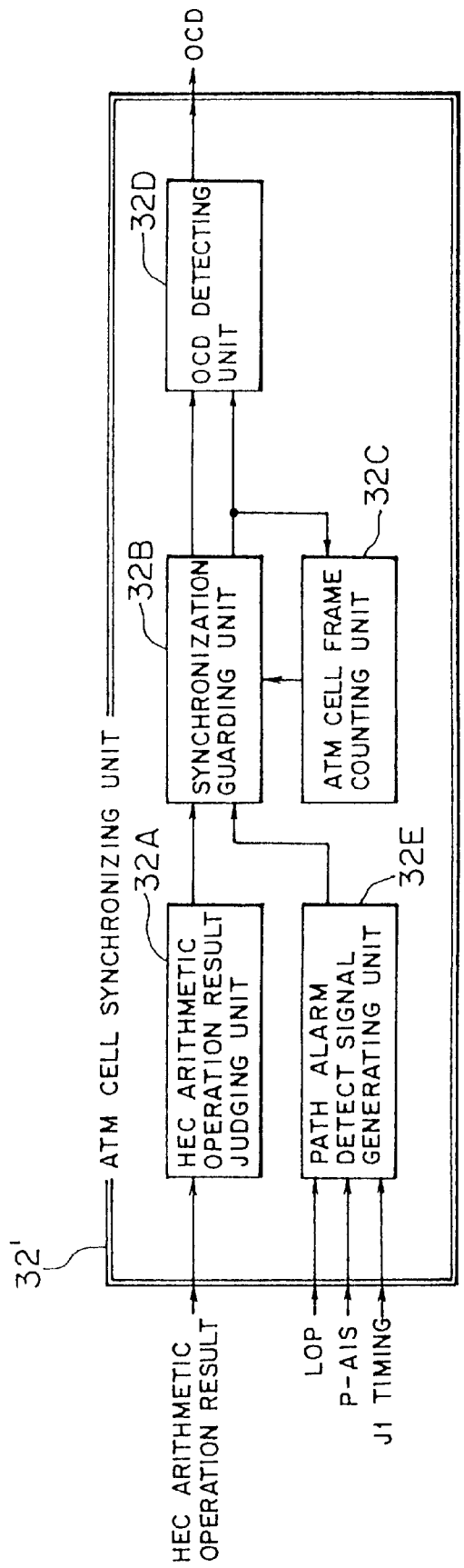
FIG. 60 is a block diagram showing a structure of an ATM cell synchronizing unit in the STM/ATM converting transmission path terminating apparatus according to the second embodiment.

FIG. 60 is a block diagram showing a structure of the above ATM cell synchronizing unit 32'. As shown in FIG. 60, the ATM cell synchronizing unit 32' has, similarly to the ATM cell synchronizing unit 32 shown in FIG. 5, the HEC arithmetic operation result judging unit 32A, the synchronization guarding unit 32B, the ATM cell frame counting unit 32C and the cell loss indicating signal (OCD: Out of Cell Delineation) detecting unit 32D. The ATM cell synchronizing unit 32' further has a path alarm detect signal generating unit 32E.

Figure 61:
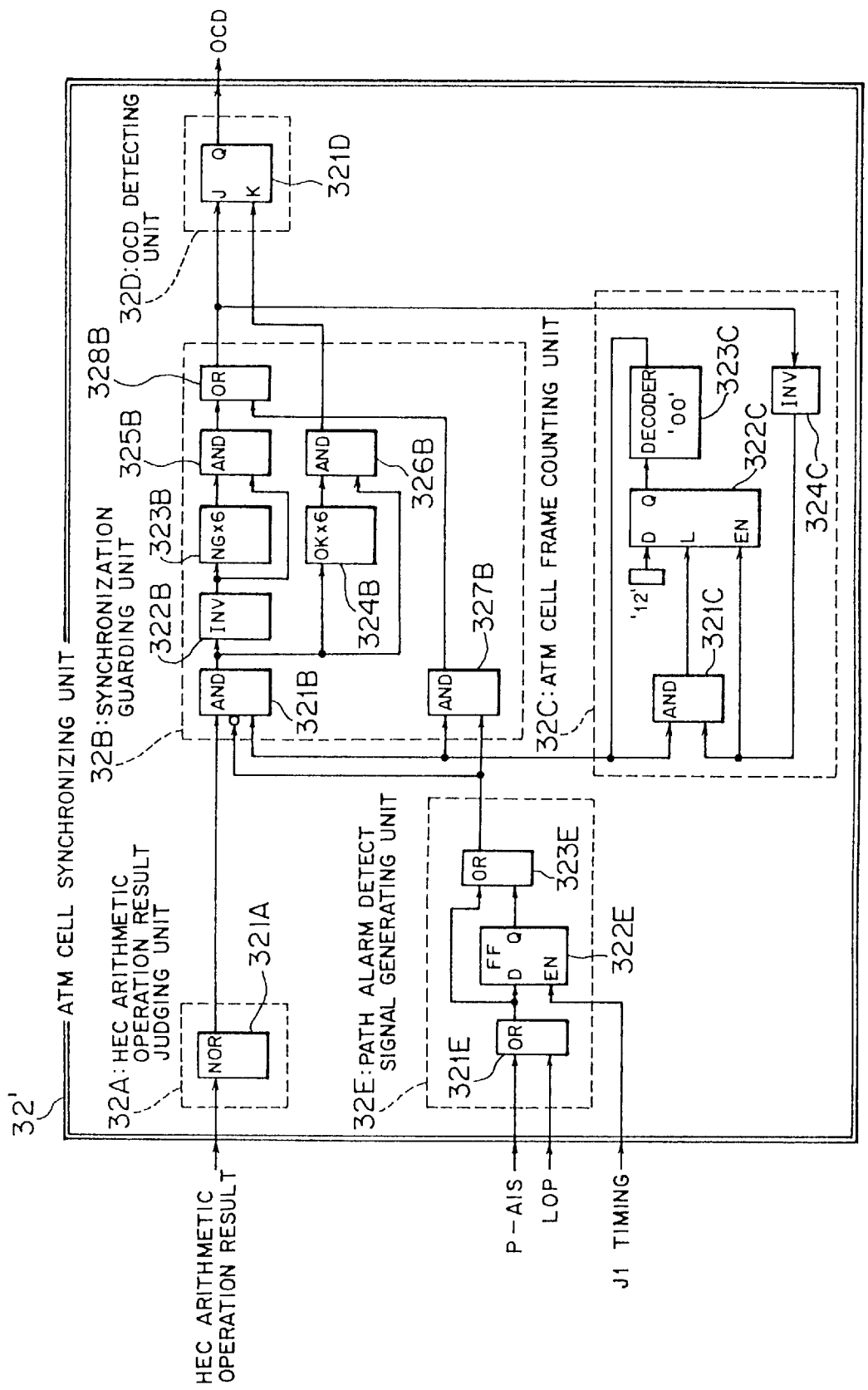
FIG. 61 is a block diagram showing in detail the structure of the ATM cell synchronizing unit in the STM/ATM converting transmission path terminating apparatus according to the second embodiment.

In this case, the HEC arithmetic operation result judging unit 32A judges whether the ATM cell 11 has a header error or not on the basis of a result of the arithmetic operation fed from the HEC arithmetically operating unit 31 using the NOR gate 321A as shown in FIG. 61. The synchronization guarding unit 32B successively receives header error information fed from the HEC arithmetically operating unit 31 six times by means of the asynchronous state judging unit 323B and the synchronization judging unit 324B using the AND gate 321B of a one-input inverting type, the inversion gate (INV) 322B, the asynchronous state judging unit 323B in six stages, the synchronous state judging unit 324B, the AND gates 325B through 327B and the OR gate 328B, thereby outputting a signal representing out of synchronization (NG) or synchronization (OK).

When receiving the path alarm detect signal fed from the path alarm detect signal generating unit 32E through the synchronization guarding unit 32B, the OCD detecting unit (the circuit unit) 321 forcibly outputs the OCD signal representing that a received STM frame is out of synchronization using the J-K flip-flop circuit 321D, as shown in FIG. 61. The ATM cell frame counting unit 32C uses, as shown in FIG. 6, the AND gate 321C, the frame counter 322C, the decoder 323C and the inversion gate (INV) 324C to generate 53 counter values on the basis of an output of the synchronization guarding unit 32B such that a synchronization guarding process by the synchronization guarding unit 32B is conducted on all bytes (53 bytes) of the ATM cell 11 of one frame, and outputs them to the synchronization guarding unit 32B.

Here, if the STM frame becomes out of synchronization, the count value is fixed to "0" until the header of the ATM cell 11 is normally re-hunted as will be described later. For this, not "0" but, for example, "12" is inputted as an initial count value to a data input terminal (D) of the frame counter 322C.

With an OR gate 321E for conducting a logical sum arithmetic operation on the P-AIS and the LOP, a flip-flop (FF) circuit 322E for outputting an output of the OR gate 321E according to the J1 timing and an OR gate 323E for conducting a logical sum arithmetic operation on the output of the OR gate 321E and an output of the FF circuit 322E, the path alarm detect signal generating unit 32E generates the path alarm detect signal when receiving the alarm signal from the above receive pointer processing unit 25 of the receive TM processing unit 2, and outputs it to the OCD detecting unit 32D through the synchronization guarding nit 32B (the AND gate 327B), as shown in FIG. 61.

Figure 62:
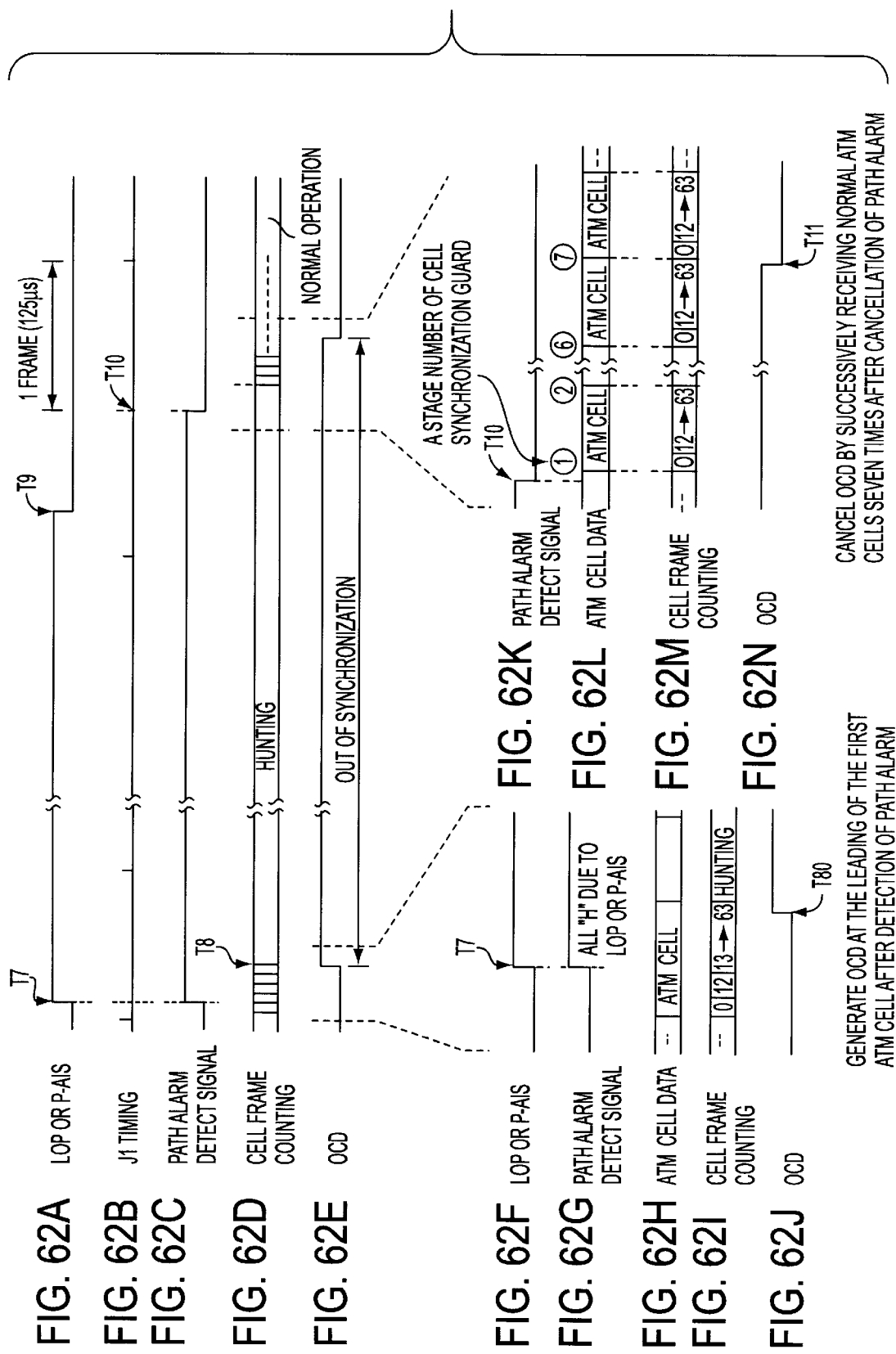
FIGS. 62(a) through 62(n) are timing charts for illustrating an operation of the ATM cell synchronizing unit in the STM/ATM converting transmission path terminating apparatus according to the second embodiment.

In the ATM cell synchronizing unit 32' with the above structure, when the receive pointer processing unit 25 of the receive STM processing unit 2 detects the P-AIS or the LOP from the main signal (the STM frame) at a point of time T7 as shown in FIGS. 62(a) and 62(f), for example, the path alarm detect signal generating unit 32E generates and outputs the path alarm detect signal as shown in FIGS. 62(c) and 62(g).

In the above-mentioned receive pointer unit 25, data is set to the ALL "H" state from the first ATM cell data (a point of time T8) after the path alarm detect signal has been outputted since the main signal is brought to the ALL "H" state, as shown in FIG. 62(h).

At that time, in the ATM cell frame counter 32C, an output of the frame counter 322C is fixed to "0" to be in a hunting state because of the path alarm detect signal as shown in FIGS. 62(d) and 62(i), whereby the OCD signal is outputted (becomes the "H" level) from the OCD detecting unit 32D as shown in FIGS. 62(e) and 62(j) and the following STM frame is forcibly brought to the out of synchronization state.

After that, when the P-AIS or the LOP comes to be not detected by the receive pointer processing unit 25 and is cancelled at a point of time T9 as shown in FIG. 62(a), for example, the path alarm detect signal fed from the path alarm detect signal generating unit 32E is cancelled (becomes the "L" level) by the first J1 timing signal after the P-AIS or the LOP has been cancelled as indicated at a point of time T10 in FIGS. 62(b), 62(c) and 62(k).

In the synchronization guarding unit 32B, the frame counter 322C of the ATM cell frame counter 32C becomes a normal operation as shown in FIGS. 62(d) and 62(m).

From when the STM-frame which is synchronized is received, that is, from a point of time T11 at which the normal ATM cell 11 has been successively received seven times as shown in FIG. 62(l) after the synchronous state judging unit 324B has successively judged six times that synchronization of the STM frame is established, an output of the OCD signal fed from the OCD detecting unit 32D is cancelled (becomes "L" level) and the operation becomes normal as shown in FIG. 62(n).

Namely, the ATM cell synchronizing unit 32' cancels an output of the OCD signal when the normal ATM cell 11 is successively received predetermined times (seven times) if the P-AIS or the LOP comes to be not detected by the receive pointer processing unit 25.

The ATM cell synchronizing unit 32' according to this embodiment generates the path alarm detect signal while the LOP or the P-AIS is detected by the receive pointer processing unit 25 of the receive STM processing unit 2, outputs the OCD signal representing that the received STM frame is out of synchronization from the OCD detecting unit 32D, thereby forcibly bringing the ATM cell 11 to the out of synchronization state until the ATM cell 11 which is normally synchronized is successively received seven times and it is recognized that synchronization of the STM frame has been established. It is therefore possible to prevent the ATM cell 11 lacking reliability in signal quality from being captured in the terminating apparatus 1 so that it is possible to always continue the process based on accurate data, as well.

Figure 63:
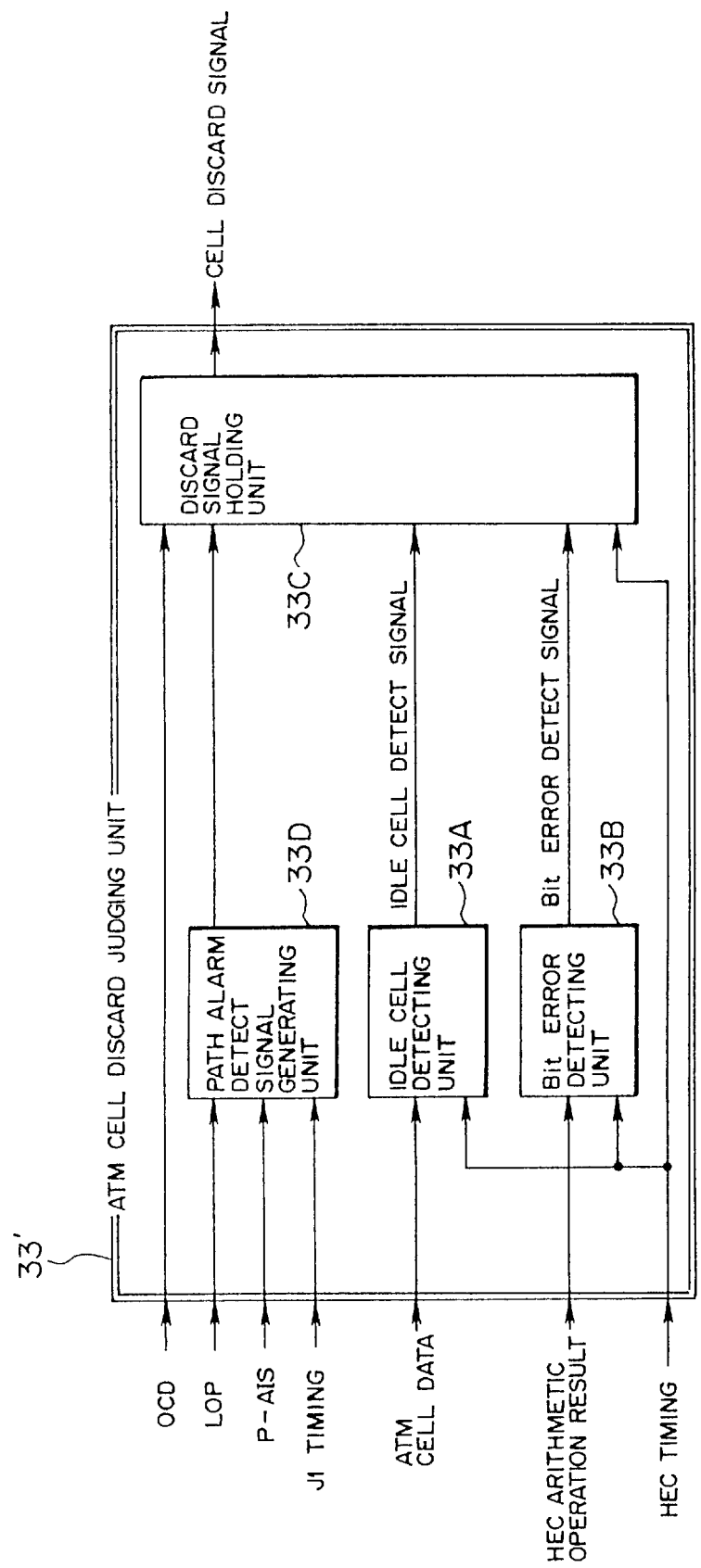
FIG. 63 is a block diagram showing a structure of an ATM cell discard judging unit in the STM/ATM converting transmission path terminating apparatus according to the second embodiment.

Next, FIG. 63 is a block diagram showing a structure of the above ATM cell discard judging unit 33'. As shown in FIG. 63, the ATM cell discard judging unit 33' has, similarly to the ATM cell discard judging unit 33 shown in FIG. 8, the idle cell detecting unit 33A, the bit error detecting unit 33B and the discard signal holding unit 33C. The ATM cell discard judging unit 33' further has a path alarm detect signal generating unit 33D.

Figure 64:
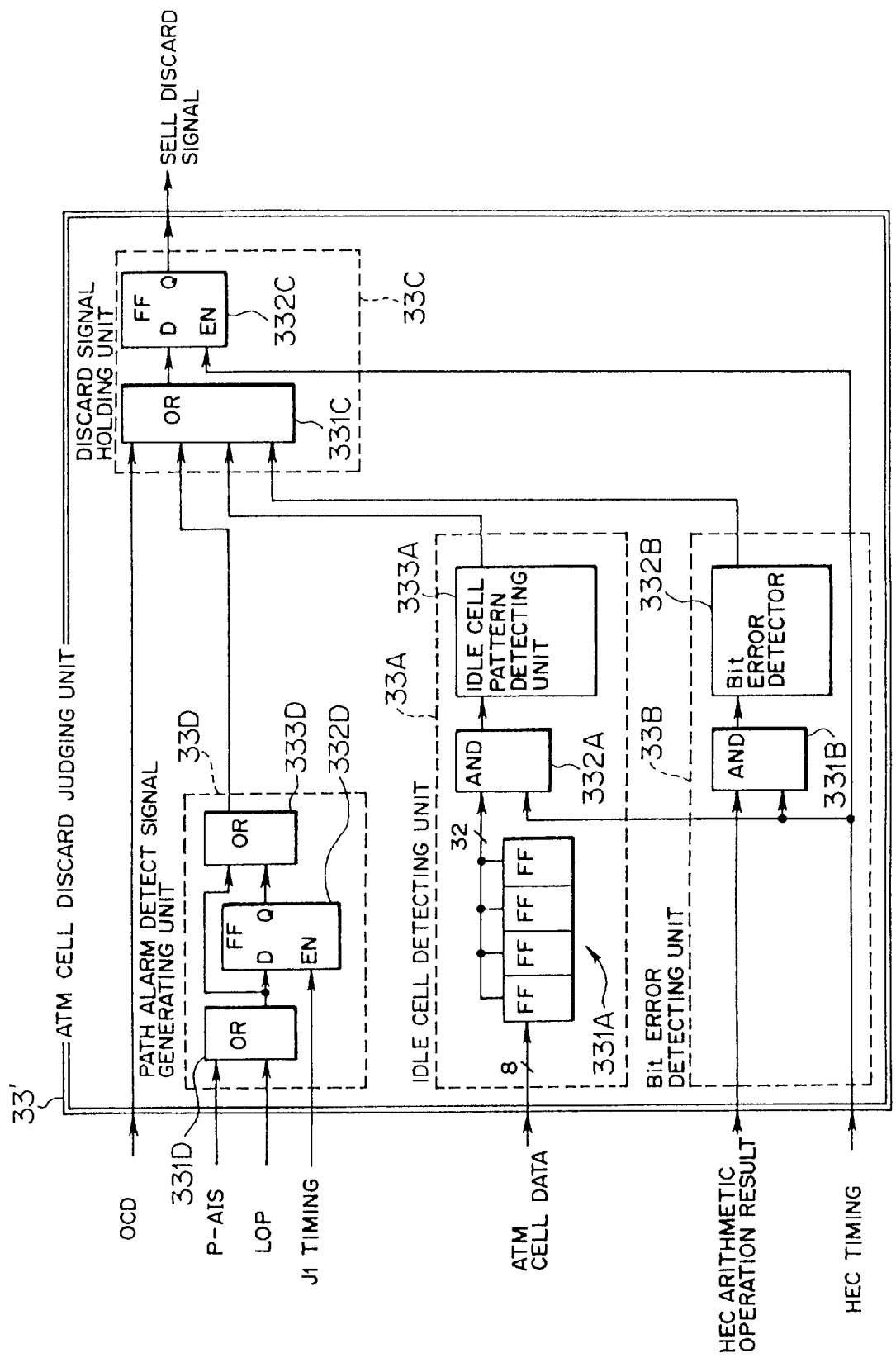
FIG. 64 is a block diagram showing in detail the structure of the ATM cell discard judging unit in the STM/ATM converting transmission path terminating apparatus according to the second embodiment.

In this case, the idle cell detecting unit 33A detects an idle cell (an empty cell) from the ATM cell data fed from the above ATM cell synchronizing unit 32. In this embodiment, the idle cell detecting unit 33A has the flip-flop (FF) circuit 331A in four stages, the AND gate 332A, the idle pattern detecting unit 333A as shown in FIG. 64, for example. Based on a result of AND (a logical multiplication arithmetic operation) on the ATM cell data having been delayed in four stages in the flip-flop circuit 331A and the HEC timing fed from the ATM cell synchronizing unit 32', the idle cell detecting unit 33A detects an idle pattern showing which ATM cell 11 is an idle cell over four ATM cells 11, and outputs an idle cell detect signal.

The bit error detecting unit 33B detects a bit error from a result of the HEC arithmetic operation (the header error information) fed from the HEC arithmetically operating unit 31, which has the AND gate 331B and the bit error detector 332B, as shown in FIG. 64. In the bit error detecting unit 33B, a bit error is detected based on a result of AND (a logical multiplication) arithmetic operation on a result of the HEC arithmetic operation and the HEC timing by the bit error detector 332B, and a bit error detect signal is outputted.

The discard signal holding unit 33C holds the path alarm detect signal generated by the path alarm detect signal generating unit 33D, the idle cell detect signal fed from the idle cell detecting unit 33A and the bit error detect signal fed form the bit error detecting unit 33B on the basis of the OCD signal fed from the ATM cell synchronizing unit 32' and the P-AIS or the LOP detected by the receive pointer processing unit 25 of the receive unit processing unit 2. The discard signal holding unit 33C has, as shown in FIG. 64, for example, the OR gate 331C and the flip-flop (FF) circuit 332C, in which a result of OR (a logical sum arithmetic operation) on the above OCD signal, the path alarm detect signal, the idle cell detect signal and the bit error detect signal is successively inputted to the flip-flop.(FF) circuit 332C, and each of the result is outputted as the cell discard signal by cell according to the HEC timing.

The path alarm detect signal generating unit 33D generates the path alarm detect signal on the basis of the P-AIS or the LOP detected by the receive pointer processing unit 25 of the receive STM processing unit 2, which has, as shown in FIG. 64, an OR gate 331D for conducting a logical sum arithmetic operation on the P-AIS and the LOP detected by the receive pointer processing unit 25 of the receive STM processing unit 2, a flip-flop (FF) circuit 332D for outputting an output of the OR gate 331D according to the J1 timing fed from the receive pointer processing unit 25, and an OR gate 333D for conducting a logical sum arithmetic operation on an output of the OR gate 331D and an output of the FF circuit 332D.

If any one among the above OCD signal, the P-AIS, the LOP, the idle cell detect signal and the bit error detect signal (a discard condition signal) is detected, the ATM cell discard judging unit 33' with the above structure re-times the discard condition signal at the HEC timing, and the cell discard signal is outputted in cell from the discard signal holding unit 33C. If the P-AIS or the LOP is detected by the receive pointer processing unit 25 of the receive STM processing unit 2, in particular, the cell discard signal is instantaneously outputted form the ATM cell discard judging unit 33' so that an asynchronous transfer mode cell lacking reliability in signal quality is forcibly discarded.

Hereinafter, an operation of the ATM cell discard judging unit 33' will be described.

When the P-AIS or the LOP is detected (becomes the "H" level) by the receive pointer processing unit 25 of the receive STM processing unit 2 at a point of time T12 as shown in FIGS. 65(a) and 65(g), for example, an output of the OR gate 331D becomes the "H" level in the path alarm detect signal generating unit 33D. With this, an output of the OR gate 333D becomes the "H" level, the path alarm detect signal is thereby outputted as shown in FIGS. 65(c) and 65(h).

At that time, the receive pointer processing unit 25 of the receive STM processing unit 2 makes the main signal be in the ALL "H" state when the P-AIS or the LOP is detected as having described hereinbefore so that the ATM cell data to be inputted to the ATM cell discard judging unit 33' is in the ALL "H" state as shown in FIG. 65(i).

Then, an output of the ATM cell frame counter 32C of the above ATM cell synchronizing unit 32' is fixed to "0" from a point of time T13 as shown in FIGS. 65(d) and 65(j) to be in the hunting state, whereby the OCD signal is outputted (becomes the "H" level) as shown in FIGS. 65(e) and 65(k). Accordingly, the following STM frames are forcibly brought to the out of synchronizing state, following that, the ATM cell discard signal is outputted from the discard signal holding unit 33C as shown in FIGS. 65(f) and 65(l).

After that, when the P-AIS or the LOP comes to be not detected (becomes the "L" level) by the receive pointer processing unit 25 of the receive STM processing unit 2 at a point of time T14 as shown in FIG. 66(a) and 66(g), for example, the ATM cell frame counter 32C of the above ATM cell synchronizing unit 32' comes to operate normally, then an output of the OCD signal is cancelled as shown in FIGS. 66(e) and 66(j) at a point of time T15 up to which the normal ATM cell 11 has been successively received seven times as shown in FIG. 66(h).

When the J1 timing signal becomes the "H" level at a point of time T16 as shown in FIG. 67(b), for example, under a condition where the P-AIS and the LOP are not detected after the point of time T14 as shown in FIG. 67(a), the FF circuit 332D of the path alarm detect signal generating unit 33D is re-timed, and the path alarm detect signal fed from the OR gate 333D becomes the "L" level as shown in FIG. 67(c) and 67(g) so as to be cancelled.

At that time, the ATM cell frame counter 32C operates normally in the above ATM cell synchronizing unit 32' as shown in FIG. 67(d). On the other hand, when a counter value of the fame counter 322C becomes "0" and at a timing (a point of time T17) at which a leading position of the first ATM cell 11 is detected after cancellation of the path alarm detect signal, the cell discard signal fed from the discard signal holding unit 33C is cancelled in the ATM cell discard judging unit 33' as shown in FIG. 67(j).

Namely, the ATM cell discard judging unit 33' cancels forcible output of the cell discard signal when receiving the first normal ATM cell 11 if the receive pointer processing unit 25 of the receive STM processing unit 2 comes to not detect the P-AIS and the LOP.

The above ATM cell discard judging unit 33' outputs the cell discard signal while the receive pointer processing unit 25 of the receive STM processing unit 2 detects the P-AIS or the LOP to discard the ATM cell 11 lacking reliability in signal quality, thereby preventing it from being captured in the terminating apparatus 1. When the P-AIS or the LOP is cancelled, the ATM cell discard judging unit 33' can promptly capture the ATM cell 11 whose quality has been assured into the terminating apparatus 1 so as to continue the process.

According to this embodiment, it is possible that the ATM cell extracting unit 3 executes either a process of forcibly judging that a received STM frame is out of synchronization or a process of forcibly outputting the cell discard signal when receiving the alarm signal from the receive pointer processing unit 25 of the receive STM processing unit 2.

The error information detecting unit 23 of the receive STM processing unit 2 and the error information inserting unit 61 of the transmit STM processing unit 6 according to this embodiment shown in FIG. 56 are configured similarly to those having been described in the first embodiment.

Namely, the error information detecting unit 23 has the B2 byte processing unit 23D, whereas the error information inserting unit 61 has the transmit section overhead inserting unit 61C. Further, the B2 byte processing unit 23D has the B2 byte arithmetic operation processing unit 23D-1 and the line far end block error information (L-FEBE) detecting unit 23D-2, as described hereinbefore with reference to FIG. 16.

As shown in FIG. 17, the B2 byte arithmetic operation processing unit 23D-1 has the B2 parity arithmetically operating unit 231D, the B2 parity arithmetic operation result holding register 232D, the AND gate 233D, the comparing unit 234D and the binary converting unit 235D, whereas the line far end block error information detecting unit 23D-2 has the line far end block error information holding register 236D and the AND gate 237D of a one-input inverting type. Further, the transmit section overhead inserting unit 61C has the AND gate 611, the AND gate 612 of a one-input inverting type and the OR gate 613.

According to this embodiment, in the error information inserting unit 61 (the transmit section overhead inserting unit 61C), when the SEF signal is generated (becomes the "H" level) by the STM synchronizing unit 21 and an output of the AND gate 237D of the, line far end block, error information detecting unit 23D-2 becomes the "L" level, an output of the AND gate 611 becomes the "L" level, too. At that time, the line far end block error information is not inserted as the Z2 byte of the section overhead 8 that should be inserted in a down signal on the apparatus side, and inhibited from being transferred to the error information inserting unit 61 of the transmit STM processing unit 6.

In consequence, the line far end block error information lacking reliability in results of the arithmetic operation obtained while a received STM frame is out of synchronization is not transferred to the error information inserting unit 61 of the transmit STM processing unit 6. It is therefore possible to certainly avoid unnecessary switching of the transmission path in an apparatus or the like receiving the line far end block error information to switch the transmission path.

It is alternatively possible to configure the error information detecting unit 23 such that, as shown in FIG. 19, for example, the AND gate 237D of the line far end block error information detecting unit 23D-2 is omitted, the AND gate 238D of a one-input inverting type for conducting a logical multiplication arithmetic operation on an inverted signal of the SEF signal and the reset signal is used in the B2 byte arithmetic operation processing unit 23D-1, and a signal obtained by inverting an output of the AND gate 238D is inputted to each of clock terminals (CLs) of the B2 parity arithmetically operating unit 231D, the B2 parity arithmetic operation result holding register 232D, the line far end block error information holding register 236D of the line far end block error information detecting unit 23D-2. With this arrangement, it is, as well, possible to inhibit the line far end block error information obtained while the SEF signal is generated from being transferred to the error information inserting unit 61 of the line far end block error information.

In this embodiment, it is alternatively possible that the SEF signal fed from the STM synchronizing unit 21 of the receive STM processing unit 2 is received by the error information inserting unit 61 (the transmit section overhead inserting unit 61C) of the transmit STM processing unit 6 as shown in FIG. 21, for example.

In which case, the B2 byte processing unit 23D in the structure shown in FIG. 17 has the line far end block error information detecting unit 23D-2 in which the AND gate 237D is omitted, whereas the transmit section overhead inserting unit 61C in the structure shown in FIG. 17 further has the AND gate 614 of a one-input inverting type for conducting a logical product arithmetic operation on the Z2 timing and an inverted signal of the SEF signal.

With the above structure, the error information detecting unit 23 and the error information inserting unit 61 can stop (inhibit) transfer of the line far end block error information to the error information inserting unit 61 while the SEF signal is generated.

The error information detecting unit 23 according to this embodiment shown in FIG. 56 has the B3 byte processing unit 23E, whereas the error information inserting unit 61 has the transmit path overhead inserting unit 23E-1 as shown in FIG. 24. Further, the B3 byte processing unit 23E has the B3 byte arithmetic operation processing unit 23E-1 and the path far end block error information (P-FEBE) detecting unit 23E-2.

In this case, the B3 byte arithmetic operation processing unit 23E-1 has, as shown in FIG. 25, the B3 parity arithmetically operating unit 231E, the B3 parity arithmetic operation result holding register 232E, the AND gate 233E, the comparing unit 234E and the binary converting unit 235E, whereas the path far end block error information detecting unit 23E-2 has the path far end block error information holding register 236E and the AND gate 237E of one-input inverting type. Further, the transmit path overhead inserting unit 61A has, similarly to the transmit section overhead inserting unit 61C described hereinbefore with reference to FIG. 17, has the AND gate 611, the AND gate 612 of a one-input inverting type and the OR gate 613.

In the error information inserting unit 61 (the transmit path overhead inserting unit 61A), when the SEF signal is generated (becomes the "H" level) by the STM synchronizing unit 21 and an output of the AND gate 237E of the path far end block error information detecting unit 23E-2 becomes the "L" level, an output of the AND gate 611 becomes the "L" level, too, so that the path far end block error information at that time is not inserted as the G1 byte of the section overhead 8 that should be inserted to a down signal on the apparatus side, whereby transfer of the path far end block error information to the error information inserting unit 61 (the transmit path overhead inserting unit 61A) of the transmit STM processing unit 6 is inhibited.

According to this embodiment, the path far end block error information lacking reliability in results of the arithmetic operation obtained while a received STM frame is out of synchronization is not transferred to the error information inserting unit 61. It is therefore possible to certainly avoid unnecessary switching of a transmission path in an apparatus or the like receiving the path far end block error information to switch the transmission path, as well.

It is alternatively possible to configure the error information detecting unit 23 (refer to FIG. 25) according to this embodiment, similarly to the error information detecting unit 23 shown in FIG. 17, such that the AND gate 237E of the path far end block error information detecting unit 23E-2 is omitted as described before with reference to FIG. 27, for example, the AND gate 238E of a one-input inverting type for conducting a logical product arithmetic operation on an inverted signal of the SEF signal and the reset signal is used in the B3 byte arithmetic operation processing unit 23E-1, and a signal obtained by inverting an output of the AND gate 238E is inputted to each of clock terminals (CLs) of the B3 parity arithmetically operating unit 231E, the B3 parity arithmetic operation result holding register 232E and the line far end block error information holding register 236E of the path far end block error information detecting unit 23E-2, as shown in FIG. 27, for example. With this arrangement, it is, as well, possible to inhibit the path far end block error information from being transferred to the error information inserting unit 61 while the SEF signal is generated.

According to this embodiment, it is alternatively possible that the SEF signal fed from the STM synchronizing unit 21 of the receive STM processing unit 2 is received by the error information inserting unit 61 (the transmit path overhead inserting unit 61A) of the transmit STM processing unit 6 as shown in FIG. 29.

In this case, the B3 byte processing unit 23E and the transmit path overhead inserting unit 61A have structures shown in FIG. 30, in which the AND gate 237E in the path far end block error information detecting unit 23E-2 shown in FIG. 25 is omitted in the B3 byte processing unit 23E, and the AND gate 614 of a one-input inverting type for conducting a logical multiplication arithmetic operation on the G1 timing and an inverted signal of the SEF signal is added to the structure shown in FIG. 17 of the transmit path overhead inserting unit 61A.

With the above arrangement, the error information detecting unit 23 and the error information inserting unit 61 shown in FIG. 30 can stop (inhibit) transfer of the path far end block error information to the error information inserting unit 61 while the SEF signal is generated.

Further, the essential part of the error information detecting unit 23 and the performance monitor 24 shown in FIG. 56 according to this embodiment are configured as shown in FIG. 32, where the error information detecting unit 23 has the B1 byte processing unit 23C which has the B1 byte arithmetic operation processing unit (B1-BiP) 23C-1 for conducting a necessary process such as the parity arithmetic operation or the like on the B1 byte included in the section overhead 8 extracted by the receive section overhead extracting unit 23A to detect the B1 parity error (section error) information about the STM transmission path, and the B1 byte count value detecting unit 23C-2 for detecting a count value (BLCV) used for monitoring by the performance monitor 24 on the basis of the B1 parity error information obtained by the B1 byte arithmetic operation processing unit 23C-1.

In this case, the B1 byte arithmetic operation processing unit 23C-1 has the B1 parity arithmetically operating unit 231C, the B1 parity arithmetic operation result holding register 232C, the AND gate 233C, the comparing unit 234C and the binary converting unit 235C, whereas the B1 byte count value detecting unit 23C-2 has the B1 byte count value holding register 236C and the AND gate 237C of a one-input inverting type, as shown in FIG. 33. Further, the performance monitor 24 has the adding unit (ADD) 241, the AND gate 242 of a one-input inverting type and the accumulation holding register 243.

In the error information detecting unit 23 (the B1 byte arithmetic operation processing unit 23C-1 and the B1 byte count value detecting unit 23C-2), when the SEF signal is generated (becomes the "H" level) by the STM synchronizing unit 21 and an output of the AND gate 237C of the B1 byte count value detecting unit 23C-2 becomes the "L" level (data "0"), an output of the adding unit 241 of the performance monitor 24 is held to data obtained at the preceding point of time so that the transmission path switching information to be fed to the microcomputer is held to data obtained immediately before generation of the SEF signal. In consequence, transfer of the B1 parity error information to the performance monitor 24 is stopped (inhibited).

According to this embodiment, the error information detecting unit 23 of the receive STM processing unit 2 does not transfer the B1 parity error information lacking reliability in results of the arithmetic operation obtained while a received STM frame is out of synchronization to the performance monitor 24. It is therefore possible to certainly avoid unnecessary switching of the transmission path in a microcomputer or the like receiving the B1 parity error information to switch the transmission path.

It is alternatively possible to configure the above error information detecting unit 23, as shown in FIG. 35, such that the AND gate 237C of the B1 byte count value detecting unit 23C-2 is omitted, the AND gate 238C of a one-input inverting type for conducting a logical multiplication arithmetic operation on an inverted signal of the SEF signal and the reset signal is used in the B1 byte arithmetic operation processing unit 23C-1, and a signal obtained by inverting an output of the AND gate 238C is inputted to each of clock terminals (CLs) of the B1 parity arithmetically operating unit 231C, the B1 parity arithmetic operation result holding register 232C and the B1 byte count value holding register 236C of the B1 byte count value detecting unit 23C-2. With such the arrangement, it is, as well, possible to inhibit transfer of the B1 parity error information to the performance monitor 24 while the SEF signal is generated.

In this embodiment, it is alternatively possible that the SEF signal fed from the STM synchronizing unit 21 of the receive STM processing unit 2 is received by the performance monitor 24 as shown in FIG. 29.

In which case, the B1 byte processing unit 23C and the performance monitor 24 are configured, as shown in FIG. 38, such that the B1 byte processing unit 23C having the structure shown in FIG. 33 has the B1 byte count value detecting unit 23C-2 in which the AND gate 237C is omitted, and the performance monitor 24 having the structure shown in FIG. 33 further has the AND gate 244 of a one-input inverting type for conducting a logical product arithmetic operation on the B1 timing and an inverted signal of the SEF signal.

The essential part of the error information detecting unit 23 and the performance monitor 24 of this embodiment are configured as shown in FIG. 40, where the error information detecting unit 23 has the B2 byte processing unit 23D. Further, the B2 byte processing unit 23D has the B2 byte arithmetic operation processing unit (B2-BiP) 23D-1 for conducting a necessary process such as the parity arithmetic operation or the like on the B2 byte included in the section overhead 8 extracted by the receive section overhead extracting unit 23A to detect the line error (B2 parity error) information of the STM transmission path, and the B2 byte count value detecting unit 23D-3 for detecting a count value (B2CV) used for monitoring by the performance monitor 24 on the basis of the B2 parity error information obtained by the B2 byte arithmetic operation processing unit 23D-1.

As shown in FIG. 41, the B2 byte arithmetic operation processing unit 23D-1 the B2 parity arithmetically processing unit 231D, the B2 parity arithmetic operation result holding register 232D, the AND gate 233D, the comparing unit 234D and the binary converting unit 235D, whereas the B2 byte count value detecting unit 23D-3 has the B2 byte count value holding register 239D and the AND gate 237D of a one-input inverting type.

In the error information detecting unit 23 (the B2 byte arithmetic operation processing unit 23D-1 and the B2 byte count value detecting unit 23D-3) according to this embodiment, when the SEF signal is generated (becomes the "H" level) by the STM synchronizing unit 21 and an output of the AND gate 237D of the B2 byte count value detecting unit 23D-3 becomes the "L" level (data "0"), an output of the adding unit 241 of the performance monitor 24 is held to data obtained at the preceding point of time so that the transmission path switching information to be fed to the microcomputer is also held to data obtained immediately before generation of the SEF signal. In consequence, transfer of the B2 parity error information to the performance monitor 24 is stopped (inhibited).

Accordingly, the B2 parity error information lacking reliability in results of the arithmetic operation obtained while a received STM frame is out of synchronization is not transferred to the performance monitor 24, whereby unnecessary switching of the transmission path is certainly avoided in a microcomputer or the like receiving the B2 parity error information to switch the transmission path.

It is alternatively possible to configure the above error information detecting unit 23 such that, as shown in FIG. 43, the AND gate 237D of the B2 byte count value detecting unit 23D-3 is omitted, the AND gate 238D of a one-input inverting type for conducting a logical multiplication arithmetic operation on an inverted signal of the SEF signal and the reset signal is used in the B2 byte arithmetic operation processing unit 23D-1, and a signal obtained by inverting an output of the AND gate 238D is inputted to each of clock terminals (CLs) of the B2 parity arithmetically operating unit 231, the B2 parity arithmetic operation result holding register 232D and the B2 byte count value holding register 239D of the B2 byte count value detecting unit 23D-3. With such the arrangement, it is, as well, possible to inhibit transfer of the B2 parity error information to the performance monitor 24 while the SEF signal is generated.

In this case, it is alternatively possible that the SEF signal fed from the STM synchronizing unit 21 of the receive STM processing unit 2 is received by the performance monitor 24 as shown in FIG. 45. In which case, the B2 byte processing unit 23D and the performance monitor 24 are configured such that the B2 byte processing unit 23D having the structure shown in FIG. 41 has the B2 byte count value detecting unit 23D-3 in which the AND gate 237D is omitted and the performance monitor 24 having the structure shown in FIG. 41 further has the AND gate 244 of a one-input inverting type for conducting a logical product arithmetic operation on the B2 timing and an inverted signal of the SEF signal, as shown in FIG. 46.

The essential part of the error information detecting unit 23 and the performance monitor 24 according to this embodiment are configured such that, as shown in FIG. 48, the error information detecting unit 23 has the B3 byte processing unit 23E, the B3 byte processing unit 23E has the B3 byte arithmetic operation processing unit (B3-BiP) 23E-1 for conducting a necessary process such as the parity arithmetic operation on the B3 byte included in the path overhead 9 extracted by the receive path overhead extracting unit 23B to detect the B3 parity error (path error) information of the STM transmission path and the B3 byte count value detecting unit 23E-3 for detecting a count value (B3CV) used for monitoring by the performance monitor 24 on the basis of the B3 parity error information obtained by the B3 byte arithmetic operation processing unit 23E-1.

In this case, the B3 byte arithmetic operation processing unit 23E-1 has the B3 parity arithmetically operating unit 231E, and B3 parity arithmetic operation result holding register 232E, the AND gate 233E, the comparing unit 234E and the binary converting unit 235E, whereas the B3 byte count value detecting unit 23E-3 has the B3 byte count value holding register 239E and the AND gate 237E of a one-input inverting type, as shown in FIG. 49.

In the error information detecting unit 23 (the B3 byte arithmetic operation processing unit 23E-1 and the B3 byte count value detecting unit 23E-3), when the SEF signal is generated (becomes the "H" level) from the STM synchronizing unit 21 and an output of the AND gate 237E of the B3 byte count value detecting unit 23E-3 becomes the "L" level (data "0"), an output of the adding unit 241 of the performance monitor 24 is held to data obtained at the preceding point of time so that the transmission path switching information to be transferred to the microcomputer is held to data obtained immediately before generation of the SEF. In consequence, transfer of the B3 parity error information to the performance monitor 24 is stopped (inhibited).

According to this embodiment, the B3 parity error information lacking reliability in results of the arithmetic operation obtained while a received STM frame is out of synchronization is not transferred to the performance monitor 24, whereby unnecessary switching of he transmission path is certainly avoided in a microcomputer or the like receiving the B3 parity error information to switch the transmission path.

The above error information detecting unit 23 may be alternatively configured such that the AND gate 237E of the B3 byte count value detecting unit 23E-3 is omitted, the AND gate 238E of a one-input inverting type for conducting a logical multiplication arithmetic operation on an inverted signal of the SEF signal and the reset signal is used in the B3 byte arithmetic operation processing unit 23E-1, and a signal obtained by inverting an output of the AND gate 238E is inputted to each of clock terminals (CLs) of the B3 parity arithmetic operating unit 231E, the B3 parity arithmetic operation result holding register 232E and the B3 byte count value holding register 239E of the B3 byte count value detecting unit 23E-3. With this arrangement, it is, as well, possible to inhibit transfer of the B3 parity error information to the performance monitor 24 while the SEF signal is generated, as shown in FIG. 51.

The SEF signal fed from the STM synchronizing unit 21 of the receive STM processing unit 2 may be alternatively received by the performance monitor 24 as shown in FIG. 53. In which case, the B3 byte processing unit 23E having the structure shown in FIG. 49 has the B3 byte count value detecting unit 23E-3 in which the AND gate 237E is omitted, whereas the performance monitor 24 having the structure shown in FIG. 49 further has the AND gate 244 of a one-input inverting type for conducting a logical product arithmetic operation on the B3 timing and an inverted signal of the SEF signal, as shown in FIG. 54.

The STM/ATM converting transmission path terminating apparatus 1 according to this embodiment promptly suspends capture of the ATM cell data if an alarm such as the P-AIS or the LOP is generated so as to continue at any time the process on the basis of accurate ATM cell data.

It is also possible to always transfer error information used to switch a transmission path to the transmit STM processing unit 6 and the performance monitor 24 so as to prevent unnecessary switching of the transmission path.

(d) Others

The above terminating apparatus 1 according to the first and second embodiments has the error information detecting unit 23, the microcomputer interface 24 and the error information inserting unit 61, as shown in FIGS. 4 and 56. However, It is alternatively possible that the terminating apparatus 1 has either a combination of the error information detecting unit 23 and the error information inserting unit 61 or a combination of the error information detecting unit 23 and the microcomputer interface 24, thereby preventing unnecessary switching of the transmission path similarly to the first and second embodiments.

What is claimed is:

1. A synchronous transfer mode/asynchronous transfer mode converting transmission path terminating apparatus for terminating a synchronous transfer mode transmission path to conduct a switching process in an asynchronous transfer mode comprising:

a receive synchronous transfer mode processing unit for receiving a synchronous transfer mode signal sent from said synchronous transfer mode transmission path to conduct a necessary process on overhead information included in said synchronous transfer mode signal;

an asynchronous transfer mode cell extracting unit for extracting an asynchronous transfer mode cell on the basis of a signal having been undergone the process in said receive synchronous transfer mode processing unit;

an asynchronous transfer mode switching unit for conducting a switching process on a signal fed from said asynchronous transfer mode cell extracting unit;

an asynchronous transfer mode cell inserting unit for inserting a synchronous transfer mode cell into a signal fed from said asynchronous transfer mode switching unit;

a transmit synchronous transfer mode processing unit for conducting a necessary process on the overhead information of a signal fed from said asynchronous transfer mode cell inserting unit to transmit the synchronous transfer mode signal to said synchronous transfer mode transmission path or another synchronous transfer mode transmission path;

said receive synchronous transfer mode processing unit comprising an out of synchronization detecting unit for detecting out of synchronization information from the received synchronous transfer mode signal;

said asynchronous transfer mode cell extracting unit comprising;

a header error information arithmetically operating unit for determining header error information of the asynchronous transfer mode cell through an arithmetic operation;

an asynchronous transfer mode cell synchronizing unit for judging a synchronous state of the received synchronous transfer mode signal on the basis of the header error information fed from said header error information arithmetically operating unit, besides forcibly outputting a signal representing that the received synchronous transfer mode signal is out of synchronization when receiving the out of synchronization information detected by said out of synchronization detecting unit of said receive synchronous transfer mode processing unit;

an asynchronous transfer mode cell discard judging unit for receiving synchronization judgement information fed from said asynchronous transfer mode cell synchronizing unit to judge whether the asynchronous transfer mode cell should be discarded or not, besides forcibly outputting a cell discard signal when receiving the out of synchronization information detected by said out of synchronization detecting unit of said receive synchronous transfer mode processing unit;

a storage unit for successively storing the asynchronous transfer mode cell having synchronous transfer mode signal information received;

a storage write controlling unit for conducting a control to write the asynchronous transfer mode cell in said storage unit on the basis of outputs from said asynchronous transfer mode cell synchronizing unit and said asynchronous transfer mode cell discard judging unit, besides forcibly inhibiting the asynchronous transfer mode cell from being written in said storage unit when receiving the out of synchronization information detected by said out of synchronization detecting unit of said receive synchronous transfer mode processing unit; and a storage read controlling unit for conducting a control to read asynchronous transfer mode cell information stored in said storage unit to output it to said asynchronous transfer mode switching unit.

2. The synchronous transfer mode/asynchronous transfer mode converting transmission path terminating apparatus according to claim 1, wherein said asynchronous transfer mode cell synchronizing unit has a synchronization guarding unit for outputting a signal representing synchronization or out of synchronization by receiving the header error information fed from said header error information arithmetically operating unit two or more times, and said synchronization guarding unit has a circuit unit for forcibly outputting a signal representing that the received synchronous transfer mode signal is out of synchronization when receiving the out of synchronization information detected by said out of synchronization detecting unit of said receive synchronous transfer mode processing unit.

3. The synchronous transfer mode/asynchronous transfer mode converting transmission path terminating apparatus according to claim 1, wherein said asynchronous transfer mode cell discard judging unit comprises an idle cell detecting unit for detecting an idle cell from asynchronous transfer mode cell data, a bit error detecting unit for detecting a bit error from the header error information fed from said header error information arithmetically operating unit, and a cell discard signal holding unit for holding the synchronization judgement information fed from said asynchronous transfer mode cell synchronizing unit, the out of synchronization information detected by said out of synchronization detecting unit of said receive synchronous transfer mode processing unit, idle cell detection information fed from said idle cell detecting unit and bit error detection information fed from said bit error detecting unit.

4. The synchronous transfer mode/asynchronous transfer mode converting transmission path terminating apparatus according to claim 1, wherein said storage write controlling unit comprises a write address counting unit for counting a write address to said storage unit and a write address counting controlling unit for controlling said write address counting unit on the basis of outputs from said asynchronous transfer mode cell synchronizing unit and said asynchronous transfer mode cell discard judging unit, and said address counting controlling unit controls said address counting unit in order to forcibly inhibit the asynchronous transfer mode cell from being written in said storage unit when receiving the out of synchronization information detected by said out of synchronization detecting unit of said receive synchronous transfer mode processing unit.

5. A synchronous transfer mode/asynchronous transfer mode converting transmission path terminating apparatus for terminating a synchronous transfer mode transmission path to conduct a switching process in an asynchronous transfer mode comprising:

a receive synchronous transfer mode processing unit for receiving a synchronous transfer mode signal sent from said synchronous transfer mode transmission path to conduct a necessary process on overhead information included in said synchronous transfer mode signal;

an asynchronous transfer mode cell extracting unit for extracting an asynchronous transfer mode cell on the basis of a signal having been undergone the process in said receive synchronous transfer mode processing unit;

an asynchronous transfer mode switching unit for conducting a switching process on a signal fed from said asynchronous transfer mode cell extracting unit;

an asynchronous transfer mode cell inserting unit for inserting a synchronous transfer mode cell into a signal fed from said asynchronous transfer mode switching unit;

a transmit synchronous transfer mode processing unit for conducting a necessary process on the overhead information of a signal fed from said asynchronous transfer mode cell inserting unit to transmit the synchronous transfer mode signal to said synchronous transfer mode transmission path or another synchronous transfer mode transmission path; and said receive synchronous transfer mode processing unit comprising an out of synchronization detecting unit for detecting out of synchronization information from the received synchronous transfer mode signal;

said synchronous transfer mode cell extracting unit executing at least any one among a process of forcibly judging that the received synchronous transfer mode cell is out of synchronization, a process of forcibly outputting a cell discard signal and a process of forcibly inhibiting the asynchronous transfer mode cell from being written in a storage unit.

6. A synchronous transfer mode/asynchronous transfer mode converting transmission path terminating apparatus for terminating a synchronous transfer mode transmission path to conduct a switching process in an asynchronous transfer mode comprising:

a receive synchronous transfer mode processing unit for receiving a synchronous transfer mode signal sent from said synchronous transfer mode transmission path to conduct a necessary process on overhead information included in said synchronous transfer mode signal;

an asynchronous transfer mode cell extracting unit for extracting an asynchronous transfer mode cell on the basis of a signal having been undergone the process in said receive synchronous transfer mode processing unit;

an asynchronous transfer mode switching unit for conducting a switching process on a signal fed from said asynchronous transfer mode cell extracting unit;

an asynchronous transfer mode cell inserting unit for inserting a synchronous transfer mode cell into a signal fed from said asynchronous transfer mode switching unit;

a transmit synchronous transfer mode processing unit for conducting a necessary process on the overhead information of a signal fed from said asynchronous transfer mode cell inserting unit to transmit the synchronous transfer mode signal to said synchronous transfer mode transmission path;

said receive synchronous transfer mode processing unit comprising an out of synchronization detecting unit for detecting out of synchronization information from the received synchronous transfer mode signal and a receive pointer processing unit for conducting a necessary process on pointer information of the overhead information of the received synchronous transfer mode signal besides outputting an alarm signal on the basis of the out of synchronization information detected by said out of synchronization detecting unit;

said asynchronous transfer mode cell extracting unit comprising;

a header error information arithmetically operating unit for determining header error information of the asynchronous transfer mode cell through an arithmetic operation;

an asynchronous transfer mode cell synchronizing unit for judging a synchronous state of the received synchronous transfer mode signal on the basis of the header error information fed from said header error information arithmetically operating unit besides forcibly outputting a signal representing that the received synchronous transfer mode signal is out of synchronization when receiving the alarm signal from said receive pointer processing unit of said receive synchronous transfer mode processing unit;

an asynchronous transfer mode cell discard judging unit for receiving synchronization judgement information fed from said asynchronous transfer mode cell synchronizing unit to judge whether the asynchronous transfer mode cell should be discarded or not besides forcibly outputting a cell discard signal when receiving the alarm signal from said receive pointer processing unit of said receive synchronous transfer mode processing unit;

a storage unit for successively storing the asynchronous transfer mode cell having synchronous transfer mode signal information received;

a storage write controlling unit for conducting a control to write the asynchronous transfer mode cell in said storage unit on the basis of outputs from said asynchronous transfer mode cell synchronizing unit and said asynchronous transfer mode cell discard judging unit; and a storage read controlling unit for conducting a control to read asynchronous transfer mode cell information stored in said storage unit to output it to said asynchronous transfer mode switching unit.

7. The synchronous transfer mode/asynchronous transfer mode converting transmission path terminating apparatus according to claim 6, wherein said asynchronous transfer mode cell synchronizing unit has a synchronization guarding unit for outputting a signal representing synchronization or out of synchronization by receiving the header error information fed from said header error information arithmetically operating unit two or more times, and said synchronization guarding unit has a circuit unit for forcibly outputting a signal representing that the received synchronous transfer mode signal is out of synchronization when receiving the alarm signal from said receive pointer processing unit of said receive synchronous transfer mode processing unit.

8. The synchronous transfer mode/asynchronous transfer mode converting transmission path terminating apparatus according to claim 6, wherein said asynchronous transfer mode cell discard judging unit comprises an idle cell detecting unit for detecting an idle cell from asynchronous transfer mode cell data, a bit error detecting unit for detecting a bit error from the header error information fed from said header error information arithmetically operating unit, and a cell discard signal holding unit for holding the synchronization judgement information fed from said asynchronous transfer mode cell synchronizing unit, the alarm signal fed from said receive pointer processing unit of said receive synchronous transfer mode processing unit, idle cell detection information fed from said idle cell detecting unit and bit error detection information fed from said bit error detecting unit.

9. A synchronous transfer mode/asynchronous transfer mode converting transmission path terminating apparatus for terminating a synchronous transfer mode transmission path to conduct a switching process in an asynchronous transfer mode comprising:

a receive synchronous transfer mode processing unit for receiving a synchronous transfer mode signal sent from said synchronous transfer mode transmission path to conduct a necessary process on overhead information included in said synchronous transfer mode signal;

an asynchronous transfer mode cell extracting unit for extracting an asynchronous transfer mode cell on the basis of a signal having been undergone the process in said receive synchronous transfer mode processing unit;

an asynchronous transfer mode switching unit for conducting a switching process on a signal fed from said asynchronous transfer mode cell extracting unit;

an asynchronous transfer mode cell inserting unit for inserting a synchronous transfer mode cell into a signal fed from said asynchronous transfer mode switching unit;

a transmit synchronous transfer mode processing unit for conducting a necessary process on the overhead information of a signal fed from said asynchronous transfer mode cell inserting unit to transmit a synchronous transfer mode signal to said synchronous transfer mode transmission path or another synchronous transfer mode transmission path;

said receive synchronous transfer mode processing unit comprising an out of synchronization detecting unit for detecting out of synchronization information from the received synchronous transfer mode signal and a receive pointer processing unit for conducting a necessary process on pointer information of the overhead information of the received synchronous transfer mode signal besides outputting an alarm signal on the basis of the out of synchronization information detected by said out of synchronization detecting unit; and said asynchronous transfer mode cell extracting unit executing at least either a process of forcibly judging that the received synchronous transfer mode signal is out of synchronization or a process of forcibly outputting a cell discard signal when receiving the alarm signal from said receive pointer processing unit of said receive synchronous transfer mode processing unit.

10. A synchronous transfer mode/asynchronous transfer mode converting transmission path terminating apparatus for terminating a synchronous transfer mode transmission path to conduct a switching process in an asynchronous transfer mode comprising:

a receive synchronous transfer mode processing unit for receiving a synchronous transfer mode signal sent from said synchronous transfer mode transmission path to conduct a necessary process on overhead information included in said synchronous transfer mode signal;

an asynchronous transfer mode cell extracting unit for extracting an asynchronous transfer mode cell on the basis of a signal having been undergone the process in said receive synchronous transfer mode processing unit;

an asynchronous transfer mode switching unit for conducting a switching process on a signal fed from said asynchronous transfer mode cell extracting unit;

an asynchronous transfer mode cell inserting unit for inserting a synchronous transfer mode cell into a signal fed from said asynchronous transfer mode switching unit;

a transmit synchronous transfer mode processing unit for conducting a necessary process on the overhead information of a signal fed from said asynchronous transfer mode cell inserting unit to transmit the synchronous transfer mode signal to said synchronous transfer mode transmission path or another synchronous transfer mode transmission path;

said receive synchronous transfer mode processing unit comprising an out of synchronization detecting unit for detecting out of synchronization information from the received synchronous transfer mode signal and an error information detecting unit for detecting error information from the received synchronous transfer mode signal; and said transmit synchronous transfer mode processing unit comprising an error information inserting unit for inserting the error information fed from said error information detecting unit of said receive synchronous transfer mode processing unit to provide information used to switch a transmission path;

said error information detecting unit of said receive synchronous transfer mode processing unit inhibiting transfer of the error information to said error information inserting unit of said transmit synchronous transfer mode processing unit when receiving the out of synchronization information from said out of synchronization detecting unit.

11. The synchronous transfer mode/asynchronous transfer mode converting transmission path terminating apparatus according to the claim 10, wherein said error information detecting unit of said receive synchronous transfer mode processing unit detects line far end block error information.

12. The synchronous transfer mode/asynchronous transfer mode converting transmission path terminating apparatus according to the claim 10, wherein said error information detecting unit of said receive synchronous transfer mode processing unit detects path far end block error information.

13. A synchronous transfer mode/asynchronous transfer mode converting transmission path terminating apparatus for terminating a synchronous transfer mode transmission path to conduct a switching process in an asynchronous transfer mode comprising:

a receive synchronous transfer mode processing unit for receiving a synchronous transfer mode signal sent from said synchronous transfer mode transmission path to conduct a necessary process on overhead information included in said synchronous transfer mode signal;

an asynchronous transfer mode cell extracting unit for extracting an asynchronous transfer mode cell on the basis of a signal having been undergone the process in said receive synchronous transfer mode processing unit;

an asynchronous transfer mode switching unit for conducting a switching process on a signal fed from said asynchronous transfer mode cell extracting unit;

an asynchronous transfer mode cell inserting unit for inserting a synchronous transfer mode cell in a signal fed from said asynchronous transfer mode switching unit;

a transmit synchronous transfer mode processing unit for conducting a necessary process on the overhead information of a signal fed from said asynchronous transfer mode cell inserting unit to transmit the synchronous transfer mode signal to said synchronous transfer mode transmission path or another synchronous transfer mode transmission path; and said receive synchronous transfer mode processing unit comprising an out of synchronization detecting unit for detecting out of synchronization information from the received synchronous transfer mode signal, an error information detecting unit for detecting error information from the received synchronous transfer mode signal and a monitoring unit for monitoring the error information detected by said error information detecting unit to provide information used to switch a transmission path;

said error information detecting unit of said receive synchronous transfer mode processing unit inhibiting transfer of the error information to said monitoring unit when receiving the out of synchronization information from said out of synchronization detecting unit.

14. The synchronous transfer mode/asynchronous transfer mode converting transmission path terminating apparatus according to claim 13, wherein said error information detecting unit of said receive synchronous transfer mode processing unit detects section error information.

15. The synchronous transfer mode/asynchronous transfer mode converting transmission path terminating apparatus according to claim 13, wherein said error information detecting unit of said receive synchronous transfer mode processing unit detects line error information.

16. The synchronous transfer mode/asynchronous transfer mode converting transmission path terminating apparatus according to claim 13, wherein said error information detecting unit of said receive synchronous transfer mode processing unit detects path error information.

17. A synchronous transfer mode/asynchronous transfer mode converting transmission path terminating apparatus for terminating a synchronous transfer mode transmission path to conduct a switching process in an asynchronous transfer mode comprising:

- a receive synchronous transfer mode processing unit for receiving a synchronous transfer mode signal sent from said synchronous transfer mode transmission path to conduct a necessary process on overhead information included in said synchronous transfer mode signal;
- an asynchronous transfer mode cell extracting unit for extracting an asynchronous transfer mode cell on the basis of a signal having been undergone the process in said receive synchronous transfer mode processing unit;
- an asynchronous transfer mode switching unit for conducting a switching process on a signal fed from said asynchronous transfer mode cell extracting unit;
- an asynchronous transfer mode cell inserting unit for inserting a synchronous transfer mode cell into a signal fed from said asynchronous transfer mode switching unit;
- a transmit synchronous transfer mode processing unit for conducting a necessary process on the overhead information of a signal fed from said asynchronous transfer mode cell inserting unit to transmit the synchronous transfer mode signal to said synchronous transfer mode transmission path or another synchronous transfer mode transmission path;
- said receive synchronous transfer mode processing unit comprising an out of synchronization detecting unit for detecting out of synchronization information from the received synchronous transfer mode signal, an error information detecting unit for detecting first error information composed of far end block error information from the received synchronous transfer mode signal and second error information composed of transmission path error information from the received synchronous transfer mode signal, and a monitoring unit for monitoring said second error information detected by said error information detecting unit to provide information used to switch a transmission path; and
- said transmit synchronous transfer mode processing unit comprising an error information inserting unit for inserting said first error information fed from said error information detecting unit of said receive synchronous transfer mode processing unit to provide information used to switch the transmission path;
- said error information detecting unit of said receive synchronous transfer mode processing unit inhibiting transfer of said first error information to said error information inserting unit of said transmit synchronous transfer mode processing unit when receiving the out of synchronization information from said out of synchronization detecting unit besides inhibiting transfer of said second error information to said monitoring unit.

* * * * *